United States Patent
Tanaka et al.

(10) Patent No.: US 11,697,362 B2
(45) Date of Patent: Jul. 11, 2023

(54) CONVEYANCE SEAT

(71) Applicant: TS TECH CO., LTD., Saitama (JP)

(72) Inventors: Yuji Tanaka, Tochigi (JP); Masao Hayashi, Tochigi (JP); Yuji Ueno, Tochigi (JP); Takamasa Kubo, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 70 days.

(21) Appl. No.: 17/259,705

(22) PCT Filed: Jul. 12, 2019

(86) PCT No.: PCT/JP2019/027780
§ 371 (c)(1),
(2) Date: Jan. 12, 2021

(87) PCT Pub. No.: WO2020/013329
PCT Pub. Date: Jan. 16, 2020

(65) Prior Publication Data
US 2021/0331608 A1   Oct. 28, 2021

(30) Foreign Application Priority Data

Jul. 13, 2018 (JP) .................................. 2018-133552
Jul. 17, 2018 (JP) .................................. 2018-134415
(Continued)

(51) Int. Cl.
*B60N 2/30* (2006.01)
*B60N 2/90* (2018.01)

(52) U.S. Cl.
CPC ........... *B60N 2/3047* (2013.01); *B60N 2/309* (2013.01); *B60N 2/3013* (2013.01);
(Continued)

(58) Field of Classification Search
None
See application file for complete search history.

(56) References Cited

U.S. PATENT DOCUMENTS 6,024,411 A * 2/2000 Pesta ................... B60N 2/3011
297/378.12
6,196,610 B1 * 3/2001 Pesta .................. B60N 2/01591
296/65.09
(Continued)

FOREIGN PATENT DOCUMENTS

JP   07-040784 A   2/1995
JP   2001-180350 A   7/2001
(Continued)

OTHER PUBLICATIONS

Japanese Office Action dated Aug. 30, 2022 from the Japan Patent Office (JPO) for the related Japanese Patent Application No. 2018-134415, with machine English translation.
(Continued)

*Primary Examiner* — David E Allred
(74) *Attorney, Agent, or Firm* — Michael Best & Friedrich LLP

(57) ABSTRACT

Provided is a conveyance seat capable of reducing the number of components and reducing swing of a seat cushion while a vehicle is travelling. The conveyance seat is a seat including a cushion lock apparatus turnably coupling a seat cushion to a seat back and configured switchable between a seatable state and a housing state. The cushion lock apparatus includes a lock member attached to a seat cushion side, a lock target member attached to a seat back side and engaging with the lock member to lock turning motion of the seat cushion, and a position holding member holding at least one of the positions of the lock member and the lock target member to hold a state in which a clearance is, in the seatable state, formed between an engagement portion pro-
(Continued)

vided at the lock member and an engagement target portion provided at the lock target member.

20 Claims, 73 Drawing Sheets

(30) Foreign Application Priority Data

| Nov. 30, 2018 | (JP) | 2018-225628 |
|---|---|---|
| Feb. 22, 2019 | (JP) | 2019-030940 |
| Feb. 22, 2019 | (JP) | 2019-030941 |
| Mar. 14, 2019 | (JP) | 2019-047526 |
| Jun. 7, 2019 | (JP) | 2019-107190 |

(52) U.S. Cl.
CPC ......... *B60N 2/3075* (2013.01); *B60N 2/3093* (2013.01); *B60N 2/933* (2018.02); *B60N 2/995* (2018.02); *B60N 2002/971* (2018.02)

(56) References Cited

U.S. PATENT DOCUMENTS

| 6,227,619 | B1* | 5/2001 | Pesta | B60N 2/01591 |
| | | | | 297/378.12 |
| 6,361,098 | B1* | 3/2002 | Pesta | B60N 2/305 |
| | | | | 297/331 |
| 8,523,262 | B2* | 9/2013 | Haeske | B60N 2/3011 |
| | | | | 296/65.09 |
| 2004/0195890 | A1* | 10/2004 | Liu | B60N 2/236 |
| | | | | 297/367 R |
| 2005/0082865 | A1* | 4/2005 | Doxey | B60N 2/015 |
| | | | | 296/65.16 |
| 2006/0082204 | A1* | 4/2006 | Zhang | B60N 2/366 |
| | | | | 297/366 |
| 2006/0138836 | A1 | 6/2006 | Yudovich | |
| 2007/0080555 | A1* | 4/2007 | Lutzka | B60N 2/01583 |
| | | | | 296/65.03 |
| 2008/0030061 | A1* | 2/2008 | Pejathaya | B60N 2/847 |
| | | | | 297/367 R |
| 2009/0295185 | A1 | 12/2009 | Abe et al. | |
| 2011/0215627 | A1* | 9/2011 | Wieclawski | B60N 2/366 |
| | | | | 297/378.12 |
| 2013/0129413 | A1* | 5/2013 | Dryburgh | B60N 2/01583 |
| | | | | 403/316 |
| 2013/0341953 | A1* | 12/2013 | White | B60N 2/22 |
| | | | | 296/65.01 |
| 2014/0306479 | A1* | 10/2014 | Abe | B60N 2/3013 |
| | | | | 296/65.09 |
| 2015/0329014 | A1 | 11/2015 | Elton et al. | |
| 2016/0318426 | A1 | 11/2016 | Aita et al. | |
| 2017/0021746 | A1 | 1/2017 | Akutsu et al. | |
| 2017/0341543 | A1 | 11/2017 | Fujisawa et al. | |
| 2020/0171986 | A1* | 6/2020 | Höpfner | B60N 2/42781 |

FOREIGN PATENT DOCUMENTS

| JP | 2003-040009 A | 2/2003 | |
| JP | 2004-123001 A | 4/2004 | |
| JP | 2005-80740 A | 3/2005 | |
| JP | 2005-186642 A | 7/2005 | |
| JP | 2006-255393 A | 9/2006 | |
| JP | 2006-264454 A | 10/2006 | |
| JP | 2007-176404 A | 7/2007 | |
| JP | 2007-314061 A | 12/2007 | |
| JP | 2008-279182 A | 11/2008 | |
| JP | 2013-035390 A | 2/2013 | |
| JP | 2013-095272 A | 5/2013 | |
| JP | 2013-133053 A | 7/2013 | |
| JP | 2015-127157 A | 7/2015 | |
| JP | 2017-206263 A | 11/2017 | |
| JP | 2017-210138 A | 11/2017 | |
| JP | 2018-001926 A | 1/2018 | |
| JP | 2018-039513 A | 3/2018 | |
| JP | 2018-052435 A | 4/2018 | |
| JP | 2018-052436 A | 4/2018 | |
| JP | 2018-062341 A | 4/2018 | |
| JP | 2018-114931 A | 7/2018 | |
| JP | 2020132060 A * | 8/2020 | B60N 2/3013 |
| WO | 2013/099977 A1 | 7/2013 | |
| WO | 2015/137092 A1 | 9/2015 | |

OTHER PUBLICATIONS

International Search Report dated Sep. 17, 2019 for the corresponding PCT Application No. PCT/JP2019/027780, with English translation.

Japanese Office Action dated Oct. 4, 2022 from the Japan Patent Office (JPO) for the related Japanese Application No. 2018-133552, with machine English translation.

Japanese Office Action dated Jan. 10, 2023 from the Japan Patent Office (JPO) for the related Japanese Patent Application No. 2018-225628, with English machine translation.

Japanese Office Action dated Feb. 28, 2023, for the corresponding Japanese Patent Application No. 2019-030940, with English machine translation.

Japanese Office Action dated Apr. 4, 2023, for the corresponding Japanese Patent Application No. 2019-047526, with English machine translation.

Japanese Office Action dated May 9, 2023 from the Japan Patent Office (JPO) for the related Japanese patent application No. 2019-107190, with English machine translation.

* cited by examiner

FIG. 31
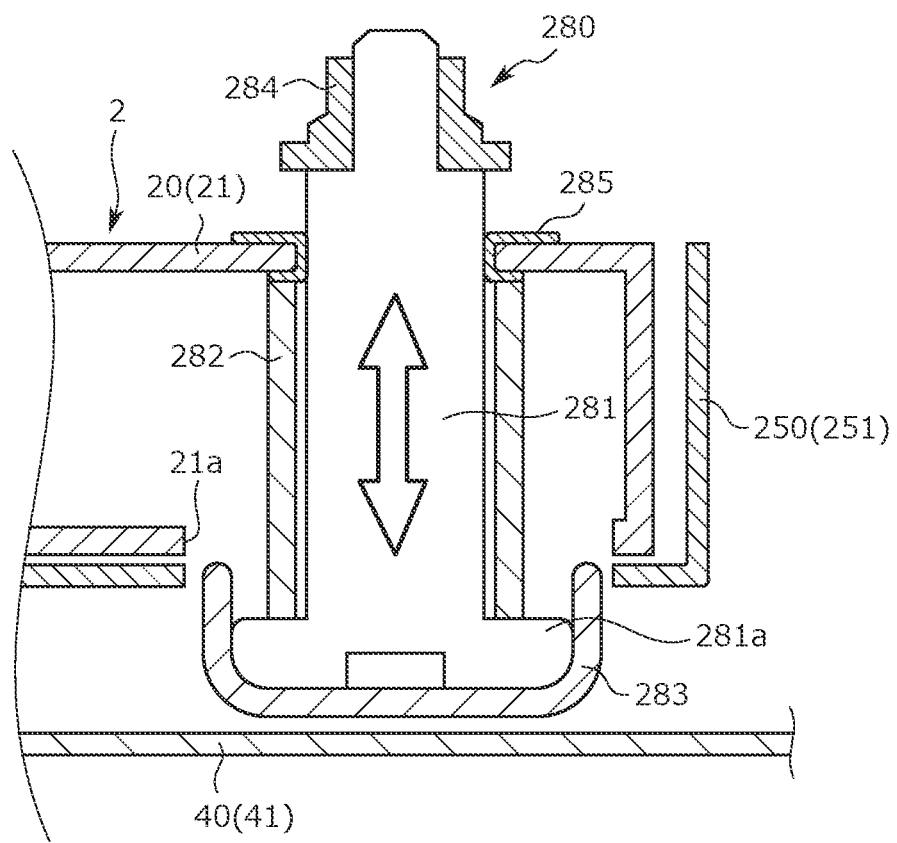
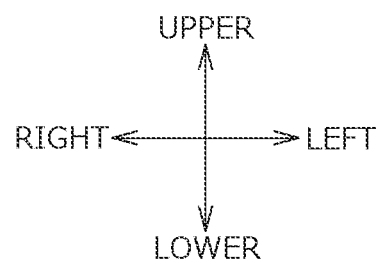

FIG. 47
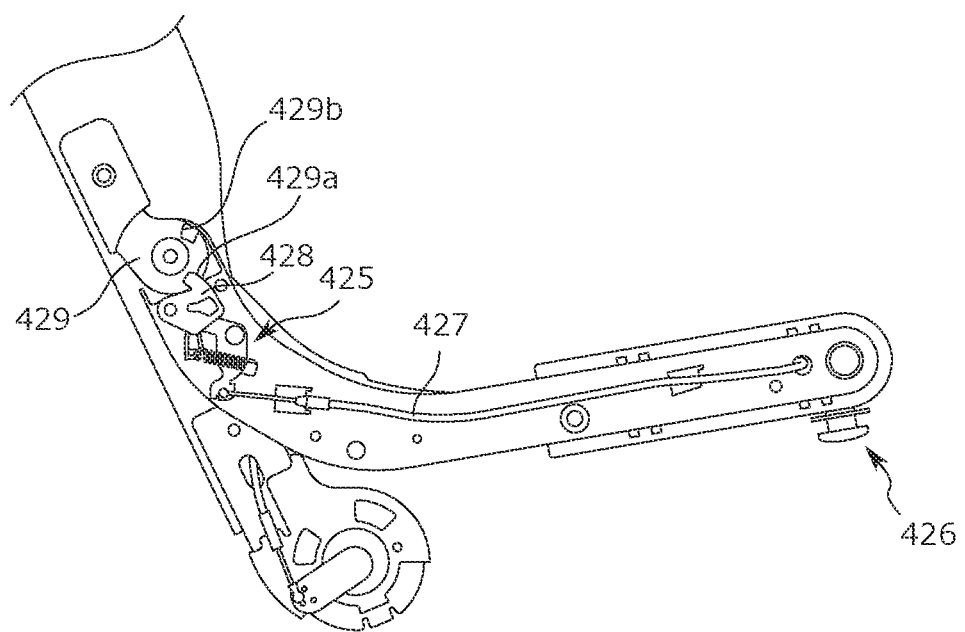
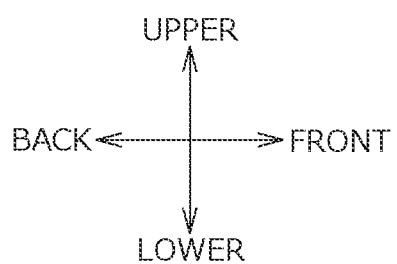

FIG. 48
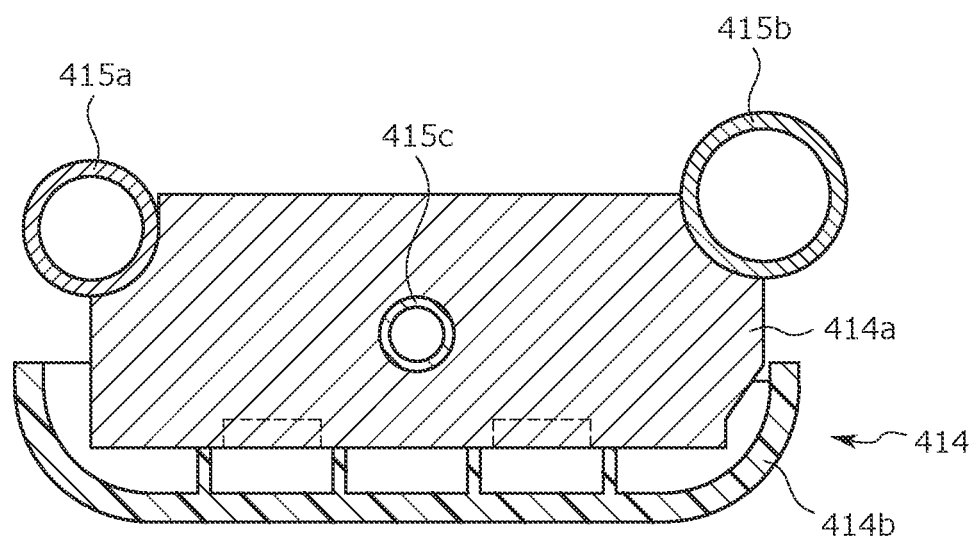
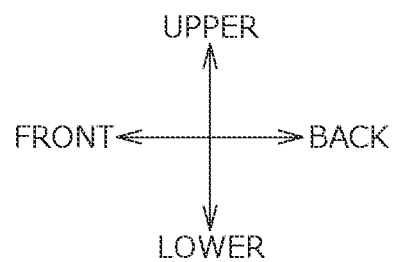

FIG. 49
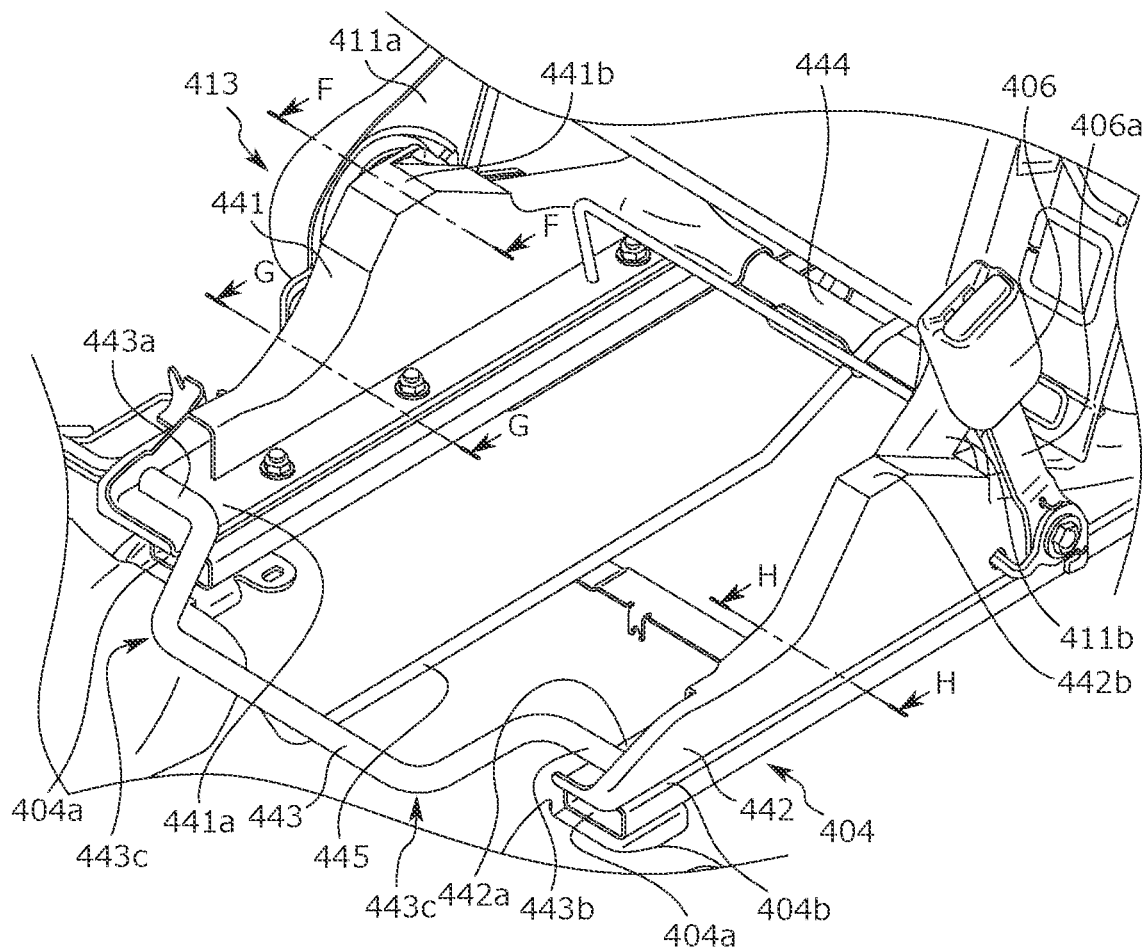
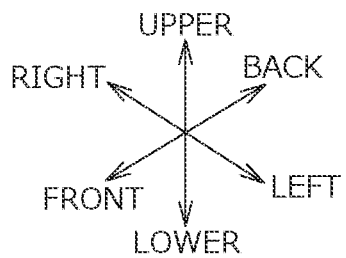

FIG. 53
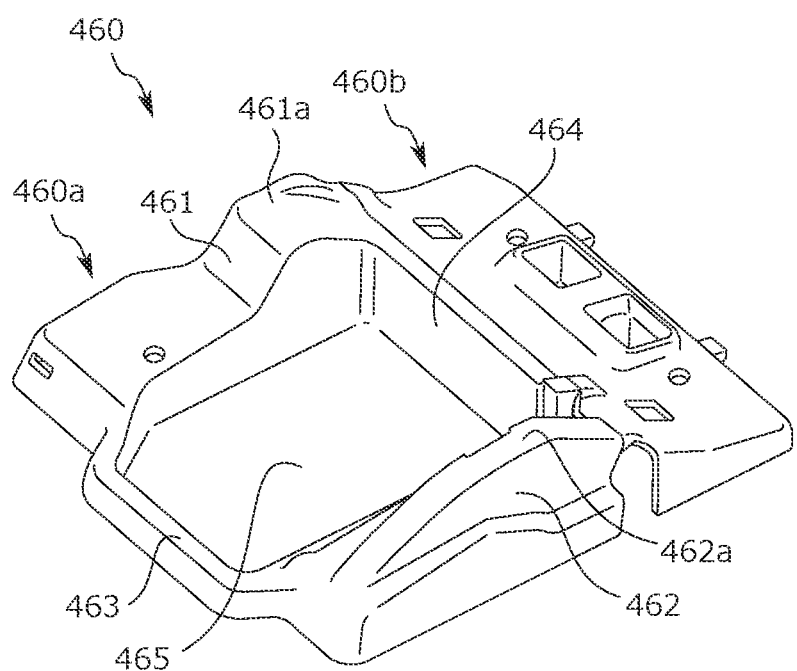
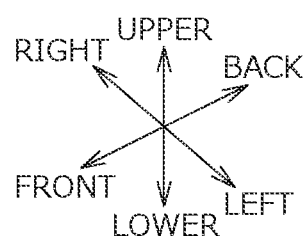

FIG. 54
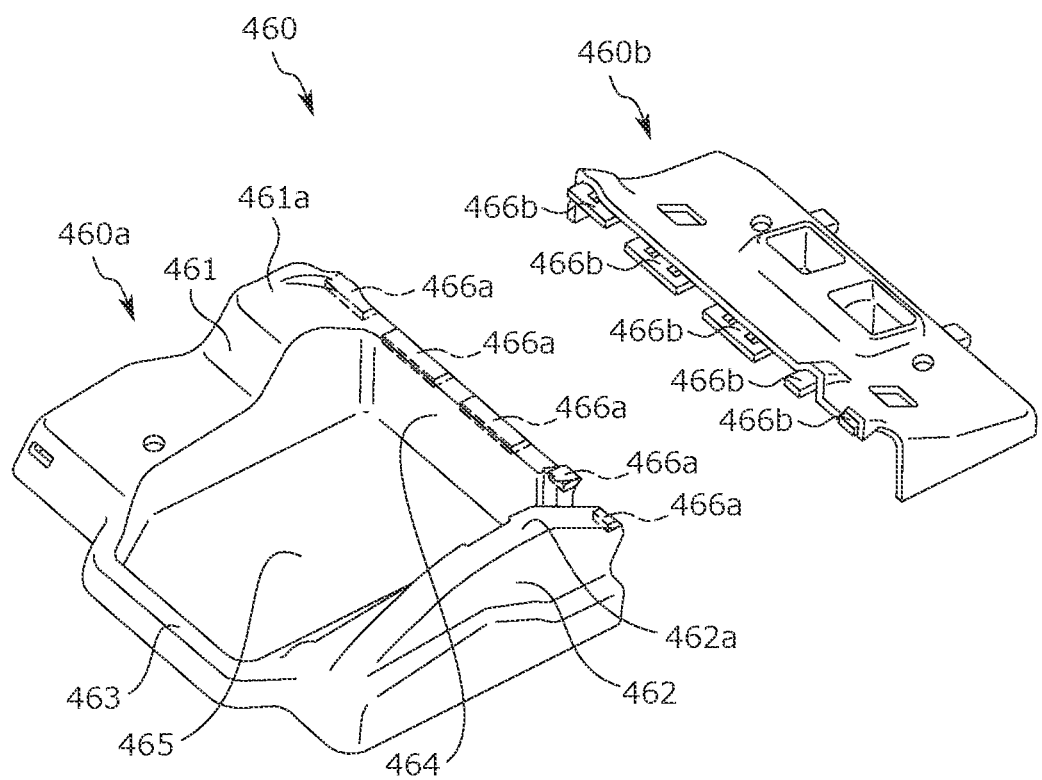
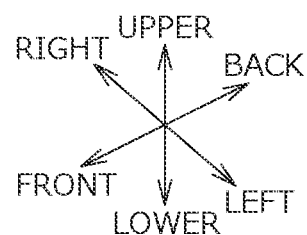

FIG. 56
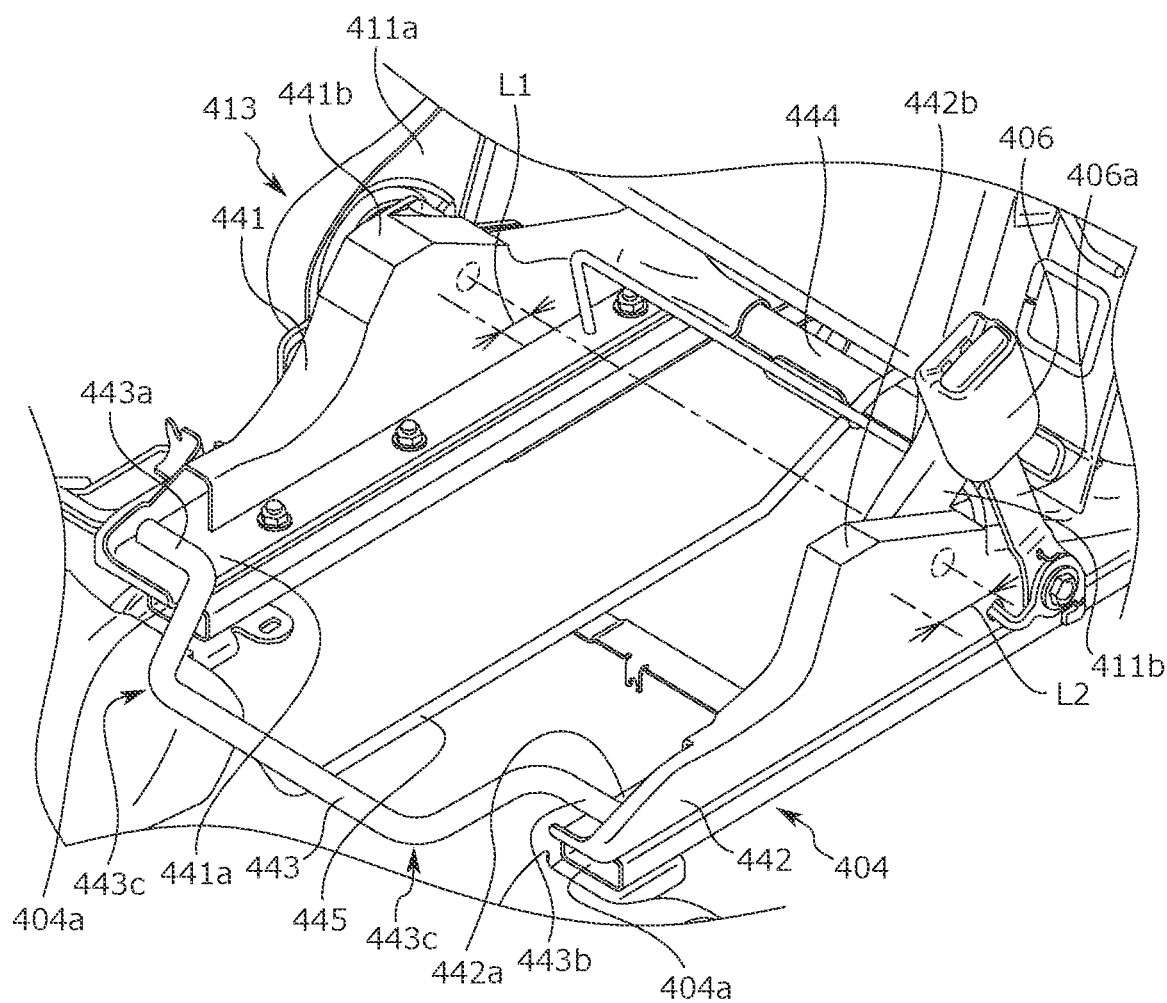
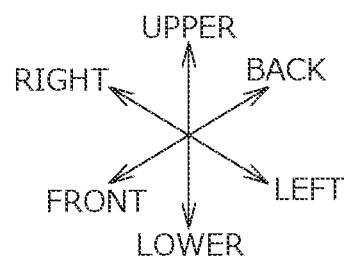

FIG. 61
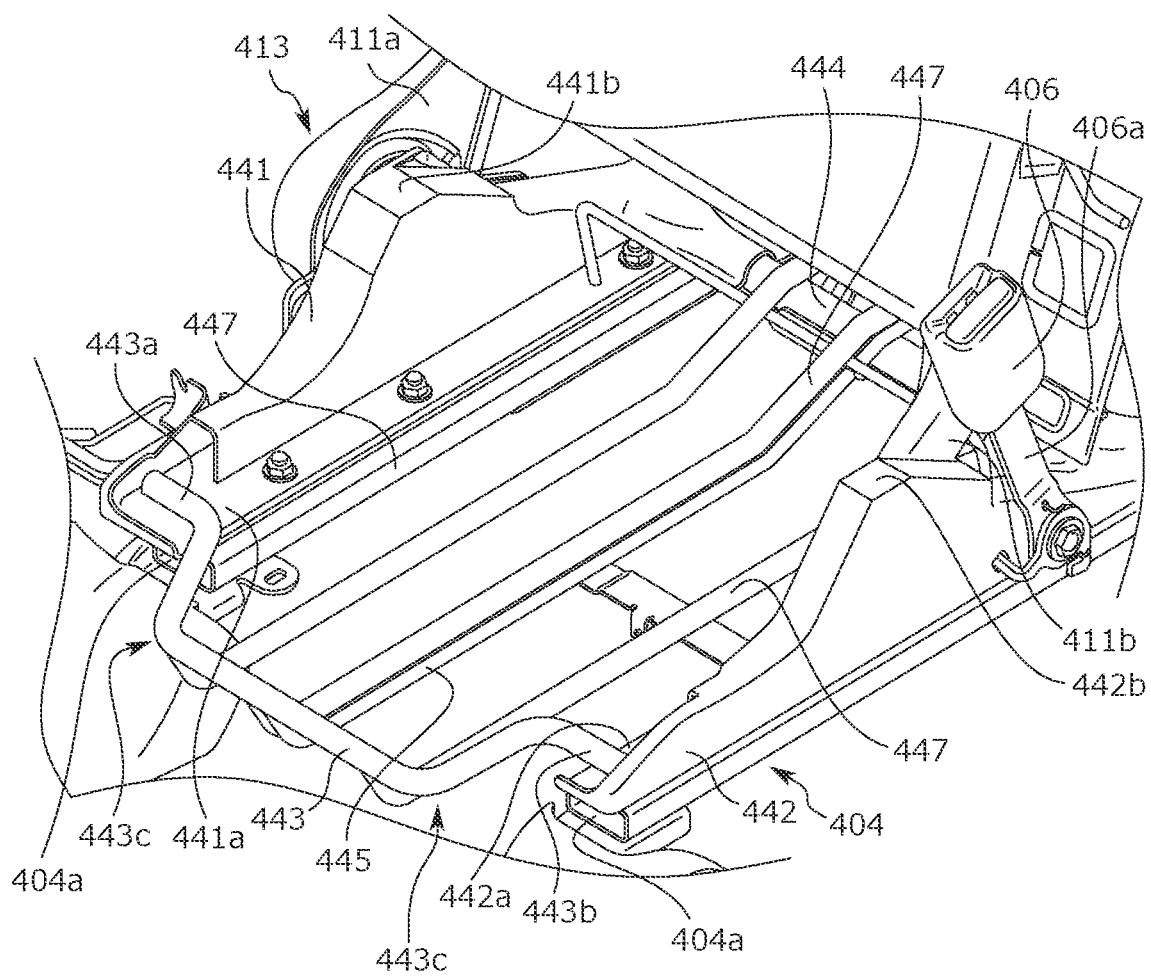
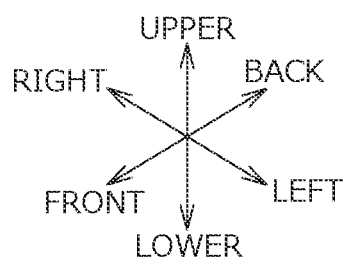

FIG. 64
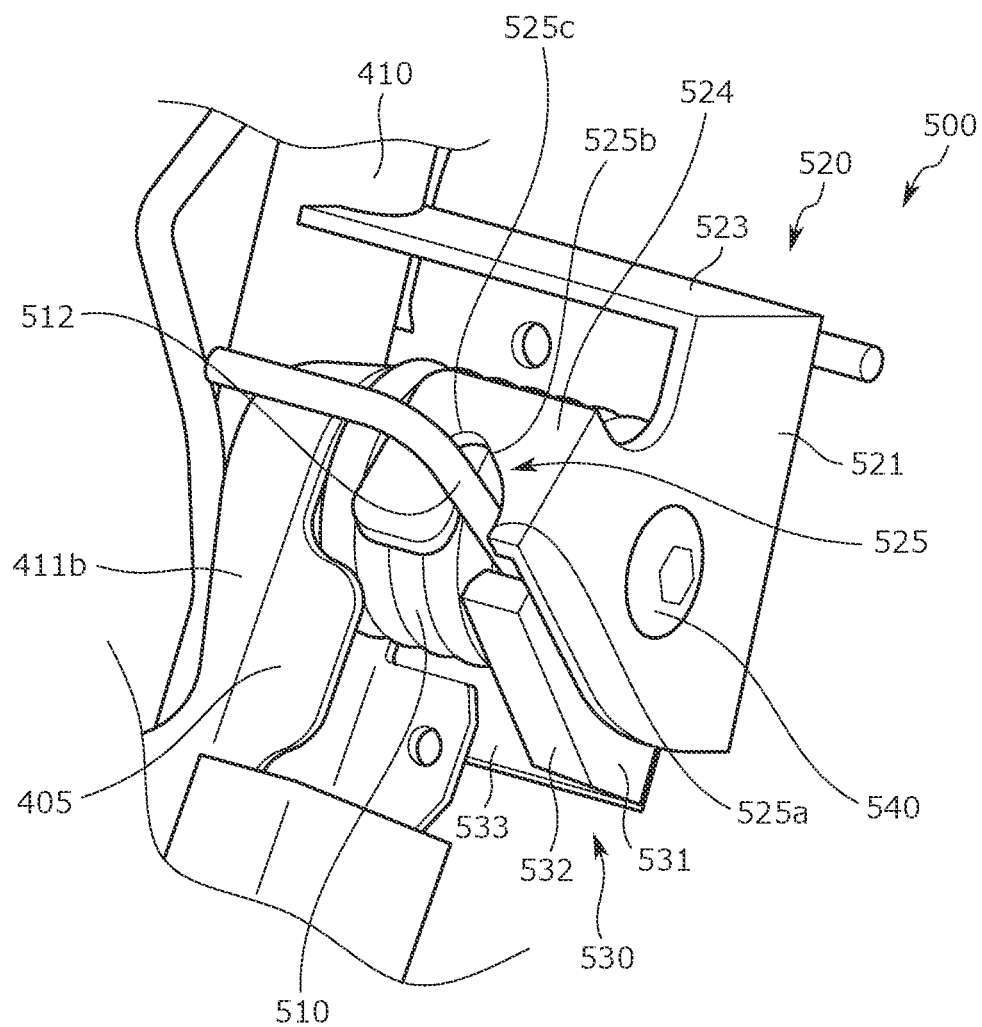
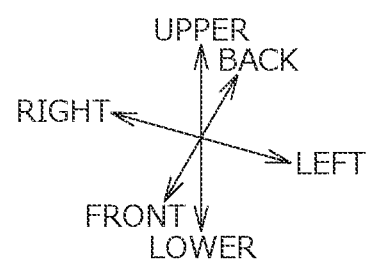

FIG. 65
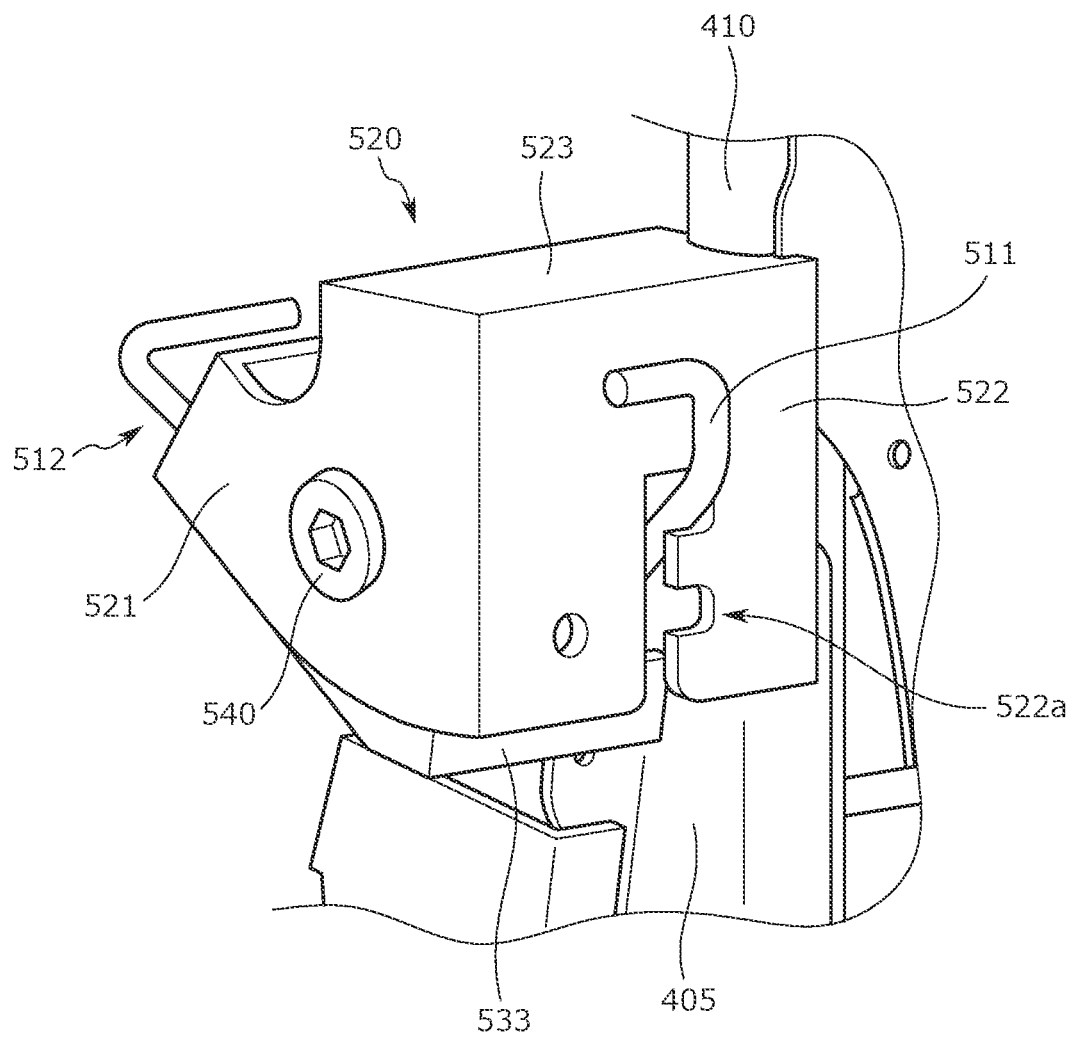
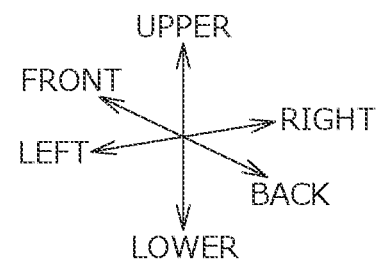

FIG. 67
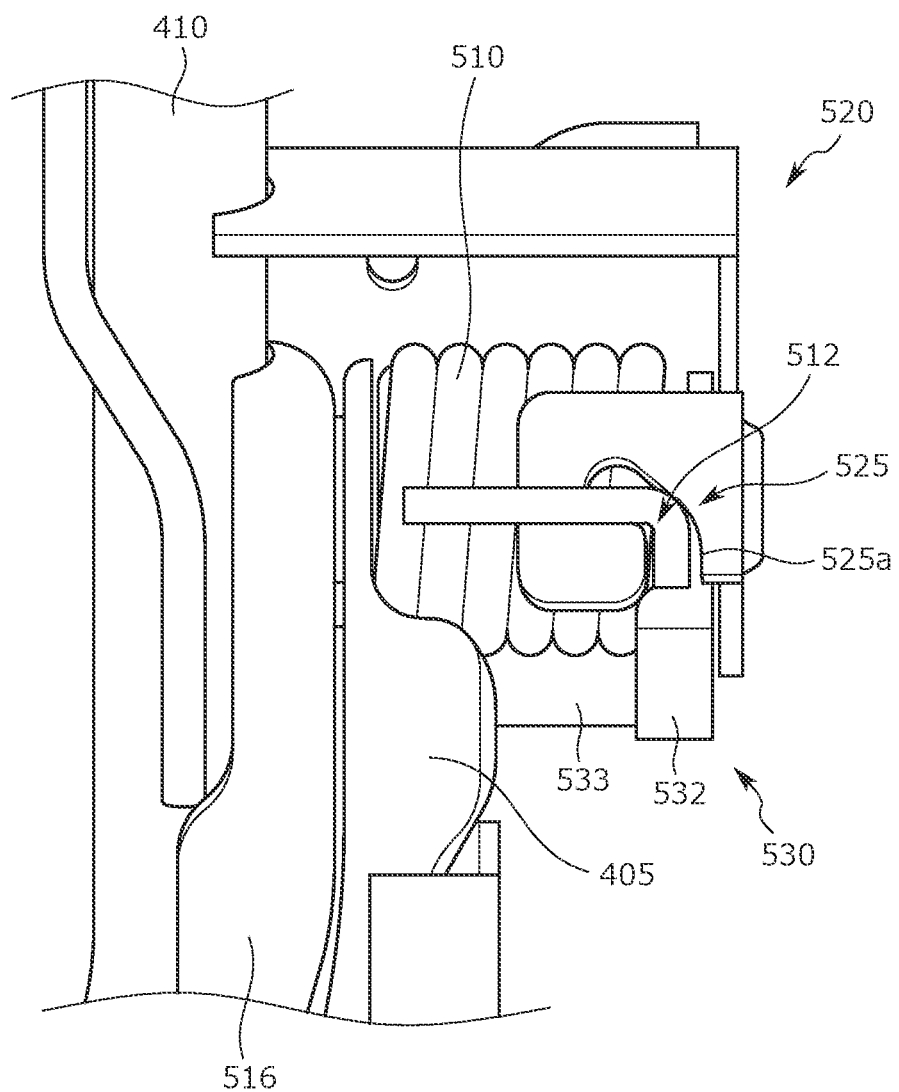
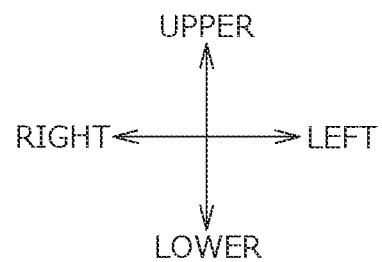

FIG. 69
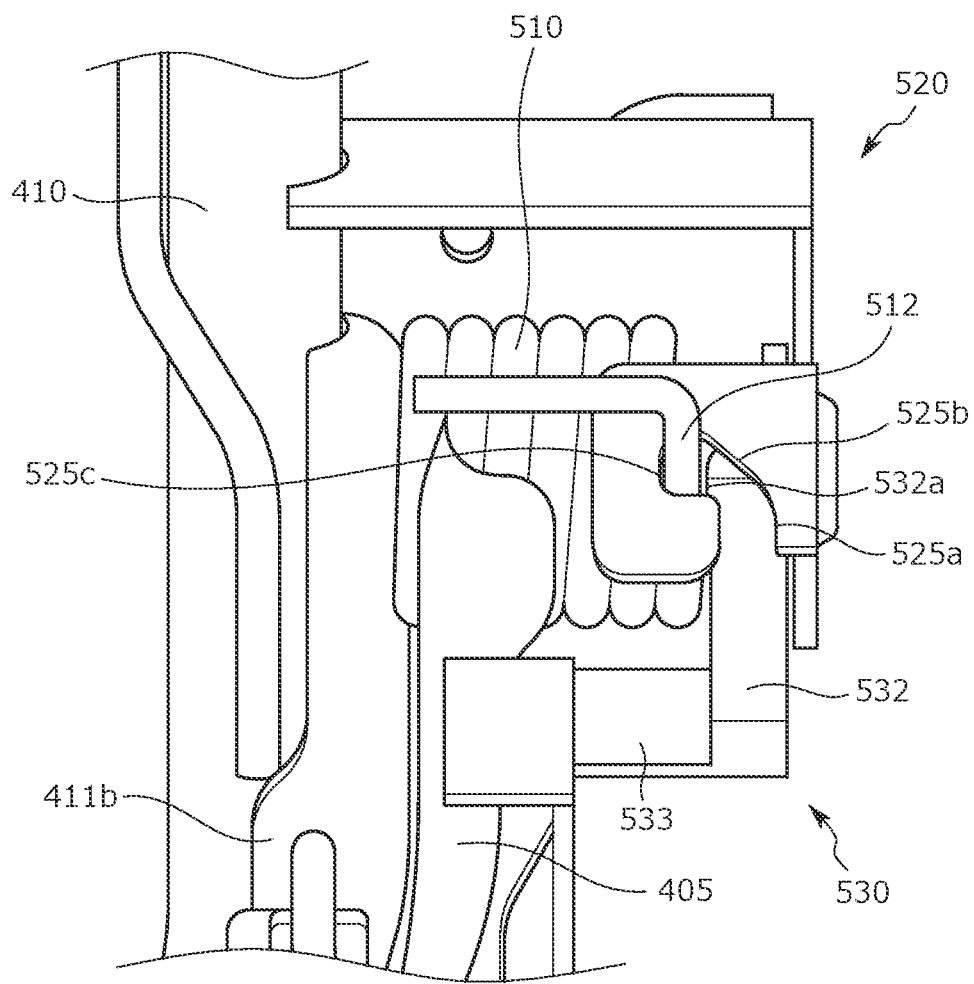
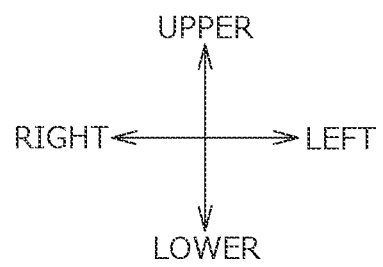

CONVEYANCE SEAT

CROSS-REFERENCE TO RELATED APPLICATIONS

This application is entering into the national phase of PCT Application No. PCT/JP2019/027780, filed on Jul. 12, 2019. Further, this application claims the benefit of priority from Japanese Application No. 2018-133552, filed on Jul. 13, 2018, Japanese Application No. 2018-134415, filed on Jul. 17, 2018, Japanese Application No. 2018-225628, filed on Nov. 30, 2018, Japanese Application No. 2019-030940, filed on Feb. 22, 2019, Japanese Application No. 2019-030941, filed on Feb. 22, 2019, Japanese Application No. 2019-047526, filed on Mar. 14, 2019, and Japanese Application No. 2019-107190, filed on Jun. 7, 2019, the entire contents of which are incorporated herein by reference.

TECHNICAL FIELD

The present invention relates to a conveyance seat, and particularly relates to a conveyance seat capable of switching a seat body including a seat back and a seat cushion from a seatable state.

BACKGROUND ART

Typically, a vehicle seat capable of housing a seat back and a seat cushion forming a seat body at a position lower than a vehicle body floor has been already known. Among these vehicle seats, a vehicle seat capable of tilting a seat body forward to house the seat body in a housing floor provided on a seat front side is present (see, e.g., Patent Literatures 1, 2, and 3).

A vehicle seat described in Patent Literature 1 includes a seat rotary shaft (a floor-side support shaft) attached to a vehicle body floor and turnably supporting a seat back and a cushion lock apparatus (a latch apparatus) turnably coupling a seat cushion to the seat back and locking turning motion of the seat cushion when a seat body is in a seatable state in which an occupant can be seated on the seat body.

In the operation of housing the seat body, the seat back rotates relative to the vehicle body floor to move the seat cushion to a housing floor, and the seat body can be housed in the housing floor.

Moreover, the vehicle seat can be switched from the seatable state in which the occupant can be seated to a tip-up state in which the seat cushion is tipped up.

An automobile seat described in Patent Literature 2 includes not only a seat rotary shaft turnably supporting a seat back relative to a vehicle body floor and a cushion lock apparatus turnably coupling a seat cushion to the seat back, but also a leg member extending in an upper-to-lower direction and turnably held on a leg holding member whose upper end supports a front portion of the seat cushion and whose lower end is fixed to a housing floor.

In the operation of housing a seat body, the seat back rotates relative to a vehicle body floor to move the seat cushion to the housing floor, and along with the seat back, the leg member rotates about the leg holding member. Accordingly, the seat body can be housed in the housing floor.

A conveyance seat described in Patent Literature 3 is an ottoman-apparatus-equipped seat allowing three types of seat arrangement including a seatable state in which an occupant can be seated, a housing state in which a seat body is housed in a housing floor, and a tip-up state in which the seat body is tipped up.

Specifically, such an ottoman apparatus mainly includes an ottoman rotary shaft (a base member) attached to a seat cushion through a reinforcement member and a leg support member (an ottoman) turnably attached through an ottoman rotary shaft.

Further, the conveyance seat includes a switching operating lever (a gripping member) attached to project forward of the seat cushion at a front portion of the seat cushion and operated for seat arrangement.

In this case, the ottoman rotary shaft and the leg support member are, for reducing contact with the switching operating lever, arranged to project to a seat front side with respect to the seat cushion and the switching operating lever.

A vehicle seat described in Patent Literature 4 is a seat capable of switching a seat body between a normal state and a slide movement state, and includes a lock member and an operating lever for unlocking the lock member. The operating lever is arranged at a position on a seat back side with respect to a seat back in the vehicle seat, and is attached to the periphery of a lower end portion of the seat back through a lever rotary shaft.

With the above-described configuration, an occupant can operate, for switching the seat body from the normal state to the slide movement state, the operating lever from a position behind the seat body. Moreover, the occupant can operate the operating lever with one hand, and can slidably move the seat body with the other hand.

Patent Literature 5 discloses that in a conveyance seat structure, a cushion body of a seat cushion is attached to a cushion frame such that the cushion body is turnable forward and a housing container as a housing portion is detachably attached to a lower space of the cushion body.

CITATION LIST

Patent Literature

PATENT LITERATURE 1: JP 2018-052435 A
PATENT LITERATURE 2: JP 2007-176404 A
PATENT LITERATURE 3: JP 2015-127157 A
PATENT LITERATURE 4: JP 2004-123001 A
PATENT LITERATURE 5: JP 07-040784 A

SUMMARY OF INVENTION

Technical Problem

In mass production of conveyance seats, a clearance is normally set for suitably assembling components, considering a product error of each component.

For this reason, in a conveyance seat capable of housing a seat body, such clearance setting needs to be performed for a cushion lock apparatus with a relatively-complicated configuration. As a result, a certain degree of play is provided to a seat cushion relative to a seat back.

In the conveyance seat as in Patent Literature 1, a leg member supporting the seat cushion from below is omitted from components for the purpose of reducing the number of components. Since no leg member is provided, the seat cushion swings (vibrates) while a vehicle is travelling, and there is a probability that noise due to contact between the components is caused in the cushion lock apparatus.

On the other hand, in the conveyance seat as in Patent Literature 2, the seat cushion is fixed and supported by the leg member, and therefore, swing of the seat cushion can be reduced while a vehicle is travelling. However, a demand for reducing the number of components cannot be satisfied.

For this reason, a conveyance seat capable of reducing the number of components while reducing swing (vibration) of a seat cushion while a vehicle is travelling has been demanded.

The conveyance seat capable of housing the seat body as in Patent Literatures 1 and 2 has a relatively-complicated structure such as the cushion lock apparatus, and for this reason, tendency shows that the size of the seat is increased.

For this reason, a conveyance seat capable of suppressing an increase in the size of the seat with a simple configuration has been demanded.

The conveyance seat allowing seat arrangement as in Patent Literature 3 has a relatively-complicated configuration, and the number of components thereof increases. For this reason, there is a probability that the size of the entire seat increases and the weight of the seat increases accordingly. Particularly, in the ottoman-apparatus-equipped conveyance seat, the ottoman apparatus projects to the seat front side with respect to the seat cushion, and for this reason, there is a probability that the size increases in a seat front-to-back direction.

For this reason, a conveyance seat capable of suppressing, with a simple configuration, an increase in the size of the entire seat including an ottoman apparatus has been demanded.

In the vehicle seat as in Patent Literature 4, the operating lever is arranged at the position on the seat back side with respect to the seat back in the conveyance seat, and is attached to the periphery of the lower end portion of the seat back. For this reason, there is a probability that the size of the structure of a slide rail apparatus including the operating lever increases.

Particularly, in the vehicle seat of Patent Literature 4, the operating lever is a member elongated in the seat front-to-back direction, and a lever operation portion of the operating lever as a portion on which the occupant hooks one's finger and the lever rotary shaft of the operating lever are set at positions relatively separated from each other. For this reason, the size of the structure of the slide rail apparatus increases.

Thus, a vehicle seat configured such that operability of an operating lever to be operated for switching the state of a seat body is ensured while the structure of a slide rail apparatus including the operating lever is compactified as much as possible has been demanded.

In the conveyance seat as in Patent Literature 5, a pair of slide rails is, in a seat width direction, coupled to each other by a front pipe and a back pipe, and the housing container is supported on the front pipe as a support member. However, improvement of stiffness of the support member supporting the luggage housing portion has been demanded.

The present invention has been made in view of the above-described problems, and an object of the present invention is to provide a conveyance seat capable of reducing the number of components while reducing swing (vibration) of a seat cushion while a vehicle is travelling in a seat capable of switching a seat body from a seatable state.

Moreover, another object of the present invention is to provide a conveyance seat capable of suppressing an increase in the size of the seat with a simple configuration.

Further, still another object of the present invention is to provide a conveyance seat capable of suppressing, with a simple configuration, an increase in the size of the seat while ensuring seat switching operation suitable for a pre-seated occupant.

In addition, still another object of the present invention is to provide an ottoman-apparatus-equipped conveyance seat capable of suppressing an increase in the size of the seat with a simple configuration in a seat capable of switching a seat body from a seatable state.

Moreover, still another object of the present invention is to provide a conveyance seat configured such that operability of an operating lever to be operated for switching the state of a seat body is ensured while the structure of a switching apparatus including the operating lever is more compactified.

Further, still another object of the present invention is to provide a conveyance seat capable of improving stiffness of a support member supporting a housing portion for housing an article such as a luggage and stably supporting the housing portion.

Solution to Problem

The above-described problems are solved by a conveyance seat of the present invention. The conveyance seat of the present invention is a conveyance seat including a seat body having a seat back and a seat cushion and a cushion lock apparatus turnably coupling the seat cushion to the seat back and locking turning motion of the seat cushion when the seat body is in a seatable state in which an occupant can be seated. The conveyance seat is switchable between the seatable state and a movement state in which the seat body is moved from the seatable state. The cushion lock apparatus includes a lock member attached to one of the seat cushion or the seat back, a lock target member attached to the other one of the seat cushion or the seat back and engaging with the lock member to lock the turning motion of the seat cushion, and a position holding member attached to a position at the periphery of the lock member and the lock target member and holding at least one of the positions of the lock member and the lock target member to hold a state in which a clearance is, in the seatable state, formed between an engagement portion provided at the lock member and an engagement target portion provided at the lock target member.

As described above, the conveyance seat capable of switching the seat body from the seatable state has the position holding member holding at least one of the positions of the lock member and the lock target member to hold the state in which the clearance is, in the seatable state, formed between the engagement portion provided at the lock member and the engagement target portion provided at the lock target member. Thus, the conveyance seat capable of reducing the number of components by a simpler configuration than that of a typical technique while reducing swing (vibration) of the seat cushion while the vehicle is travelling can be realized.

Moreover, swing of the seat cushion can be reduced while the vehicle is travelling, and therefore, the noise due to contact between the components in the cushion lock apparatus can be also reduced.

The movement state may be a housing state in which the seat body is moved to and housed in a housing floor positioned lower than a vehicle body floor. The conveyance seat may further include a reclining apparatus turnably coupling the seat back to the vehicle body floor and locking turning motion of the seat back in the seatable state and a support base provided on the vehicle body floor and supporting the seat cushion from below. The lock member may be attached to a seat cushion side, and the lock target member may be attached to a seat back side.

With the above-described configuration, no component is provided on a housing floor side as compared to the typical technique in the conveyance seat capable of housing the seat body, and therefore, the conveyance seat whose size is reduced by a simple configuration can be realized.

A contact portion contacting a contact target portion provided at one of the lock member or the lock target member to hold one of the positions may be formed at the position holding member, and the cushion lock apparatus may further include a biasing member attached to the position holding member and biasing the position holding member in the direction of causing the contact portion to contact the contact target portion.

With this configuration, swing of the seat cushion while the vehicle is travelling can be reduced by a simpler configuration, and the noise due to contact between the components in the cushion lock apparatus can be reduced.

The position holding member may be biased by the biasing member, and may be movable between a holding position as a position at which the contact portion contacts the contact target portion and a release position as a position at which the contact portion does not contact the contact target portion. When the position holding member is moved, in response to a load from the outside in the seatable state, from the holding position to a release position side against biasing force of the biasing member, the engagement portion of the lock member and the engagement target portion of the lock target member may engage with each other.

With the above-described configuration, when a load exceeding a predetermined level is, for example, applied from the outside due to collision, the position holding member can be released from the holding position to the release position. Thus, the size of the position holding member does not need to be increased more than necessary, and the size of the cushion lock apparatus can be reduced.

The conveyance seat may further include a cushion frame as a framework of the seat cushion. The lock member and the position holding member may be arranged next to each other in a seat width direction, and in the seat width direction, may be turnably coupled to a side surface of the cushion frame through a lock rotary shaft.

As described above, the lock member and the position holding member are arranged on the same axis, and therefore, the components of the cushion lock apparatus can be arranged compactly.

The seat cushion may be turnably coupled to the seat back through a cushion rotary shaft. The lock rotary shaft and the cushion rotary shaft may be arranged at positions different from each other on the side surface of the cushion frame. The cushion lock apparatus may further include a shaft coupling member extending along the side surface of the cushion frame to couple the lock rotary shaft and the cushion rotary shaft to each other.

With the above-described configuration, the components (the lock rotary shaft and the cushion rotary shaft) relatively requiring stiffness can be reinforced by a simple configuration.

The shaft coupling member may include a first shaft support portion supporting the cushion rotary shaft, a second shaft support portion supporting the lock rotary shaft, and a cutout portion cut out at a portion closer to a first shaft support portion side than to the second shaft support portion.

With the above-described configuration, the lock rotary shaft having slightly-lower stiffness than that of the cushion rotary shaft can be reinforced on a preferential basis. A constricted portion is formed at the shaft coupling member, and therefore, the components positioned inside the cushion lock apparatus are easily visually checked.

The lock target member may be, in the seat width direction, turnably coupled to the side surface of the cushion frame through the cushion rotary shaft. The lock member and the lock target member may be arranged at an identical position in the seat width direction. The contact portion of the position holding member may contact a contact protrusion as the contact target portion protruding from a side surface of the lock target member to a position holding member side in the seat width direction.

With the above-described configuration, design is made such that the size of the cushion lock apparatus does not increase in the seat width direction, and as a result, an increase in the size of the seat body in the seat width direction can be suppressed.

The conveyance seat may further include a housing portion provided below the seat cushion and capable of housing an article, a pair of base members supporting the seat body, and a coupling member coupling the pair of base members. The housing portion may be supported by the coupling member, and the coupling member may include a reinforcement portion between one end portion and the other end portion of the coupling member.

With the above-described configuration, the coupling member as the support member supporting the housing portion includes the reinforcement portion between one end portion and the other end portion, and therefore, stiffness is improved. Thus, the housing portion can be stably supported.

The reinforcement portion may be a bent portion bent to protrude to a front side of the conveyance seat.

With the above-described configuration, the bent portion bent to protrude to the front side of the conveyance seat can improve stiffness of the coupling member and can expand a housing portion region with a simple configuration.

The housing portion may be formed with a protruding portion upwardly protruding from a portion supported by the coupling member and having a space inside, and the bent portion of the coupling member may support the housing portion in the space.

With the above-described configuration, the bent portion of the coupling member supports the housing portion in the space inside the protruding portion formed at the housing portion, and therefore, position shift of the coupling member from the housing portion can be reduced.

The cushion lock apparatus may have a first unlock lever and a second unlock lever attached to positions at the periphery of the lock member and moving between a lockable position and an unlockable position to cancel a lock state between the lock member and the lock target member, may cancel, in the seatable state, the lock state when the first unlock lever or the second unlock lever is moved from the lockable position to the unlockable position, and may not cancel, in the movement state, the lock state when the first unlock lever is moved from the lockable position to the unlockable position and may cancel the lock state when the second unlock lever is moved from the lockable position to the unlockable position. The first unlock lever and the second unlock lever may be arranged at positions different from each other in an upper-to-lower direction or a seat front-to-back direction, and may be provided to sandwich the lock member.

As described above, in the seat capable of switching the seat body from the seatable state, the first unlock lever and the second unlock lever as the components of the cushion lock apparatus are arranged at the positions different from each other in the upper-to-lower direction or the seat front-to-back direction, and are provided to sandwich the lock member. Thus, the conveyance seat capable of suppressing, with a simple configuration, an increase in the size of the cushion lock apparatus (an increase in the size of the seat) while ensuring the seat switching operation suitable for the pre-seated occupant can be realized.

The movement state may be a tip-up state in which the seat cushion is rotatably upwardly moved relative to the seat back. The conveyance seat may be switchable among the seatable state, the tip-up state, and a housing state in which the seat body is moved to and housed in a vehicle body floor side. The conveyance seat may further include a reclining apparatus turnably coupling the seat back to the vehicle body floor and locking turning motion of the seat back in the seatable state. The reclining apparatus may include a reclining operating lever attached to an upper portion of the seat back and operated for unlocking the seat back and a reclining cable coupling the reclining operating lever and a body portion of the reclining apparatus and drawn by operation of reclining operating lever to act to switch the seat back from a lock state to an unlock state. The cushion lock apparatus may include a first cushion cable coupling the reclining operating lever and the first unlock lever and drawn by operation of the reclining operating lever to switch the first unlock lever from a lockable position to an unlockable position, a cushion operating lever attached to the seat cushion and operated for unlocking the seat cushion, and a second cushion cable coupling the cushion operating lever and the second unlock lever and drawn by operation of the cushion operating lever to switch the second unlock lever from a lockable position to an unlockable position. The first unlock lever may be arranged at a position above the second unlock lever.

With the above-described configuration, in the seat allowing three types of seat arrangement including the seatable state, the housing state, and the tip-up state, the first unlock lever on a reclining operating lever side is arranged at the position above the second unlock lever on a cushion operating lever side. Thus, the cushion lock apparatus realizes more suitable seat switching operation, and has a much simpler configuration.

The conveyance seat may further include a seat switching apparatus having a switching operating lever operated for switching the seat body between the seatable state and the movement state and operated in association with operation of the switching operating lever and an ottoman apparatus having a leg support member turnably attached to a front portion of the seat cushion through an ottoman rotary shaft and provided for supporting legs of the seated occupant from below and capable of turning the leg support member between a storage position at which the leg support member is stored on a seat cushion side and a deploy position at which the leg support member is rotatably moved to a seat front side with respect to the storage position. The switching operating lever may be attached to the front portion of the seat cushion. The switching operating lever and the ottoman rotary shaft may be arranged next to each other in a seat width direction.

As described above, in the seat capable of switching the seat body from the seatable state, the switching operating lever and the ottoman rotary shaft are arranged next to each other in the seat width direction, and therefore, the ottoman apparatus is easily compactly arranged in the seat front-to-back direction.

Thus, the ottoman-apparatus-equipped conveyance seat capable of suppressing an increase in the size of the seat with a simple configuration can be realized.

The conveyance seat capable of switching the seat body between a normal state and a slide movement state in which the seat body is moved from the normal state may further include a rail lock member attached to a predetermined position of the conveyance seat and locking movement of the seat body in the normal state and a rail operating lever arranged at a position on a seat back side with respect to the seat back in the conveyance seat, attached to the periphery of a lower end portion of the seat back through a lever rotary shaft, and rotatably operated for unlocking the rail lock member. The lever rotary shaft may be arranged between a lever operating portion as a portion of the rail operating lever on which an occupant's finger is hooked and a lever operation support portion as a portion which is provided at the periphery of the rail operating lever, which is different from the lever operating portion, and on which the occupant's finger is hooked.

As described above, the operating lever is arranged at the position on the seat back side with respect to the seat back in the conveyance seat and is attached to the periphery of the lower end portion of the seat back through the lever rotary shaft, and the lever rotary shaft is arranged between the lever operating portion of the operating lever and the lever operation support portion. Thus, the conveyance seat configured such that operability of the operating lever is ensured while the structure of the switching apparatus including the operating lever is more compactified can be realized.

Specifically, the lever rotary shaft is arranged between the lever operating portion as the portion of the operating lever on which the occupant's finger is hooked and the lever operation support portion as the portion which is different from the lever operating portion and on which the occupant's finger is hooked. Thus, the lever operating portion and the rotary shaft are arranged at positions relatively close to each other. As a result, an increase in the size of the switching apparatus can be suppressed as compared to the typical technique.

Advantageous Effects of Invention

According to the present invention, the conveyance seat capable of reducing the number of components by a simpler configuration than that of the typical technique while reducing swing (vibration) of the seat cushion while the vehicle is travelling can be realized. Moreover, the noise due to contact between the components in the cushion lock apparatus can be also reduced.

Moreover, according to the present invention, no component is provided on the housing floor side as compared to the typical technique in the conveyance seat capable of housing the seat body, and therefore, the conveyance seat whose size is reduced by a simple configuration can be realized.

Further, according to the present invention, the size of the position holding member does not need to be increased more than necessary, and the size of the cushion lock apparatus can be reduced.

In addition, according to the present invention, the components of the cushion lock apparatus can be arranged compactly.

Moreover, according to the present invention, the components relatively requiring stiffness can be reinforced by a simple configuration.

Further, according to the present invention, the components positioned inside the cushion lock apparatus are easily visually checked.

In addition, according to the present invention, an increase in the size of the cushion lock apparatus and the seat body in the seat width direction can be suppressed.

Moreover, according to the present invention, the coupling member as the support member supporting the housing portion includes the reinforcement portion between one end portion and the other end portion, and therefore, stiffness is improved. Thus, the housing portion can be stably supported.

Further, according to the present invention, the bent portion bent to protrude to the front side of the conveyance seat can improve stiffness of the coupling member and can expand the housing portion region with a simple configuration.

In addition, according to the present invention, the bent portion of the coupling member supports the housing portion in the space inside the protruding portion formed at the housing portion, and therefore, position shift of the coupling member from the housing portion can be reduced.

Moreover, according to the present invention, in the seat capable of switching the seat body from the seatable state, the conveyance seat capable of suppressing, with a simple configuration, an increase in the size of the cushion lock apparatus (an increase in the size of the seat) while ensuring the seat switching operation suitable for the pre-seated occupant can be realized.

Further, according to the present invention, in the seat allowing three types of seat arrangement including the seatable state, the housing state, and the tip-up state, the cushion lock apparatus realizes more suitable seat switching operation and has a much simpler configuration.

In addition, according to the present invention, in the seat capable of switching the seat body from the seatable state, the ottoman-apparatus-equipped conveyance seat capable of suppressing an increase in the size of the seat with a simple configuration can be realized.

Moreover, according to the present invention, the conveyance seat configured such that operability of the operating lever is ensured while the structure of the switching apparatus including the operating lever is more compactified can be realized.

BRIEF DESCRIPTION OF DRAWINGS

FIG. 31 is a D-D sectional view of FIG. 26 illustrating a clearance filling member of a second variation.

FIG. 47 is a view illustrating a cushion lock apparatus.

FIG. 48 is an E-E sectional view of FIG. 46.

FIG. 49 is a view illustrating a lower portion of the seat frame and peripheral equipment thereof.

FIG. 53 is a perspective view of a base cover.

FIG. 54 is a perspective view in a state in which the base cover is separated into a front cover and a back cover.

FIG. 56 is a view illustrating a lower portion of a seat frame and peripheral equipment thereof according to a variation.

FIG. 61 is a view illustrating a lower portion of a seat frame and peripheral equipment thereof according to a variation.

FIG. 64 is a view illustrating a biasing force reduction apparatus.

FIG. 65 is a view illustrating a back surface of the biasing force reduction apparatus.

FIG. 67 is a view illustrating the biasing force reduction apparatus when the seat state is a seatable state.

FIG. 69 is a view illustrating the biasing force reduction apparatus when the seat state is the tip-up state.

DESCRIPTION OF EMBODIMENTS

Hereinafter, a conveyance seat according to an embodiment of the present invention will be described with reference to FIGS. 1 to 18.

The present embodiment relates to an invention of a conveyance seat including a seat body having a seat back and a seat cushion and a cushion lock apparatus turnably coupling the seat cushion to the seat back and locking turning motion of the seat cushion when the seat body is in a seatable state. The conveyance seat is switchable between the seatable state and a housing state. The cushion lock apparatus includes a lock member attached to a seat cushion side, a lock target member attached to a seat back side and engaging with the lock member to lock the turning motion of the seat cushion, and a position holding member attached to a position at the periphery of the lock member and the lock target member and holding at least one of the positions of the lock member and the lock target member to hold a state in which a clearance is, in the seatable state, formed between an engagement portion provided at the lock member and an engagement target portion provided at the lock target member.

Note that a side on which an occupant is seated is a seat front side with respect to the seat back of the conveyance seat.

A conveyance seat S of the present embodiment is, for example, a rear seat equivalent to a back seat of a vehicle. Note that the conveyance seat S can be also utilized as a middle seat in a second row in a vehicle including three rows of seats in a vehicle front-to-back direction.

The conveyance seat S is a seat allowing three types of seat arrangement including a seatable state in which an occupant can be seated, a housing state in which a seat body is housed in a housing floor, and a tip-up state in which the seat body is tipped up.

Figure 6:
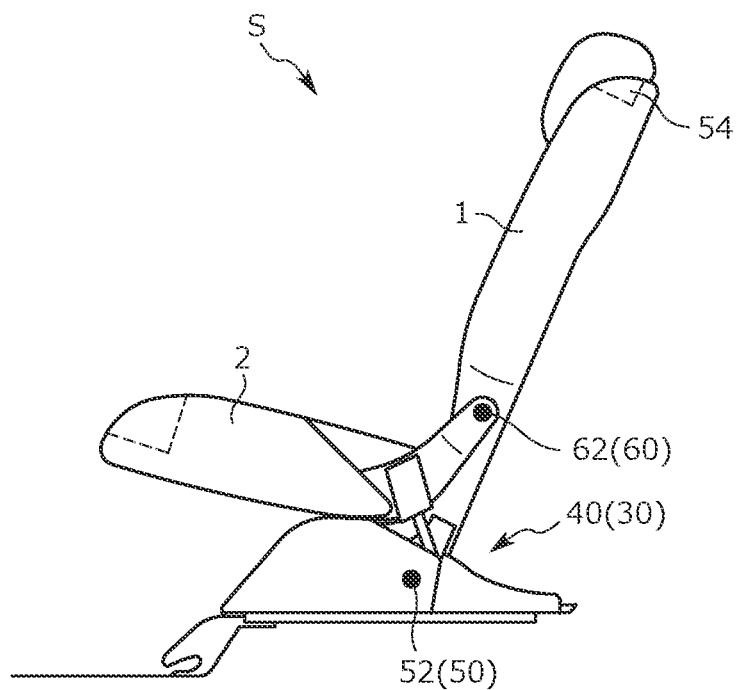
FIG. 6 is a side view of the conveyance seat illustrating a seatable state.
Figure 7:
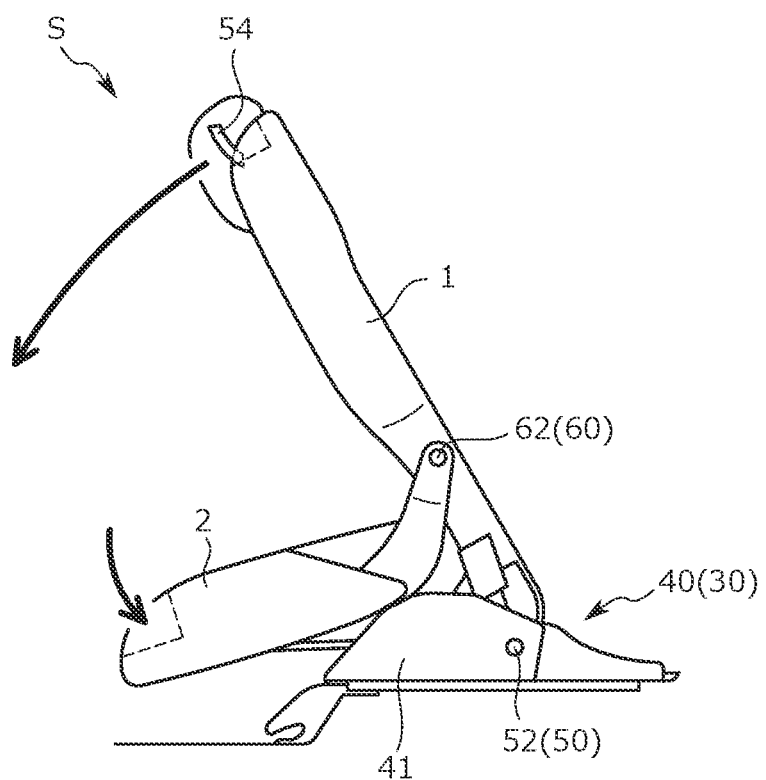
FIG. 7 is a view for describing motion from the seatable state to a housing state.
Figure 8:
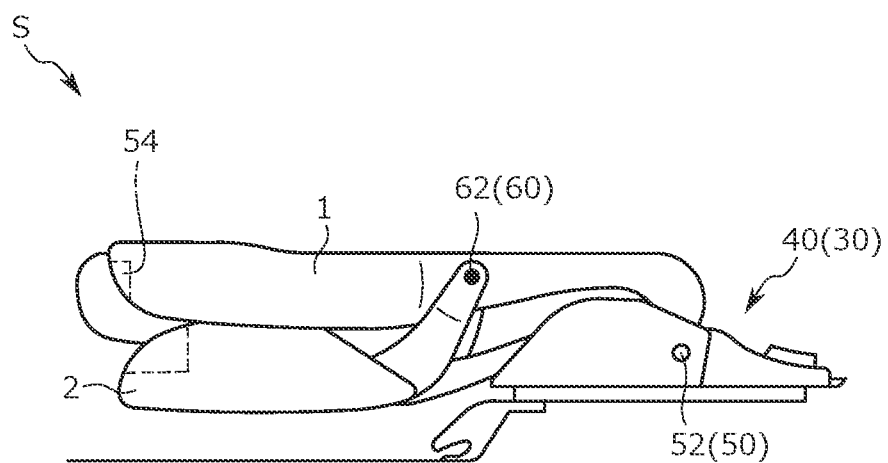
FIG. 8 is a view illustrating the housing state.

Specifically, when the pre-seated occupant pulls, from the seatable state illustrated in FIG. 6, a reclining operating lever 54 at an upper end portion of the seat body, the seat body tilts forward and is folded (see FIG. 7), and the conveyance seat S switches to the housing state in which the seat body is housed in the housing floor as illustrated in FIG. 8. From the housing state, the pre-seated occupant manually raises up the seat body, and in this manner, the conveyance seat S switches to the tip-up state illustrated in FIG. 9. From the tip-up state, the pre-seated occupant pulls a cushion operating lever 64 at a front end portion of the seat body (a seat cushion) (see FIG. 10), and in this manner, part (the seat cushion) of the seat body rotates downward and the conveyance seat S returns to the seatable state illustrated in FIG. 11. Details will be described later.

Figure 1:
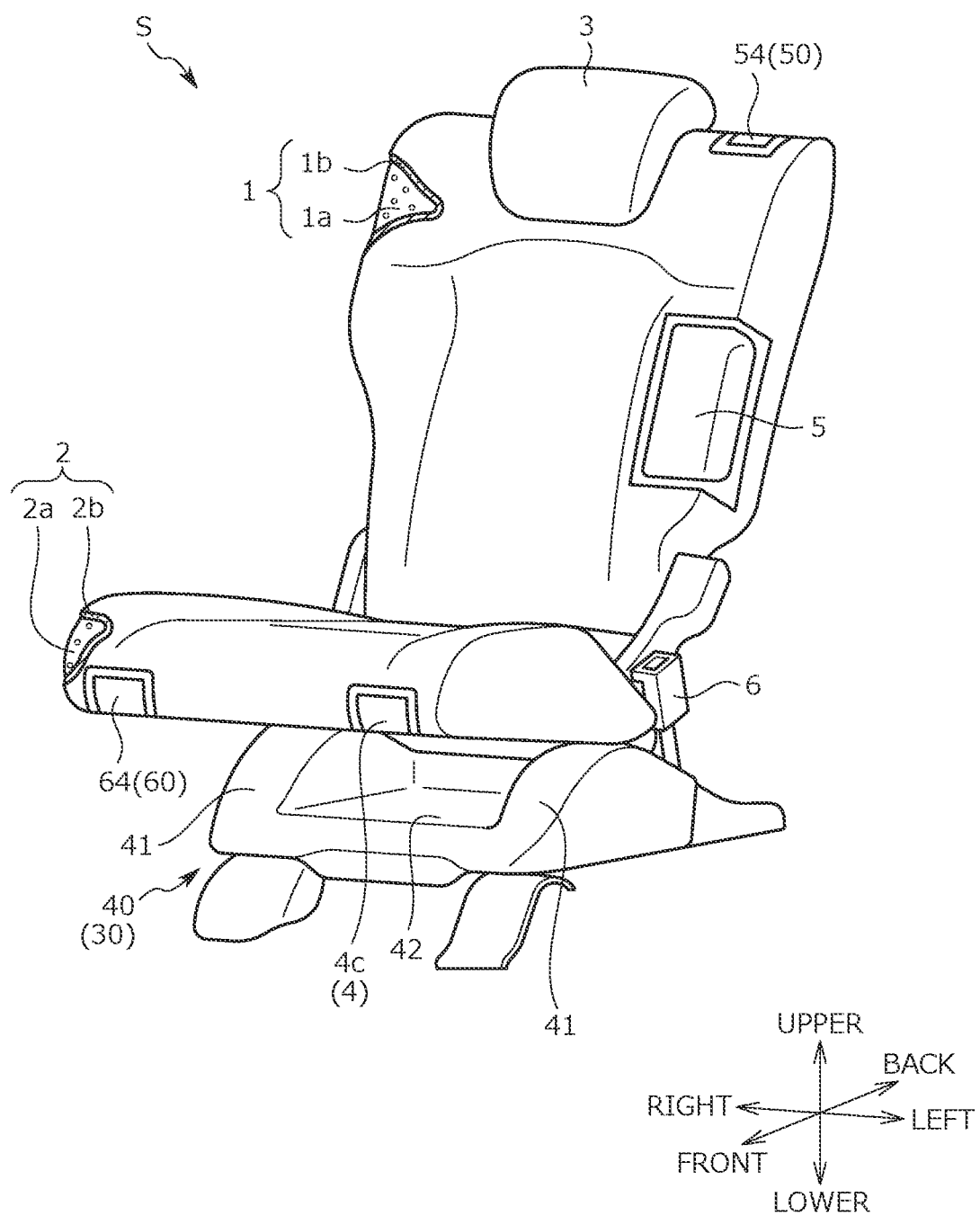
FIG. 1 is a perspective view of a conveyance seat of the present embodiment.
Figure 2:
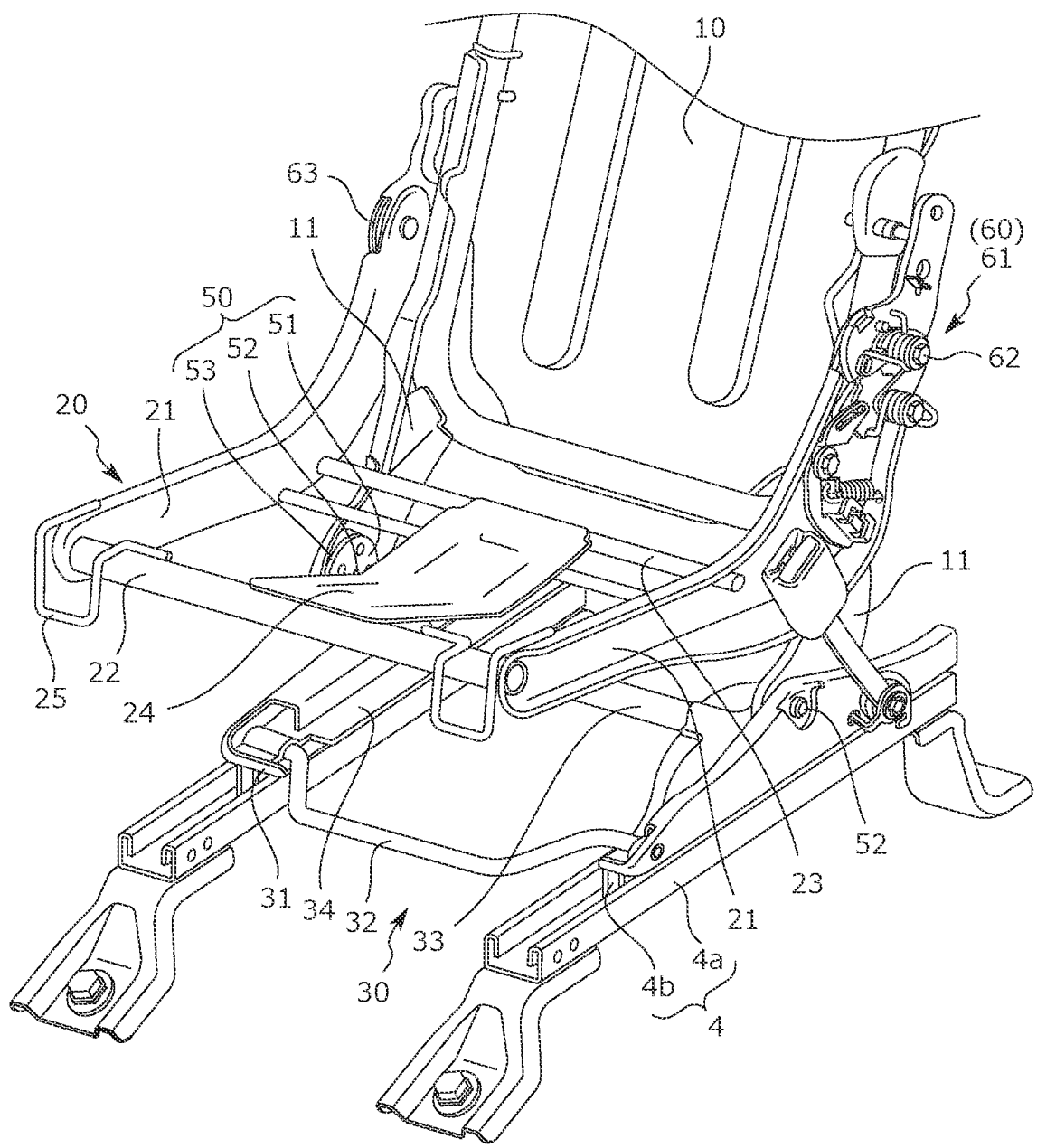
FIG. 2 is a perspective view of a seat frame as a framework of the conveyance seat.

As illustrated in FIGS. 1 and 2, the conveyance seat S mainly includes the seat body having a seat back 1, the seat cushion 2, and a headrest 3, right and left rail apparatuses 4 attached onto a vehicle body floor and movably supporting the seat body in the front-to-back direction, a support base 30 attached onto the rail apparatuses 4 and supporting the seat body, and a base cover 40 covering the support base 30 from above.

Further, as illustrated in FIG. 2, the conveyance seat S includes a reclining apparatus 50 turnably coupling the seat back 1 to the support base 30 and locking turning motion of the seat back 1 in the seatable state and the tip-up state and a cushion lock apparatus 60 turnably coupling the seat cushion 2 to the seat back 1 and locking turning motion of the seat cushion 2 in the seatable state, the housing state, and the tip-up state.

Note that on the seat front side of the conveyance seat S, the recessed housing floor formed at a position lower than the vehicle body floor is provided.

As illustrated in FIG. 1, the seat back 1 is a backrest portion supporting the back of the occupant from back, and is configured such that a cushion pad 1a placed on a back frame 10 as a framework illustrated in FIG. 2 is covered with a skin 1b.

The seat cushion 2 is a seating portion supporting the occupant from below, and is configured such that a cushion pad 2a placed on a cushion frame 20 as a framework illustrated in FIG. 2 is covered with a skin 2b.

The headrest 3 is a head portion supporting the head of the occupant from back, and is configured such that a cushion pad placed on a not-shown pillar as a core is covered with a skin.

As illustrated in FIG. 2, the rail apparatuses 4 mainly include right and left lower rails 4a arranged between the seat body and the vehicle body floor in an upper-to-lower direction, fixed to the vehicle body floor, and extending in the seat front-to-back direction, right and left upper rails 4b slidably supported along the lower rails 4a, a not-shown lock apparatus locking the upper rails 4b such that the upper rails 4b do not slide on the lower rails 4a, and a rail operating lever 4c to be operated for unlocking the lock apparatus as illustrated in FIG. 1.

The support base 30 is bridged over upper surfaces of the right and left upper rails 4b.

As illustrated in FIG. 2, the back frame 10 includes a substantially rectangular frame-shaped body as the framework of the seat back 1, and right and left coupling brackets 11 for coupling the back frame 10 to the support base 30 are attached to lower portions of outer surfaces of the back frame 10 in a seat width direction.

The coupling bracket 11 includes a bow-shaped sheet-metal member extending in the upper-to-lower direction. An upper end of the coupling bracket 11 is attached to the back frame 10, and a lower end of the coupling bracket 11 is attached to the support base 30.

The reclining apparatus 50 (a reclining body 51) turnably coupling the back frame 10 to the support base 30 is attached to a lower end portion of the right coupling bracket 11, and a back rotary shaft 52 supported on the support base 30 in the seat width direction is provided at a lower end portion of the left coupling bracket 11.

Figure 3:
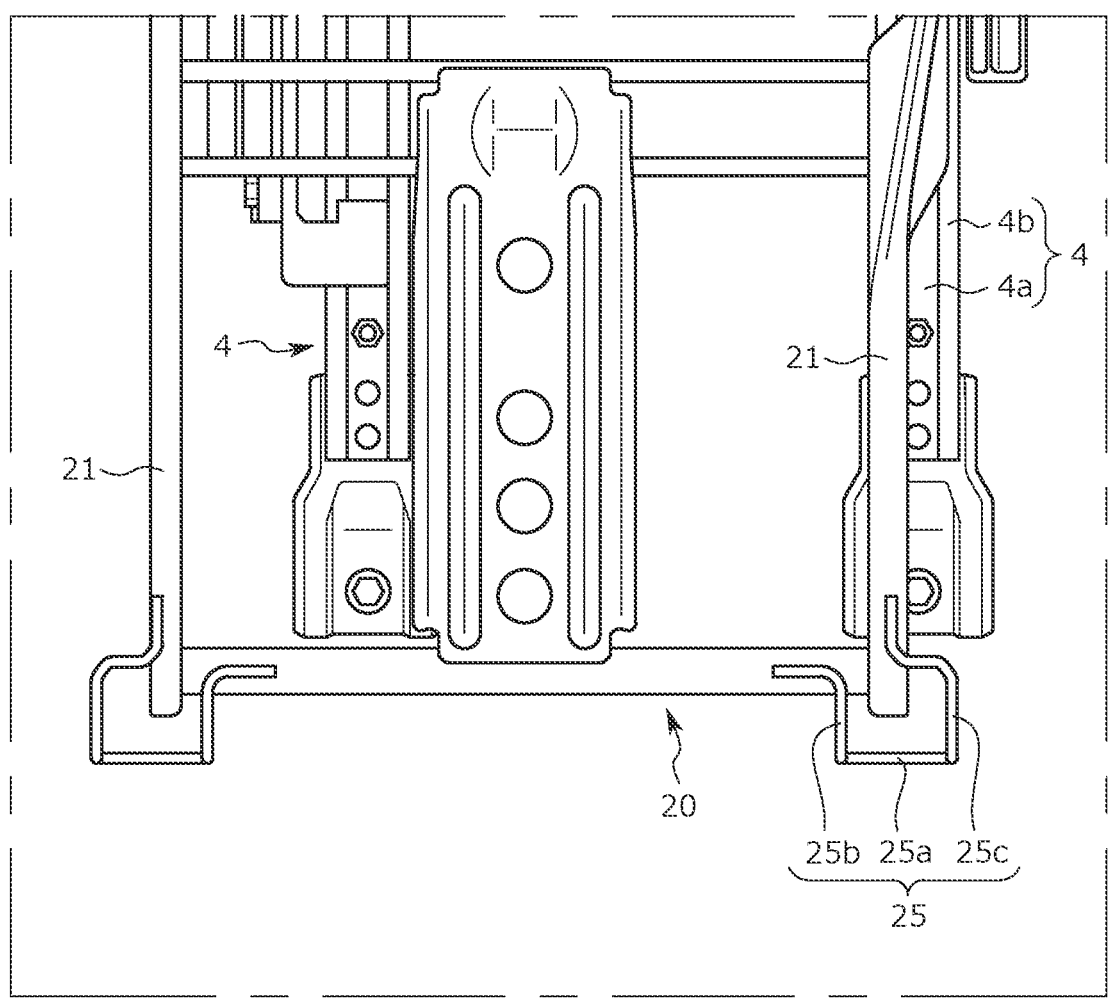
FIG. 3 is an upper view of the seat frame.

As illustrated in FIGS. 2 and 3, the cushion frame 20 includes a substantially rectangular frame-shaped body as the framework of the seat cushion 2, and mainly includes right and left side frames 21 arranged on the sides in the seat width direction, a front coupling pipe 22 coupling front portions of the side frames 21, a center coupling pipe 23 coupling back portions of the side frames 21, and a pan frame 24 as a plate-shaped frame coupling the front coupling pipe 22 and the center coupling pipe 23 to each other.

The side frame 21 includes a sheet-metal member extending in the seat front-to-back direction. The rail operating lever 4c illustrated in FIG. 1 is attached to a front end portion of the left side frame 21 through an attachment wire 25, and the cushion operating lever 64 illustrated in FIG. 1 is attached to a front end portion of the right side frame through an attachment wire 25.

The cushion lock apparatus 60 is attached to a back end portion of an outer surface of the side frame 21 in the seat width direction.

As illustrated in FIG. 3, the right and left side frames 21 are offset-arranged at positions different from those of the right and left rail apparatuses 4 in the seat width direction, specifically on the right side with respect to the right and left rail apparatuses 4. With such offset arrangement, a space can be ensured outside the left side frame 21, and in such a space, not only the cushion lock apparatus 60 but also an armrest 5 and a seat belt buckle 6 as illustrated in FIG. 1 are attached. As a result, an increase in the size of the conveyance seat S in the seat width direction can be suppressed.

As illustrated in FIGS. 2 and 3, the attachment wire 25 is in a substantially U-shape, and is bridged over an end portion of the front coupling pipe 22 in the seat width direction and the front end portion of the side frame 21.

Specifically, the attachment wire 25 has a wire body portion 25a to which the rail operating lever 4c (the cushion operating lever 64) is attached, a wire attachment portion 25b continuously downwardly bent from an inner end portion of the wire body portion 25a in the seat width direction and attached to the front coupling pipe 22, and a wire attachment portion 25c continuously downwardly bent from an outer end portion of the wire body portion 25a in the seat width direction and attached to the side frame 21.

The wire attachment portion 25b is in a substantially L-shape, and part thereof extends in the seat width direction along the front coupling pipe 22.

As illustrated in FIG. 2, the support base 30 is a member supporting the seat body, and includes right and left side base portions 31 provided on the sides in the seat width direction and arranged along the upper rails 4b, a front base coupling portion 32 coupling front portions of the side base portions 31, a back base coupling portion 33 coupling substantially center portions of the side base portions 31, and right and left reinforcement base portions 34 attached to upper surfaces of the side base portions 31.

Both right and left end portions of each of the front base coupling portion 32 and the back base coupling portion are coupled with each of these end portions being sandwiched by the side base portion 31 and the reinforcement base portion 34.

As illustrated in FIG. 1, the base cover 40 is a resin molded article covering the entire support base 30 and the rail apparatuses 4 from above.

The base cover 40 has not only the function of protecting the support base 30 and the rail apparatuses 4 from the outside, but also the function of guiding movement of the seat body (the seat cushion 2) when the seat body switches from the seatable state to the housing state.

The base cover 40 mainly includes right and left cover protruding portions 41 provided on the sides in the seat width direction and formed to upwardly protrude toward the seat cushion 2 and a cover housing recessed portion 42 provided between the right and left cover protruding portions 41 and formed depressed downward of the cover protruding portions 41 to house a housing target object.

The cover protruding portion 41 has a highest upper surface at a center portion thereof in the seat front-to-back direction, and the housing floor is arranged on an extension of an inclined surface of the cover protruding portion 41 on the seat front side.

Figure 11:
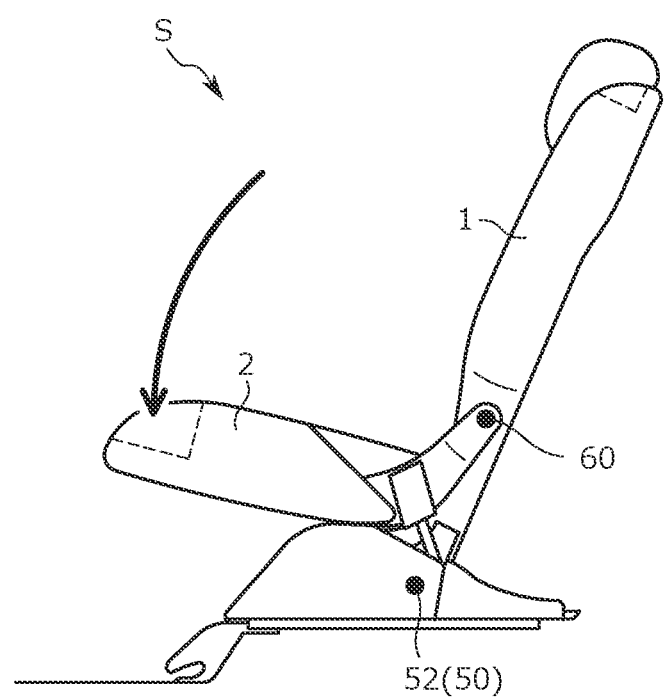
FIG. 11 is a view illustrating the seatable state.

The cover protruding portion 41 has the function of contacting, when the seat body moves from the seatable state to the housing state, a not-shown cushion cover protecting the seat cushion 2 to slide (glide) the cushion cover to a housing floor side as illustrated in FIG. 11. That is, it is configured such that the seat cushion 2 is guided by the base cover 40 to smoothly move toward the housing floor.

Figure 4:
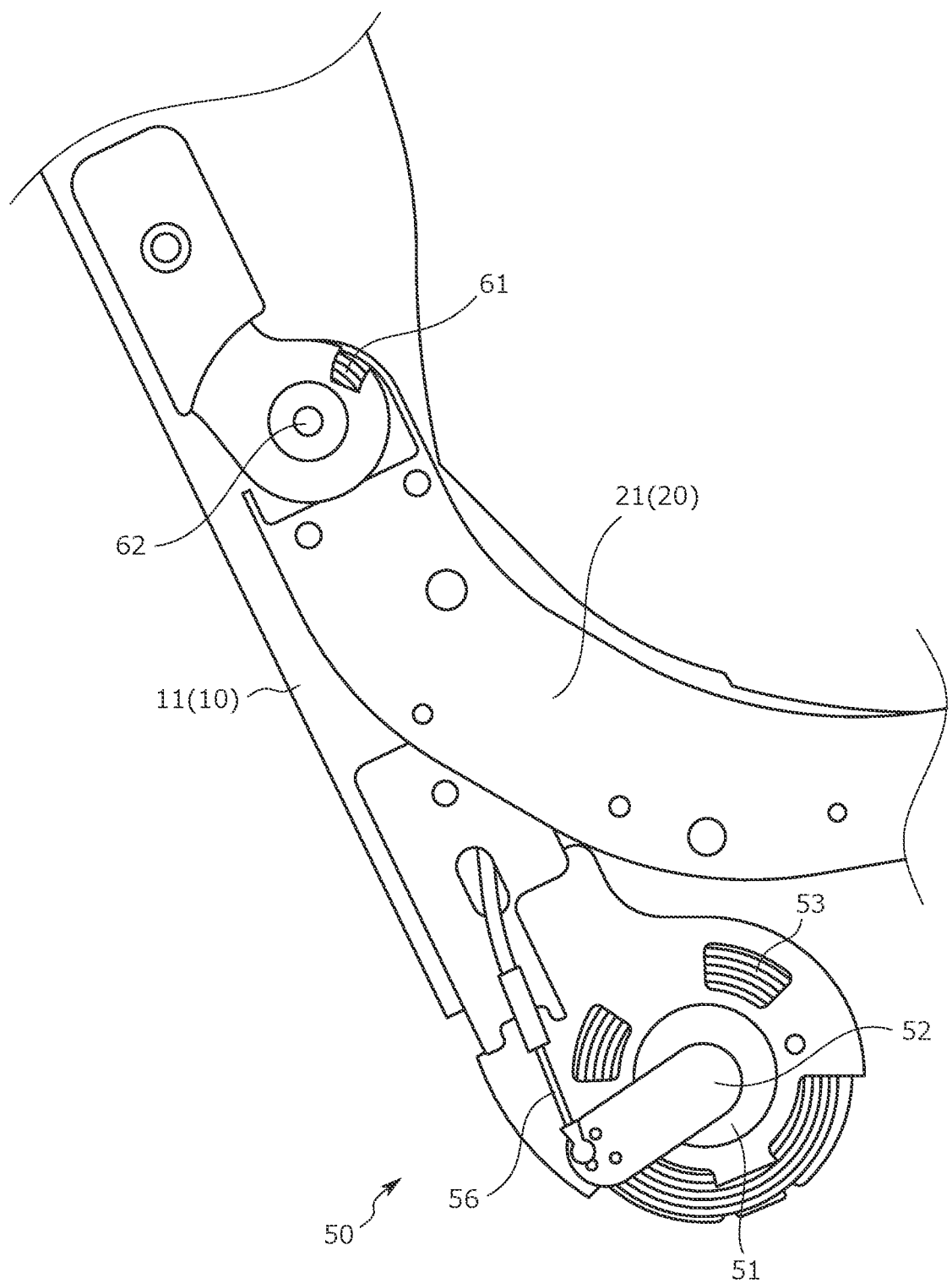
FIG. 4 is a side view of the seat frame illustrating a reclining apparatus.

As illustrated in FIGS. 2 and 4, the reclining apparatus 50 is arranged on an inner surface of the right coupling bracket 11 in the seat width direction, thereby reducing contact with the cushion frame 20 in the seat width direction.

The reclining apparatus 50 mainly includes the reclining body 51 to be driven upon turning of the back frame 10, the back rotary shaft 52, a spiral spring 53 biasing the back frame 10 such that the back frame 10 rotates forward about the back rotary shaft 52, the reclining operating lever 54 of FIG. 1 to be operated for unlocking the back frame 10, and a reclining cable 56 coupling the reclining operating lever 54 and the reclining body 51.

The reclining body 51 has a well-known lock mechanism, and is capable of switching the state of the back frame 10 between a lock state in which the back frame 10 is fixed relative to the support base 30 and an unlock state in which the back frame 10 is turnable relative to the support base 30.

The back rotary shaft 52 is supported on a back frame 10 side and a support base 30 side in the seat width direction. One end of the spiral spring 53 is locked on the back frame 10 side, and the other end of the spiral spring 53 is locked on the support base 30 side.

The reclining cable 56 is drawn by operation of the reclining operating lever 54, thereby acting to switch the seat back 1 from a lock state to an unlock state.

In the above-described configuration, the reclining apparatus 50 can lock the back frame 10 in a standing posture of FIG. 6, can unlock the back frame 10 by operation of the reclining operating lever 54, and can rotate the back frame 10 forward by biasing force of the spiral spring 53 to fold the back frame 10 to a vehicle body floor side (see FIG. 7).

Figure 5:
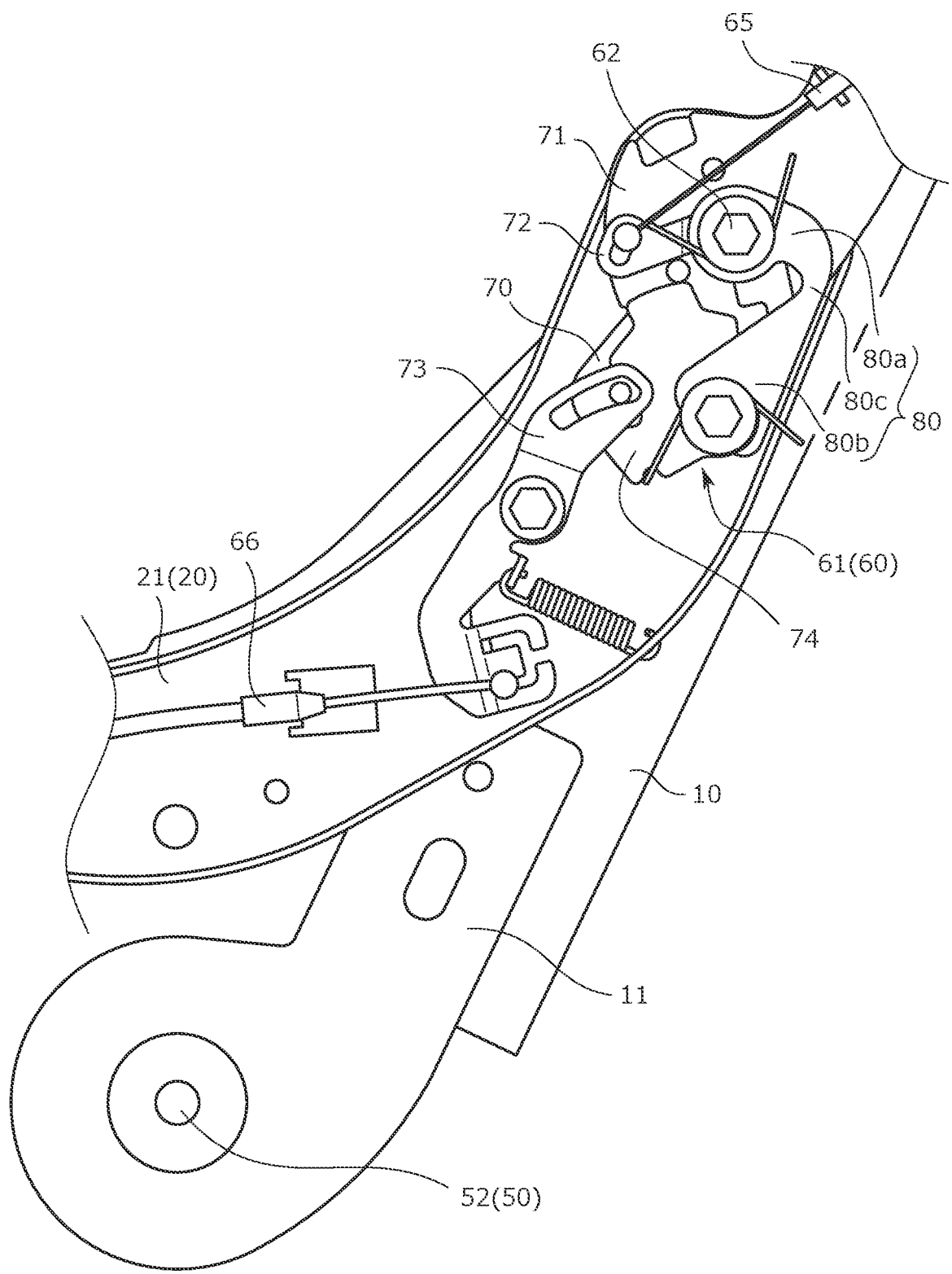
FIG. 5 is a side view of the seat frame illustrating a cushion lock apparatus.

As illustrated in FIGS. 2 and 5, the cushion lock apparatus 60 is arranged on the outer surface of the left side frame 21 in the seat width direction.

The cushion lock apparatus 60 mainly includes a lock body 61 for locking turning motion of the cushion frame 20, a cushion rotary shaft 62, a spiral spring 63 downwardly biasing the cushion frame 20 about the cushion rotary shaft 62, the cushion operating lever 64 of FIG. 1 to be operated for unlocking the cushion frame 20, a first cushion cable 65 coupling the above-described reclining operating lever 54 and the lock body 61, and a second cushion cable 66 coupling the cushion operating lever 64 and the lock body 61.

Details of the lock body 61 will be described later.

The cushion rotary shaft 62 is supported on the back frame 10 side and the cushion frame 20 side in the seat width direction. One end of the spiral spring 63 is locked on the back frame 10 side, and the other end of the spiral spring 63 is locked on the cushion frame 20 side.

The cushion operating lever 64 is attached to a front end portion of the cushion frame 20, and is arranged at a right end portion of the cushion frame 20, i.e., a vehicle-door-side end portion of the conveyance seat S. Thus, the occupant can operate the cushion operating lever 64 from the outside of the vehicle in a state in which a vehicle door is opened.

The first cushion cable 65 extends in the upper-to-lower direction along the outer surface of the back frame 10. The first cushion cable 65 is drawn by operation of the reclining operating lever 54, thereby acting to switch the cushion frame 20 from a lock state to an unlock state.

The second cushion cable 66 extends in the seat front-to-back direction along an outer surface of the cushion frame 20. The second cushion cable 66 is drawn by operation of the cushion operating lever 64, thereby acting to switch the cushion frame 20 from the lock state to the unlock state.

The cushion lock apparatus 60 can lock the cushion frame 20 in a horizontal posture of FIG. 6, can unlock the cushion frame 20 along with the back frame 10 by operation of the reclining operating lever 54, and can fold the cushion frame 20 to the vehicle body floor side while biasing the cushion frame 20 forward by biasing force of the spiral spring 63 (see FIG. 7).

Figure 9:
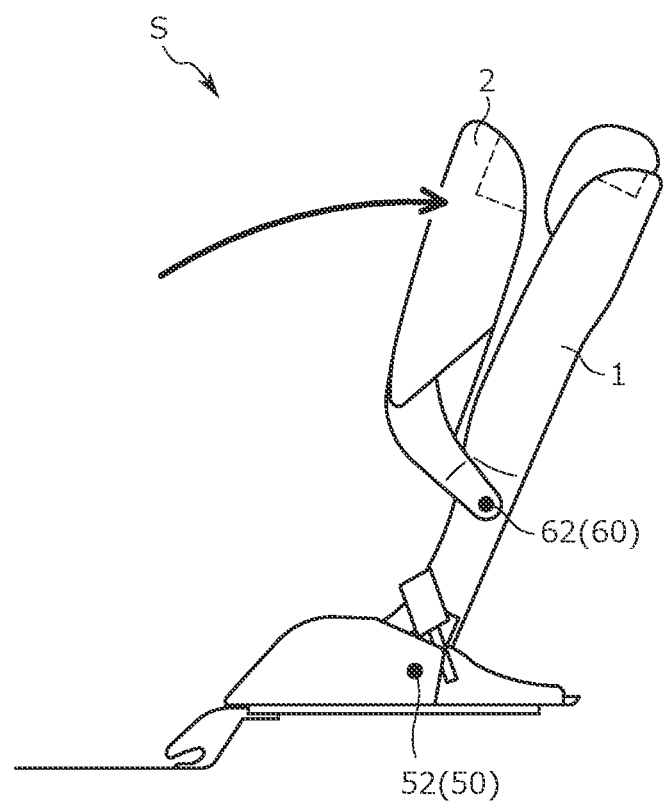
FIG. 9 is a view illustrating a tip-up state.

By operation of the cushion operating lever 64 in the seatable state, the cushion lock apparatus 60 can unlock the cushion frame 20, and can raise up the cushion frame 20 against the biasing force of the spiral spring 63 to move the cushion frame 20 to the tip-up state illustrated in FIG. 9. By re-operation of the cushion operating lever 64 in the tip-up state (see FIG. 10), the cushion lock apparatus 60 can downwardly rotate the cushion frame 20 relative to the back frame 10 by the biasing force of the spiral spring 63, and can return the cushion frame 20 to the seatable state illustrated in FIG. 11.

In the above-described configuration, as illustrated in FIG. 2, the reclining apparatus 50 is arranged on the right side of the seat body in the seat width direction, and on the other hand, the cushion lock apparatus 60 is arranged on the left side of the seat body. Thus, relatively-large components can be arranged with favorable balance, leading to favorable balance across the entirety of the seat body.

<Seat Housing Motion>

Next, motion for moving the seat body from the seatable state to the housing state will be described based on FIGS. 6 to 8. Note that in FIGS. 6 to 8, black circles indicate the lock states of the reclining apparatus 50 and the cushion lock apparatus 60 and white circles indicate the unlock states of the reclining apparatus 50 and the cushion lock apparatus 60. The same also applies to FIGS. 9 to 10.

When the conveyance seat S is in the seatable state illustrated in FIG. 6, the seat back 1 is supported by the support base 30, and is locked in a standing posture by the reclining apparatus 50. Moreover, the seat cushion 2 coupled to the seat back 1 is supported by the base cover 40 (the support base 30) from below.

When the conveyance seat S is moved from the seatable state to the housing state, the reclining operating lever 54 provided at an upper surface of the seat back 1 is operated.

The pre-seated occupant operates the reclining operating lever 54 to draw the reclining cable 56 and the first cushion cable 65, thereby unlocking the reclining apparatus 50 and the cushion lock apparatus 60 as illustrated in FIG. 7.

Then, due to the biasing force of the spiral spring 53, the seat back 1 starts rotating to the seat front side about the back rotary shaft 52 such that the seat cushion 2 moves to the housing floor.

As illustrated in FIG. 7, when the seat back 1 reaches a predetermined rotation position, the seat cushion 2 contacts a surface of the base cover 40 (the cover protruding portions 41), and moves toward the housing floor while sliding on the surface of the base cover 40.

Then, as illustrated in FIG. 8, when the seat back 1 and the seat cushion 2 reach the housing floor, operation of the reclining operating lever 54 is terminated, and accordingly, the seat cushion 2 is locked again by the cushion lock apparatus 60.

Note that the reclining apparatus 50 has a well-known unlock canceller mechanism maintaining the unlock state of the reclining apparatus 50 when the seat back 1 rotates to the seat front side to a predetermined angle with respect to the vehicle body floor. Thus, even after operation of the reclining operating lever 54 has ended, the seat back 1 is turnable relative to the vehicle body floor.

By a series of motion as described above, the seat body is housed in the housing floor, and the conveyance seat S is switched to the housing state.

<Seat Tip-Up Motion>

Next, motion for moving the seat body from the housing state to the tip-up state will be described based on FIGS. 9 and 10.

When the conveyance seat S is in the housing state illustrated in FIG. 8, the occupant manually raises up the seat body to switch the seat body to the tip-up state illustrated in FIG. 9, for example.

At this point, the cushion lock apparatus 60 locks the turning motion of the seat cushion 2, and therefore, the seat back 1 is raised up so that the seat cushion 2 can be also integrally raised up.

Note that in the tip-up state, the upper rails 4b are slid to a seat back side relative to the lower rails 4a so that a much broader trunk room space can be ensured on the seat front side.

When the conveyance seat S is switched to the tip-up state illustrated in FIG. 9, the seat back 1 returns to the same position as that in the seatable state, and is locked in the standing posture by the reclining apparatus 50.

Figure 10:
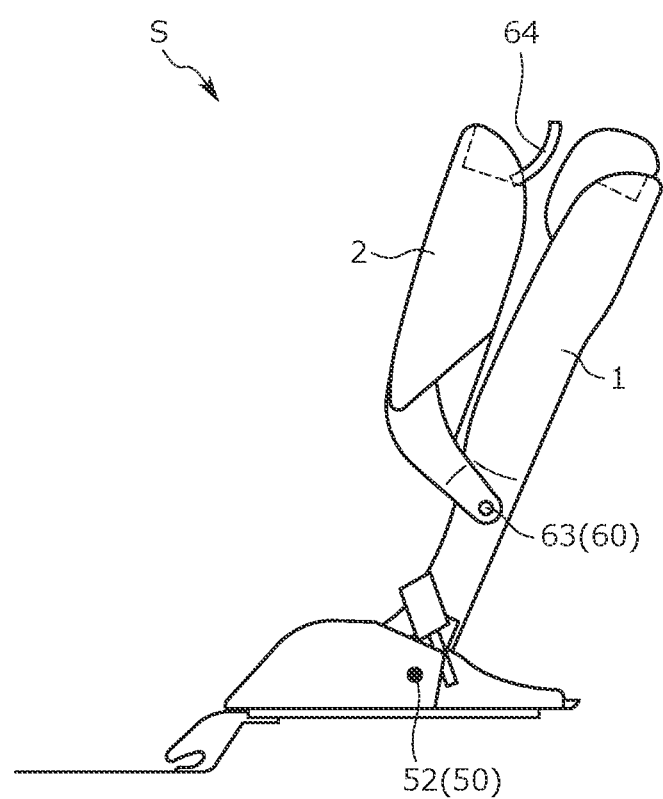
FIG. 10 is a view for describing motion for returning from the tip-up state to the seatable state.

Finally, when the conveyance seat S is moved from the tip-up state to the seatable state, the operation of pulling the cushion operating lever 64 illustrated in FIG. 9 is performed to draw the second cushion cable 66, and as illustrated in FIG. 10, the cushion lock apparatus 60 is unlocked.

In association with unlocking of the cushion lock apparatus 60, the seat cushion 2 downwardly rotates relative to the seat back 1 by the biasing force of the spiral spring 63.

By a series of motion as described above, the conveyance seat S returns to the seatable state illustrated in FIG. 11.

Note that in addition to the above-described switching operation, the conveyance seat S can be moved from the seatable state to the tip-up state.

Specifically, the pre-seated occupant operates the cushion operating lever 64 to draw the second cushion cable 66, thereby unlocking the cushion lock apparatus 60.

Then, the seat cushion 2 is upwardly rotated relative to the seat back 1 against the biasing force of the spiral spring 63, and therefore, can be directly moved to the tip-up state. At this point, the lock state of the seat back 1 by the reclining apparatus 50 is maintained.

<Details of Cushion Lock Apparatus>

Next, a specific configuration of the cushion lock apparatus 60 (the lock body 61) will be described based on FIGS. 12A and 12B to 13A and 13B.

Figure 12A:
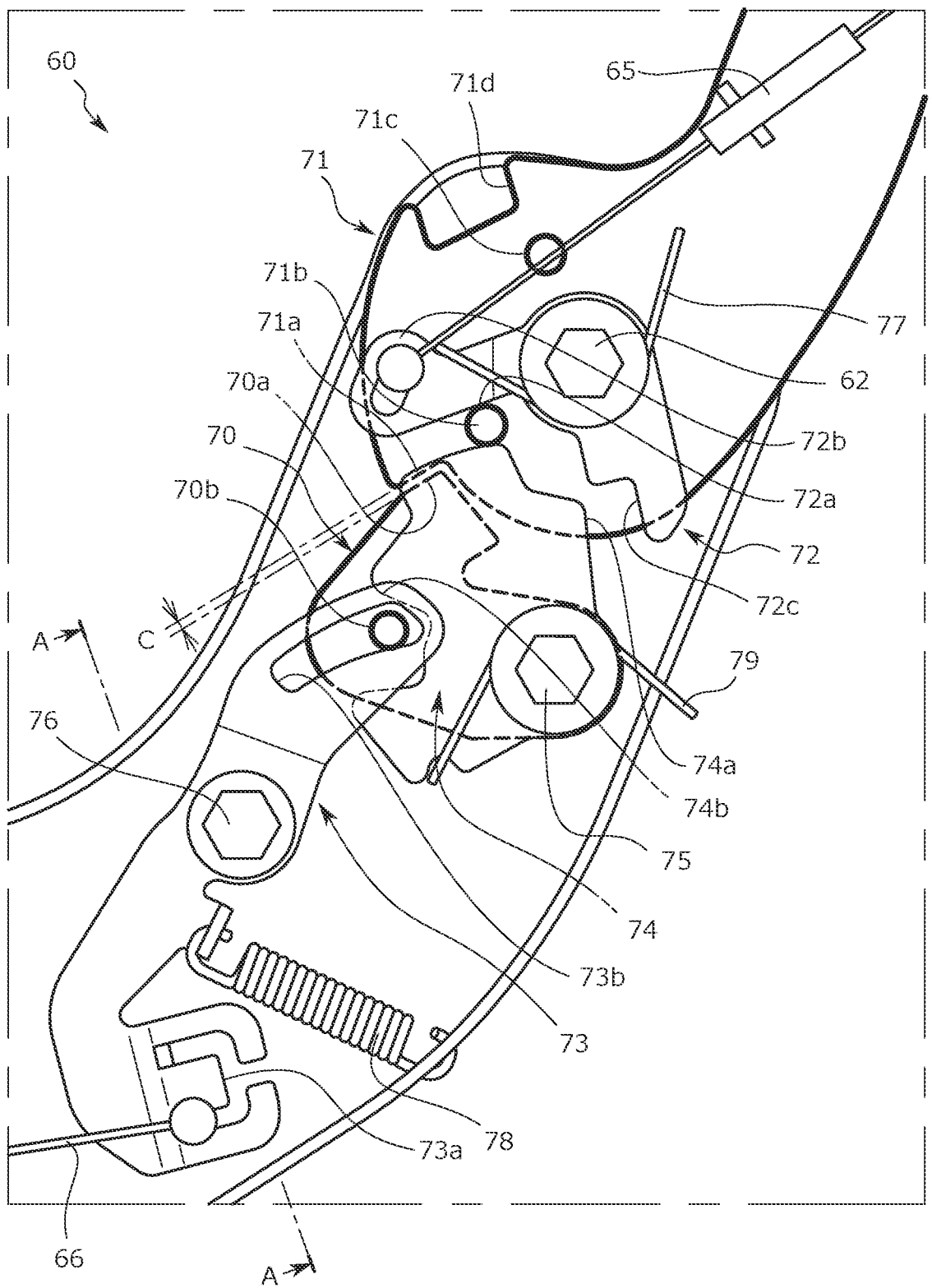
FIG. 12A is a view illustrating a state in which a lock member and a lock target member are arranged at lock positions in the seatable state.

As illustrated in FIG. 12A, the cushion lock apparatus 60 includes a lock member 70 attached to the cushion frame 20 side (the side frame 21), a lock target member 71 attached to the back frame 10 side and engaging with the lock member 70, and a first unlock lever 72 and a second unlock lever 73 to be operated for cancelling a lock state between the lock member 70 and the lock target member 71.

Further, the cushion lock apparatus 60 includes a position holding member 74 holding the position of the lock target member 71 to hold a state in which a clearance C is, in the seatable state, formed between an engagement portion 70a provided at the lock member 70 and an engagement target portion 71a provided at the lock target member 71.

As described above, the cushion lock apparatus 60 locks the cushion frame 20 at a lock position at which the lock member 70 engages with the lock target member 71 as illustrated in FIG. 12A. On the other hand, at an unlock position at which the lock member 70 does not engage with the lock target member 71 as illustrated in FIG. 12B, the cushion frame 20 is unlocked.

Figure 12B:
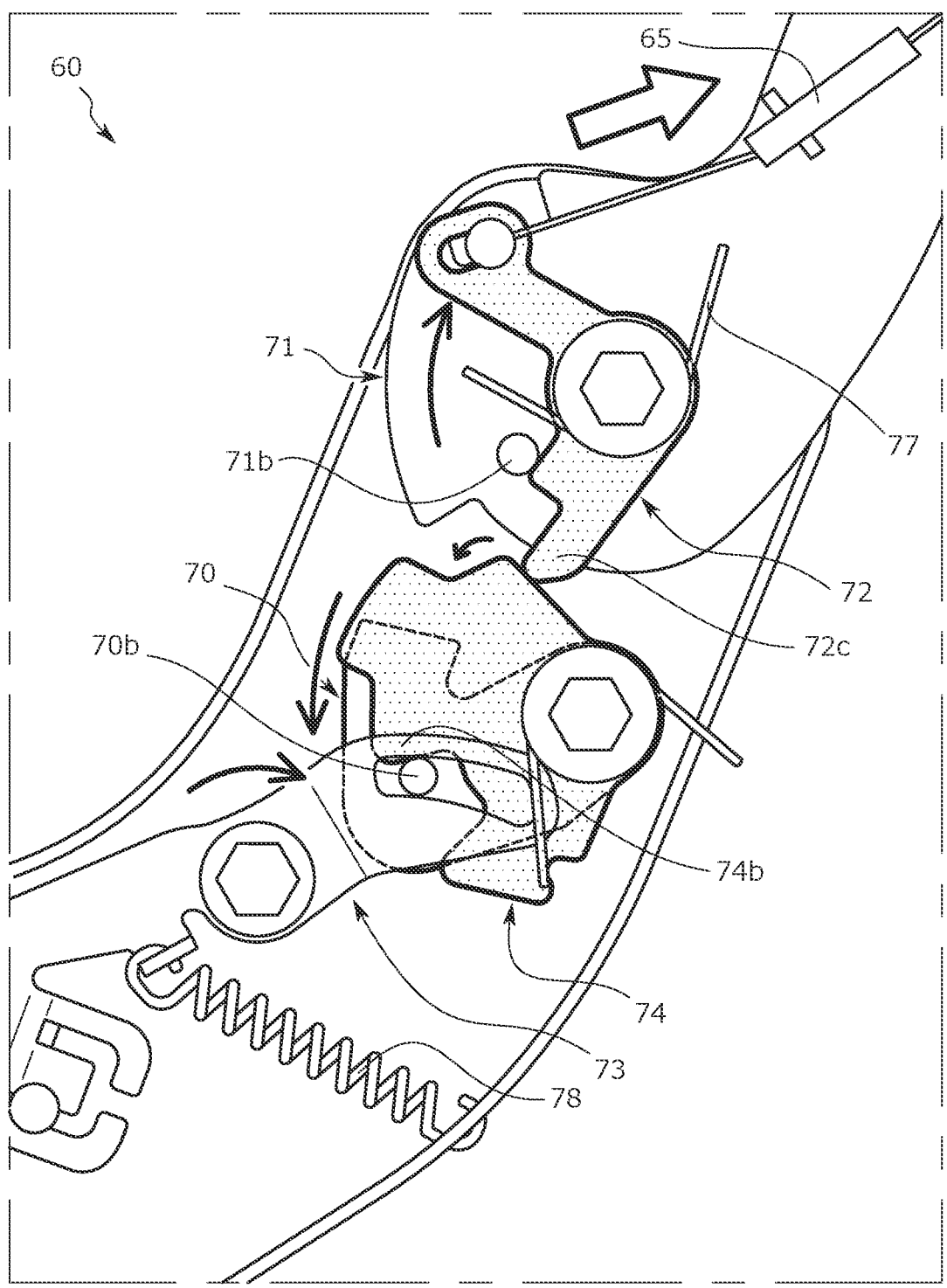
FIG. 12B is a view illustrating a state in which a first unlock lever moves from a lockable position to an unlockable position in the seatable state.

As illustrated in FIGS. 12A and 12B, the lock member is a member rotating about a lock rotary shaft 75 extending along the seat width direction between the lock position and the unlock position at which the lock member 70 is downwardly moved with respect to the lock position. In the seatable state, the lock member 70 is upwardly biased by the second unlock lever 73 and a second biasing spring 78, and is arranged at the lock position.

Specifically, the lock member 70 has the engagement portion 70a and a fitting protrusion 70b arranged on the opposite side of the lock rotary shaft 75 from the engagement portion 70a and protruding to a second unlock lever 73 side from an outer surface of the engagement portion 70a in the seat width direction.

The fitting protrusion 70b is in such arrangement that the fitting protrusion 70b is fitted in a fitting groove 73b formed at a side surface of the second unlock lever 73.

That is, the lock member 70 is arranged at the same position as that of the lock target member 71 in the seat width direction, and is arranged inside the second unlock lever 73.

As illustrated in FIGS. 12A and 12B, the lock target member 71 is a member extending in the upper-to-lower direction to couple the back frame 10 and the cushion frame 20 to each other. An upper end portion of the lock target member 71 is fixed to the outer surface of the back frame 10, and a lower end portion of the lock target member 71 is attached to the outer surface of the side frame 21 through the cushion rotary shaft 62.

Moreover, the lock target member 71 is arranged at the same position as that of the lock member 70 in the seat width direction.

The lock target member 71 has the engagement target portion 71a, a contact protrusion 71b arranged between the engagement target portion 71a and the cushion rotary shaft 62 and protruding to a first unlock lever 72 and a position holding member 74 side from an outer surface of the engagement target portion 71a in the seat width direction, an auxiliary protrusion 71c arranged on the opposite side of the cushion rotary shaft 62 from the contact protrusion 71b.

The contact protrusion 71b is arranged to contact the first unlock lever 72 (a contact portion 72a) to restrict turning of the first unlock lever 72, and is arranged to contact the position holding member 74 (a contact portion 74a) to hold the position of the lock target member 71.

That is, the lock target member 71 is, in the seat width direction, arranged inside the first unlock lever 72 and the position holding member 74. On the other hand, the first unlock lever 72 and the position holding member 74 are arranged at the same position in the seat width direction.

The first unlock lever 72 is a member turnably coupled to the outer surface of the cushion frame 20 through the cushion rotary shaft 62 and rotating between a lockable position illustrated in FIG. 12A and an unlockable position illustrated in FIG. 12B.

The first unlock lever 72 is biased to a lockable position side from an unlockable position side by a first biasing spring 77 attached to an outer peripheral surface of the cushion rotary shaft 62.

Moreover, the first unlock lever 72 is, in the seat width direction, arranged at a position different from those of the lock member 70 and the lock target member 71, and is arranged at a position next to the lock target member 71 in the seat width direction.

The contact portion 72a, a cable attachment portion 72b to which one end of the first cushion cable 65 is attached, and a pressing portion 72c arranged on the opposite side of the cushion rotary shaft 62 from the cable attachment portion 72b and pressing the lock member 70 are formed at the first unlock lever 72.

Specifically, the pressing portion 72c is configured to indirectly press the lock member 70 through the position holding member 74, and in association with drawing by the first cushion cable 65, presses the lock member 70 from the lockable position to the unlockable position as illustrated in FIG. 12A.

Figure 13A:
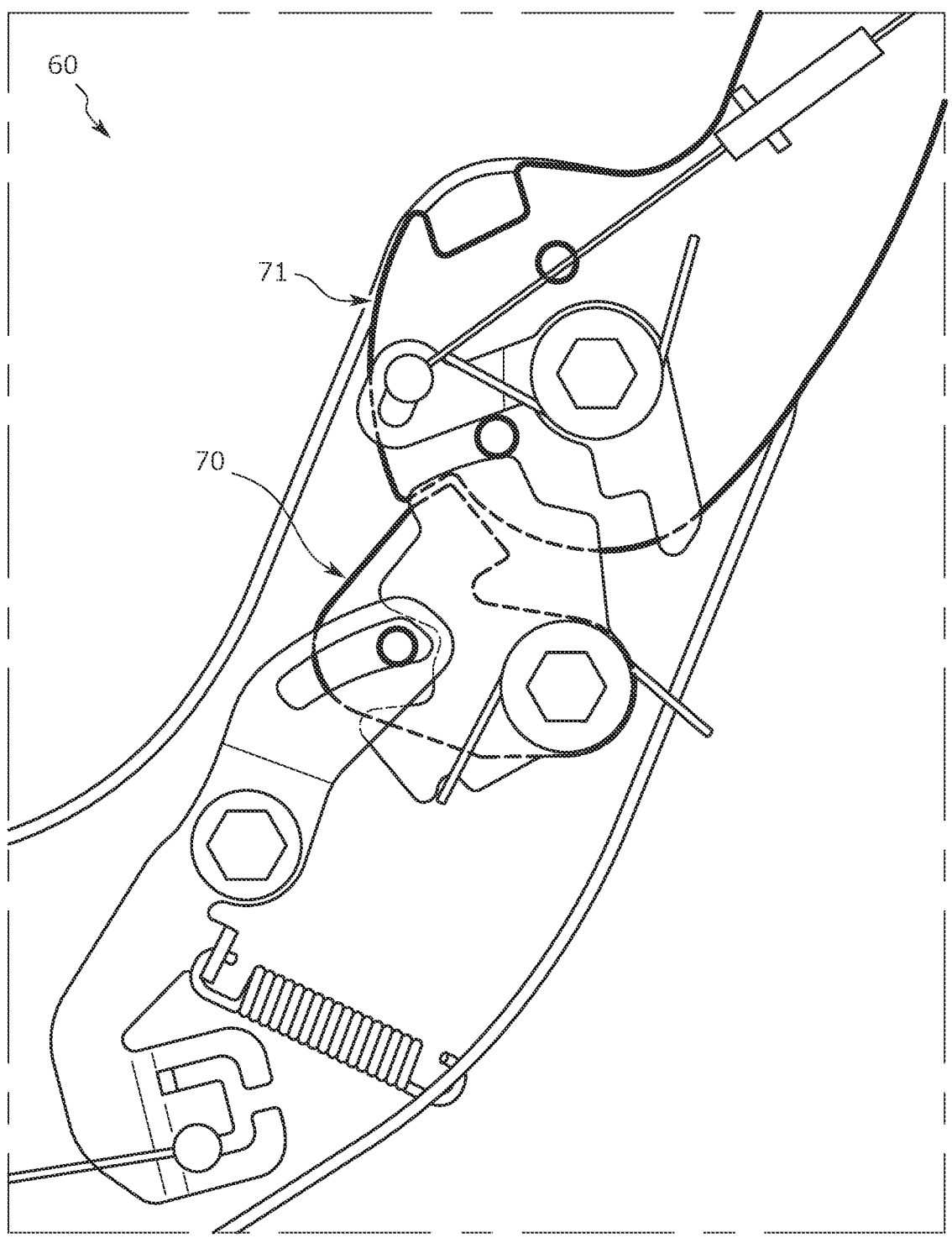
FIG. 13A is a view illustrating the state in which the lock member and the lock target member are arranged at the lock positions in the seatable state.
Figure 13B:
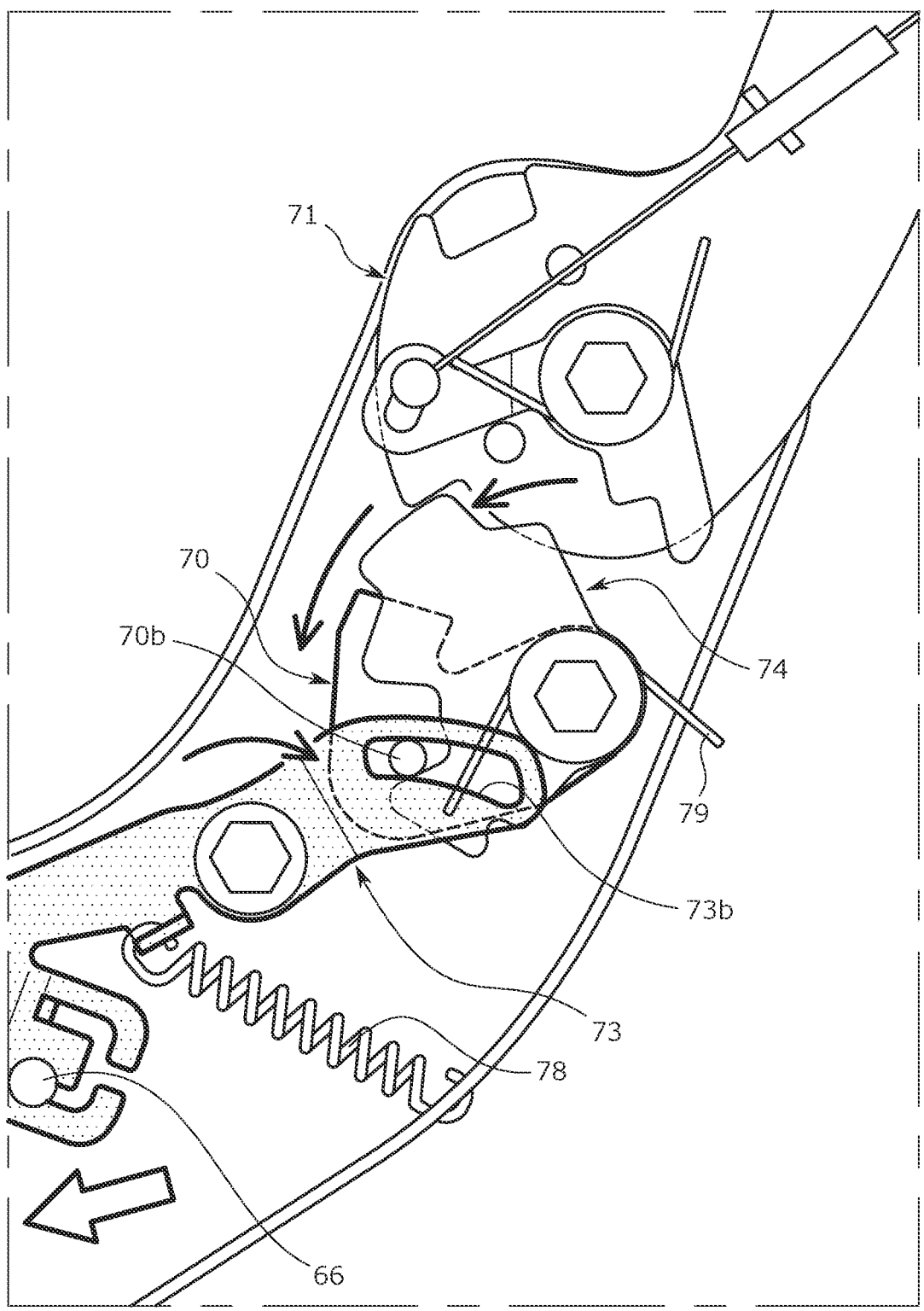
FIG. 13B is a view illustrating a state in which a second unlock lever moves from a lockable position to an unlockable position in the seatable state.

The second unlock lever 73 is a member turnably coupled to the outer surface of the cushion frame 20 through a lever rotary shaft 76 and rotating between a lockable position illustrated in FIG. 13A and an unlockable position illustrated in FIG. 13B.

The second unlock lever 73 is biased to a lockable position side from an unlockable position side by the second biasing spring 78 attached to a lower end of the cushion frame 20.

A cable attachment portion 73a to which one end of the second cushion cable 66 is attached and the fitting groove 73b arranged on the opposite side of the lever rotary shaft 76 from the cable attachment portion 73a and fitted onto the fitting protrusion 70b for moving the lock member 70 are formed at the second unlock lever 73.

The position holding member 74 is a member turnably coupled to the outer surface of the cushion frame 20 through the lock rotary shaft 75 and rotating between a holding position at which the contact portion 74a contacts the contact protrusion 71b and a release position at which the contact portion 74a does not contact the contact protrusion 71b as illustrated in FIGS. 12A and 12B.

The position holding member 74 is biased to a holding position side from a release position side by a third biasing spring 79 attached to an outer peripheral surface of the lock rotary shaft 75.

Moreover, the position holding member 74 is arranged at a position different from those of the lock member 70 and the lock target member 71 in the seat width direction, and is arranged at a position next to the lock member 70 in the seat width direction.

The contact portion 74a contacting the lock target member 71 (the contact protrusion 71b) to hold the position of the lock target member 71 and a push-out portion 74b provided for pushing out the lock member 70 (the fitting protrusion 70b) are formed at the position holding member 74.

Note that a portion of the position holding member 74 attached to a free end of the third biasing spring 79 is formed with a recessed portion 74c, and assembly stiffness of the free end is ensured.

Figure 16:
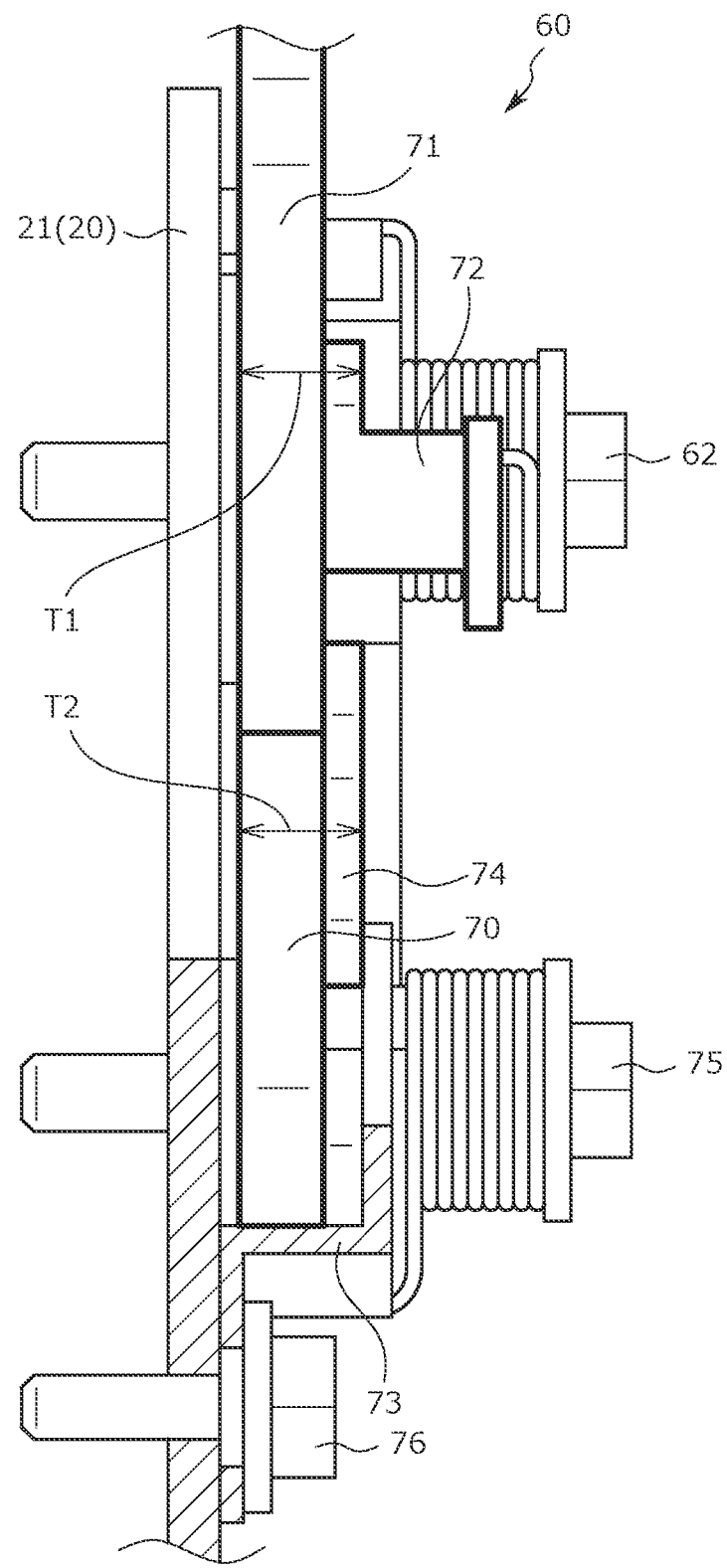
FIG. 16 is an A-A sectional view of FIG. 12A illustrating the cushion lock apparatus.

Note that as illustrated in FIGS. 16, T1 and T2 are set to the same thickness, assuming that the thickness of an overlap between the lock member 70 and the position holding member 74 is T1 and the thickness of an overlap between the lock target member 71 and the first unlock lever 72 is T2.

In the above-described configuration, as illustrated in FIG. 12A, the slight clearance C is formed between the lock member 70 and the lock target member 71 in the cushion lock apparatus 60, considering a product error of each component. The position holding member 74 is arranged to hold the position of the lock target member 71.

Thus, the conveyance seat S capable of reducing swing (vibration) of the seat cushion while the vehicle is travelling can be realized.

The cushion lock apparatus 60 is configured such that when the position holding member 74 moves from the holding position to the release position side against biasing force of the third biasing spring 79 in response to a load from the outside, the lock member 70 (the engagement portion 70a) and the lock target member 71 (the engagement target portion 71a) engage with each other instead.

Thus, the position holding member 74 can be released from the holding position to the release position side, and therefore, the size of the position holding member 74 does not need to be increased more than necessary.

In the above-described configuration, as illustrated in FIG. 12A, the contact protrusion 71b and the auxiliary protrusion 71c of the lock target member 71 are arranged at positions close to the engagement target portions 71a, 71d formed in such a manner that part of the lock target member 71 is cut out.

Thus, a low-stiffness portion of the lock target member 71 can be reinforced utilizing the contact protrusion 71b and the auxiliary protrusion 71c.

In the above-described configuration, as illustrated in FIG. 12A, the first unlock lever 72 and the second unlock lever 73 are arranged at different positions in the upper-to-lower direction, and are arranged to sandwich the lock member 70. The first unlock lever 72 is arranged at a position above the second unlock lever 73.

Thus, an increase in the size of the cushion lock apparatus 60 can be suppressed by more compact arrangement as compared to a typical technique.

In the above-described configuration, as illustrated in FIG. 12A, a portion of the first unlock lever 72 formed with the pressing portion 72c is formed narrower.

Thus, design can be made such that contact with other components can be reduced while stiffness of the portion formed with the pressing portion 72c is ensured as much as possible.

In the above-described configuration, as illustrated in FIGS. 2 and 12A, the second unlock lever 73 is in a crank shape, and specifically, the fitting groove 73b of the second unlock lever 73 is arranged outside a portion attached to the lever rotary shaft 76 in the seat width direction.

Thus, components including the second unlock lever 73 can be arranged compactly.

In the above-described configuration, as illustrated in FIG. 5, the cushion lock apparatus 60 further includes a shaft coupling member 80 extending along a side surface of the cushion frame 20 to couple the cushion rotary shaft 62 and the lock rotary shaft 75. Thus, reinforcement can be made with a simple configuration.

The shaft coupling member 80 is in a flat plate shape, and has a first shaft support portion 80a supporting the cushion rotary shaft 62, a second shaft support portion 80b supporting the lock rotary shaft 75, and a cutout portion 80c cut out at a portion closer to a first shaft support portion 80a side than to the second shaft support portion 80b.

<Motion of Cushion Lock Apparatus>

Next, specific motion of the cushion lock apparatus 60 will be described based on FIGS. 12A and 12B to 15A and 15B.

First, motion of the cushion lock apparatus 60 when the "reclining operating lever 54" illustrated in FIG. 1 is operated in the "seatable state" will be described based on FIGS. 12A and 12B.

When the cushion lock apparatus 60 is in the lock state in the seatable state as illustrated in FIG. 6, the lock member 70 is arranged at an engagement position at which the lock member 70 engages with the lock target member 71 as illustrated in FIG. 12A. Specifically, in a state in which the slight clearance C is formed between the engagement portion 70a of the lock member 70 and the engagement target portion 71a of the lock target member 71, the lock member 70 and the lock target member 71 engage with each other.

At this point, the first unlock lever 72 and the second unlock lever 73 are arranged at the lockable positions.

Specifically, the first unlock lever 72 is biased by the first biasing spring 77, and contacts the contact protrusion 71b of the lock target member 71. Thus, the first unlock lever 72 is arranged at the lockable position. The second unlock lever 73 is biased by the second biasing spring 78, and is fitted onto the fitting protrusion 70b of the lock member 70. Thus, the second unlock lever 73 is arranged at the lockable position. In other words, the second unlock lever 73 (the fitting groove 73b) holds the position of the lock member 70.

The position holding member 74 is arranged at the holding position for holding the engagement position of the lock target member 71. Specifically, the position holding member 74 is biased by the third biasing spring 79, and contacts the contact protrusion 71b of the lock target member 71. Thus, the position holding member 74 is arranged at the holding position.

When the reclining operating lever 54 is operated in the seatable state, the first unlock lever 72 is, as illustrated in FIG. 12B, drawn by the first cushion cable 65, and rotatably moves from the lockable position to the unlockable position against biasing force of the first biasing spring 77.

As a result, the first unlock lever 72 (the pressing portion 72c) presses the lock member 70 through the position holding member 74, and the lock member 70 rotatably moves from the engagement position to a disengagement position.

Specifically, the position holding member 74 is pressed by the first unlock lever 72, and moves from the holding position to the release position. At this point, the position holding member 74 (the push-out portion 74b) pushes out the fitting protrusion 70b of the lock member 70 so that the lock member 70 can be rotatably moved.

Note that in association with rotary movement of the lock member 70 (the fitting protrusion 70b), the second unlock lever 73 also rotatably moves from the lockable position to the unlockable position against biasing force of the second biasing spring 78.

By a series of motion as described above, the cushion lock apparatus 60 is unlocked in the seatable state, i.e., the lock state between the lock member 70 and the lock target member 71 is cancelled in the seatable state.

Next, motion of the cushion lock apparatus 60 when the "cushion operating lever 64" illustrated in FIG. 1 is operated in the "seatable state" will be described based on FIGS. 13A and 13B.

When the cushion lock apparatus 60 is in the lock state in the seatable state as illustrated in FIG. 6, the lock member 70 is arranged at the engagement position at which the lock member 70 engages with the lock target member 71 as illustrated in FIG. 13A.

When the cushion operating lever 64 is operated in the seatable state, the second unlock lever 73 is, as illustrated in FIG. 13B, drawn by the second cushion cable 66, and rotatably moves from the lockable position to the unlockable position against the biasing force of the second biasing spring 78.

As a result, the second unlock lever 73 (the fitting groove 73b) pulls the lock member 70 (the fitting protrusion 70b), and the lock member 70 rotatably moves from the engagement position to the disengagement position.

Note that in association with rotary movement of the lock member 70 (the fitting protrusion 70b), the position holding member 74 also rotatably moves from the holding position to the release position side against the biasing force of the third biasing spring 79. Specifically, the position holding member 74 rotatably moves to an intermediate position at which the position holding member 74 does not hold the lock target member 71.

By a series of motion as described above, the cushion lock apparatus 60 is unlocked in the seatable state, i.e., the lock state between the lock member 70 and the lock target member 71 is cancelled in the seatable state.

Next, motion of the cushion lock apparatus 60 when the "reclining operating lever 54" illustrated in FIG. 1 is operated in the "tip-up state" will be described based on FIGS. 14A and 14B.

Figure 14A:
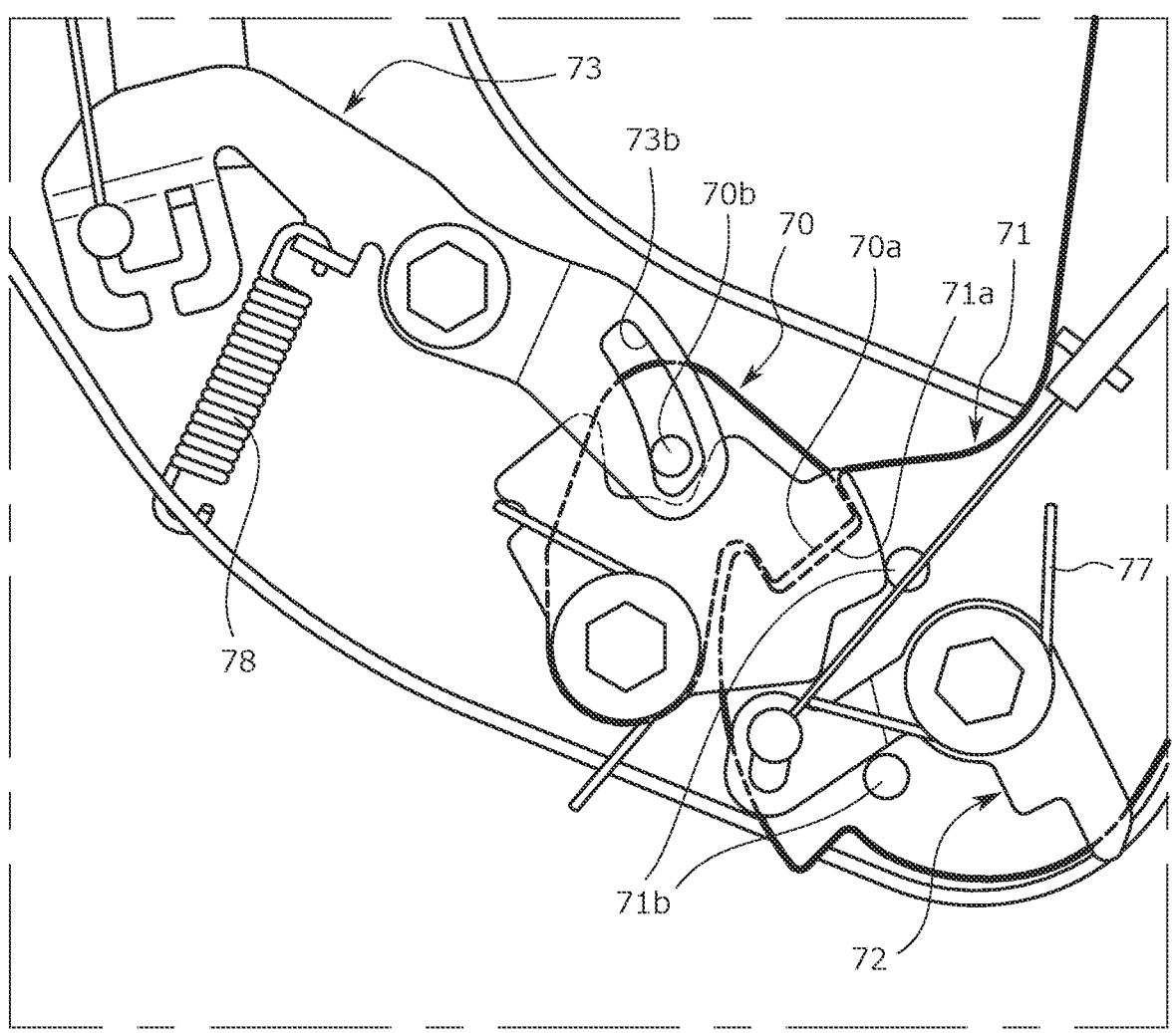
FIG. 14A is a view illustrating a state in which the lock member and the lock target member are arranged at the lock positions in the tip-up state.

When the cushion lock apparatus 60 is in the lock state in the tip-up state as illustrated in FIG. 9, the lock member 70 is arranged at the engagement position at which the lock member 70 engages with the lock target member 71 as illustrated in FIG. 14A. Specifically, the engagement portion 70a of the lock member 70 and the engagement target portion 71d provided at the lock target member 71 engage with each other.

At this point, the first unlock lever 72 and the second unlock lever 73 are arranged at the lockable positions.

Specifically, the first unlock lever 72 is biased by the first biasing spring 77, and contacts the contact protrusion 71b of the lock target member 71. Thus, the first unlock lever 72 is arranged at the lockable position. The second unlock lever 73 is biased by the second biasing spring 78, and is fitted onto the fitting protrusion 70b of the lock member 70. Thus, the second unlock lever 73 is arranged at the lockable position. In other words, the second unlock lever 73 (the fitting groove 73b) holds the position of the lock member 70.

The position holding member 74 is arranged at the holding position for holding the engagement position of the lock target member 71. Specifically, the position holding member 74 is biased by the third biasing spring 79, and contacts the auxiliary protrusion 71c of the lock target member 71. Thus, the position holding member 74 is arranged at the holding position.

Figure 14B:
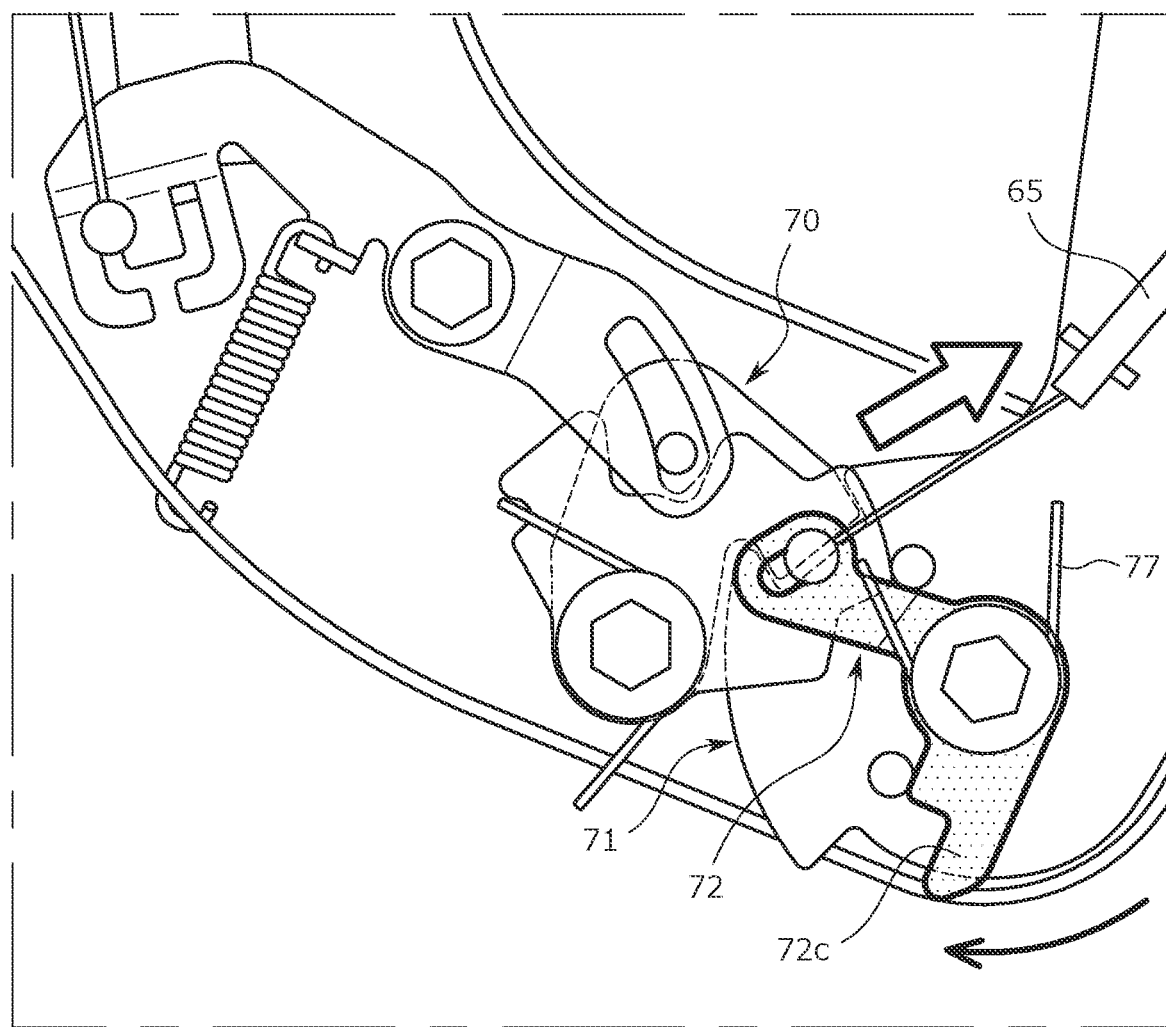
FIG. 14B is a view illustrating a state in which the first unlock lever moves from the lockable position to the unlockable position in the tip-up state.

When the reclining operating lever 54 is operated in the tip-up state, the first unlock lever 72 is, as illustrated in FIG. 14B, drawn by the first cushion cable 65, and rotatably moves from the lockable position to the unlockable position against the biasing force of the first biasing spring 77.

At this point, the first unlock lever 72 (the pressing portion 72c) idles, and therefore, the lock state between the lock member 70 and the lock target member 71 cannot be cancelled.

That is, when the reclining operating lever 54 is operated in the tip-up state, the cushion lock apparatus 60 is not unlocked, and only the reclining apparatus 50 is unlocked.

Next, motion of the cushion lock apparatus 60 when the "cushion operating lever 64" illustrated in FIG. 1 is operated in the "tip-up state" will be described based on FIGS. 15A and 15B.

Figure 15A:
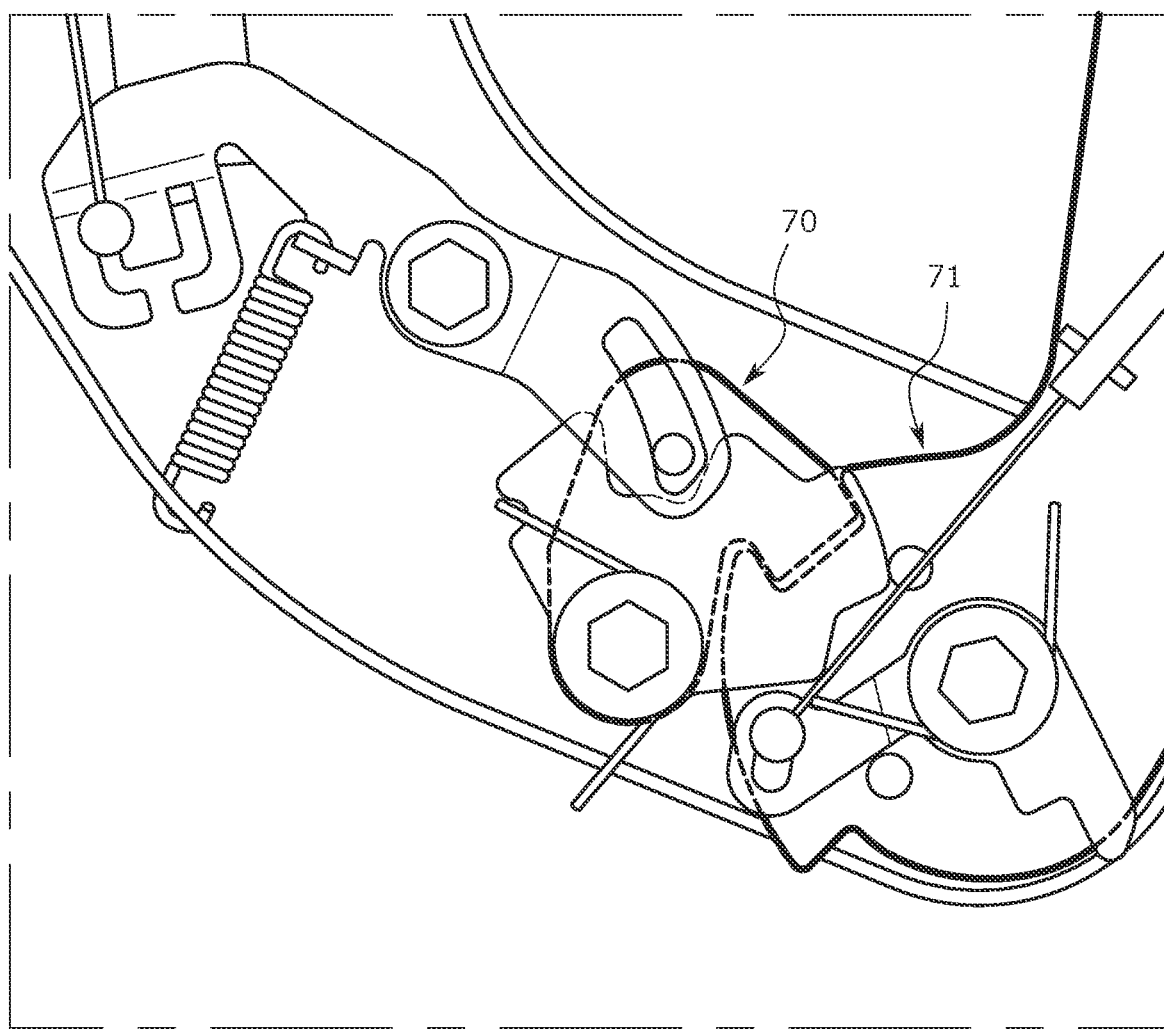
FIG. 15A is a view illustrating the state in which the lock member and the lock target member are arranged at the lock positions in the tip-up state.

When the cushion lock apparatus 60 is in the lock state in the tip-up state as illustrated in FIG. 9, the lock member 70 is arranged at the engagement position at which the lock member 70 engages with the lock target member 71 as illustrated in FIG. 15A.

Figure 15B:
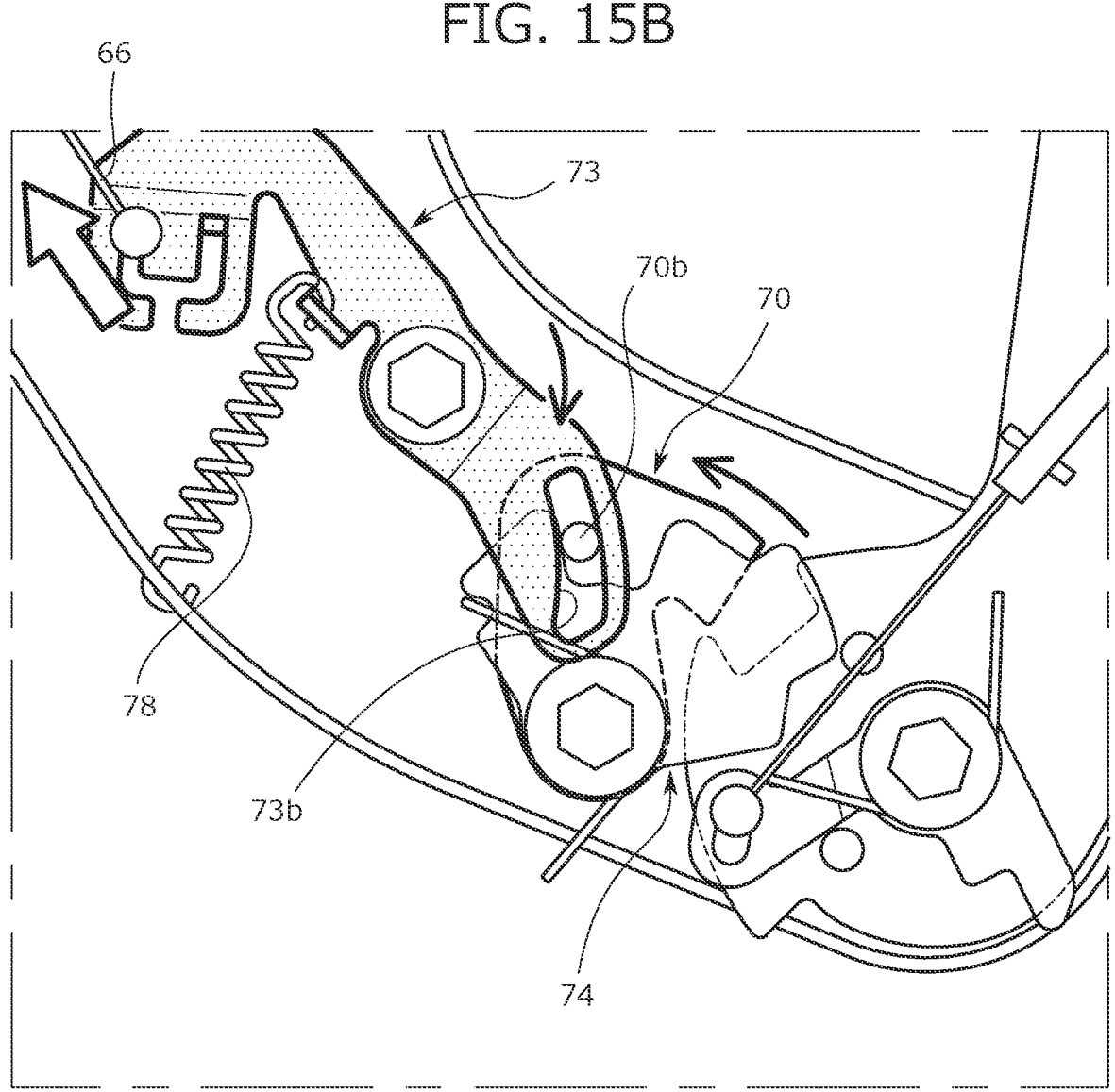
FIG. 15B is a view illustrating a state in which the second unlock lever moves from the lockable position to the unlockable position in the tip-up state.

When the cushion operating lever 64 is operated in the seatable state, the second unlock lever 73 is, as illustrated in FIG. 15B, drawn by the second cushion cable 66, and rotatably moves from the lockable position to the unlockable position against the biasing force of the second biasing spring 78.

As a result, the second unlock lever 73 (the fitting groove 73b) pulls the lock member 70 (the fitting protrusion 70b), and the lock member 70 rotatably moves from the engagement position to the disengagement position.

At this point, the position holding member 74 is arranged at a position outside a turning area of the second unlock lever 73, and therefore, remains in a state in which the position holding member 74 is arranged at the holding position.

By a series of motion as described above, the cushion lock apparatus 60 is unlocked in the tip-up state, i.e., the lock state between the lock member 70 and the lock target member 71 is cancelled in the tip-up state.

Second Embodiment of Conveyance Seat

Next, a second embodiment of a conveyance seat will be described based on FIGS. 17 and 18.

Note that description of contents overlapping with those of the above-described conveyance seat S will be omitted.

A conveyance seat S2 according to the second embodiment is mainly different from the conveyance seat S in that the conveyance seat S2 further includes an ottoman apparatus 90.

Figure 17:
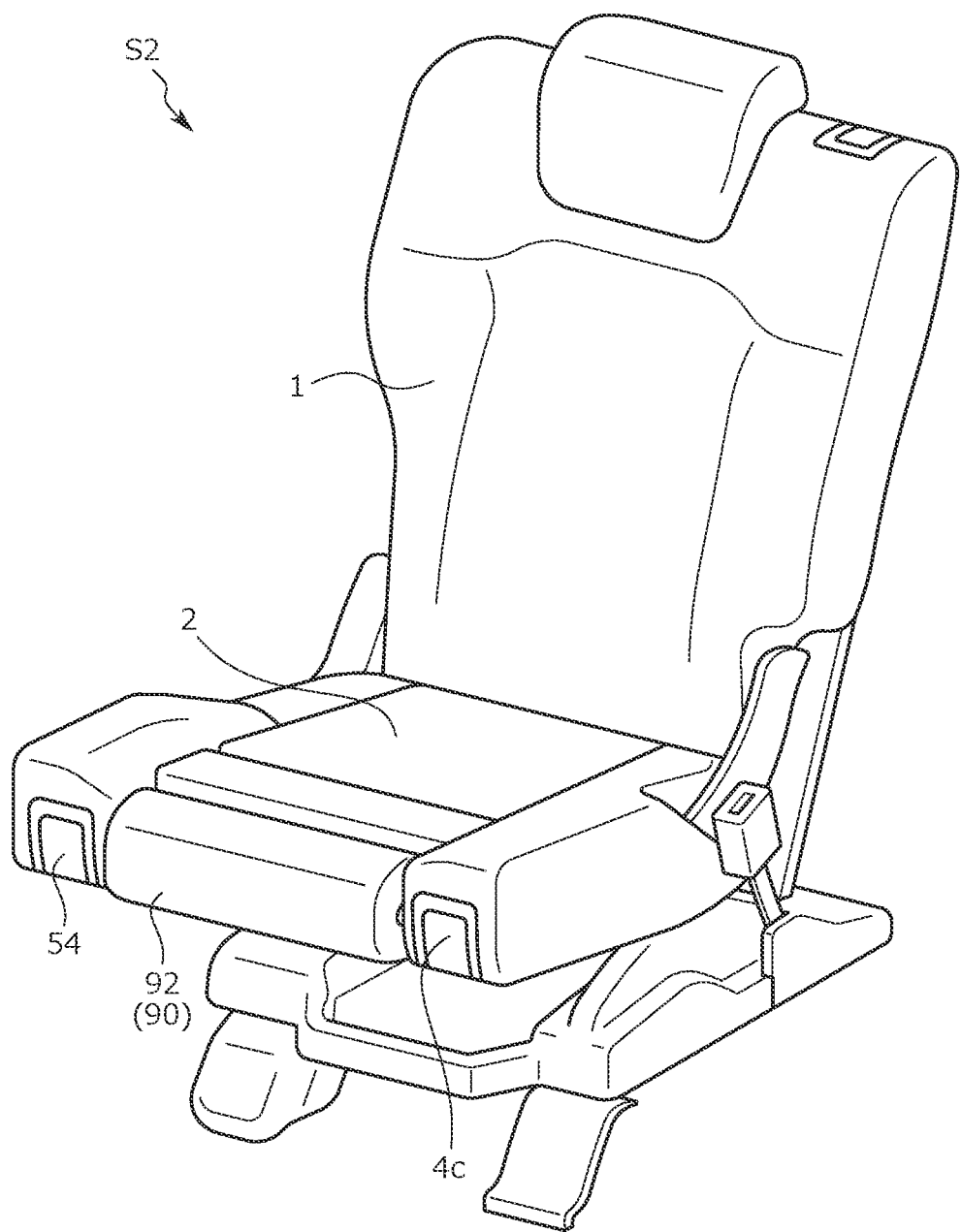
FIG. 17 is a perspective view of a conveyance seat of a second embodiment.

The ottoman apparatus 90 includes a well-known apparatus, and as illustrated in FIG. 17, is attached to a front end portion of a seat cushion 2 and is arranged between a reclining operating lever 54 and a rail operating lever 4c in a seat width direction.

The ottoman apparatus 90 mainly includes an ottoman rotary shaft 91 extending in the seat width direction and supported on the front end portion of the seat cushion 2, a leg support member 92 turning relative to the seat cushion 2 about the ottoman rotary shaft 91 as the center of turning, and a not-shown movable unit for moving the leg support member 92.

Figure 18:
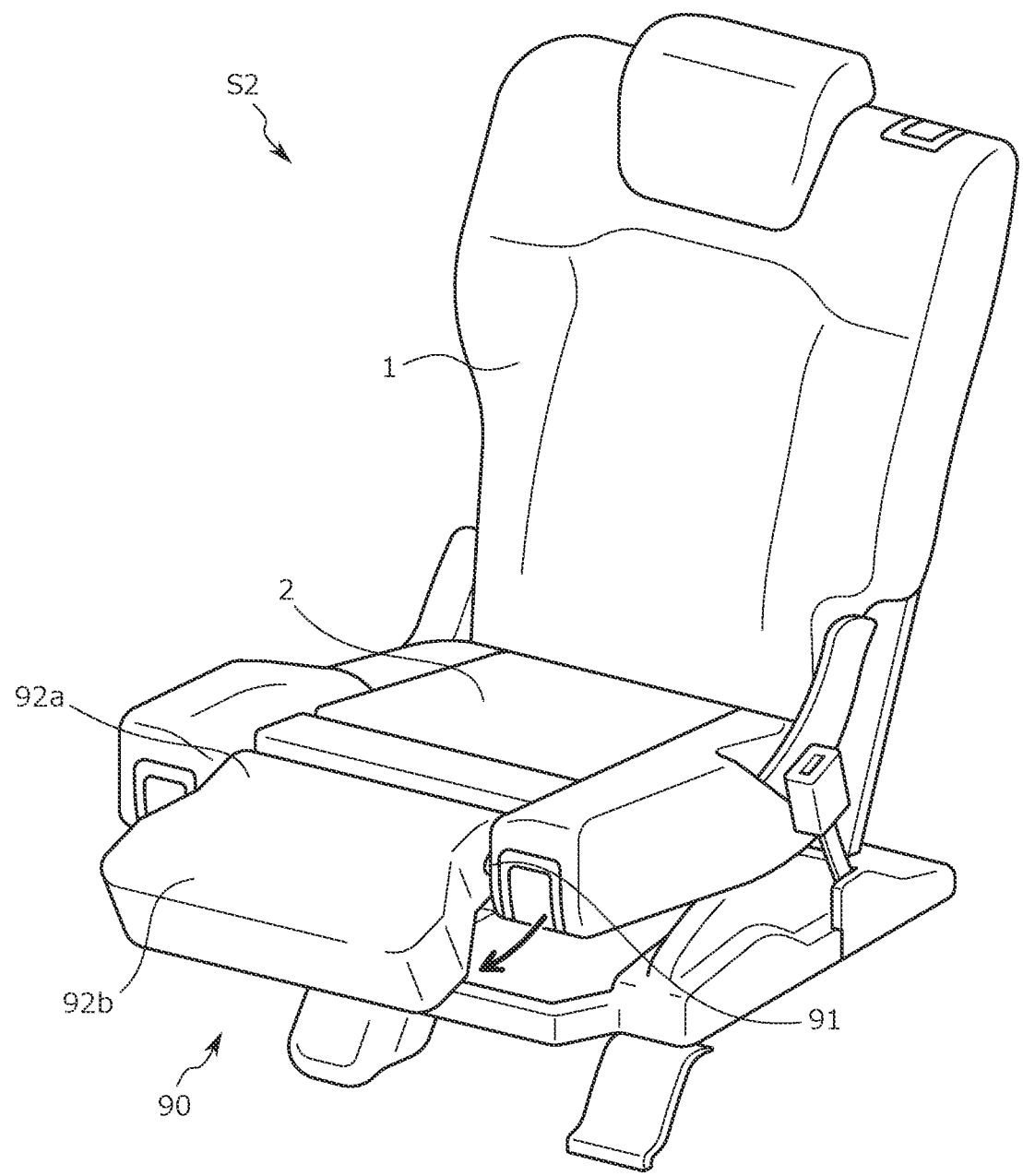
FIG. 18 is a perspective view of the conveyance seat illustrating a state in which an ottoman apparatus moves from a reference position to a movable position.

The leg support member 92 is turnable between a storage position at which the leg support member 92 is stored inside the seat cushion 2 as illustrated in FIG. 17 and a deploy position at which the leg support member 92 is deployed forward of the seat cushion 2 from the storage position as illustrated in FIG. 18.

The leg support member 92 mainly includes a support-side end portion 92a supported on the front end portion of the seat cushion 2 and a deploy-side end portion 92b formed wider than the support-side end portion 92a in the seat width direction.

With the above-described configuration, the conveyance seat allowing seat arrangement and configured such that the ottoman apparatus 90 is arranged compactly can be realized.

Third Embodiment of Conveyance Seat

Next, a third embodiment of a conveyance seat will be described based on FIGS. 19 to 25.

As a conveyance seat S3, an ottoman-apparatus-equipped conveyance seat whose seat body is switchable from a seatable state and which is configured so that an increase in the size of the seat can be suppressed with a simple configuration is realized. Moreover, a conveyance seat is realized, whose size is reduced while attachment stiffness of various apparatuses including an ottoman apparatus is improved.

Figure 19:
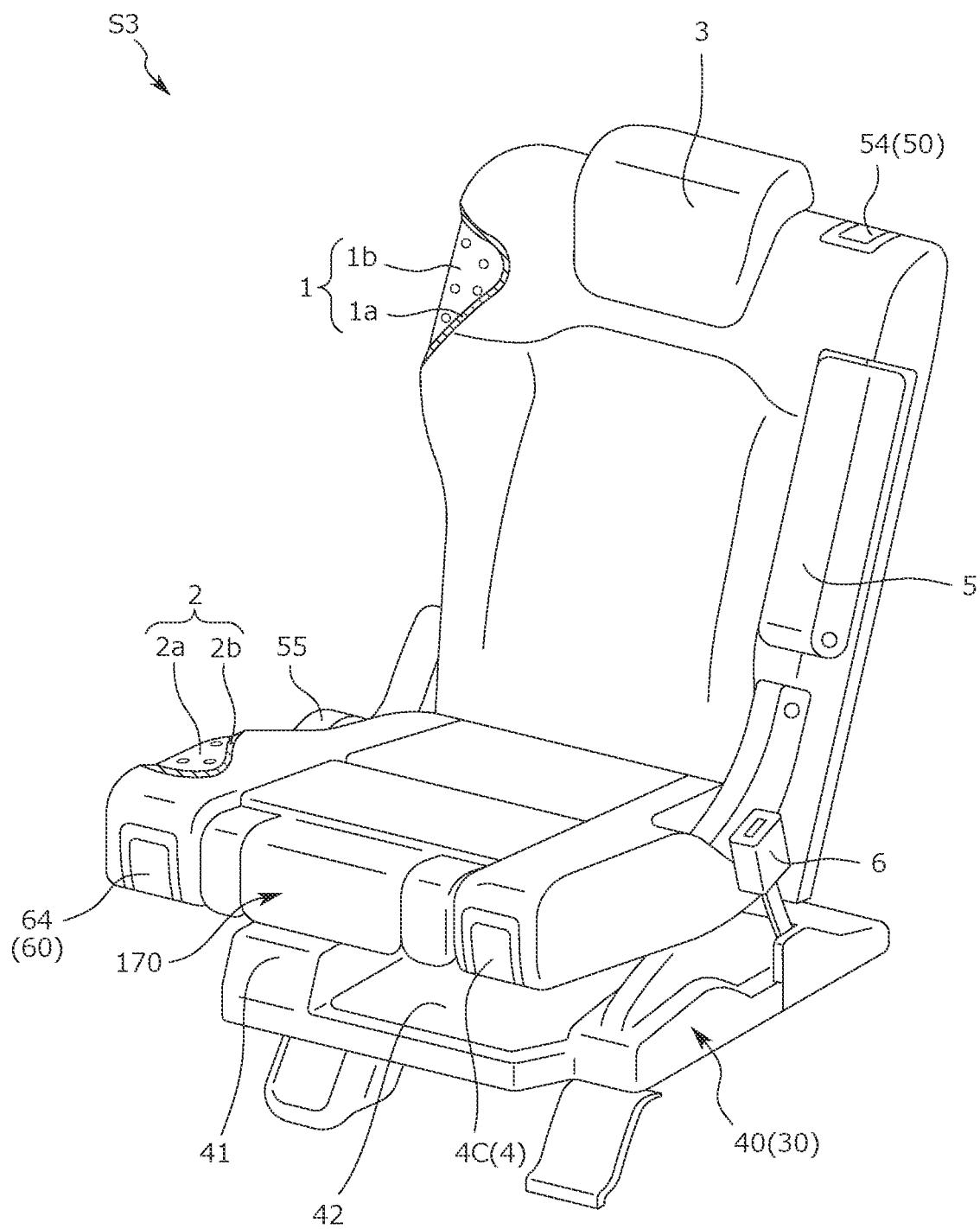
FIG. 19 is a perspective view of a conveyance seat of a third embodiment.
Figure 20:
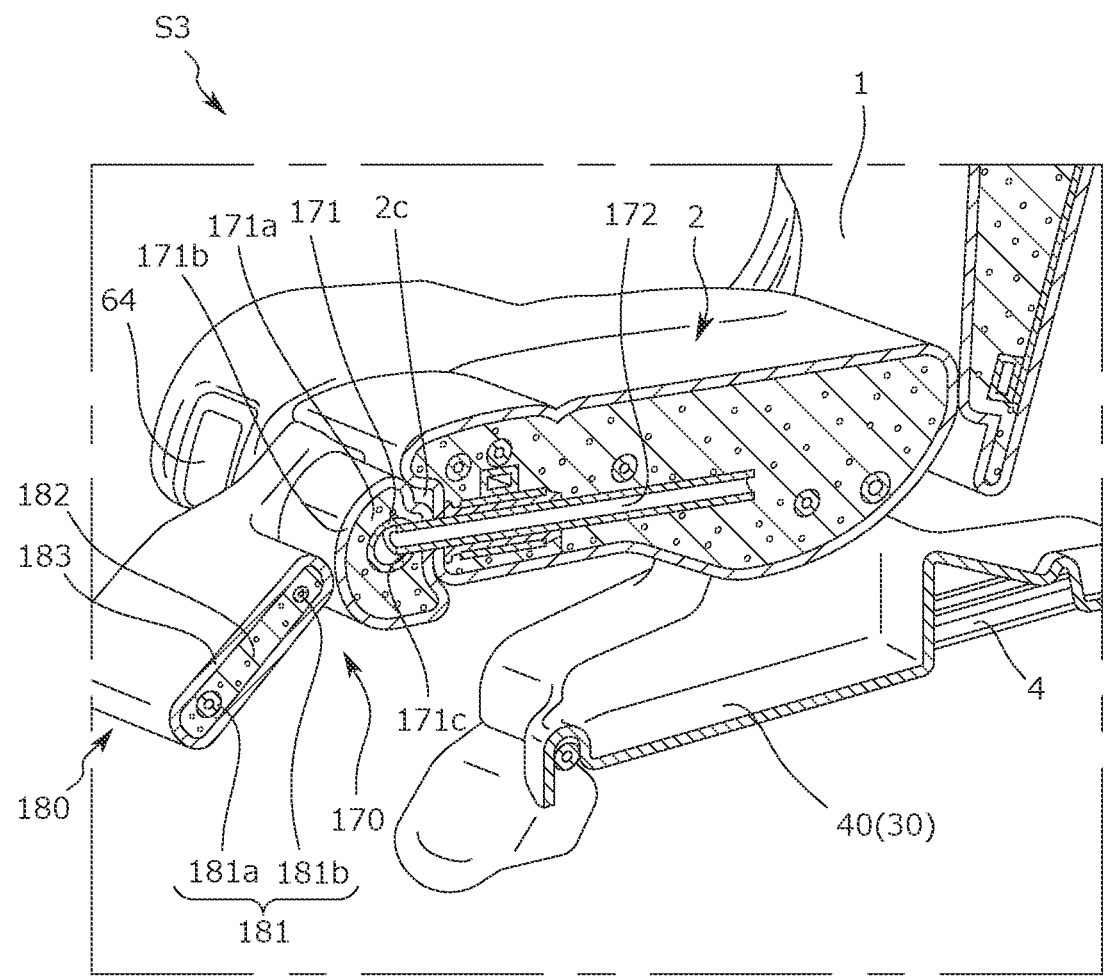
FIG. 20 is a perspective sectional view illustrating a seat cushion and an ottoman apparatus.
Figure 21:
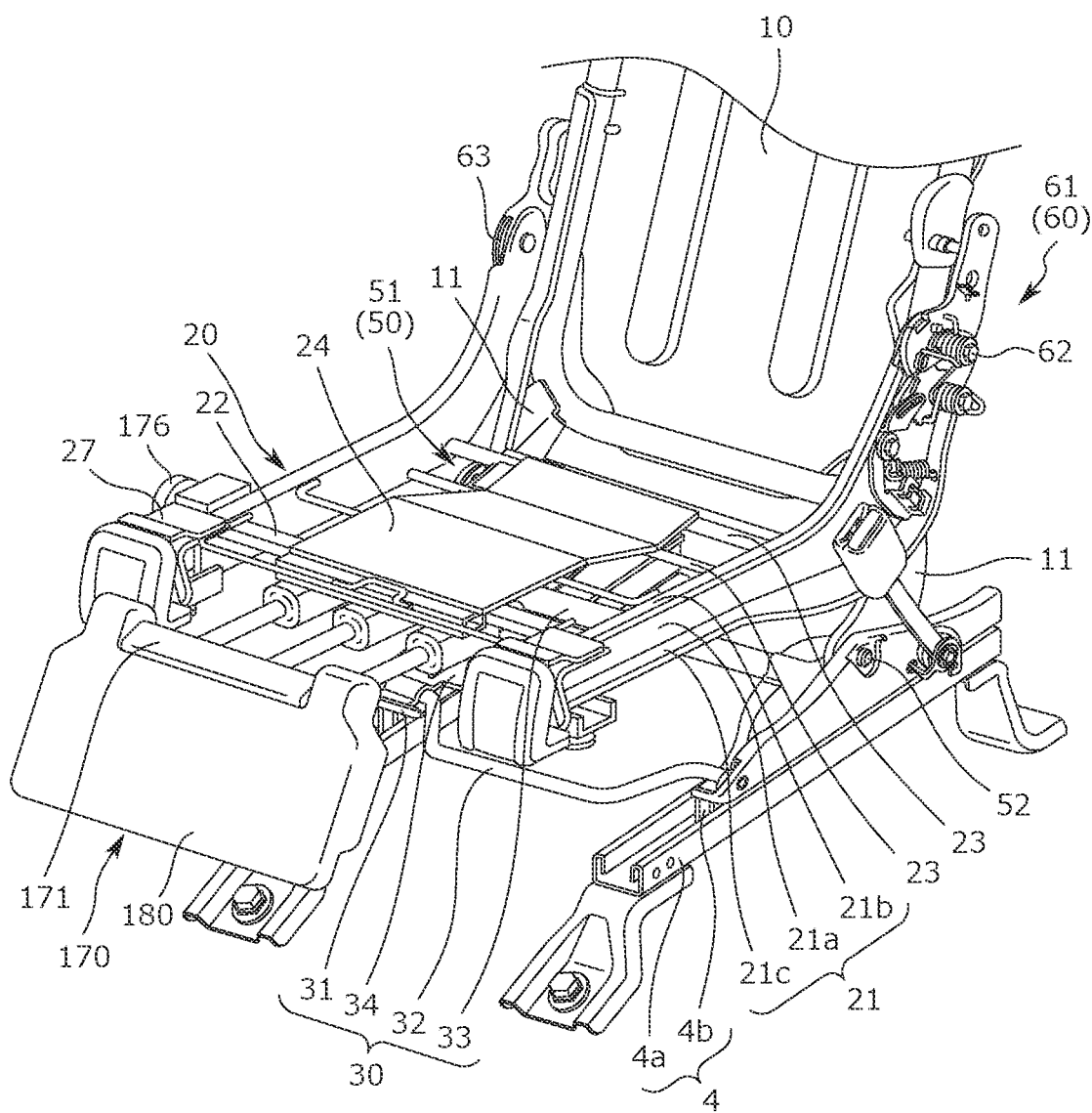
FIG. 21 is a perspective view of a seat frame as a framework of the conveyance seat.

The conveyance seat S3 mainly includes, as illustrated in FIGS. 19 to 21, a seat body having a seat back 1, a seat cushion 2, and a headrest 3, a support base 30 supporting the seat body from below, and right and left rail apparatuses 4 attached to between a vehicle body floor and the support base 30, movably supporting the seat body in a seat front-to-back direction, and locking movement of the seat body.

Further, the conveyance seat S3 includes, as illustrated in FIG. 21, a reclining apparatus 50 turnably coupling the seat back 1 to the support base 30 and locking turning motion of the seat back 1 in a seatable state and a tip-up state and a cushion lock apparatus 60 turnably coupling the seat cushion 2 to the seat back 1 and locking turning motion of the seat cushion 2 in the seatable state, a housing state, and the tip-up state.

In addition, the conveyance seat S3 includes an ottoman apparatus 170 which has a leg support member 180 turnably attached to a front portion of the seat cushion 2 and supporting the legs of a seated occupant from below and which is capable of turning the leg support member 180 between a storage position at which the leg support member 180 is stored on a seat cushion 2 side as illustrated in FIG. 19 and a deploy position at which the leg support member 180 is rotatably moved to a seat front side with respect to the storage position as illustrated in FIG. 20.

The seat cushion 2 is a seating portion supporting an occupant from below, and is configured such that a cushion pad 2a placed on a cushion frame 20 as a framework illustrated in FIG. 19 is covered with a skin 2b.

As illustrated in FIG. 20, at a center portion of a front end of the seat cushion 2 in a seat width direction, a storage recessed portion 2c for storing the ottoman apparatus 170 (an ottoman rotary shaft 171) is formed. It is configured such that a portion from an outer surface of the seat cushion 2 to an outer surface of the ottoman apparatus 170 forms a substantially integrated appearance.

At the front end of the seat cushion 2, a lower portion of the storage recessed portion 2c is formed recessed to a seat back side. Even at a front end portion of the seat cushion 2, a seating surface (an upper surface) of the seat cushion 2 is ensured. That is, the cushion pad 1a is placed and covered with the skin 1b even at the front end portion of the seat cushion 2.

Thus, an occupant's feeling of seating is not degraded. Moreover, entrance of a foreign substance into a portion between components of the ottoman apparatus 170 from the outside (from above) can be reduced.

As illustrated in FIG. 21, the rail apparatuses 4 mainly include right and left lower rails 4a, right and left upper rails 4b, a not-shown lock member locking the upper rails 4b such that the upper rails 4b do not slide on the lower rails 4a, and a rail operating lever 4c to be operated for unlocking the lock member.

The support base 30 is bridged over upper surfaces of the right and left upper rails 4b.

The rail operating lever 4c is attached to a front end portion of a left side frame 21 through a lever attachment bracket 27.

As illustrated in FIG. 21, the cushion frame 20 includes a substantially rectangular frame-shaped body as the framework of the seat cushion 2, and includes the right and left side frames 21 arranged on the sides in the seat width direction.

The side frame 21 includes a steel-plate member elongated in a seat front-to-back direction and having a substantially C-shaped section, and specifically, mainly includes a frame side wall portion 21a extending in an upper-to-lower direction and a frame upper wall portion 21b and a frame bottom wall portion 21c bent from both end portions of the frame side wall portion 21a in the upper-to-lower direction and outwardly extending in the seat width direction.

A cushion operating lever 64 is attached to a front end portion of the right side frame 21 through a lever attachment bracket 27, and the rail operating lever 4c is attached to the front end portion of the left side frame through the lever attachment bracket 27.

An ottoman operating lever 176 of the ottoman apparatus 170 is attached to a front portion of an outer surface of the right side frame 21 (the frame side wall portion 21a) in the seat width direction, and a second reclining operating lever 55 of the reclining apparatus 50 is attached to a center portion of such an outer surface. The cushion lock apparatus 60 is attached to a back end portion of an outer surface of the left side frame 21 (the frame side wall portion 21a) in the seat width direction.

Figure 22:
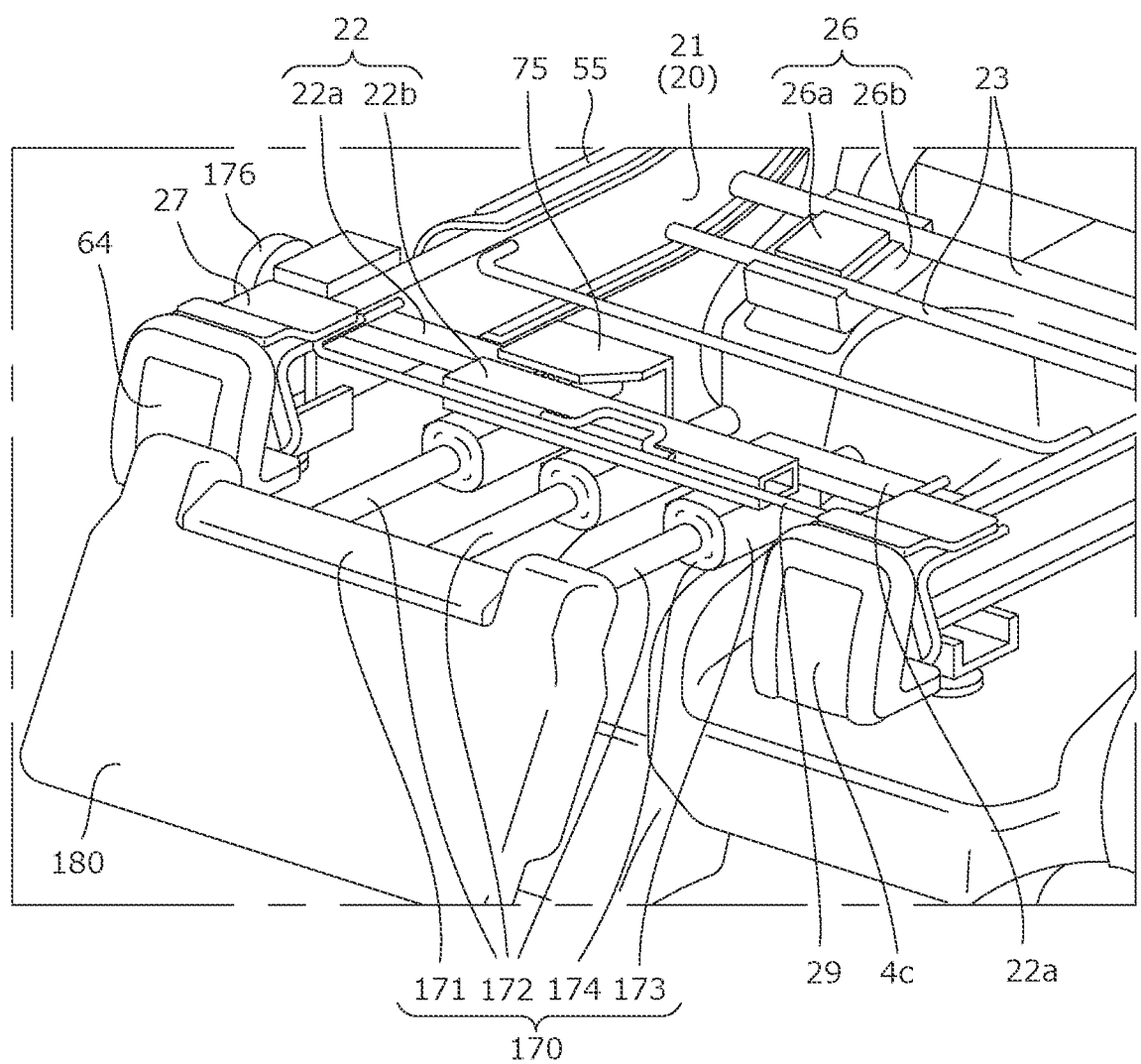
FIG. 22 is an enlarged view of a main portion of FIG. 21.
Figure 23:
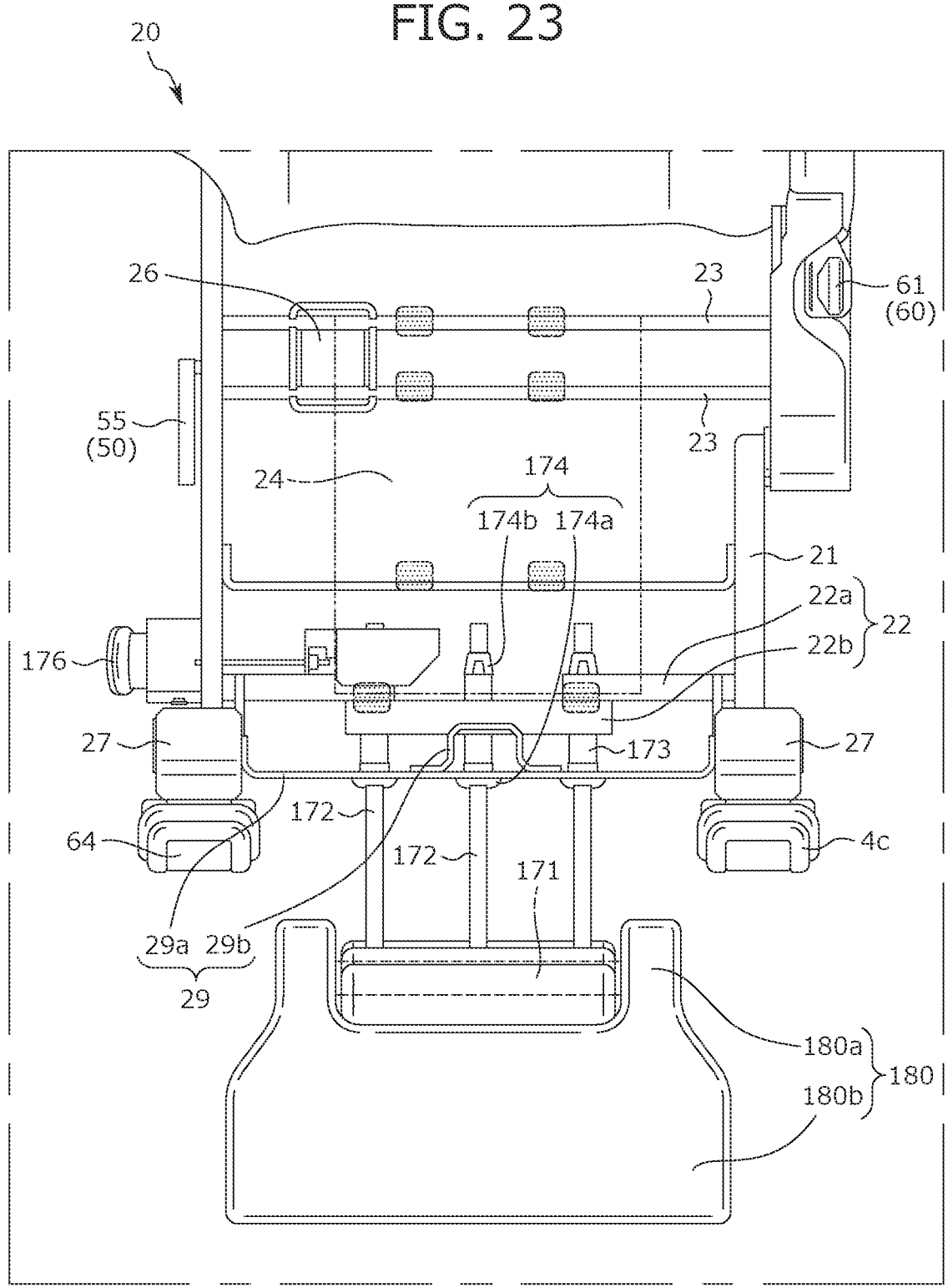
FIG. 23 is an upper view illustrating a cushion frame and the ottoman apparatus.

As illustrated in FIGS. 22 to 23, a front frame 22 includes a combined member of multiple square pipes, and extends in the seat width direction.

The front frame 22 has right and left frame side portions 22a arranged to penetrate side surfaces of the right and left side frames 21 and a frame center portion 22b coupling inner end portions of the right and left frame side portions 22a in the seat width direction and arranged to protrude to the seat front side with respect to the frame side portions 22a.

Of the right and left frame side portions 22a, the frame side portion 22a on an ottoman operating lever 176 side is, at a back surface of the inner end portion thereof, attached to an ottoman lock member 175.

Pillar support members 173 for supporting ottoman pillars 172 are, by welding, attached to bottom surfaces of the inner end portions of the frame side portions 22a.

The frame center portion 22b is, by welding, attached to the frame side portions 22a with the frame center portion 22b contacting front surfaces of the right and left frame side portions 22a.

Three pillar support members 173 arranged at predetermined intervals in the seat width direction are, by welding, attached to a bottom surface of the frame center portion 22b.

A back frame 23 includes multiple pipe members arranged with a spacing in the seat front-to-back direction, and a base contact member 26 arranged to contact the support base 30 (a base cover 40) in the seatable state is attached to a bottom surface of a side portion of the back frame 23 on a side on which the reclining apparatus 50 and the ottoman apparatus 170 are attached.

The base contact member 26 includes a frame attachment portion 26a attached to the back frame 23 by welding with the frame attachment portion 26a being sandwiched by the back frame 23 and a resin base contact portion 26b fitted onto part of the back frame 23 and the frame attachment portion 26a and downwardly protruding from the frame attachment portion 26a.

In the above-described configuration, as illustrated in FIG. 22, portions of the front frame 22 coupled to the frame side portions 22a and the frame center portion 22b support the right and left pillar support members 173.

Thus, the area of support of the right and left pillar support members 173 by the front frame 22 can be ensured, and stiffness of support of the pillar support members 173 by the cushion frame 20 can be enhanced.

In the above-described configuration, as illustrated in FIG. 23, the portions of the front frame 22 coupled to the frame side portions 22a and the frame center portion 22b are attached to the pan frame 24 by welding.

Thus, stiffness of support of the pan frame 24 by the front frame 22 can be enhanced.

In the above-described configuration, as illustrated in FIG. 23, the base contact member 26 and the pan frame 24 are coupled to the back frame 23, and the base contact member 26 is further arranged at a position overlapping with part of the pan frame 24 in the upper-to-lower direction.

Thus, support stiffness of the base contact member 26 and the pan frame 24 can be enhanced.

As illustrated in FIGS. 22 to 25, the lever attachment bracket 27 is a member for attaching the cushion operating lever 64 and the rail operating lever 4c to the cushion frame 20. The lever attachment bracket 27 is attached to the front end portion of the side frame 21, and is arranged at a position above the ottoman rotary shaft.

Figure 24:
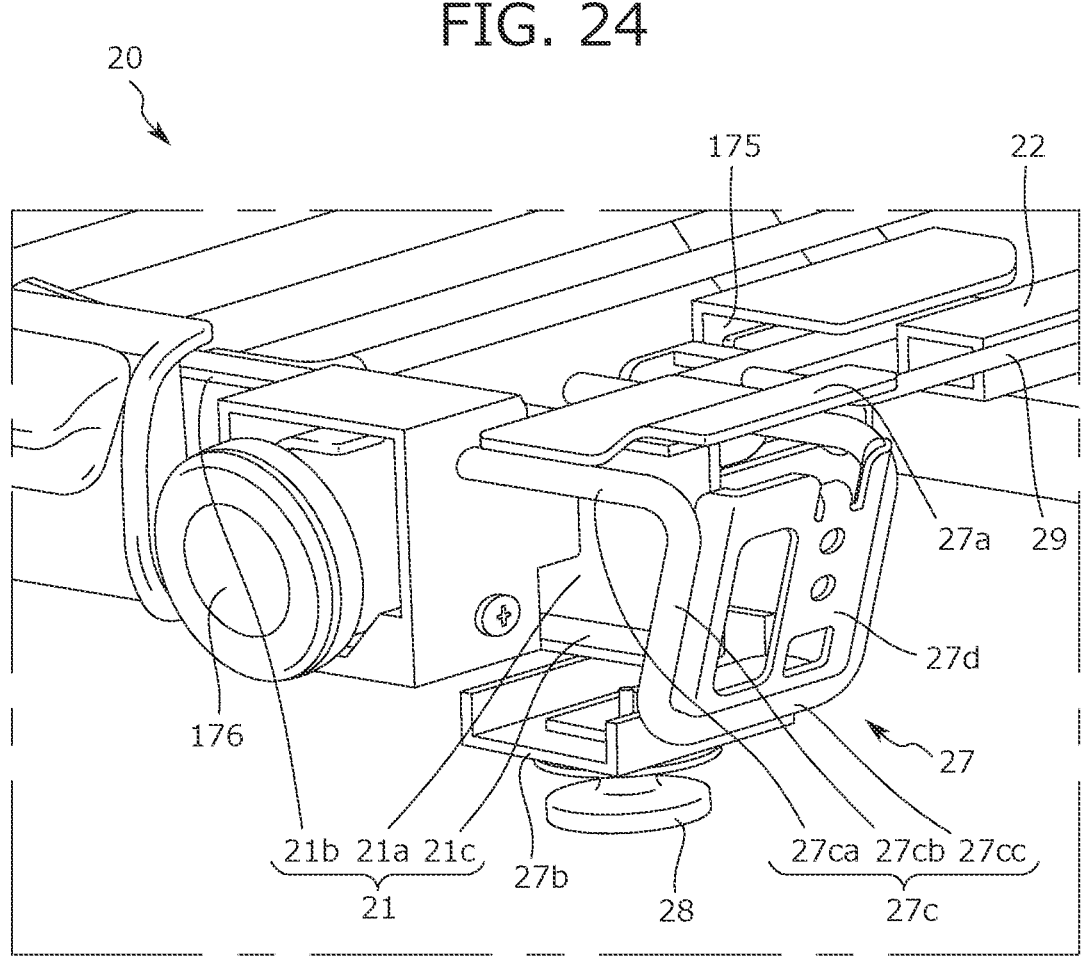
FIG. 24 is an enlarged view of a main portion illustrating the cushion frame and a lever attachment bracket.
Figure 25:
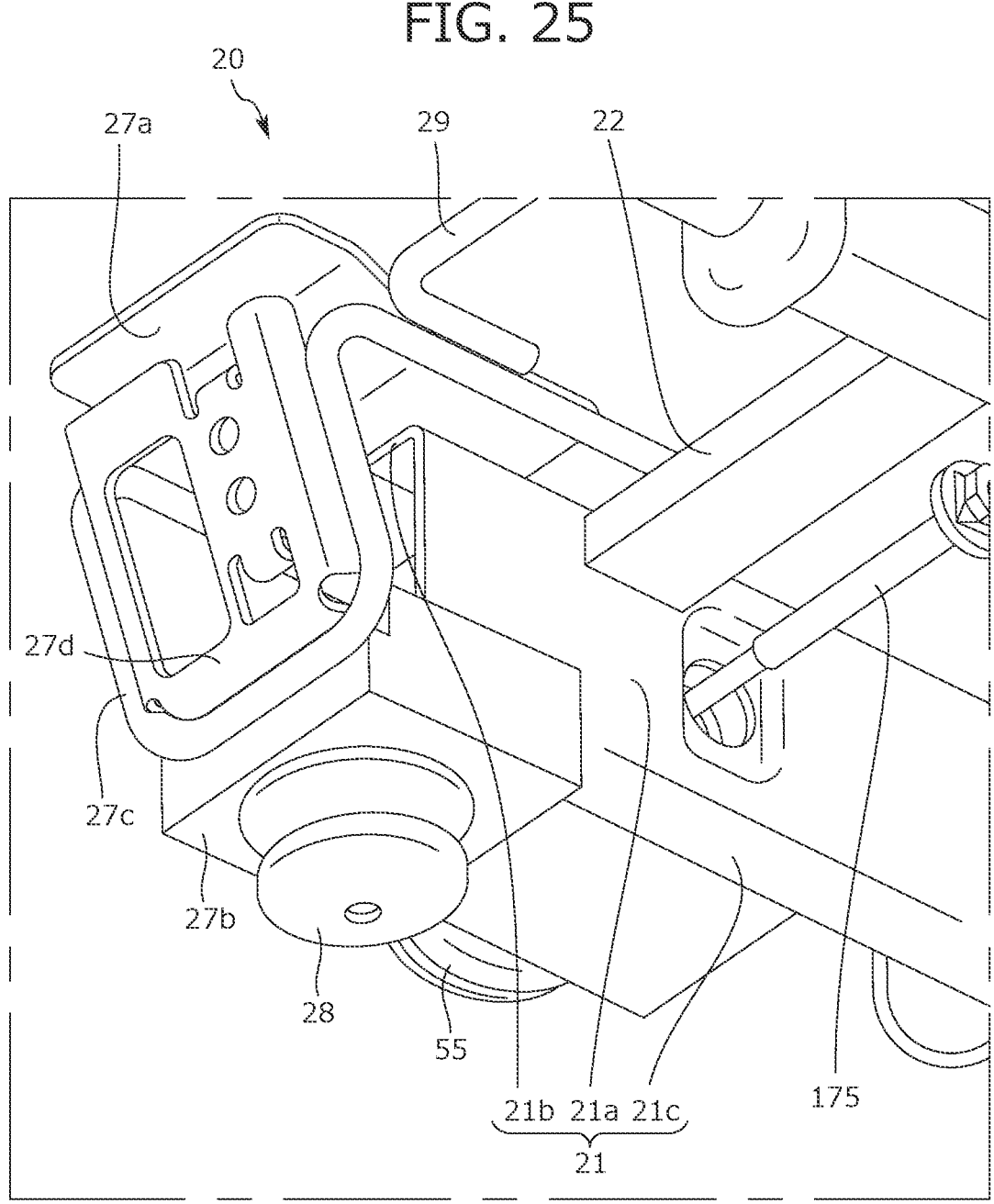
FIG. 25 is an enlarged view of a main portion illustrating the cushion frame and the lever attachment bracket from another angle.

As illustrated in FIGS. 24 and 25, the lever attachment bracket 27 mainly includes an upper plate portion 27a attached in contact with the frame upper wall portion 21b of the side frame 21 and extending to the seat front side, a lower plate portion 27b attached in contact with the frame side wall portion 21a and the frame bottom wall portion 21c and extending to the seat front side, a coupling wire portion 27c coupling the upper plate portion 27a and the lower plate portion 27b to each other, and a lever attachment portion 27d attached to the coupling wire portion 27c with the lever attachment portion 27d being surrounded by the coupling wire portion 27c and provided for attaching the cushion operating lever 64 (the rail operating lever 4c).

The upper plate portion 27a is a plate-shaped member having a crank shape bent such that a front portion thereof upwardly projects beyond a back portion, and also fulfills the function of supporting the seat cushion 2 (the cushion pad 2a) from below.

The lower plate portion 27b is a plate-shaped member having a box shape formed such that an outer edge portion thereof upwardly protrudes, and a floor contact member 28 contactable with a housing floor when the seat body moves to the housing state is attached to a bottom surface of the lower plate portion 27b.

The coupling wire portion 27c includes right and left first extending portions 27ca extending in the seat front-to-back direction, right and left second extending portions 27cb continuously bent from front end portions of the right and left first extending portions 27ca and extending downwardly, and a third extending portion 27cc coupling lower end portions of the right and left second extending portions 27cb.

The lever attachment portion 27d is, by welding, attached to the right and left second extending portions 27cb and the third extending portion 27cc with the lever attachment portion 27d being surrounded by these extending portions.

Note that an attachment hole for attaching the cushion operating lever 64 (the rail operating lever 4c) is formed at the lever attachment portion 27d.

As illustrated in FIGS. 24 and 25, the floor contact member 28 is made of a well-known resin material having elasticity, and is arranged inside an outer end portion of the seat cushion 2 (the cushion frame 20) in the seat width direction. The floor contact member 28 and the cushion operating lever 64 (the rail operating lever 4c) are arranged at the same position in the seat width direction.

In the above-described configuration, as illustrated in FIGS. 22 and 23, a reinforcement wire 29 for coupling the right and left lever attachment brackets 27 and the front frame 22 is provided for ensuring attachment stiffness of the right and left lever attachment brackets 27.

Specifically, the reinforcement wire 29 has a substantially U-shaped first reinforcement wire 29a coupling the right and left lever attachment brackets 27 (the upper plate portions 27a) and a substantially inverted U-shaped second reinforcement wire 29b bridged over a center portion of the first reinforcement wire 29a in the seat width direction and the front frame 22 (the frame center portion 22b).

The reinforcement wire 29 is arranged at a position above the ottoman rotary shaft.

The reclining apparatus 50 mainly includes a reclining body 51 to be driven upon turning of a back frame 10, a back rotary shaft 52, a spiral spring 53 biasing the back frame 10 to rotate the back frame 10 forward about the back rotary shaft 52, a first reclining operating lever 54 of FIG. 19 and the second reclining operating lever 55 of FIG. 23 to be operated for unlocking the back frame 10, a first reclining cable 56 coupling the first reclining operating lever 54 and the reclining body 51, and a second reclining cable 57 coupling the second reclining operating lever 55 and the reclining body 51.

The first reclining cable 56 is drawn by operation of the reclining operating lever 54, thereby acting to switch the seat back 1 from a lock state to an unlock state.

The second reclining cable 57 is drawn by operation of the second reclining operating lever 55, thereby acting to switch the seat back 1 from the lock state to the unlock state.

In the above-described configuration, the reclining apparatus 50 can lock the back frame 10 in a standing posture, can unlock the back frame 10 by operation of the first reclining operating lever 54 (the second reclining operating lever 55), and can rotate the back frame 10 forward by biasing force of the spiral spring 53 to fold the back frame 10 to a vehicle body floor side.

In the above-described configuration, as illustrated in FIG. 23, the reclining body 51 and the cushion operating lever 64 of the cushion lock apparatus 60 are arranged inside the outer end portion of the seat cushion 2 in the seat width direction, and are arranged at the same position in the seat width direction.

Thus, components of the reclining apparatus 50 and the cushion lock apparatus 60 can be arranged compactly.

As illustrated in FIGS. 20 to 23, the ottoman apparatus 170 is attached to the front end portion of the seat cushion 2, and is arranged between the cushion operating lever 64 and the rail operating lever 4c in the seat width direction.

The ottoman apparatus 170 is an apparatus which includes the ottoman rotary shaft 171 extending in the seat width direction and supported on the cushion frame 20 (the front frame 22) and the leg support member 180 turning relative to the cushion frame 20 about the ottoman rotary shaft 171 as the center of turning and which is capable of turning the leg support member 180 between the storage position illustrated in FIG. 19 and the deploy position at which the leg support member 180 is rotatably moved to the seat front side with respect to the storage position as illustrated in FIG. 20.

Moreover, the ottoman apparatus 170 further includes the ottoman pillars 172 attached to a back end of the ottoman rotary shaft 171 and supporting the leg support member 180 such that the leg support member 180 is movable back and forth, the pillar support members 173 attached to a bottom surface of the front frame 22 for supporting the ottoman pillars 172, pillar guides 174 attached with the pillar guides 174 being housed in the pillar support members 173 and guiding the ottoman pillars 172, the ottoman lock member 175 attached to a back surface of the front frame 22 and locking front-to-back motion of the leg support member 180, and the ottoman operating lever 176 to be operated for unlocking the ottoman lock member 175.

That is, the ottoman apparatus 170 has, for supporting the legs of the seated occupant, the function of turning the leg support member 180 between the storage position at which the leg support member 180 is stored on the seat cushion 2 side as illustrated in FIG. 19 and the deploy position at which the leg support member 180 is rotatably moved to the seat front side with respect to the storage position as illustrated in FIGS. 20 and 21.

Moreover, the ottoman apparatus 170 also has, for supporting the legs according to the body type of the seated occupant, the function of moving the leg support member 180 back and forth between a reference position at which the leg support member 180 is positioned on the seat cushion 2 side as illustrated in FIGS. 19 and 20 and a protrusion position at which the leg support member 180 protrudes to the seat front side with respect to the reference position as illustrated in FIG. 21.

As illustrated in FIG. 20, the ottoman rotary shaft 171 includes a pipe member extending in the seat width direction and having a circular longitudinal section, and is configured such that the pipe member is surrounded by an ottoman pad 171a and the pipe member and the ottoman pad 171a are covered with a skin material 171b.

As illustrated in FIGS. 19 and 20, the ottoman rotary shaft 171 is arranged between the cushion operating lever 64 and the rail operating lever 4c in the seat width direction, and the ottoman rotary shaft 171, the cushion operating lever 64, and the rail operating lever 4c are arranged next to each other in the seat width direction.

Moreover, the ottoman rotary shaft 171, the cushion operating lever 64, and the rail operating lever 4c are arranged not to project to the seat front side with respect to the front end portion of the seat cushion 2 in the seat front-to-back direction.

Both end portions of the ottoman rotary shaft 171 in the seat width direction penetrate the leg support member 180 (a leg support frame 181). Multiple attachment holes 171c arranged at predetermined intervals in the seat width direction and provided for attaching the multiple ottoman pillars 172 are formed at the back end of the ottoman rotary shaft 171.

As illustrated in FIGS. 20, 22, and 23, the ottoman pillar 172 is a pipe member having a circular longitudinal section and provided for moving the leg support member 180 and the ottoman rotary shaft 171 in the seat front-to-back direction relative to the seat cushion 2, and extends in the seat front-to-back direction.

A front end portion of the ottoman pillar 172 is fitted in the attachment hole 171c of the ottoman rotary shaft 171, and a back portion of the ottoman pillar 172 is inserted into the pillar support member 173.

Specifically, when the leg support member 180 is at the protrusion position, the back portions of the ottoman pillars 172 are supported by the pillar support members 173. When the leg support member 180 is at the reference position, front portions of the ottoman pillars 172 are supported by the pillar support members 173, and the back portions of the ottoman pillars 172 protrude to the seat back side with respect to the pillar support members 173.

That is, when the leg support member 180 is at the reference position, the ottoman pillar 172 and the pillar guide 174 housed in the pillar support member 173 contact each other.

The pillar support member 173 is a pipe member elongated in the seat front-to-back direction and having a rectangular longitudinal section, and the multiple pillar support members 173 are arranged at intervals in the seat width direction.

The right and left pillar support members 173 are attached to the frame side portions 22a and the frame center portion 22b of the front frame 22, and the center pillar support member 173 is attached only to the frame center portion 22b.

As illustrated in FIGS. 22 and 23, the pillar guide 174 is a member including a hollow rod-shaped body having a rectangular longitudinal sectional shape and an internal space into which the ottoman pillar 172 is inserted and supported, and the pillar guide 174 itself is inserted and attached to an internal space of the pillar support member 173 from the seat front side.

Specifically, when the pillar guide 174 is housed deeply in the internal space of the pillar support member 173, a front end flange 174a and a back end flange 174b of the pillar guide 174 each contact front and back ends of the pillar support member 173. In other words, the front end flange 174a and the back end flange 174b sandwich the pillar support member 173.

In the above-described configuration, as illustrated in FIGS. 22 and 23, not-shown engagement cutouts detachably engaging with not-shown engagement claws provided on an inner peripheral surface of the pillar guide 174 are formed at a portion of an outer peripheral surface of the ottoman pillar 172 inserted into the pillar guide 174. The multiple engagement cutouts are formed at predetermined intervals in the seat front-to-back direction.

Thus, the ottoman pillar 172 can move in the seat front-to-back direction in a stepwise manner relative to the pillar support member 173 and the pillar guide 174, and can be fixed at a predetermined position in the front-to-back direction.

In the above-described configuration, as illustrated in FIG. 22, the ottoman pillars 172, the pillar support members 173, and the pillar guides 174 are arranged at positions below the front frame 22.

Thus, an occupant's uncomfortable feeling of seating can be reduced.

As illustrated in FIGS. 22 and 23, the ottoman lock member 175 includes a well-known lock member, and can lock front-to-back motion of the ottoman pillar 172 and can unlock such motion by operation of the ottoman operating lever 176.

Specifically, the ottoman lock member 175 locks front-to-back motion of the right ottoman pillar 172 in a normal state. By the operation of pushing in the ottoman operating lever 176, a not-shown push-out rod connected to the ottoman operating lever 176 acts on the ottoman lock member 175. As a result, the ottoman lock member 175 unlocks the right ottoman pillar 172.

That is, while the ottoman operating lever 176 is being operated, the ottoman lock member 175 continuously unlocks the ottoman pillar 172.

As illustrated in FIG. 20, the leg support member 180 is configured such that a leg support pad 182 placed on the rectangular frame-shaped leg support frame 181 as a framework is covered with a skin material 183.

As illustrated in FIGS. 20 and 23, the leg support member 180 has a back leg support portion 180a supported by the ottoman rotary shaft 171 and a front leg support portion 180b positioned on the seat front side with respect to the back leg support portion 180a and formed wider than the back leg support portion 180a in the seat width direction.

As illustrated in FIG. 20, the leg support frame 181 mainly includes not-shown right and left leg side frames arranged on the sides in the seat width direction and attached to the ottoman rotary shaft 171, a leg coupling frame portion 181a coupling front portions of the leg side frames, and an auxiliary leg coupling frame portion 181b coupling center portions of the leg side frames.

In the above-described configuration, the leg support member 180 is attached to the ottoman rotary shaft 171 through a rotation-switchable ratchet mechanism.

Thus, the leg support member 180 can rotatably move to the seat front side relative to the ottoman rotary shaft 171 in a stepwise manner, and can be deployed and moved from the storage position and be fixed at a predetermined rotation position.

Moreover, the leg support member 180 can rotatably move to the seat back side relative to the ottoman rotary shaft 171 in a stepwise manner, and can be moved and stored from the deploy position and be fixed at a predetermined rotation position.

Fourth Embodiment of Conveyance Seat

Next, a fourth embodiment of a conveyance seat will be described based on FIGS. 26 to 31.

As a conveyance seat S4, a conveyance seat capable of favorably receiving a seating load from a seated occupant and smoothly switching a seat body from a seatable state is realized. Moreover, a conveyance seat capable of reducing occurrence of noise due to contact between seat components while a vehicle is travelling is realized.

Figure 26:
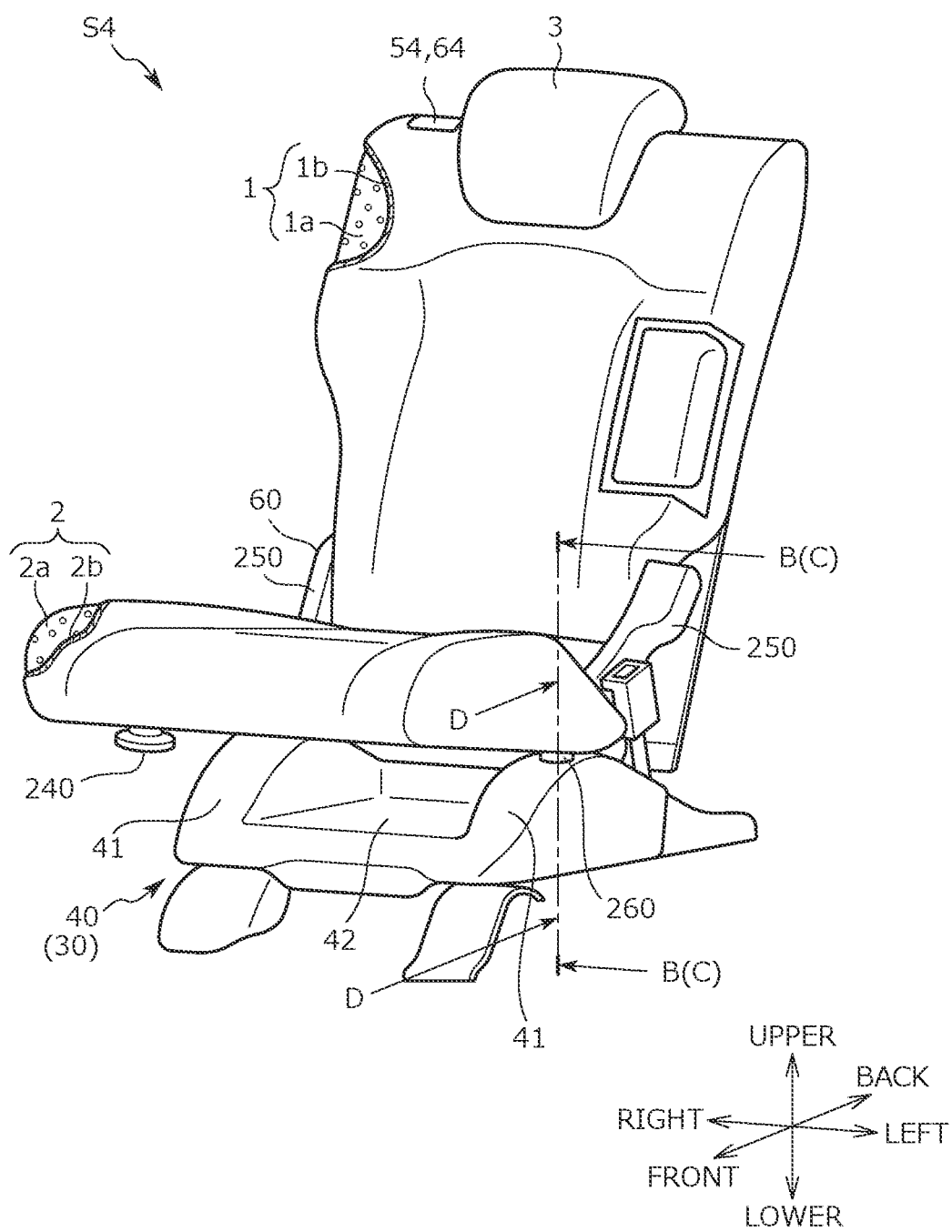
FIG. 26 is a perspective view of a conveyance seat of a fourth embodiment.
Figure 27:
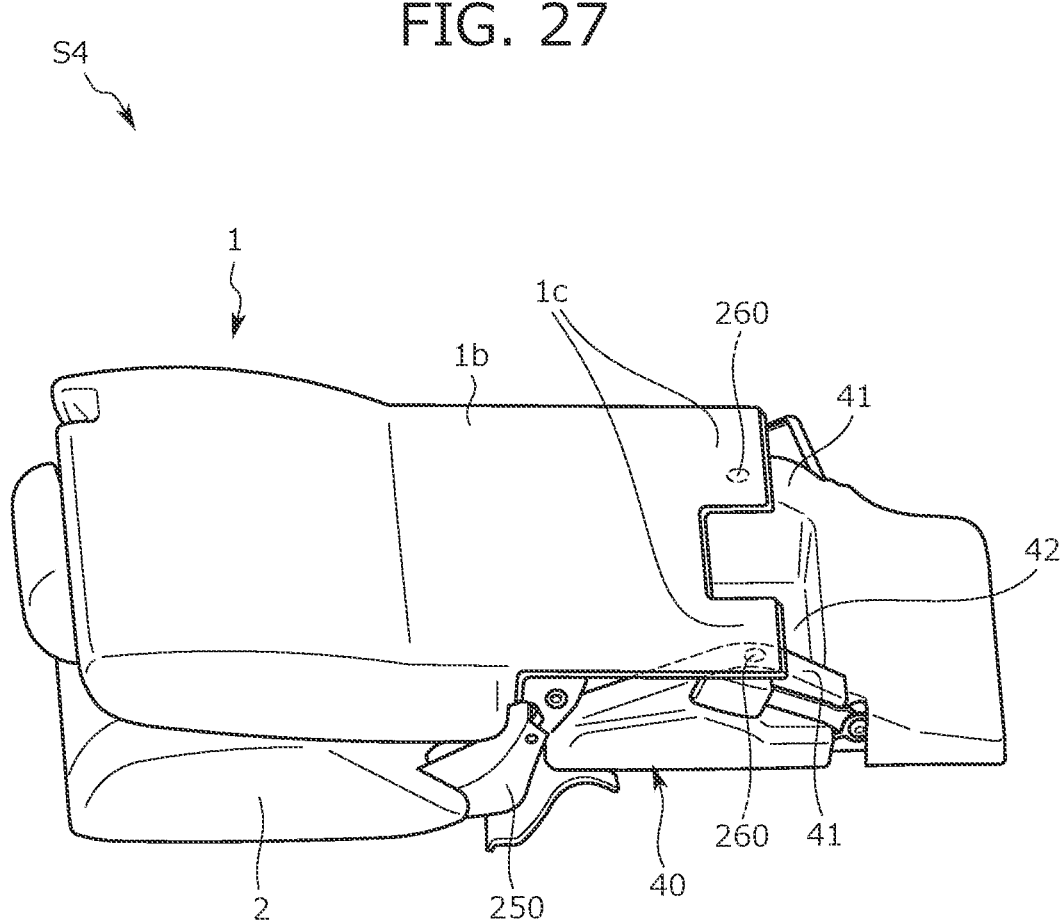
FIG. 27 is a perspective view of the conveyance seat when a seat body is in a housing state.
Figure 28:
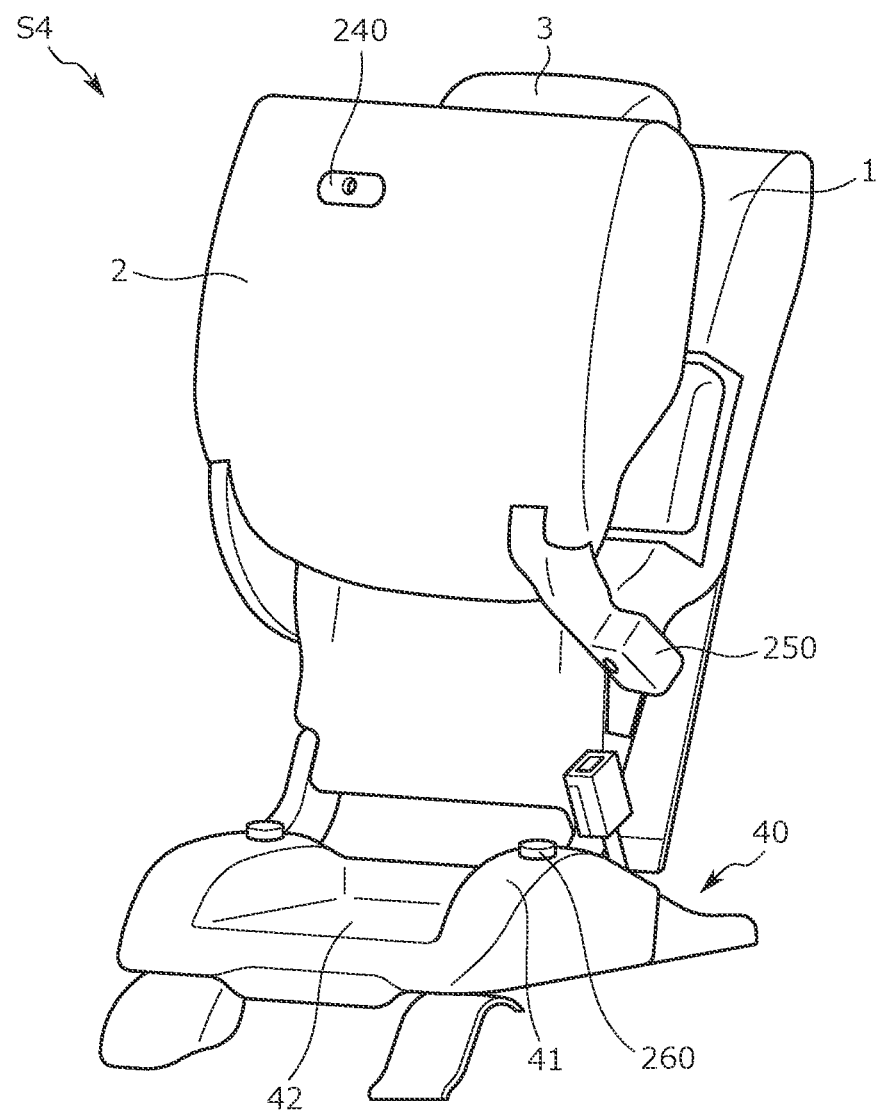
FIG. 28 is a perspective view of the conveyance seat when the seat body is in a tip-up state.

As illustrated in FIGS. 26 and 27, the conveyance seat S4 mainly includes the seat body having a seat back 1, a seat cushion 2, and a headrest 3, right and left rail apparatuses 4 attached onto a vehicle body floor and movably supporting the seat body in a front-to-back direction, and a support base 30 attached onto the rail apparatuses 4 and supporting the seat body.

As illustrated in FIG. 26, the conveyance seat S4 further mainly includes a base cover 40 covering the support base 30 from above, cushion covers 250 covering part of the seat cushion 2 from the outside in a seat width direction, and clearance filling members 260 attached to an upper end portion of the base cover 40 and extending from the base cover 40 to contact the cushion covers 250 to fill a clearance between the seat cushion 2 and the base cover 40 in an upper-to-lower direction in the seatable state.

As illustrated in FIG. 26, the seat back 1 is configured such that a cushion pad 1a placed on a back frame 10 as a framework is covered with a skin 1b.

As illustrated in FIG. 27, right and left skin projecting portions 1c extending to partially project from a body portion of the seat back 1 to cover the clearance filling members 260 from above in a housing state are formed at portions of the skin 1b provided at a back surface of the seat back 1. A cover housing recessed portion 42 provided at the base cover 40 is arranged between the right and left skin projecting portions 1c in the seat width direction such that at least part of the cover housing recessed portion 42 is exposed.

A reclining apparatus 50 is capable of switching the back frame 10 to a lock state at which turning motion of the back frame 10 is locked. The reclining apparatus 50 can lock the back frame 10 in a standing posture of FIG. 26, can unlock the back frame 10 by operation of a reclining operating lever 54, and can rotate the back frame 10 forward by biasing force of a spiral spring 53 to fold the back frame 10 to a vehicle body floor side (see FIG. 27).

A cushion lock apparatus 60 can lock a cushion frame 20 in a horizontal posture of FIG. 26, can unlock the cushion frame 20 by operation of a cushion operating lever 64, and can fold the cushion frame 20 to the vehicle body floor side while biasing the cushion frame 20 forward by biasing force of a spiral spring 63 (see FIG. 27). When the seat body is housed in a housing floor, an operation damper 240 provided at a lower end of the seat cushion 2 is automatically operated in contact with the housing floor, and accordingly, turning motion of the cushion frame 20 is locked. When the seat body is manually raised up (see FIG. 28), the cushion frame 20 can be unlocked by pulling of the operation damper 240, and can be rotated downward relative to the back frame 10 by the biasing force of the spiral spring 63.

As illustrated in FIG. 26, the base cover 40 has not only the function of protecting the support base 30 and the rail apparatuses 4 from the outside, but also the function of guiding movement of the seat body (the seat cushion 2) when the seat body is switched from the seatable state to the housing state.

The base cover 40 mainly includes right and left cover protruding portions 41 provided on the sides in the seat width direction and formed to upwardly protrude toward the seat cushion 2 and the cover housing recessed portion 42 provided between the right and left cover protruding portions 41 and formed depressed downward of the cover protruding portions 41 to house a housing target object.

The cover protruding portion 41 is an elongated body having a substantially raised curved surface as viewed in the seat width direction and extending in the seat front-to-back direction, and has a slight width in the seat width direction.

The cover protruding portion 41 has a highest upper surface at a center portion thereof in the seat front-to-back direction, and has an inclined surface downwardly inclined to a seat front side from the upper surface of the center portion. The housing floor is arranged on an extension of the inclined surface on the seat front side.

The cover protruding portion 41 has the function of contacting, when the seat body moves from the seatable state to the housing state, a later-described cushion contact portion 251 provided at the seat cushion 2 (the cushion cover 250) to slide (glide) the cushion contact portion 251 to a housing floor side. That is, it is configured such that the seat cushion 2 is guided by the base cover 40 to smoothly move toward the housing floor.

The clearance filling member 260 is attached to the center portion of the cover protruding portion 41 in the seat front-to-back direction to partially project upward of the cover protruding portion 41.

As illustrated in FIG. 26, the cover housing recessed portion 42 is a substantially rectangular parallelepiped housing space (housing region) formed at a position below the seat cushion 2 and provided for placing, e.g., a luggage of the seated occupant.

The cover housing recessed portion 42 is depressed downward of the right and left cover protruding portions 41, and can be utilized as the housing space without contacting with other seat components including the seat back 1 even in any of the seatable state, the housing state, and a tip-up state.

As illustrated in FIG. 26, the cushion covers 250 include substantially U-shaped resin molded articles covering right and left side frames 21 of the seat cushion 2 from the outer right and left sides.

The cushion cover 250 has not only the function of protecting the cushion frame 20 (the side frames 21) from the outside, but also the function of sliding, when the seat body is switched from the seatable state to the housing state, on an upper surface of the base cover 40 (the cover protruding portions 41) to smoothly perform seat housing motion. Moreover, the cushion cover 250 has the function of contacting the clearance filling member 260 in the seatable state to favorably receive the seating load.

A bottom surface of the cushion cover 250 has a substantially raised curved surface projecting to a base cover 40 side, and is arranged at a position overlapping with the cover protruding portion 41 in the seat width direction and the seat front-to-back direction.

The cushion cover 250 is arranged at a position corresponding to a portion of the side frame 21 coupled to a center coupling pipe 23 in the seat front-to-back direction. Thus, the cushion cover 250 is a portion with relatively-high stiffness.

Figure 29:
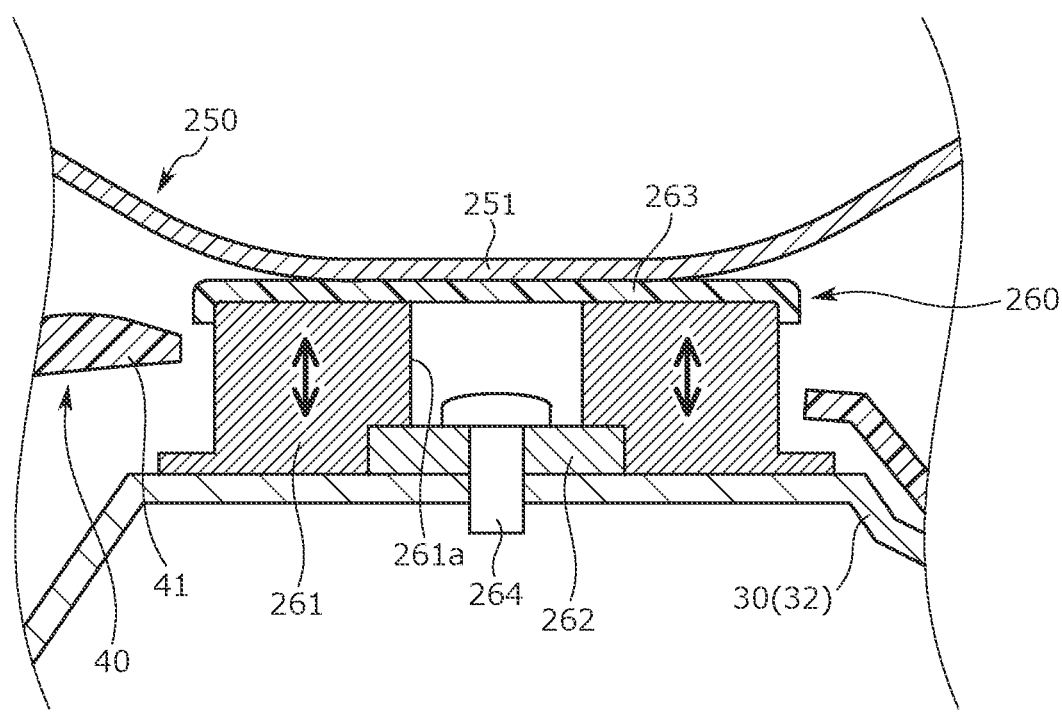
FIG. 29 is a B-B sectional view of FIG. 26 illustrating a clearance filling member.

As illustrated in FIGS. 26 and 29, the clearance filling member 260 is an elastic body arranged between the seat cushion 2 (the cushion cover 250) and the support base 30 (the base cover 40) in the upper-to-lower direction. The clearance filling member 260 is attached to a support base 30 side, and extends from the support base 30 to the seat cushion 2.

The clearance filling member 260 mainly includes a substantially cylindrical elastic portion 261 having elasticity in the upper-to-lower direction, a substantially discoid coupling portion 262 attached to a lower end portion of the elastic portion 261 and provided for coupling the clearance filling member 260 and the support base 30, and a substantially discoid cover portion 263 attached to an upper end portion of the elastic portion 261 to contact the bottom surface of the cushion cover 250 and having slidability in the horizontal direction.

The clearance filling member 260 is arranged at an uppermost end portion of the base cover 40 (the cover protruding portion 41), and is arranged at a position corresponding to a lowermost end portion (the cushion contact portion 251) of the seat cushion 2 (the cushion cover 250).

The elastic portion 261 is an elastic rubber member having a through-hole 261a at a center portion. A lower end portion of the elastic portion 261 contacts an upper surface of the support base 30, and an upper end portion of the elastic portion 261 is entirely covered with the cover portion 263.

The elastic portion 261 upwardly extends, in a state in which the elastic portion 261 is supported by the support base 30 from below, through an opening hole provided at the base cover 40, and is provided to partially project from the base cover 40.

The coupling portion 262 is a press-fit nut to be press-fitted in the lower end of the elastic portion 261, and is configured such that the through-hole 261a of the elastic portion 261 and a screw hole provided at the coupling portion 262 communicate with each other in the upper-to-lower direction.

In the above-described configuration, a coupling bolt 264 is fastened from above in a state in which the coupling portion 262 and the support base 30 contact each other, and in this manner, the clearance filling member 260 is attached to the support base 30.

The cover portion 263 is a slidable member covering an upper end of the elastic portion 261, and specifically, is made of, e.g., a thermoplastic resin material such as polyoxymethylene (POM).

The cover portion 263 includes a body portion and a flange portion provided to downwardly extend from a peripheral edge of the body portion, and is attached to the upper end of the elastic portion 261 to sandwich such an upper end.

With the above-described configuration, the clearance filling member 260 contacts the cushion contact portion 251 of the seat cushion 2 (the cushion cover 250) when the seat body is in the seatable state, and therefore, can support the seat cushion 2 from below by means of elastic action.

Moreover, the clearance filling member 260 is supported by the support base 30 as a metal member from below, and therefore, even in a case where the occupant is seated on the seat body, can receive the seating load from the seated occupant.

Thus, the conveyance seat S4 is provided, which can receive the seating load while avoiding an increase in the size of the cushion lock apparatus 60 and can provide a certain degree of play to the seat cushion 2 such that the cushion lock apparatus 60 smoothly functions.

<First Variation of Clearance Filling Member>

Next, a first variation of the clearance filling member will be described based on FIG. 30.

Note that description of contents overlapping with those of the above-described clearance filling member 260 will be omitted.

A clearance filling member 270 of the first variation is, as in the clearance filling member 260, attached to the support base 30 side, and extends from the support base 30 toward the seat cushion 2.

The clearance filling member 270 is a plate-shaped spring member having elasticity in the upper-to-lower direction, and mainly includes a spring attachment portion 271 attached to the upper surface of the base cover 40, a spring contact portion 272 provided at an end portion on a side opposite to the spring attachment portion 271 and provided contactable with the seat cushion 2 (the cushion cover 250), and a cover portion 273 for protecting a surface of the spring contact portion 272.

The clearance filling member 270 extends elongated in the seat front-to-back direction, and has a curved shape as viewed in the seat width direction. Specifically, the clearance filling member 270 is upwardly inclined while extending to a seat back side from the spring attachment portion 271 toward the spring contact portion 272.

The spring attachment portion 271 is attached in such a manner that a coupling bolt 274 is, from above, fastened to an upper surface of a front portion of the cover protruding portion 41.

The spring contact portion 272 is an elastic portion having elasticity in the upper-to-lower direction, and is arranged to contact a bottom surface of the cushion contact portion 251.

The cover portion 273 is a resinous member covering the surface of the spring contact portion 272, and specifically, provides a surface coating to a contact surface 272a of the spring contact portion 272 contacting the cushion contact portion 251 and a contact surface 272b, which is a surface on a side opposite to the contact surface 272a in the upper-to-lower direction, of the spring contact portion 272 contactable with the cover protruding portion 41.

Note that a predetermined clearance in the upper-to-lower direction is formed between the contact surface 272b of the spring contact portion 272 and an upper surface of the cover protruding portion 41.

Even with the above-described configuration, the seating load can be received while an increase in the size of the cushion lock apparatus 60 is avoided, and a certain degree of play can be provided to the seat cushion 2 such that the cushion lock apparatus 60 smoothly functions.

<Second Variation of Clearance Filling Member>

Next, a second variation of the clearance filling member will be described based on FIG. 31.

Unlike the clearance filling members 260, 270, a clearance filling member 280 of the second variation is attached to a seat cushion 2 side, and extends from the seat cushion 2 to the base cover 40.

The clearance filling member 280 is an elastic spring member having elasticity in the upper-to-lower direction, and mainly includes a protruding shaft 281 attached to the seat cushion 2 such that the length of protrusion from the seat cushion 2 to the base cover 40 is changeable, an elastic spring 282 attached to an outer peripheral surface of the protruding shaft 281 and attached to the seat cushion 2 such that the length of protrusion of the protruding shaft 281 is changeable, and a cover portion 283 protecting a protruding tip end portion of the protruding shaft 281.

The protruding shaft 281 is a stepped bolt to be assembled with the side frame 21 of the seat cushion 2 from below. The protruding shaft 281 penetrates the side frame 21 in the upper-to-lower direction, and is attached in such a manner that the side frame 21 is sandwiched between the protruding shaft 281 and a coupling nut 284.

A flange 281a of the protruding shaft 281 downwardly extends through an opening hole provided at the cushion cover 250, and is arranged to partially project from the cushion cover 250.

Note that a slide bearing 285 is, as a bush, attached to a peripheral portion of an opening hole provided at the side frame 21.

The elastic spring 282 is an elastic portion having elasticity in the upper-to-lower direction, and specifically, is a coiled wave spring. The elastic spring 282 is arranged between a flange 281a portion of the protruding shaft 281 and the side frame 21 in the upper-to-lower direction.

The cover portion 283 is a resinous member covering a surface of the flange 281a of the protruding shaft 281, and specifically, includes a body portion and a flange portion provided to upwardly extend from a peripheral edge of the body portion and is attached to sandwich the flange 281a.

Even with the above-described configuration, the seating load can be received while an increase in the size of the cushion lock apparatus 60 is avoided, and a certain degree of play can be provided to the seat cushion 2 such that the cushion lock apparatus 60 smoothly functions.

Fifth Embodiment of Conveyance Seat

Next, a fifth embodiment of a conveyance seat will be described based on FIGS. 32 to 42.

As a conveyance seat S5, a conveyance seat configured such that operability of an operating lever to be operated for switching the state of a seat body is ensured while the structure of a switching apparatus including the operating lever is compactified is realized.

Figure 32:
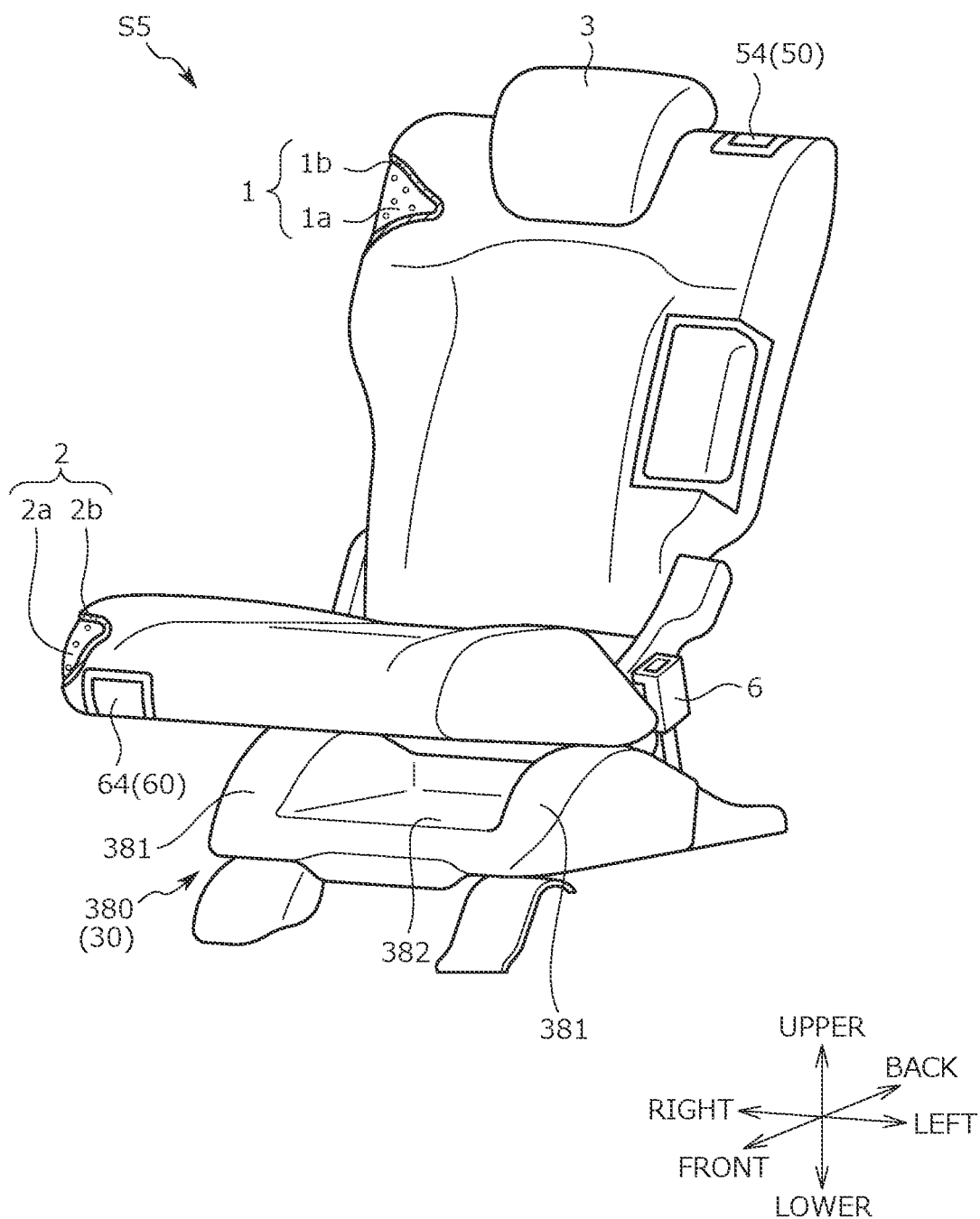
FIG. 32 is a perspective view of a conveyance seat of a fifth embodiment.
Figure 33:
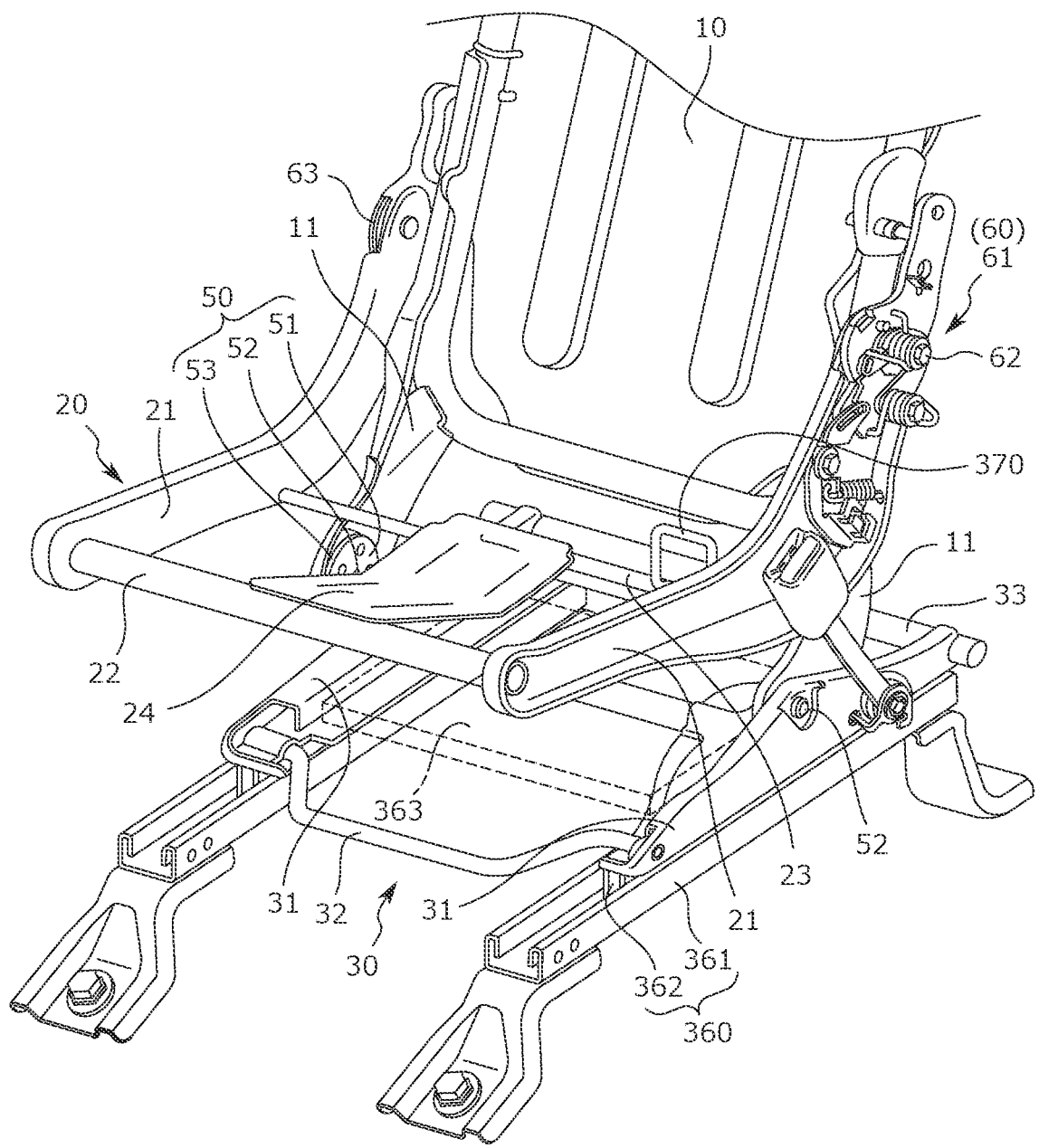
FIG. 33 is a perspective view of a seat frame as a framework of the conveyance seat.

As illustrated in FIGS. 32 and 33, the conveyance seat S5 includes a seat body having a seat back 1, a seat cushion 2, and a headrest 3, a support base 30 supporting the seat body from below, a reclining apparatus 50 turnably coupling the seat back 1 to the support base 30 and locking turning motion of the seat back 1, and a cushion lock apparatus 60 turnably coupling the seat cushion 2 to the seat back 1 and locking turning motion of the seat cushion 2.

Figure 34:
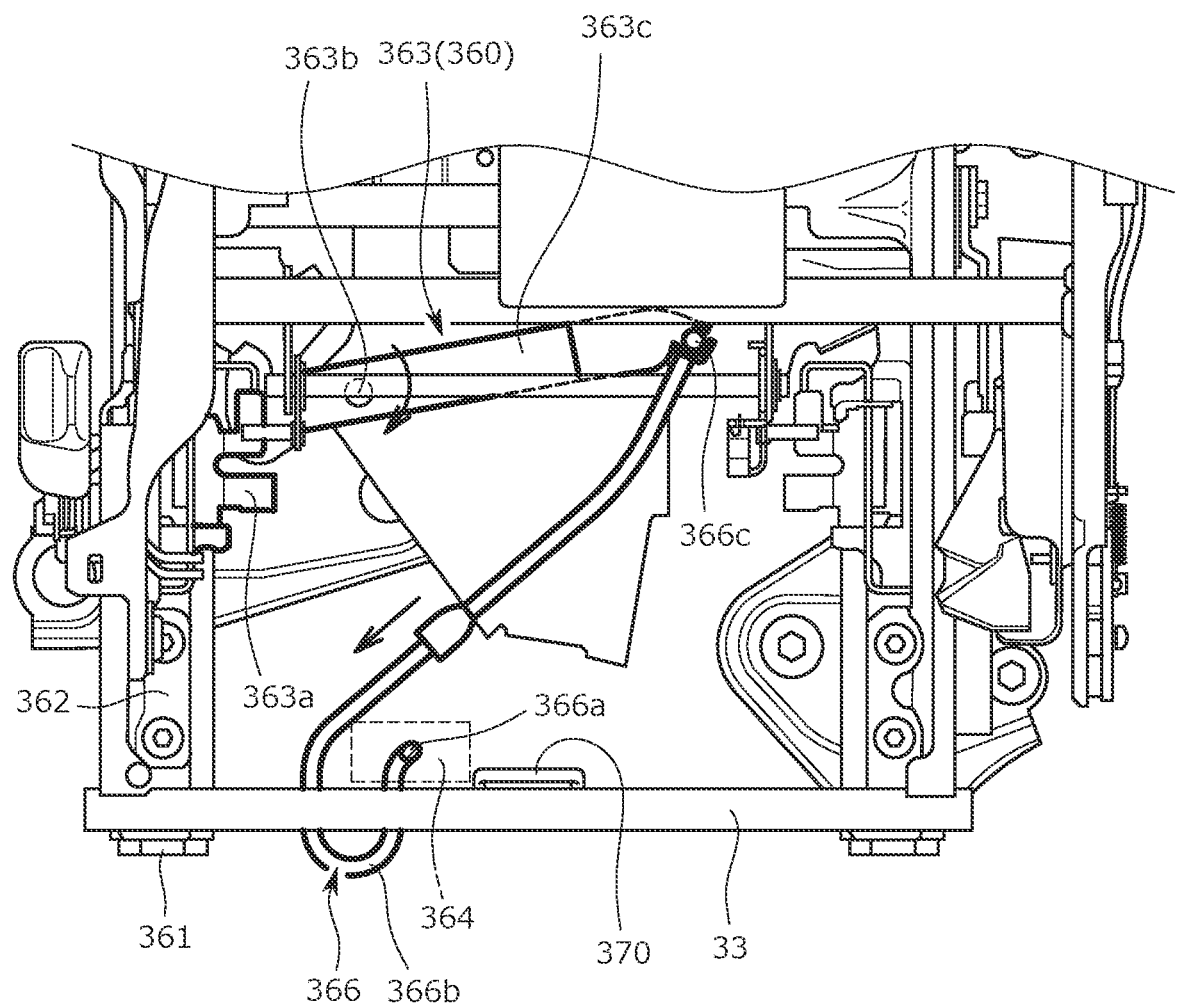
FIG. 34 is a plan view of the seat frame illustrating a rail apparatus.

As illustrated in FIGS. 32 to 34, the conveyance seat S5 further includes rail apparatuses 360 attached to between a vehicle body floor and the support base 30, movably supporting the seat body in a front-to-back direction, and locking movement of the seat body, an anchor member 370 arranged at a position on a seat back side with respect to the seat back 1 at the periphery of a lower end portion of the seat back 1 and coupling a not-shown child seat, and a base cover 380 covering the support base 30, the rail apparatuses 360, and the anchor member 370 from above.

Figure 40:
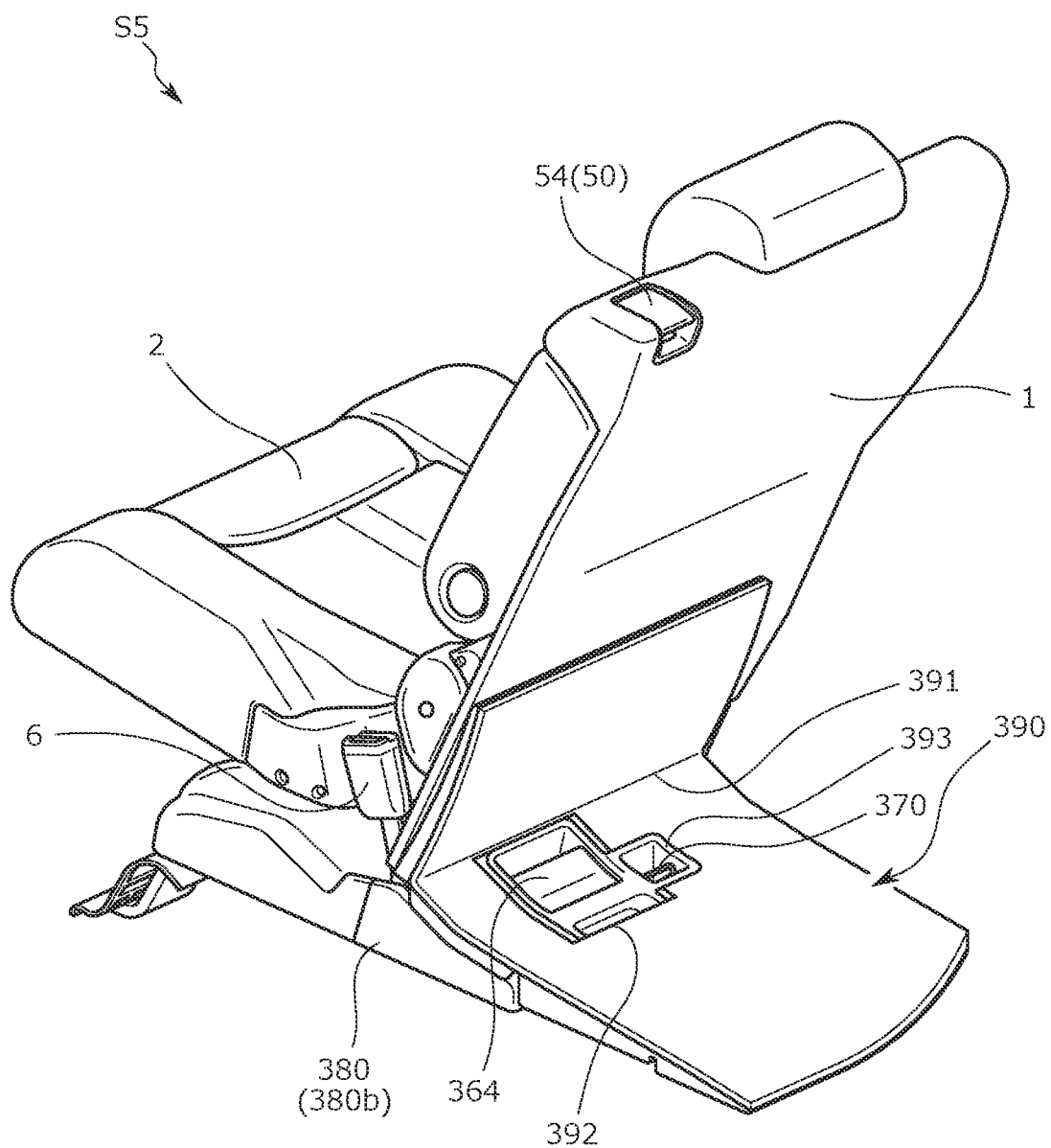
FIG. 40 is a perspective view of a floor-board-equipped conveyance seat when a seat body is in a seatable state.

As illustrated in FIG. 40, the conveyance seat S5 further includes a floor board 390 attached to a back surface of the seat back 1 and extending to the seat back side from the seat back 1 along the vehicle body floor.

As illustrated in FIG. 33, the support base 30 is a member supporting the seat body, and includes right and left side base portions 31 provided on the sides in a seat width direction and arranged along the right and left rail apparatuses 360 (upper rails 362), a front base coupling portion 32 coupling front portions of the side base portions 31, a back base coupling portion 33 coupling back portions of the side base portions 31, and a center base coupling portion coupling center portions of the side base portions 31.

The anchor member 370 for coupling the not-shown child seat is attached to a center portion of the back base coupling portion 33 in the seat width direction.

As illustrated in FIG. 33, the reclining apparatus 50 is arranged on an inner surface of a right coupling bracket 11 in the seat width direction.

The reclining apparatus 50 mainly includes a reclining body 51 to be driven upon turning of a back frame 10, a back rotary shaft 52, a spiral spring 53 biasing the back frame 10 such that the back frame 10 rotates forward about the back rotary shaft 52, a reclining operating lever 54 to be operated for unlocking the back frame 10 as illustrated in FIG. 32, and a not-shown reclining cable coupling the reclining operating lever 54 and the reclining body 51.

The reclining body 51 has a well-known lock mechanism, and is capable of switching the state of the back frame 10 between a lock state in which the back frame 10 is fixed relative to the support base 30 and an unlock state in which the back frame 10 is turnable relative to the support base 30.

The back rotary shaft 52 is supported on a back frame 10 side and a support base 30 side in the seat width direction. One end of the spiral spring 53 is locked on the back frame 10 side, and the other end of the spiral spring 53 is locked on the support base 30 side.

Note that the not-shown reclining cable is drawn by operation of the reclining operating lever 54, thereby acting to switch the seat back 1 from the lock state to the unlock state.

Figure 41:
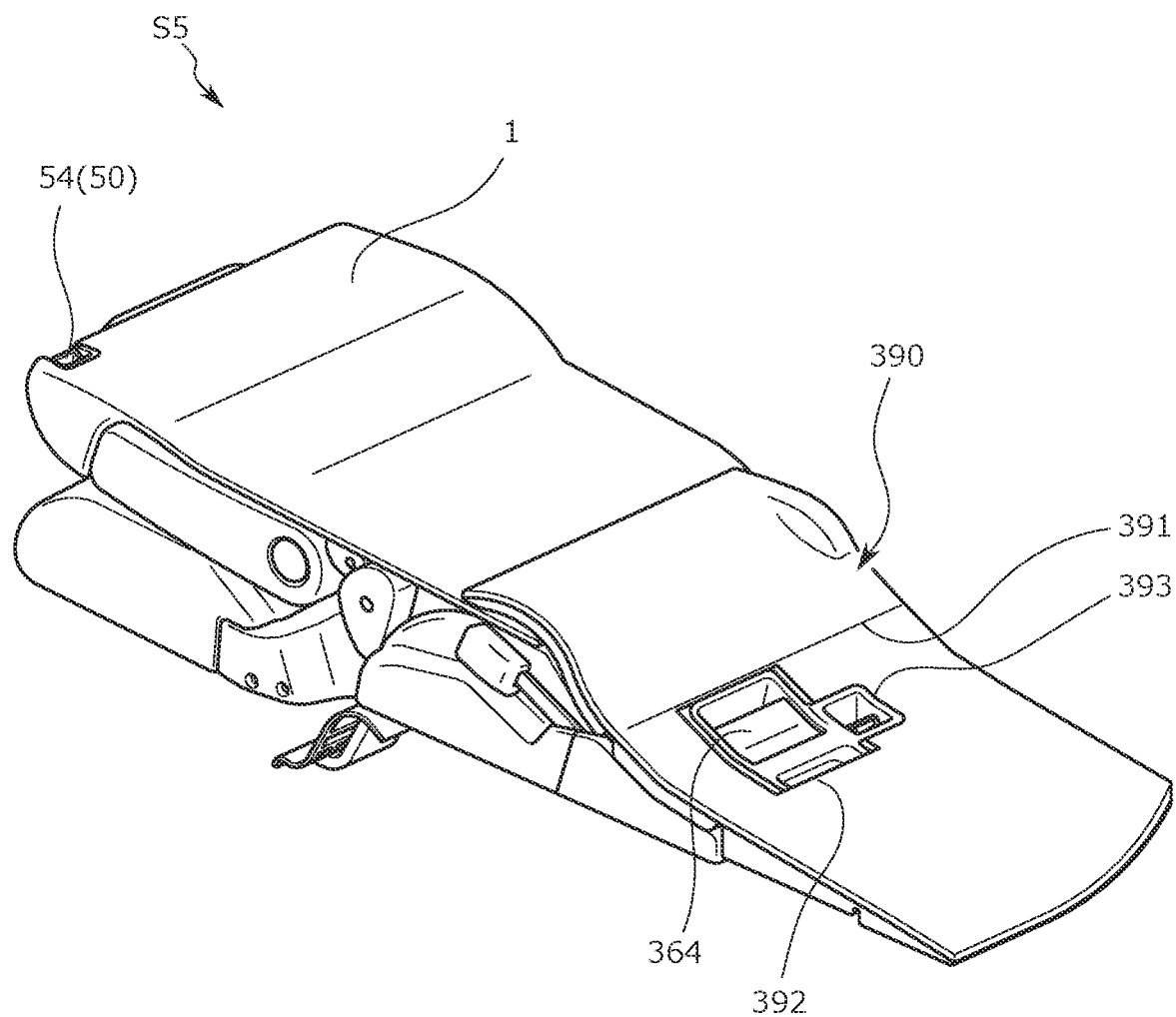
FIG. 41 is a perspective view of the floor-board-equipped conveyance seat when the seat body is in a housing state.

In the above-described configuration, the reclining apparatus 50 can lock the back frame 10 in a standing posture of FIG. 40, can unlock the back frame 10 by operation of the reclining operating lever 54, and can rotate the back frame 10 forward by biasing force of the spiral spring 53 to fold the back frame 10 to a vehicle body floor side (see FIG. 41).

As illustrated in FIG. 33, the cushion lock apparatus 60 is arranged on an outer surface of a left side frame 21 in the seat width direction.

The cushion lock apparatus 60 mainly includes a lock body 61 for locking turning motion of the cushion frame 20, a cushion rotary shaft 62, a spiral spring 63 downwardly biasing the cushion frame 20 about the cushion rotary shaft 62, a cushion operating lever 64 to be operated for unlocking the cushion frame 20 as illustrated in FIG. 32, a not-shown first cushion cable coupling the above-described reclining operating lever 54 and the lock body 61, and a not-shown second cushion cable coupling the cushion operating lever 64 and the lock body 61.

The cushion rotary shaft 62 is supported on the back frame 10 side and a cushion frame 20 side in the seat width direction. One end of the spiral spring 63 is locked on the back frame 10 side, and the other end of the spiral spring 63 is locked on the cushion frame 20 side.

The cushion operating lever 64 is attached to a right end portion of a front end portion of the cushion frame 20.

The not-shown first cushion cable is drawn by operation of the reclining operating lever 54, thereby acting to switch the cushion frame 20 from a lock state to an unlock state.

The not-shown second cushion cable is drawn by operation of the cushion operating lever 64, thereby acting to switch the cushion frame 20 from the lock state to the unlock state.

The cushion lock apparatus 60 can lock the cushion frame 20 in a horizontal posture of FIG. 40, can unlock the cushion frame 20 along with the back frame 10 by operation of the reclining operating lever 54, and can fold the cushion frame 20 to the vehicle body floor side while biasing the cushion frame 20 forward by biasing force of the spiral spring 63 (see FIG. 41).

Moreover, the cushion lock apparatus 60 unlocks the cushion frame 20 by operation of the cushion operating lever 64 in a seatable state, and an occupant raises up the cushion frame 20 against the biasing force of the spiral spring 63. In this manner, the cushion frame 20 can be moved to a not-shown tip-up state. Then, the cushion operating lever 64 is operated again in the tip-up state so that the cushion frame 20 can be downwardly rotated by the biasing force of the spiral spring 63 to return to the seatable state.

As illustrated in FIGS. 33 to 36, the rail apparatuses 360 mainly include right and left lower rails 361 arranged between the seat body and the vehicle body floor in an upper-to-lower direction, fixed to the vehicle body floor, and extending in the seat front-to-back direction, the right and left upper rails 362 slidably supported along the lower rails 361, a rail lock member 363 locking the upper rails 362 such that the upper rails 362 do not slide on the lower rails 361, a rail operating lever 364 to be operated for unlocking the rail lock member 363, a lever rotary shaft 365 as a rotary shaft of the rail operating lever 364, and a rail cable 366 coupling the rail lock member 363 and the rail operating lever 364.

As illustrated in FIG. 34, the rail lock member 363 (a lock body 363*a*) is a member arranged between the right and left upper rails 362 and rotating between a lock position at which the upper rails 362 are locked not to slide on the lower rails 361 and an unlock position.

Specifically, the rail lock member 363 mainly includes the lock body 363*a* and a turning lever 363*c* coupling the lock body 363*a* and the rail cable 366 and turning about a rotary shaft 363*b* in association with drawing of the rail cable 366.

Note that the lock body 363*a* and the turning lever 363*c* are biased to the lock position by a not-shown spring.

The lock body 363*a* is attached to an inner surface of the left upper rail 362. In association with rotary motion of the turning lever 363*c*, the lock body 363*a* can operate (be rotatably operated) such that a not-shown engagement groove provided at the upper rail 362 separates from a not-shown engagement claw provided at the lower rail 361, thereby unlocking the upper rail 362.

The turning lever 363*c* is a rotary member elongated in the seat width direction, and is attached onto the support base 30 through the rotary shaft 363*b*.

The turning lever 363c couples the lock body 363a and the rail cable 366, thereby functioning as a transmission member transmitting the motion of drawing the rail cable 366 to the lock body 363a.

Figure 35:
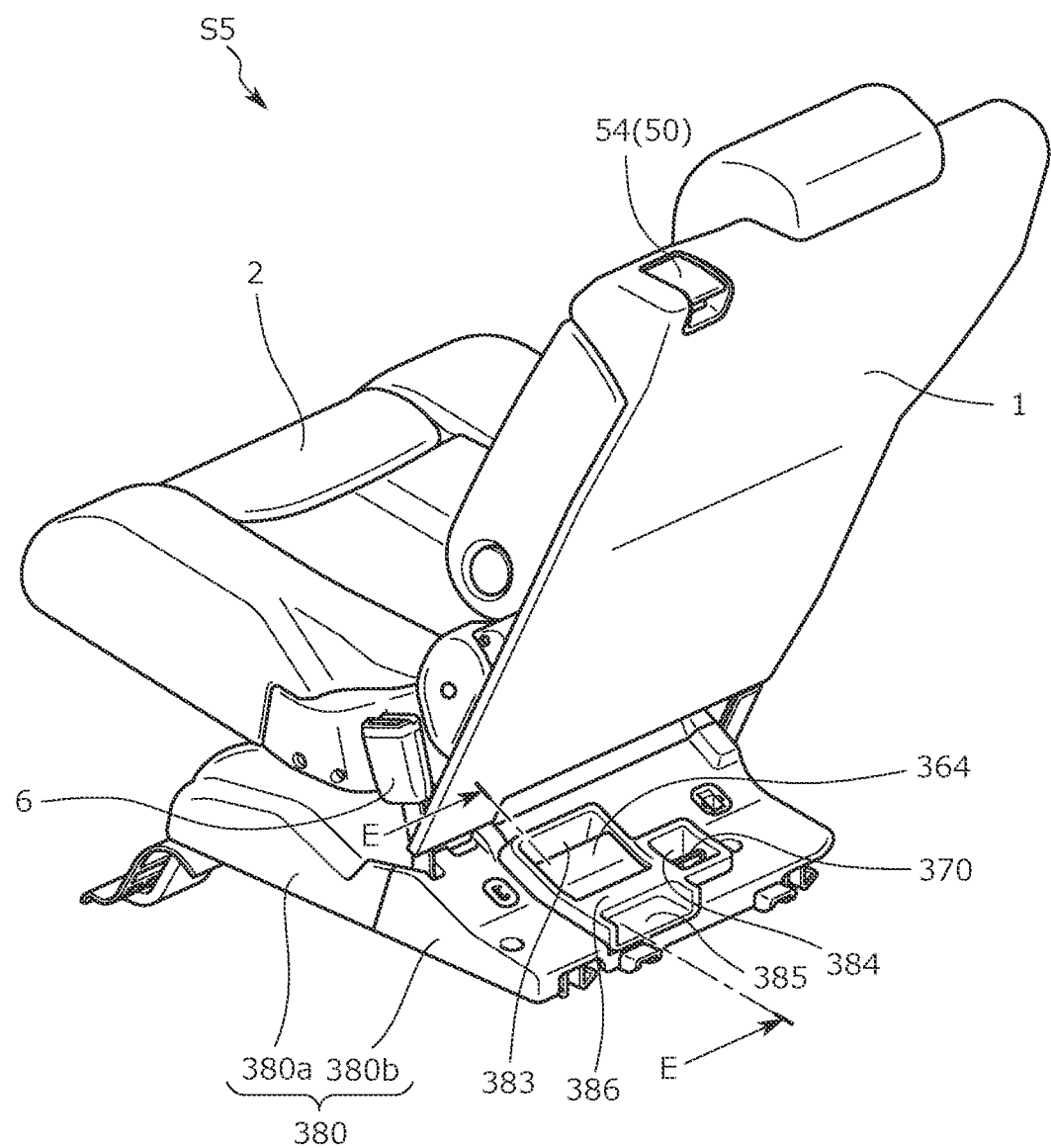
FIG. 35 is a perspective view of the conveyance seat diagonally from a back side.
Figure 36:
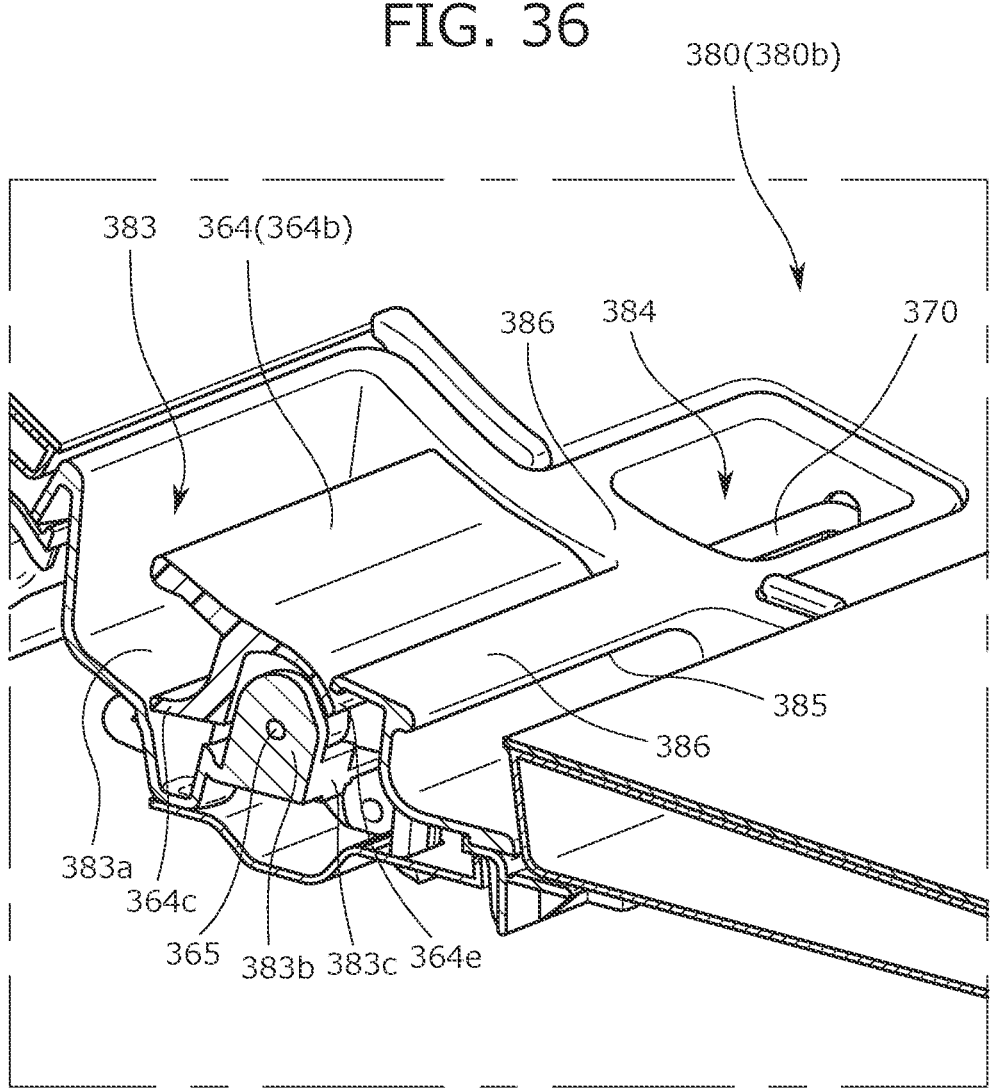
FIG. 36 is an E-E sectional view of FIG. 35 illustrating a rail operating lever and an anchor member.
Figure 37:
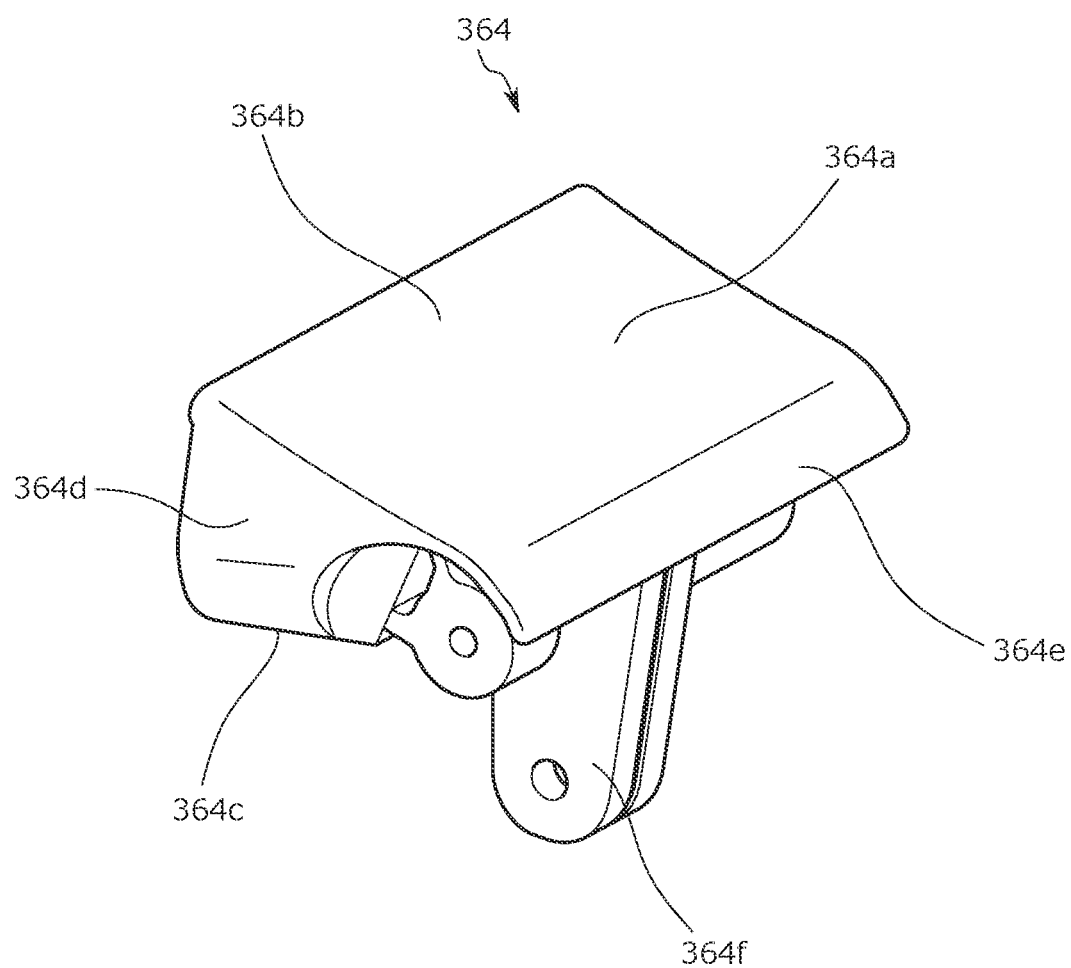
FIG. 37 is a perspective view illustrating the rail operating lever.

As illustrated in FIGS. 35 to 37, the rail operating lever 364 is arranged at a position on the seat back side with respect to the seat back 1 in the conveyance seat S5, and is attached to the periphery of the lower end portion of the seat back 1 through the lever rotary shaft 365.

Specifically, the rail operating lever 364 is rotatably attached to a lever housing portion 383 formed at an upper surface of the base cover 380 through the lever rotary shaft 365 in a state in which the rail operating lever 364 is housed in the lever housing portion 383.

The rail operating lever 364 mainly includes a lever body portion 364a elongated in the seat width direction, a lever operating portion 364b protruding to a seat front side from an upper end portion of the lever body portion 364a, a lever bottom wall portion 364c protruding to the seat front side from a lower end portion of the lever body portion 364a, right and left lever side wall portions 364d coupling both end portions of the lever operating portion 364b and the lever bottom wall portion 364c in the seat width direction, a lever movement restriction portion 364e protruding to the seat back side from the upper end portion of the lever body portion 364a, and a cable attachment portion 364f protruding downward of a center portion of the lever body portion 364a in the seat width direction.

The lever operating portion 364b and the lever bottom wall portion 364c are arranged with a predetermined spacing in the upper-to-lower direction, and are arranged facing each other.

The lever operating portion 364b is a portion of the rail operating lever 364 for hooking a finger of the occupant, and is formed substantially flush with the upper surface of the base cover 380.

The lever bottom wall portion 364c is formed substantially flush with a bottom surface of the lever housing portion 383 of the base cover 380.

Figure 38:
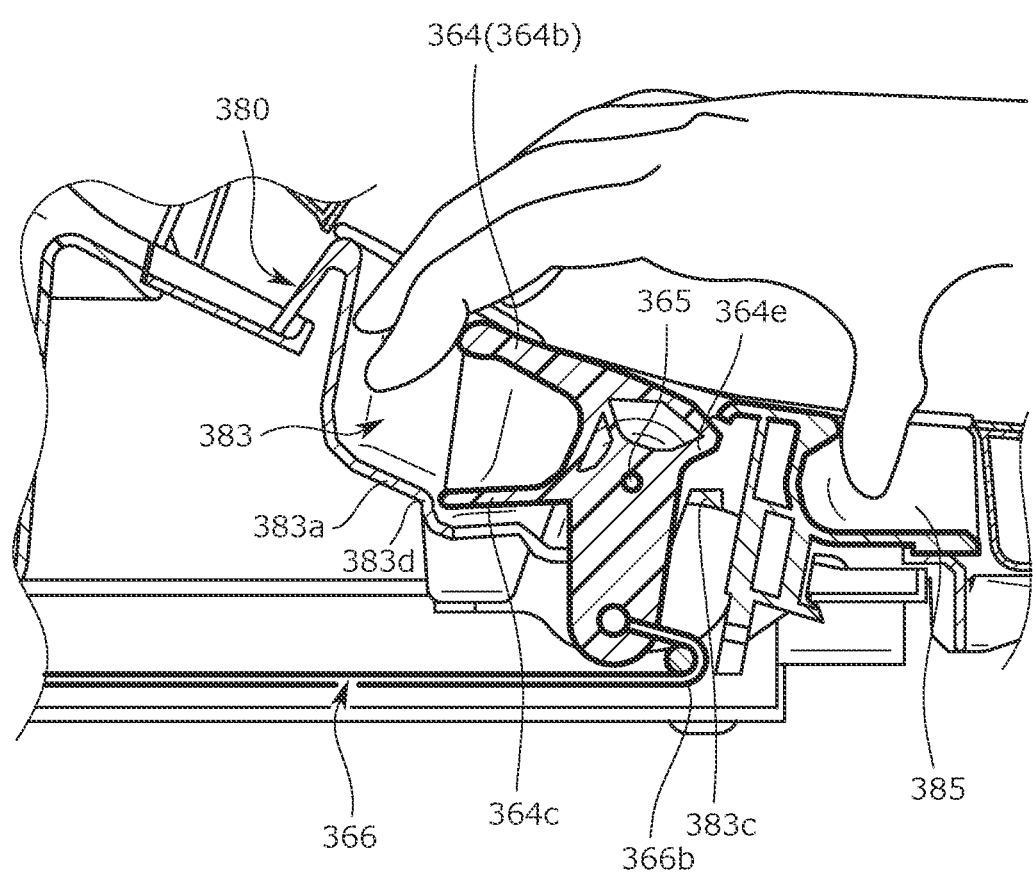
FIG. 38 is a view for describing operation of the rail operating lever when the rail operating lever is at a lock position.
Figure 39:
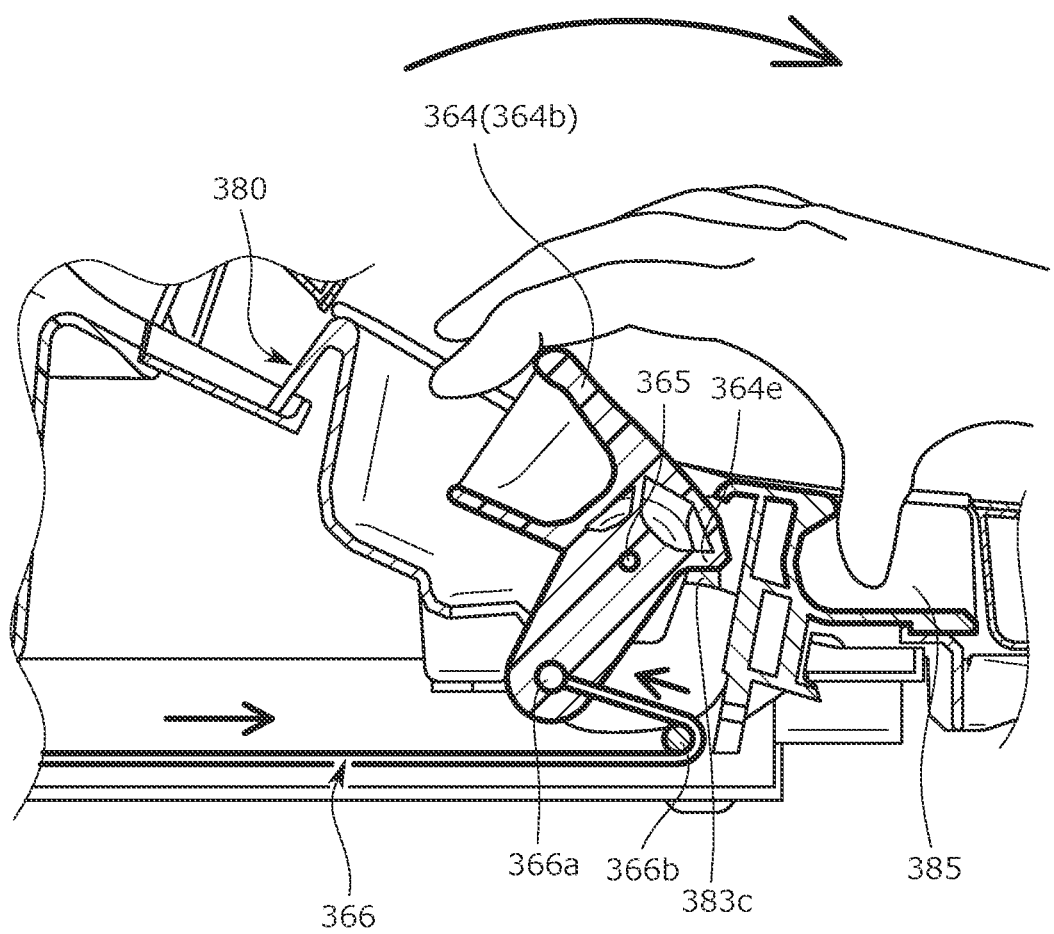
FIG. 39 is a view when the rail operating lever is at an unlock position.

The lever movement restriction portion 364e is a portion of the rail operating lever 364 for restricting rotary movement, and is configured to contact a movement restriction portion 383c provided at the base cover 380 when the rail operating lever 364 is moved to a rotation position illustrated in FIG. 39 from a reference position illustrated in FIG. 38 about the lever rotary shaft 365.

The cable attachment portion 364f is a portion to which one end portion 366a of the rail cable 366 is attached, and penetrates a hole portion provided at the lever housing portion 383 of the base cover 380 to protrude downward of the base cover 380.

The lever rotary shaft 365 supported on the support base 30 in the seat width direction is attached to the center portion of the lever body portion 364a.

Thus, the occupant operates the lever operating portion 364b (pulls to the seat back side) so that the rail operating lever 364 can rotatably move to the rotation position illustrated in FIG. 39 from the reference position illustrated in FIG. 38 about the lever rotary shaft 365.

As illustrated in FIG. 34, the rail cable 366 has one end portion 366a attached to the rail operating lever 364, a folded-back portion 366b as a portion folded back after having extended to the seat back side from one end portion 366a, and the other end portion 366c extending to the seat front side from the folded-back portion 366b and attached to the rail lock member 363 (the turning lever 363c).

The rail cable 366 is drawn by rotary motion of the rail operating lever 364, thereby acting to switch the rail lock member 363 from a lock position to an unlock position.

As illustrated in FIGS. 33 to 35, the anchor member 370 includes a backwards C-shaped wire member. The anchor member 370 is attached to a front surface of the back base coupling portion 33, and extends to protrude upward of such a front surface.

The anchor member 370 is housed in an anchor housing portion 384 formed at the upper surface of the base cover 380, and is arranged at a position adjacent to the rail operating lever 364 in the seat width direction.

As illustrated in FIGS. 32, 35, and 36, the base cover 380 is a resin cover, and is configured such that a front cover 380a arranged on the seat front side and a back cover 380b arranged in the back of the front cover 380a are joined to each other.

The front cover 380a has not only the function of protecting the support base 30 and the rail apparatuses 360 from the outside, but also the function of guiding movement of the seat body (the seat cushion 2) when the seat body is switched from the seatable state to a housing state.

Specifically, as illustrated in FIG. 32, the front cover 380a includes right and left cover protruding portions 381 provided on the sides in the seat width direction and formed to upwardly protrude toward the seat cushion 2 and a cover housing recessed portion 382 provided between the right and left cover protruding portions 381 and formed depressed downward of the cover protruding portions 381 to house a housing target object.

As illustrated in FIGS. 35 and 36, the back cover 380b has the function of protecting the rail operating lever 364 and the anchor member 370 from the outside.

The lever housing portion 383 arranged slightly on the left side (a belt buckle 6 side) at a center portion of the back cover 380b in the seat width direction and provided for housing the rail operating lever 364, the anchor housing portion 384 arranged at a position adjacent to the lever housing portion 383 in the seat width direction and provided for housing the anchor member 370, and a lever operation support portion 385 arranged at a position adjacent to the lever housing portion 383 in the seat front-to-back direction and provided as a portion which is different from the lever operating portion 364b and on which an occupant's finger is to be hooked are formed at an upper surface of the back cover 380b.

At the back cover 380b, a partition wall portion 386 partitioning the lever housing portion 383, the anchor housing portion 384, and the lever operation support portion 385 is formed among the lever housing portion 383, the anchor housing portion 384, and the lever operation support portion 385.

As illustrated in FIGS. 35 and 36, the lever housing portion 383 is a housing recessed portion formed larger than the anchor housing portion 384 in the seat front-to-back direction and the seat width direction.

The lever housing portion 383 and the lever operation support portion 385 are recessed portions formed with the same size (the same width) in the seat width direction.

As illustrated in FIG. 36, a shaft support portion 383b for supporting the lever rotary shaft 365 extending in the seat width direction and the movement restriction portion 383c as a portion contacting the lever movement restriction portion 364e when the rail operating lever 364 rotatably moves are formed at a bottom wall portion 383a as a bottom portion of the lever housing portion 383.

As illustrated in FIG. 36, the bottom wall portion 383a is formed substantially flush with the lever bottom wall portion 364c of the rail operating lever 364, and therefore, a portion of the bottom wall portion 383a facing the lever bottom wall portion 364c in the upper-to-lower direction is bent to extend downward of the lever bottom wall portion 364c to avoid contact with the lever bottom wall portion 364c.

Thus, even in a case where the rail operating lever 364 rotatably moves, no clearance is formed at the bottom wall portion 383a of the lever housing portion 383. For example, even if a foreign substance is dropped, entrance of the foreign substance into the base cover 380 is reduced.

Note that a bent portion 383d formed at the bottom wall portion 383a functions as a portion for restricting rotary movement of the rail operating lever 364.

As illustrated in FIG. 36, the lever operation support portion 385 is the portion which is different from the lever operating portion 364b and on which the occupant's finger is hooked. Specifically, an opening edge, which is formed to partially inwardly protrude, of an opening edge of a recessed portion formed at the upper surface of the base cover 380 is equivalent to the lever operation support portion 385.

In the above-described configuration, as illustrated in FIG. 38, the lever rotary shaft 365 is arranged between the lever operating portion 364b of the rail operating lever 364 and the lever operation support portion 385 of the base cover 380.

That is, the lever operating portion 364b and the lever rotary shaft 365 are arranged at positions relatively close to each other.

Thus, the conveyance seat S5 configured such that the structure of the rail apparatuses 360 including the rail operating lever 364 is compactified is easily realized.

In the above-described configuration, as illustrated in FIG. 38, the lever operating portion 364b and the lever operation support portion 385 are arranged at positions above the lever rotary shaft 365, and the lever operating portion 364b is arranged at a position above the lever operation support portion 385.

Thus, operability of the rail operating lever 364 by the occupant is improved. That is, the occupant more easily grips such an operating lever, and easily applies force to such an operating lever.

As illustrated in FIGS. 40 and 41, the floor board 390 is a board member for forming a floor surface substantially integrally with the vehicle body floor.

The floor board 390 is attached to the back surface of the seat back 1, extends to the seat back side from the seat back 1 along the vehicle body floor, and is arranged to cover the base cover 380 (the back cover 380b) from above.

A folding line portion 391 provided at a position as a boundary portion between the seat back 1 and the vehicle body floor (more specifically, the base cover 380) and provided foldable in association with rotary motion of the seat back 1, a lever exposing portion 392 provided at a position on the seat back side with respect to the folding line portion 391 and provided for exposing the rail operating lever 364 to the outside, and an anchor exposing portion 393 provided at a position on the seat back side with respect to the folding line portion 391, arranged at a position adjacent to the lever exposing portion 392 in the seat width direction, and provided for exposing the anchor member 370 to the outside are formed at an upper surface of the floor board 390.

In the present embodiment, the lever exposing portion 392 and the anchor exposing portion 393 are integrally formed.

In the above-described configuration, as illustrated in FIGS. 40 and 41, the folding line portion 391 of the floor board 390, the rail operating lever 364, and the anchor member 370 are arranged at positions different from each other in the seat front-to-back direction.

Thus, even in a case where the floor board 390 is folded at the folding line portion 391 in association with rotary motion of the seat back 1, contact among the folded portion (the folding line portion 391) of the floor board 390, the rail operating lever 364, and the anchor member 370 can be reduced.

<Conveyance Seat Unit>

Figure 42:
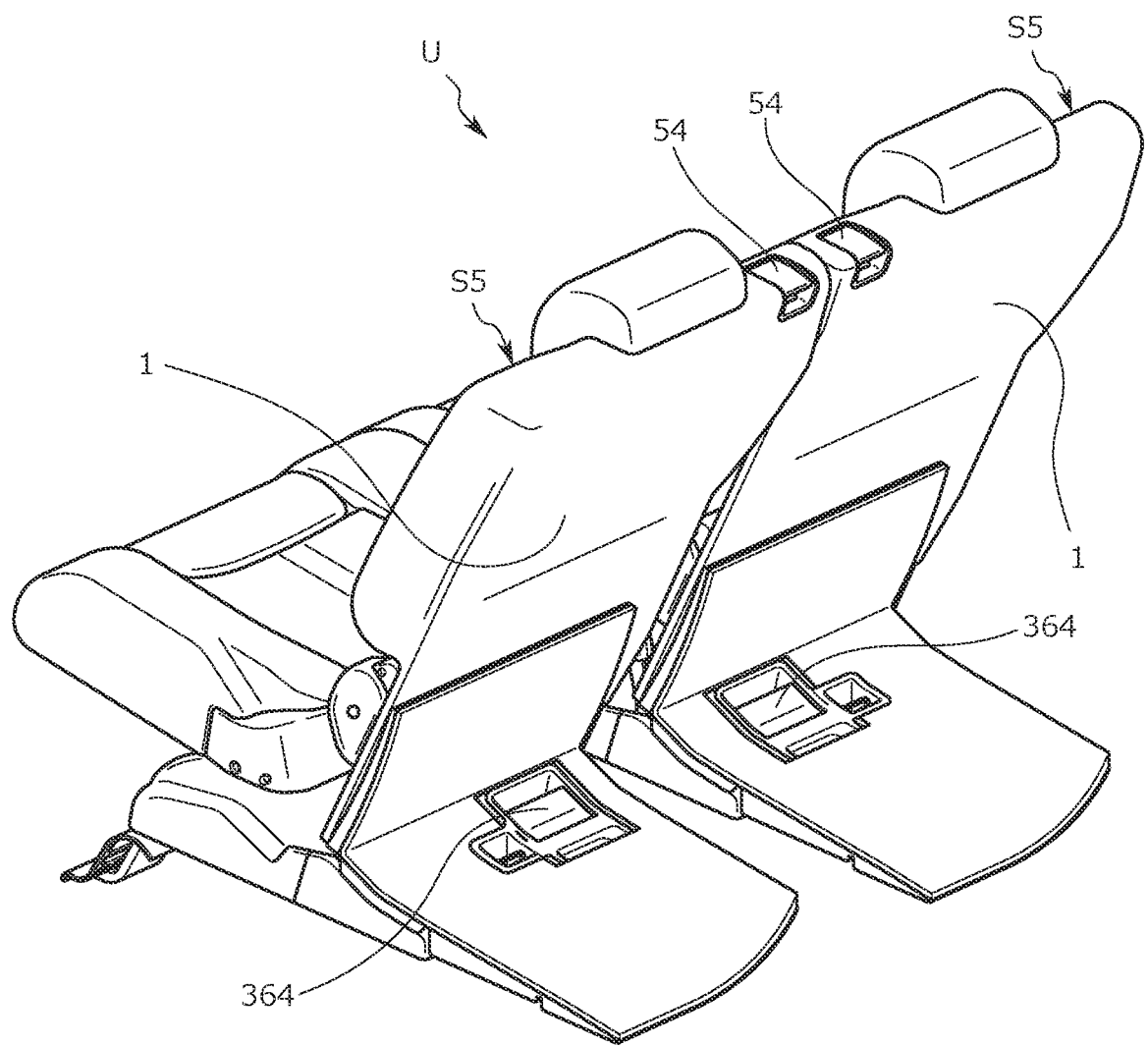
FIG. 42 is a perspective view of a conveyance seat unit.

Next, a conveyance seat unit U will be described with reference to FIG. 42.

The conveyance seat unit U is configured such that multiple conveyance seats S5 are arranged next to each other in the seat width direction.

In the conveyance seat unit U, the rail operating levers 364 each provided at the conveyance seats S5 adjacent to each other are arranged at positions on a center side of the conveyance seat unit U in the seat width direction.

Thus, the occupant can operate each rail operating lever 364 from a position behind the conveyance seat S5, thereby switching the states of the seat bodies adjacent to each other at once, for example.

As illustrated in FIG. 34, in the conveyance seat unit U, the rail operating lever 364 is arranged at a position different from those of the lower rails 361 and the upper rails 362 in the seat width direction. Moreover, as illustrated in FIG. 42, two reclining operating levers 54 are arranged at positions on the center side of the conveyance seat unit U in the seat width direction with respect to two rail operating levers 364.

Thus, contact between the rail operating lever 364 and the upper rail 362 (the lower rail 361) can be reduced. For example, the occupant can operate each reclining operating lever 54 from the position behind the conveyance seat S5, and the seat backs 1 adjacent to each other can turn together.

Sixth Embodiment of Conveyance Seat

Figure 43:
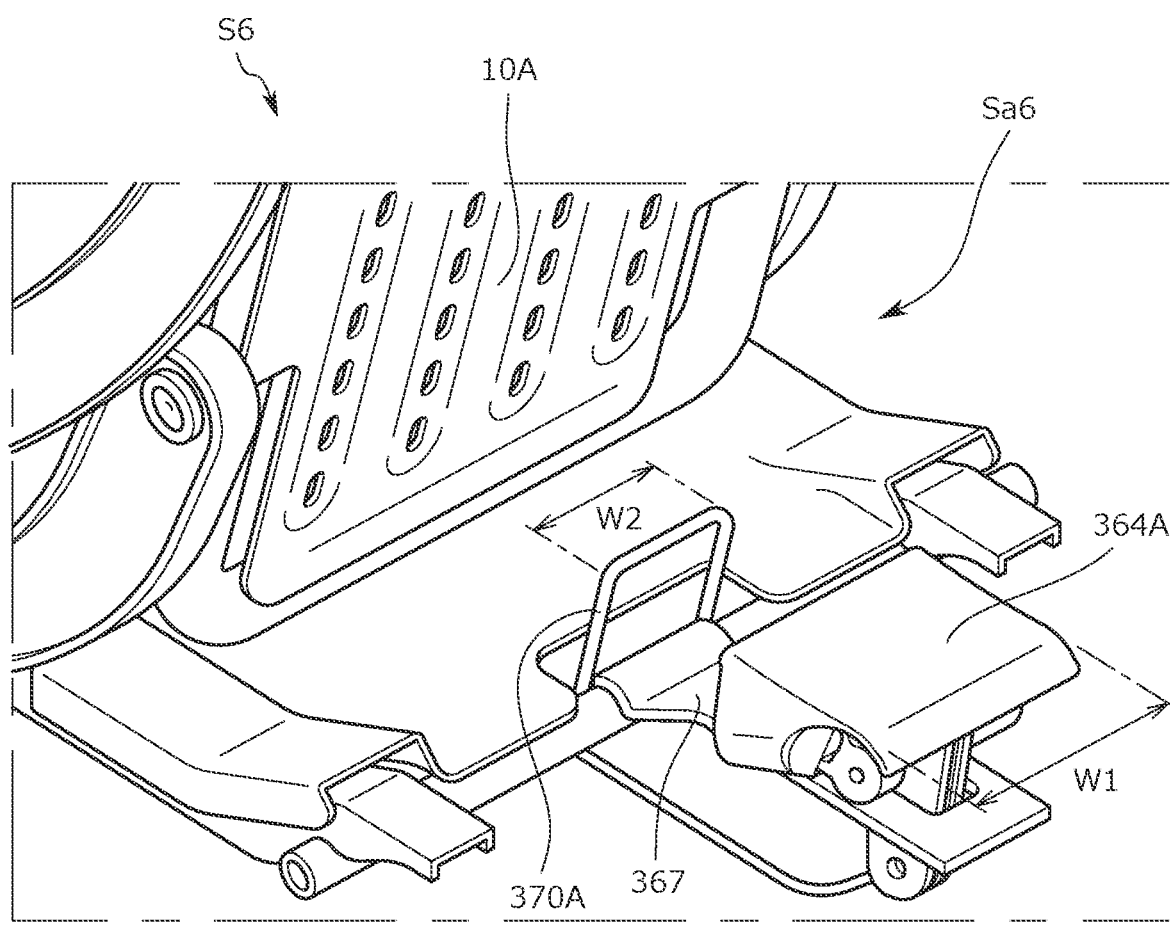
FIG. 43 is a perspective view of a conveyance seat (a seat frame) of a sixth embodiment diagonally from a back side, FIG. 43 illustrating a rail operating lever and an anchor member.

Next, a sixth embodiment of a conveyance seat will be described based on FIG. 43.

In a conveyance seat S6 according to the sixth embodiment, a rail operating lever 364A is mainly different in that the rail operating lever 364A is arranged at a position overlapping with an anchor member 370A in a seat width direction.

The conveyance seat S6 includes the anchor member 370A arranged at a position on a seat back side with respect to a back frame 10A at a seat frame Sa6 as a framework of the conveyance seat S6 and attached to the periphery of a lower end portion of the back frame 10A and the rail operating lever 364A attached to a position on the seat back side with respect to the anchor member through an attachment bracket 367.

Note that the conveyance seat S6 further includes a not-shown floor board attached to a back surface of a seat back (the back frame 10A) and extending to the seat back side from the seat back along a vehicle body floor.

A not-shown lever exposing portion for exposing the rail operating lever 364A to the outside and a not-shown anchor exposing portion for exposing the anchor member 370A to the outside are formed at an upper surface of the floor board.

In the above-described configuration, the rail operating lever 364A is arranged at the position overlapping with the anchor member 370A in the seat width direction, and is formed wider than the anchor member 370A. That is, the width W1 of the rail operating lever 364A is greater than the width W2 of the anchor member 370A.

Thus, the rail operating lever 364A and the anchor member 370A can be compactly arranged in the seat width direction. Moreover, the rail operating lever 364A is formed relatively larger, and therefore, an occupant easily operates the rail operating lever 364A.

Seventh Embodiment of Conveyance Seat

Next, a seventh embodiment of a conveyance seat will be described based on FIGS. 44 to 69.

As a conveyance seat S7, a conveyance seat capable of improving stiffness of a support member supporting a housing portion for housing an article such as a luggage and stably supporting the housing portion is realized. Moreover, a conveyance seat capable of reducing vibration of a seat cushion with a simple structure and properly supporting the seat cushion is realized.

Figure 44:
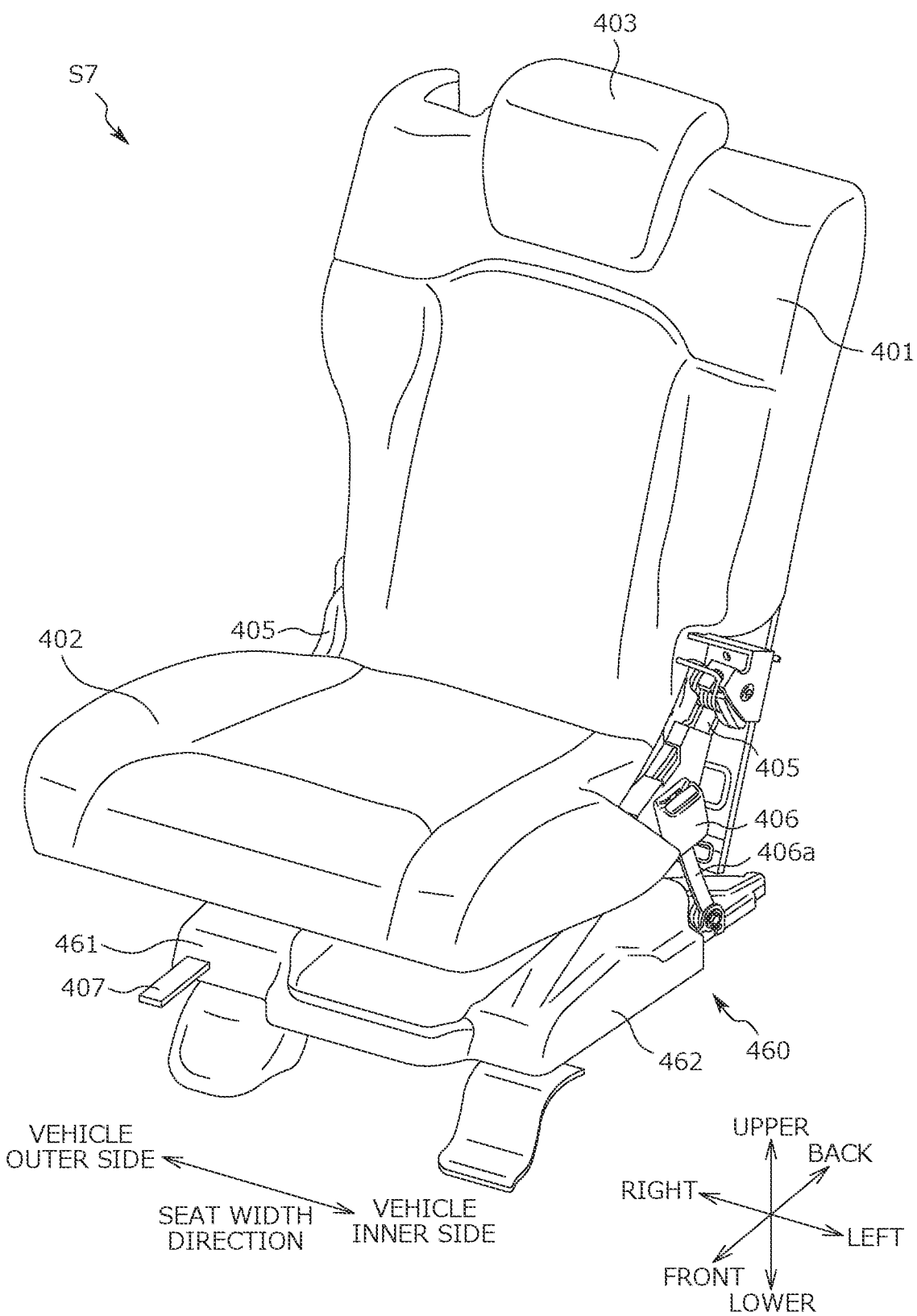
FIG. 44 is a perspective view of a conveyance seat of a seventh embodiment.

As illustrated in FIG. 44, the conveyance seat S7 has a seat body forming a body portion of the conveyance seat S7. As illustrated in this figure, the seat body includes a seat back 401, a seat cushion 402, and a headrest 403. The seat back 401 is turnably attached to a vehicle body floor through a later-described support base 440.

The seat cushion 402 is, at a back end portion thereof, coupled to a lower end portion of the seat back 401. Note that as illustrated in FIG. 44, coupling members 405 are interposed between the back end portion of the seat cushion 402 and the lower end portion of the seat back 401. The coupling members 405 are turnably attached to the seat back 401. Thus, the seat cushion 402 and the coupling members 405 can together turn relative to the seat back 401.

Later-described slide rail mechanisms 404 are placed at a lower portion of the seat body. With the slide rail mechanisms 404, the seat body is slidably attached to the vehicle body floor in a front-to-back direction.

The seat body can be housed in a state in which the seat body is folded into a housing floor F formed in the front of the seat body. The housing floor F is a recessed space formed depressed downward of part (specifically, a portion of the vehicle body floor positioned in the front of the seat body when the seat body is in a seatable state) of the vehicle body floor.

In the present embodiment, a seat state is switchable among the seatable state, a housing state, and a tip-up state.

The seatable state is a state in which the seat back 401 stands on the vehicle body floor and an occupant as a pre-seated occupant can be seated on the seat cushion 402. When the seat state is the seatable state, the seat back 401 is slightly backwardly inclined, and a seating surface (a surface on which the buttocks and thighs of the occupant are placed) of the seat cushion 402 is in an upwardly-facing posture, as illustrated in FIG. 44.

The housing state is a state in which the seat body is folded and housed in the housing floor F. When the seat body transitions to the housing state, the seat back 401 tilts forward with respect to the vehicle body floor, and the seat cushion 402 turns in the direction of approaching the seat back 401. Then, when the seat state reaches the housing state, a back surface (a rear surface) of the seat back 401 is at the same height (level) as that of the vehicle body floor at the periphery of the housing floor F, and the seat cushion 402 is arranged between the seat back 401 and the vehicle body floor.

Figure 45:
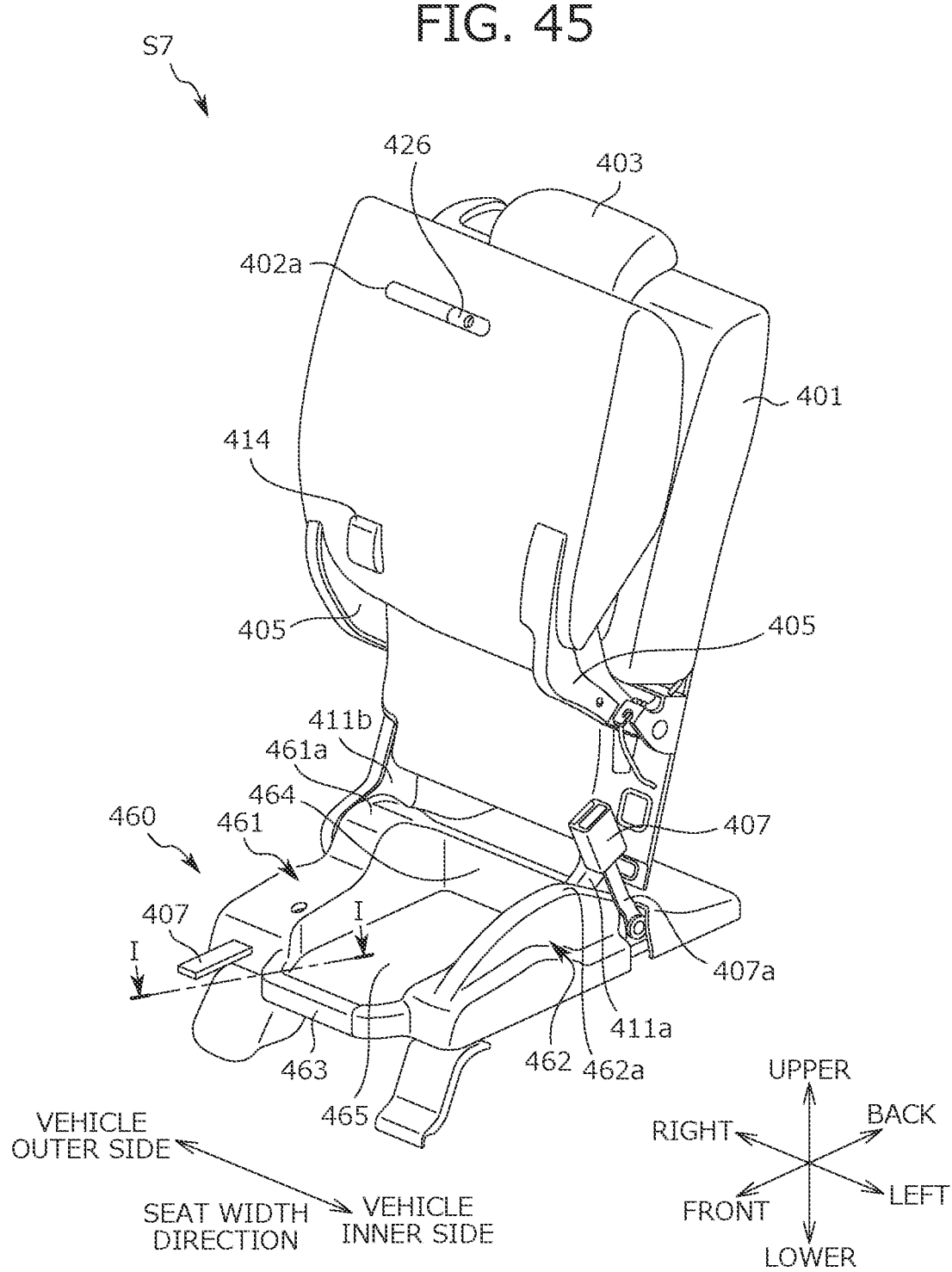
FIG. 45 is a perspective view of the conveyance seat when a seat state is a tip-up state.

As illustrated in FIGS. 4 and 45, the tip-up state is a state in which the seat back 401 stands on the vehicle body floor and the seat cushion 402 is tipped up toward the seat back 401.

In the conveyance seat S7 according to the present embodiment, a lock apparatus for locking the seat state in the tip-up state is provided. Note that the conveyance seat S7 according to the present embodiment includes, as described later, a cushion lock apparatus 425 locking the seat cushion 402 when the seat state is the seatable state and the tip-up state.

Next, movement of each portion of the seat body upon switching of the seat state will be roughly described. When the seat state is the seatable state, the seat back 401 is in such a posture that the seat back 401 stands on the vehicle body floor, and the seat cushion 402 is in a posture substantially horizontal to the vehicle body floor. When the seat state is the seatable state, the seat cushion 402 is held in the seatable state by the cushion lock apparatus 425. At this point, when a not-shown reclining operating lever is operated, a reclining apparatus 413 is unlocked, and at the same time, the cushion lock apparatus 425 is also unlocked by a not-shown cable (engagement with a first engagement hole 429a of a lock piece 428 is cancelled). Accordingly, turning of the seat back 401 and rotation of the seat cushion 402 relative to the seat back 401 are allowed. The seat back 401 is turned within a predetermined area in a state in which the cushion lock apparatus 425 is unlocked so that the occupant can adjust the position of the seat back 401 to a desired position.

In the case of switching the seat state from the seatable state to the housing state, the cushion lock apparatus 425 is first unlocked as described above, and accordingly, the seat back 401 turns relative to the vehicle body floor to tilt forward by biasing force from a not-shown biasing member. The seat cushion 402 moves forward in association with forward tilting motion of the seat back 401 while turning together with the coupling members 405 in the direction of approaching the seat back 401. At this point, lower surfaces of the coupling members 405 of the seat body slidably contact predetermined locations of a base cover 460 arranged at a position below the seat body. Accordingly, the seat cushion 402 smoothly moves forward, and eventually enters the housing floor F.

Thereafter, by further forward tilting motion of the seat back 401, the seat back 401 enters the housing floor F, and the seat cushion 402 moves forward along a bottom surface of the housing floor F. Eventually, the seat state reaches the housing state at the time of folding the seat back 401 on the seat cushion 402 in the housing floor F.

In the case of switching the seat state from the housing state to the tip-up state, the occupant manually raises up the seat body housed in the housing floor F. At this point, the seat cushion 402 is in such a posture that the seat cushion 402 is folded on the seat back 401 (i.e., a posture that the seat cushion 402 is tipped up to the seat back 401). Thus, the seat body is raised up until the seat back 401 reaches a standing position (i.e., the position of the seat back 401 when the seat state is the seatable state), and accordingly, the seat state is switched to the tip-up state. Note that when the seat state is switched to the tip-up state, the seat back 401 is locked in a posture standing on the vehicle body floor.

In the case of switching the seat state from the tip-up state to the seatable state, the occupant performs the operation of unlocking the seat cushion 402. In the present embodiment, a damper 426 provided on a back surface of the seat cushion 402 as illustrated in FIG. 45 is operated, and in this manner, the seat cushion 402 is unlocked. When being unlocked, the seat cushion 402 turns together with the coupling members 405 in the direction of separating from the seat back 401 by the biasing force from the not-shown biasing member. Then, the seat state is switched to the seatable state when the seat cushion 402 reaches a seatable position (i.e., the position of the seat cushion 402 when the seat state is the seatable state).

As illustrated in, e.g., FIG. 44, the conveyance seat S7 includes the seat body. The seat body includes the seat back 401 and the seat cushion 402. The seat back 401 and the seat cushion 402 each include frames (specifically, a seat back frame 410 and a seat cushion frame 420) illustrated in FIG. 46.

The seat back 401 and the seat cushion 402 are coupled to each other through the coupling members 405. The coupling member 405 is a substantially L-shaped member as viewed from the side, and extends in a seat front-to-back direction. Note that the coupling member 405 also has a function as a side frame of the seat cushion 402. The coupling member 405 is formed by processing of a metal plate, and at an end portion of the seat body in a seat width direction, couples the seat back frame 410 and the seat cushion frame 420 to each other. A back end portion of the coupling member 405 is turnably attached to the seat back frame 410. That is, back ends of the coupling members 405 turn relative to the seat back frame 410, and accordingly, the seat cushion 402 and the coupling members 405 together turn relative to the seat back 401.

The cushion lock apparatus 425 as the lock apparatus is attached to the back end portion of the coupling member 405. The cushion lock apparatus 425 is, in the seat width direction, arranged at a position sandwiched between the coupling member 405 and a side end of the seat back frame 410. When the seat state is the seatable state, the cushion lock apparatus 425 locks the seat cushion 402 at a position thereupon. When the seat state is the tip-up state, the cushion lock apparatus 425 locks the seat cushion 402 at a position thereupon. As described in detail below, the cushion lock apparatus 425 can switch the state thereof between a lock state and an unlock state.

The configuration of the seat body will be described in more detail. The damper 426 is, as illustrated in FIG. 45, provided on the back surface (a lower surface of the seat cushion 402 when the seat state is the seatable state) of the seat cushion 402 of the present embodiment. The damper 426 is a raised protrusion protruding downward (a side opposite to a side on which the seating surface is positioned in a thickness direction of the seat cushion 402) of the back surface of the seat cushion 402. Moreover, the damper 426 is in an oval shape as viewed from the front, and as illustrated in FIG. 45, protrudes from a center portion of a front end region of the back surface of the seat cushion 402 in the seat width direction.

When the seat state is the housing state, the damper 426 contacts, at a tip end (a lower end) thereof, the vehicle body floor. This can reduce stain on the back surface of the seat cushion 402 due to contact with the vehicle body floor while the seat state is the housing state.

The damper 426 is operated when the seat state is switched from the tip-up state to the seatable state. Specifically, in the front end region of the back surface of the seat cushion 402, a slit 402a extending to a vehicle outer side from a center portion of the seat cushion 402 along the seat width direction is provided. In the present embodiment, the damper 426 can slidably move in the slit 402a along the seat width direction. Moreover, the damper 426 is coupled to the above-described cushion lock apparatus 425 through the not-shown cable.

Specifically, as illustrated in FIG. 47, the damper 426 is coupled to the cushion lock apparatus 425 through a cable 427. In such a configuration, when the lock piece 428 of the cushion lock apparatus 425 attached to the coupling member 405 engages with an engagement hole (specifically, either of a first engagement hole 429a or a second engagement hole 429b) of an engagement member 429 attached to the seat back 401, the seat cushion 402 is locked at a position thereupon. Note that the lock piece 428 engages with the first engagement hole 429a when the seat state is the seatable state, and engages with the second engagement hole 429b when the seat state is the tip-up state.

More specifically, when the seat state is the tip-up state, if the damper 426 reaches one end position (specifically, a position corresponding to the center portion of the seat cushion 402 in the seat width direction in a slit 402a formation area) in a slide movement area, the lock piece 428 engages with the second engagement hole 429b, the seat cushion 402 is locked, and the seat state is locked in the tip-up state.

When the seat state is the tip-up state, if the occupant slidably moves the damper 426 to the other end position (specifically, an end position on the vehicle outer side in the seat width direction in the slit 402a formation area) in the slide area, the cable 427 connected to the damper 426 is drawn, and the cushion lock apparatus 425 performs unlock motion. As a result, the lock piece 428 is detached from the engagement hole, and the seat state is unlocked (precisely, the seat cushion 402 is unlocked).

Note that a component to be operated for unlocking the seat cushion 402 is not limited to the damper 426. However, when the damper 426 is utilized as the component to be operated for unlocking, the conveyance seat S7 configured to lock or unlock the seat state in the seatable state or the tip-up state can be formed by a smaller number of components.

As illustrated in FIG. 45, a receiving portion 414 is provided at the lower surface of the seat cushion 402. The receiving portion 414 is a portion contacting a top portion 461a of a first raised portion 461 in the seatable state. As illustrated in an A-A sectional view of FIG. 46 in FIG. 48, the receiving portion 414 is supported by a front pipe member 415a and a back pipe member 415b coupling the coupling members 405 as the side frames of the seat cushion 402. The receiving portion 414 described herein includes a body portion 414a made of metal such as iron and a cover member 414b made of resin, and a raised portion of the cover member 414b engages with and is fixed to a recessed portion of the body portion 414a. Note that as illustrated in FIG. 48, a pipe member 415c arranged between the front pipe member 415a and the back pipe member 415b in the seat front-to-back direction is inserted into the body portion 414a of the receiving portion 414.

Figure 46:
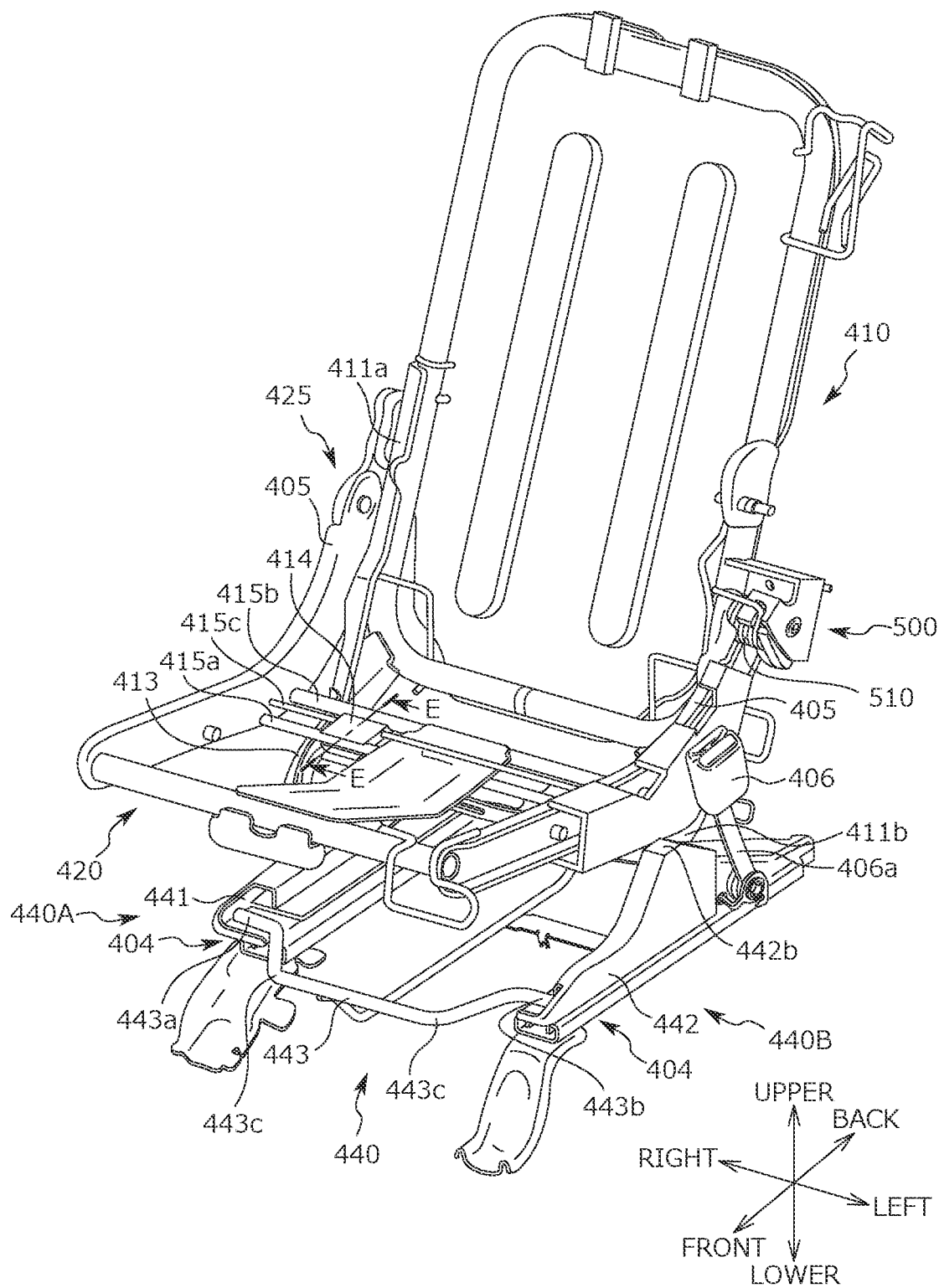
FIG. 46 is a perspective view of a seat frame.

In a case where the seat state is the seatable state, a biasing member 510 (e.g., a torsion spring) provided in a biasing apparatus 500 illustrated in FIG. 46 generates, in the conveyance seat S7, the biasing force (the pressing force) of biasing the lower surface (specifically, lower surfaces of the receiving portion 414 and the vehicle-inner-side coupling member 405) of the seat cushion 402 in a direction in which such a lower surface contacts the first raised portion 461 and a second raised portion 462 (more specifically, the top portion 461a of the first raised portion 461 and a top portion 462a of the second raised portion 462) of the base cover 460 as a cushion support member.

The conveyance seat 57 has, as peripheral equipment of the seat body, a seat belt attachment buckle 406. As illustrated in FIGS. 44 and 46, the buckle 406 is arranged at a position on the side of the seat body, and more specifically, is arranged at a position adjacent to the seat body on a vehicle inner side in the seat width direction. In the present embodiment, the buckle 406 has a support bracket 406a for supporting a body portion (a portion joined to a tongue of a seat belt), and the support bracket 406a is provided turnable relative to the vehicle body floor. That is, the buckle 406 of the present embodiment is configured tiltable forward with respect to the vehicle body floor by turning of the support bracket 406a. When the seat state transitions to the housing state, the buckle 406 is pushed by a side end portion of the seat back 401 from behind, and tilts forward together with the seat back 401.

Further, the conveyance seat 57 has, as peripheral equipment of the seat body, the slide rail mechanisms 404 illustrated in FIGS. 46 and 49. The slide rail mechanism 404 is equipment slidably moving the seat body along the front-to-back direction, and has a well-known structure (a general slide rail mechanism structure). That is, the slide rail mechanisms 404 include a pair of lower rails 404a fixed onto the vehicle body floor and a pair of upper rails 404b slidably movable on the lower rails 404a. The seat body is attached to the upper rails 404b, and moves back and forth in association with slide movement of the upper rails 404b.

Note that the upper rails 404b are, in a normal state, locked not to slidably move, and when the occupant performs predetermined operation, are unlocked to slidably move. More specifically, in the present embodiment, an operation strap 407 illustrated in FIG. 44 is provided as an operation member to be operated for unlocking the upper rails 404b. The operation strap 407 is a band-shaped member formed in an endless shape, and as illustrated in FIG. 44, is at a position below the seat cushion 402 when the seat state is the seatable state. In the present embodiment, the operation strap 407 is provided at a vehicle-outer-side end portion of both end portions of the conveyance seat S7 in the seat width direction. Thus, the operation strap 407 can be operated from the vehicle outer side with a door being opened, thereby unlocking the upper rails 404b.

The operation strap 407 is connected to a slide lock mechanism through a not-shown cable. General equipment for locking the upper rails 404b can be utilized as the slide lock mechanism, and therefore, description and illustration thereof will be omitted. When the operation strap 407 is pulled forward, the cable is drawn. As a result, the slide lock mechanism operates to unlock the upper rails 404b.

The conveyance seat 57 has the support base 440 illustrated in FIGS. 46 and 49. The support base 440 is arranged at a position right above the slide rail mechanisms 404 to support the seat body (the seat back 401 and the seat cushion 402). The support base 440 has a pair of right and left base brackets (a first base bracket 441 and a second base bracket 442) provided at positions separated from each other in the seat width direction, a front coupling member 443 coupling front portions of the first base bracket 441 and the second base bracket 442, and a back coupling member 444 coupling back portions of the first base bracket 441 and the second base bracket 442 in the front-to-back direction.

The first base bracket 441 and the second base bracket 442 are sheet-metal members extending long in the front-to-back direction, and each include flanges 441a, 442a inwardly extending in the seat width direction. The first base bracket 441 is bolted to an upper surface of the upper rail 404b at the flange 441a, and the second base bracket 442 is bolted to an upper surface of the upper rail 404b at the flange 442a. Thus, when the upper rails 404b slide, the support base 440 including the base brackets 441, 442 moves back and forth integrally with the upper rails 404b.

The first base bracket 441 includes, at a center portion thereof in the front-to-back direction, such a top portion 441b that a side wall of the first base bracket 441 is raised in a mountain shape, and the second base bracket 442 includes, at a center portion thereof in the front-to-back direction, such a top portion 442b that a side wall of the second base bracket 442 is raised in a mountain shape. Lower end portions of a first coupling link 411a and a second coupling link 411b are each turnably attached to the top portion 441b of the first base bracket 441 and the top portion 442b of the second base bracket 442.

The coupling links 411 are link members bent in a substantially bow shape, and are each interposed between a lower end portion of the seat back frame 410 and the first base bracket 441 and between the lower end portion of the seat back frame 410 and the second base bracket 442. That is, the seat body (precisely, the seat back 401) is fixed to the upper rails 404b of the slide rail mechanisms 404 through the coupling links 411 and the support base 440.

The coupling links 411 are provided at both end portions of the seat body in the seat width direction one by one (two in total). The lower end portion of the first coupling link 411a is turnably supported on the top portion 441b of a center portion of the first base bracket 441 in the front-to-back direction at a position on the same side as that of the first coupling link 411a in the seat width direction. The lower end portion of the second coupling link 411b is turnably supported on the top portion 442b of a center portion of the second base bracket 442 in the front-to-back direction at a position on the same side as that of the second coupling link 411b in the seat width direction. Thus, the above-described coupling links 411 (the first coupling link 411a and the second coupling link 411b) turn forward with respect to the first base bracket 441 and the second base bracket 442 of the support base 440, and accordingly, the seat back 401 tilts forward.

The reclining apparatus 413 is attached to the lower end portion of the first coupling link 411a on a first base bracket 441 side. The reclining apparatus 413 is, in the seat width direction, arranged between the first coupling link 411a and the first base bracket 441. The reclining apparatus 413 has a well-known structure (a general reclining apparatus structure), and can switch the state thereof between a lock state and an unlock state. When the reclining apparatus 413 is in the lock state, the first coupling link 411a is not turnable, and therefore, the seat back 401 is locked in a posture thereupon. On the other hand, when the reclining apparatus 413 is in the unlock state, the first coupling link 411a is turnable relative to the first base bracket 441, and as a result, the seat back 401 is freely turnable.

The pair of right and left first and second base brackets 441, 442 of the support base 440 and the pair of right and left slide rails (the slide rail mechanisms 404) corresponding thereto will be collectively referred to as base members. Specifically, as illustrated in FIGS. 46 and 50 to 52, the first base bracket 441 and a rail apparatus 4 corresponding thereto will be referred to as a first base member 440A, and the second base bracket 442 and a rail apparatus 4 corresponding thereto will be referred to as a second base member 440B.

As illustrated in FIGS. 46 and 49, the pairs of slide rails of the slide rail mechanisms 404 are coupled to each other through the front coupling member 443. The front coupling member 443 includes two bent portions 443c between a first end portion 443a (one end portion) and a second end portion 443b (the other end portion). As illustrated in FIG. 49, the front coupling member 443 is, between two bent portions 443c, bent to protrude to the front side.

As described above, the front coupling member 443 includes the bent portions 443c as reinforcement portions between the first end portion 443a and the second end portion 443b. Thus, stiffness is improved so that the later-described base cover 460 (the housing portion) can be stably supported.

The first end portion 443a of the front coupling member 443 is supported on the flange 441a of the first base bracket 441 extending in a seat inner direction, and the second end portion 443b of the front coupling member 443 is supported on the flange 442a of the second base bracket 442 extending in the seat inner direction. The front coupling member 443 is, at both end portions thereof, supported on the high-stiffness flanges 441a, 442a, and therefore, support stiffness is improved. The pairs of slide rails of the slide rail mechanisms 404 are coupled to each other by the front coupling member 443, and therefore, shift of the positions of the pairs of slide rails in the seat front-to-back direction is reduced.

On the back side with respect to the front coupling member 443, the back coupling member 444 (a second coupling member) couples the pairs of slide rails of the slide rail mechanisms 404. As illustrated in FIG. 48, the front coupling member 443 and the back coupling member 444 are connected to each other by a back coupling member 445 extending in the seat front-to-back direction. The front coupling member 443 is connected to the back coupling member 444 in the front-to-back direction by the back coupling member 445, and therefore, stiffness of the front coupling member 443 is improved.

The back coupling member 445 is arranged at the same height position as those of the upper rails 404b in an upper-to-lower direction. The height position of the back coupling member 445 is set considering the height positions of the upper rails 404b, and therefore, the size of the conveyance seat S7 in the upper-to-lower direction is compactified.

The reclining apparatus 413 is, in the upper-to-lower direction, arranged at the same height position as those of the front coupling member 443 and the back coupling member 444. The height position of the reclining apparatus 413 is set considering the height positions of the front coupling member 443 and the back coupling member 444, and therefore, the size of the conveyance seat S7 in the upper-to-lower direction is compactified.

Figure 50:
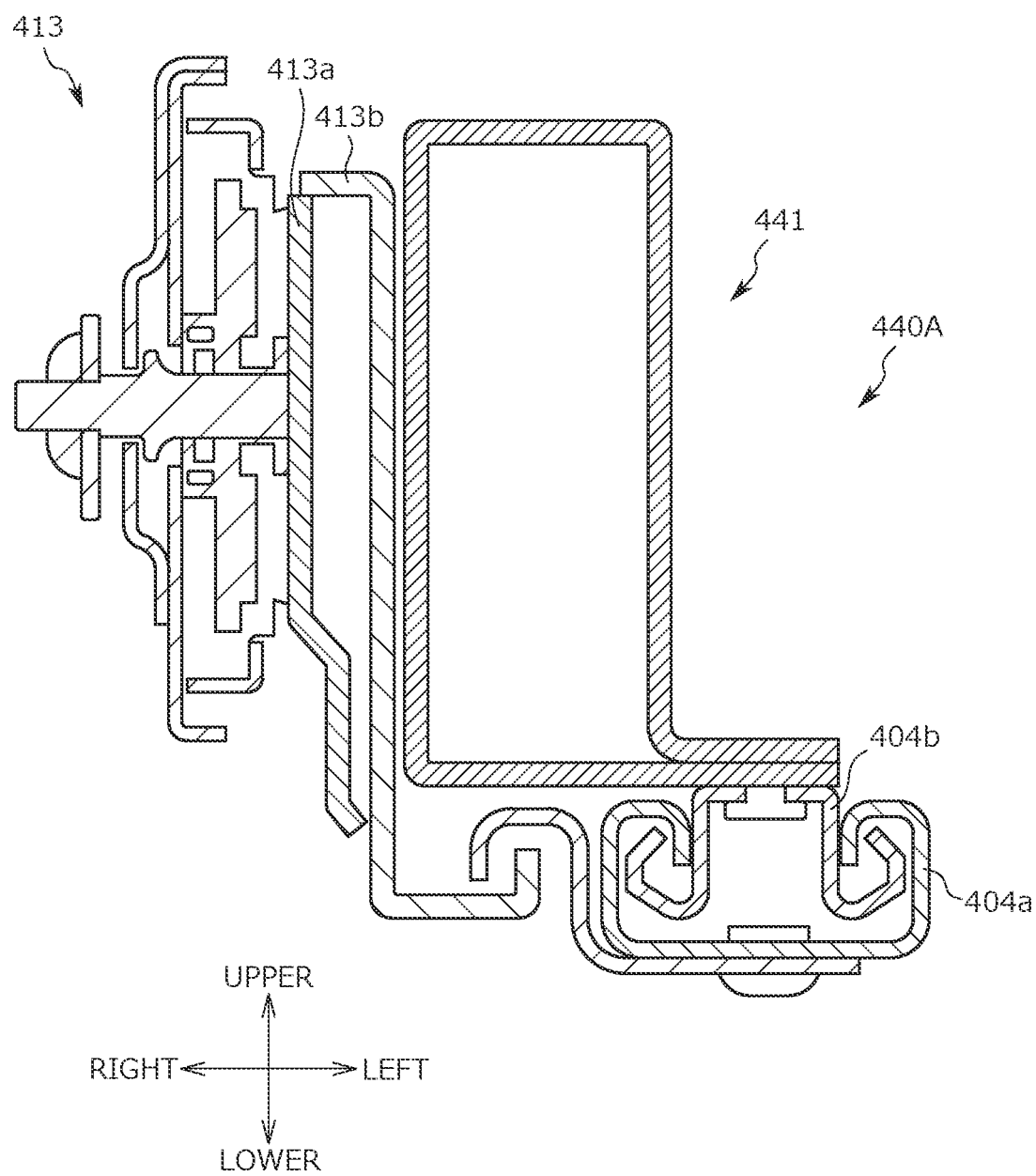
FIG. 50 is an F-F sectional view of FIG. 49 for describing an attachment structure of a reclining apparatus.

As illustrated in a B-B sectional view of FIG. 49 in FIG. 50, the reclining apparatus 413 is attached to a vehicle-outer-side surface of the first base bracket 441 by means of two plate members 413a, 413b.

Figure 51:
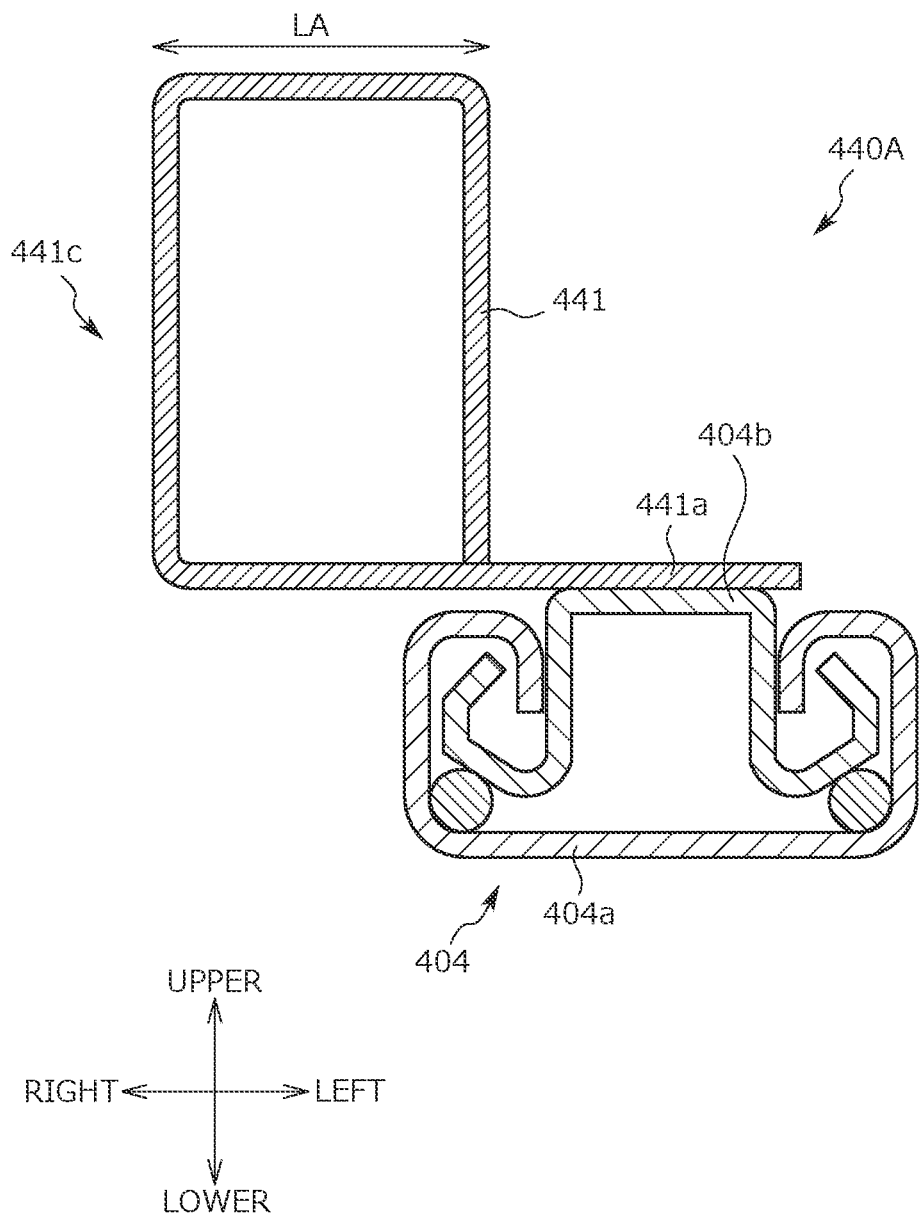
FIG. 51 is a G-G sectional view of FIG. 49 for describing the structures of a first base bracket and a slide rail.
Figure 52:
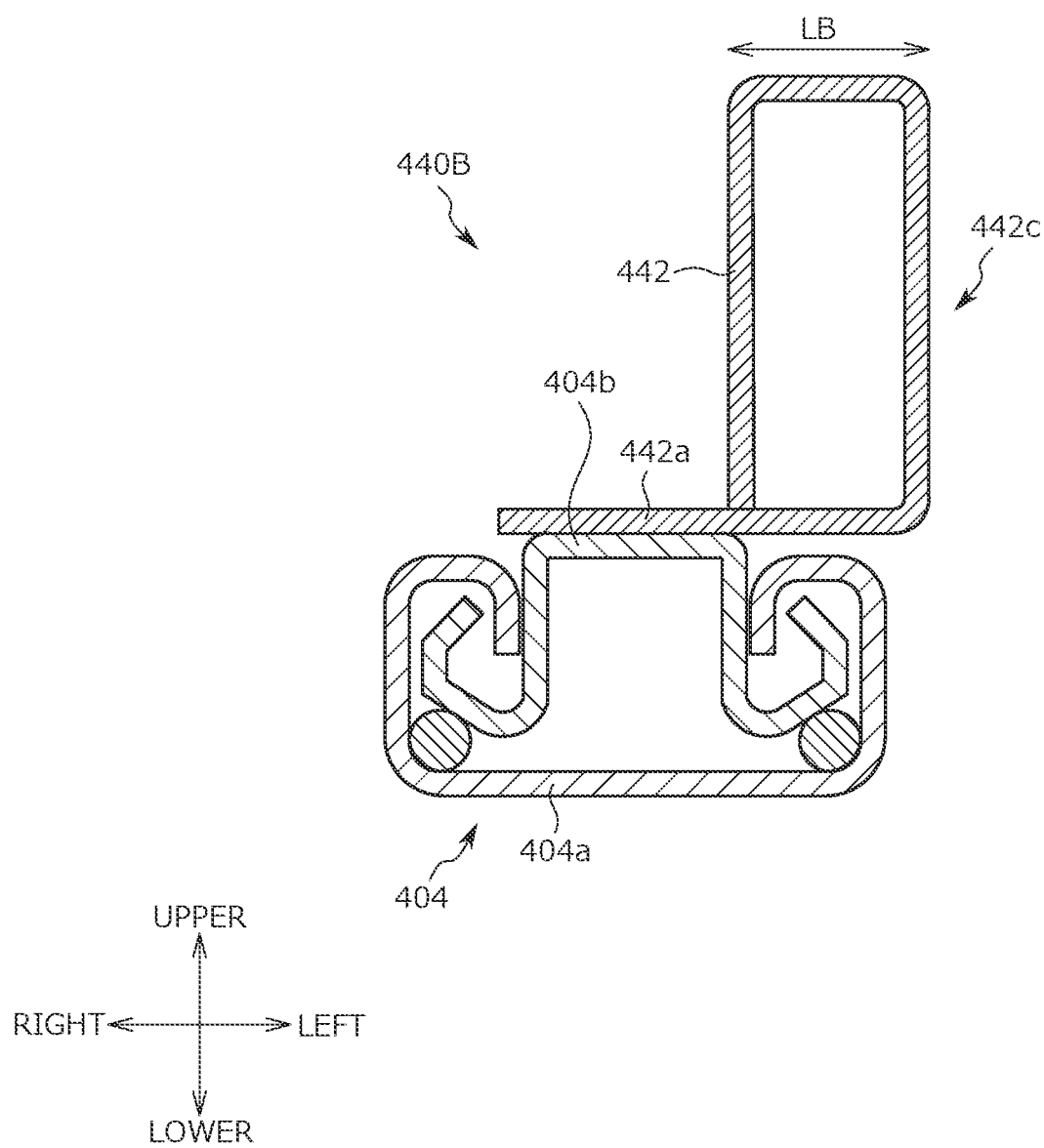
FIG. 52 is an H-H sectional view of FIG. 49 for describing the structures of a second base bracket and the slide rail.

As illustrated in sectional views in FIGS. 51 and 52, the front coupling member 443 is coupled to the first base bracket 441 and the second base bracket 442 to avoid a closed sectional portion 441c of the first base bracket 441 and a closed sectional portion 442c of the second base bracket 442 (in other words, at a portion other than the closed sectional portions). Specifically, the first base bracket 441 and the second base bracket 442 each have, as illustrated in FIGS. 51 and 52, the closed sectional portions 441c, 442c as closed sections along the vertical plane including the seat upper-to-lower direction and the seat width direction. In the seat front-to-back direction, the front coupling member 443 is coupled to the first base bracket 441 and the second base bracket 442 to avoid these closed sectional portions 441c, 442c. The closed sectional portions 441c, 442c are provided at the first base bracket 441 and the second base bracket 442, and therefore, stiffness of the support base 440 is improved while attachability of the front coupling member 443 and the back coupling member 444 is maintained.

As illustrated in FIG. 49, the A-A sectional view of FIG. 51 and the B-B sectional view of FIG. 52 illustrate the same vertical plane in the seat front-to-back direction. As seen from comparison between FIG. 51 and FIG. 52, the closed sectional portion 441c of the first base bracket 441 on a side on which the reclining apparatus 413 is provided is larger than the closed sectional portion 442c of the second base bracket 442. In other words, in the seat width direction, the width LA of the closed sectional portion 441c of the first base bracket 441 is greater than the width LB of the closed sectional portion 442c of the second base bracket 442 (LA>LB). Thus, strength in the same vertical plane in the seat front-to-back direction is higher in the first base bracket 441 than in the second base bracket 442.

As seen from comparison between FIG. 51 and FIG. 52, the first base bracket 441 (the top portion 441b and the closed sectional portion 441c) on the side on which the reclining apparatus 413 is provided is offset to the outside in the seat width direction from the second base bracket 442 (the top portion 442b and the closed sectional portion 442c) with respect to the center of each slide rail (the lower rails 404a and the upper rails 404b) in the seat width direction.

As seen from FIGS. 49, 51, and 52, the width of the flange 441a is, in the seat width direction, greater than the width of the flange 442a (in other words, the flange 441a has a greater length of extension in the seat inner direction than that of the flange 442a). Thus, the first end portion 443a of the front coupling member 443 has higher support stiffness than that of the second end portion 443b.

The base cover 460 is a resin molded article covering the entire support base 440 and the slide rail mechanisms 404 from above. In the present embodiment, the base cover 460 has, in addition to the function of covering the support base 440 and the slide rail mechanisms 404, the function of guiding movement of the seat cushion 402 upon switching of the seat state. As described later, the base cover 460 includes a luggage housing recessed portion 465 for housing an article such as a luggage, and is equivalent to a housing portion in the present embodiment.

The base cover 460 is in an outer shape illustrated in FIGS. 45 and 53, and is placed on the vehicle body floor. Moreover, the base cover 460 entirely upwardly bulges, and inside thereof, a sufficient space for housing the support base 440 and the slide rail mechanisms 404 is formed. Further, as illustrated in FIGS. 53 and 54, the base cover 460 of the present embodiment is divided into a front cover 460a and a back cover 460b. The front cover 460a is divided into two right and left portions, and is formed by combination of two pieces (fragment-shaped pieces forming the front cover 460a). Note that the present invention is not limited to such a configuration, and the front cover 460a may include only a single component (a single piece) or the base cover 460 may include only a single component (a single piece).

As illustrated in FIGS. 45 and 53, the first raised portion 461 and the second raised portion 462 upwardly raised with respect to other portions are formed at both end portions of the base cover 460 in the seat width direction. The first raised portion 461 includes the top portion 461a at a position corresponding to the top portion 441b of the first base bracket 441, and the second raised portion 462 includes the top portion 462a at a position corresponding to the top portion 442b of the second base bracket 442. The second raised portion 462 forms a guide portion, and is provided to expand from a front end to a back end of the base cover 460 along the front-to-back direction. A front protruding portion 463 and a back protruding portion 464 upwardly protruding with respect to other portions are formed at both end portions of the base cover 460 in the front-to-back direction.

As illustrated in FIG. 45, the second raised portion 462 is in a substantially mountain shape as viewed from the side, and an upper end surface thereof is a curved flat surface to form an arc protruding upward. A front end surface of the second raised portion 462 is an inclined surface as illustrated in FIG. 45, and the housing floor F is arranged on an extension of such a front end surface. Moreover, the second raised portion 462 has a slight expansion (a horizontal width) in the seat width direction.

The second raised portion 462 configured as described above slidably contacts, when the seat state transitions to the housing state, part of the seat body to guide movement of the seat back 401 and the seat cushion 402. More specifically, when the seat state transitions to the housing state, if the seat back 401 tilts forward, the seat cushion 402 accordingly moves forward to the housing floor F. At this point, the lower surface of the coupling member 405 slides (specifically, glides) on the front end surface of the second raised portion 462 inclined toward the housing floor F. Thus, the seat cushion 402 is guided by the second raised portion 462 to smoothly move toward the housing floor F.

Of the base cover 460, a portion positioned between the first raised portion 461 and the second raised portion 462 in the seat width direction and positioned between the front protruding portion 463 and the back protruding portion 464 in the front-to-back direction is, as illustrated in FIG. 45, depressed (recessed) downwardly of the first raised portion 461 and the second raised portion 462, thereby forming a recessed space. Such a space forms the luggage housing recessed portion 465. Thus, while the seat state is, for example, the seatable state or the tip-up state, a luggage with a slight height can be placed in the space (the luggage housing recessed portion 465) positioned below the seat cushion 402. Note that the front coupling member 443 includes the bent portions 443c bent to protrude forward of the conveyance seat S7 and therefore, stiffness is improved and the luggage housing recessed portion 465 as a luggage housable region is expanded with a simple configuration.

As illustrated in FIG. 54, the base cover 460 is integrated in such a manner that an engagement raised portion 466b formed at a front end portion of the back cover 460b is fitted in an engagement recessed portion 466a formed at the back protruding portion 464 as a back end portion of the front cover 460a. The engagement recessed portion 466a is provided at the back protruding portion 464 forming a back step portion of the luggage housing recessed portion 465 of the front cover 460a, and therefore, the back cover 460b can be fitted at a location with increased stiffness.

Figure 55:
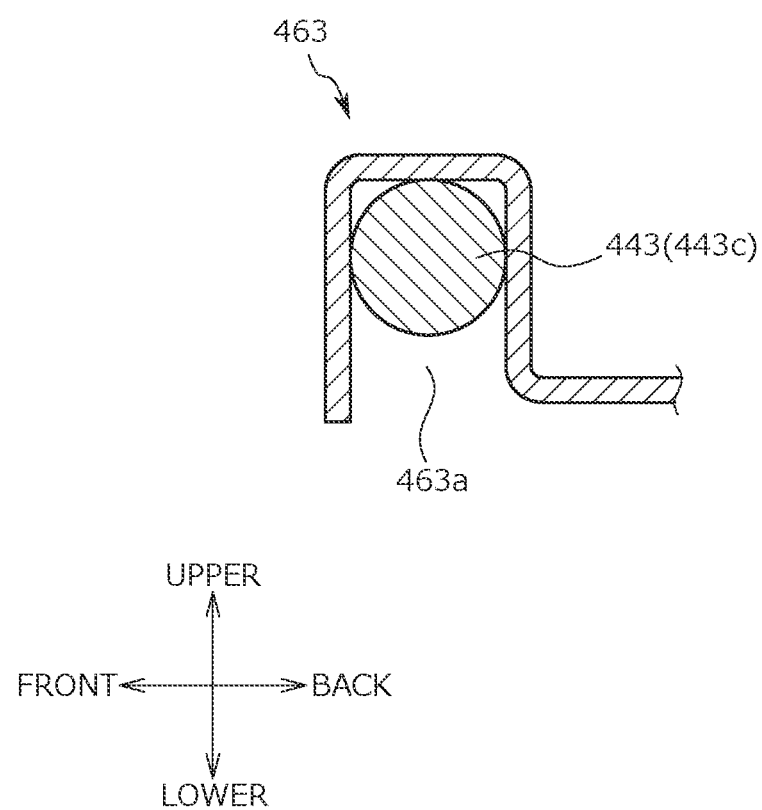
FIG. 55 is an I-I sectional view of FIG. 45.

As illustrated in an E-E sectional view of FIG. 45 in FIG. 55, the upwardly-protruding front protruding portion 463 having a space 463a inside is formed at a portion of the base cover 460 supported on the front coupling member 443, and the bent portion 443c of the front coupling member 443 supports the base cover 460 in the space 463a inside the front protruding portion 463. The bent portion 443c of the front coupling member 443 supports the base cover 460 in the space inside the front protruding portion 463, and therefore, position shift of the front coupling member 443 from the base cover 460 can be reduced. Note that at a location other than the bent portions 443c, the front coupling member 443 similarly supports the base cover 460 in the space 463a inside the front protruding portion 463.

As described in detail below, the conveyance seat S7 according to the present embodiment includes the torsion spring 510 as the biasing member biasing the seat cushion 402 in a direction in which the lower surface of the seat cushion 402 contacts the support member when the seat state is the seatable state.

In a vehicle seat which can transition to the tip-up state, when the seat state transitions from the seatable state to the tip-up state by tipping up of the seat cushion 402, if the seat cushion 402 is tipped up with action of the biasing force of the biasing member (e.g., the torsion spring 510) being kept, the biasing member is fastened, and therefore, the force of pressing the seat cushion 402 increases. That is, an operation load when the seat cushion 402 transitions to the tip-up state increases, and operability is degraded. When the seat cushion 402 transitions to the seatable state, there is a probability that the seat cushion 402 downwardly powerfully moves.

For this reason, the conveyance seat S7 according to the present embodiment includes a biasing force reduction apparatus 500 stopping fastening of the biasing member (the torsion spring 510) and suppress an increase in the biasing force of pressing the seat cushion 402 in the middle of transition of the seat state from the seatable state to the tip-up state by tipping up of the seat cushion 402.

Hereinafter, the biasing force reduction apparatus 500 according to the present embodiment will be described with reference to FIGS. 64 to 69. The biasing force reduction apparatus 500 includes, as main components, the torsion spring 510 as the biasing member, a back turning bracket 520 attached to the seat back frame 410, and a cushion turning bracket 530 attached to the coupling member 405 turnably coupling the seat cushion 402 to the seat back 401.

The torsion spring 510 as the biasing member includes a first end portion 511 as one end portion and a second end portion 512 as the other end portion. The first end portion 511 is arranged on a seat back side, and the second end portion 512 is arranged on a seat front side. The first end portion 511 and the second end portion 512 are formed in a bent shape. The torsion spring 510 is the biasing member biasing the seat cushion 402 in the direction in which the lower surface of the seat cushion 402 contacts the support member when the seat state is the seatable state. The support member in the conveyance seat S7 according to the present embodiment includes the base cover 460 (specifically the first raised portion 461 and the second raised portion 462, more specifically the top portion 461a of the first raised portion 461 and the top portion 462a of the second raised portion 462), the support base 440 (specifically the first base bracket 441 and the second base bracket 442, more specifically the top portion 441b of the first base bracket 441 and the top portion 442b of the second base bracket 442), and the slide rail mechanisms 404.

Figure 66:
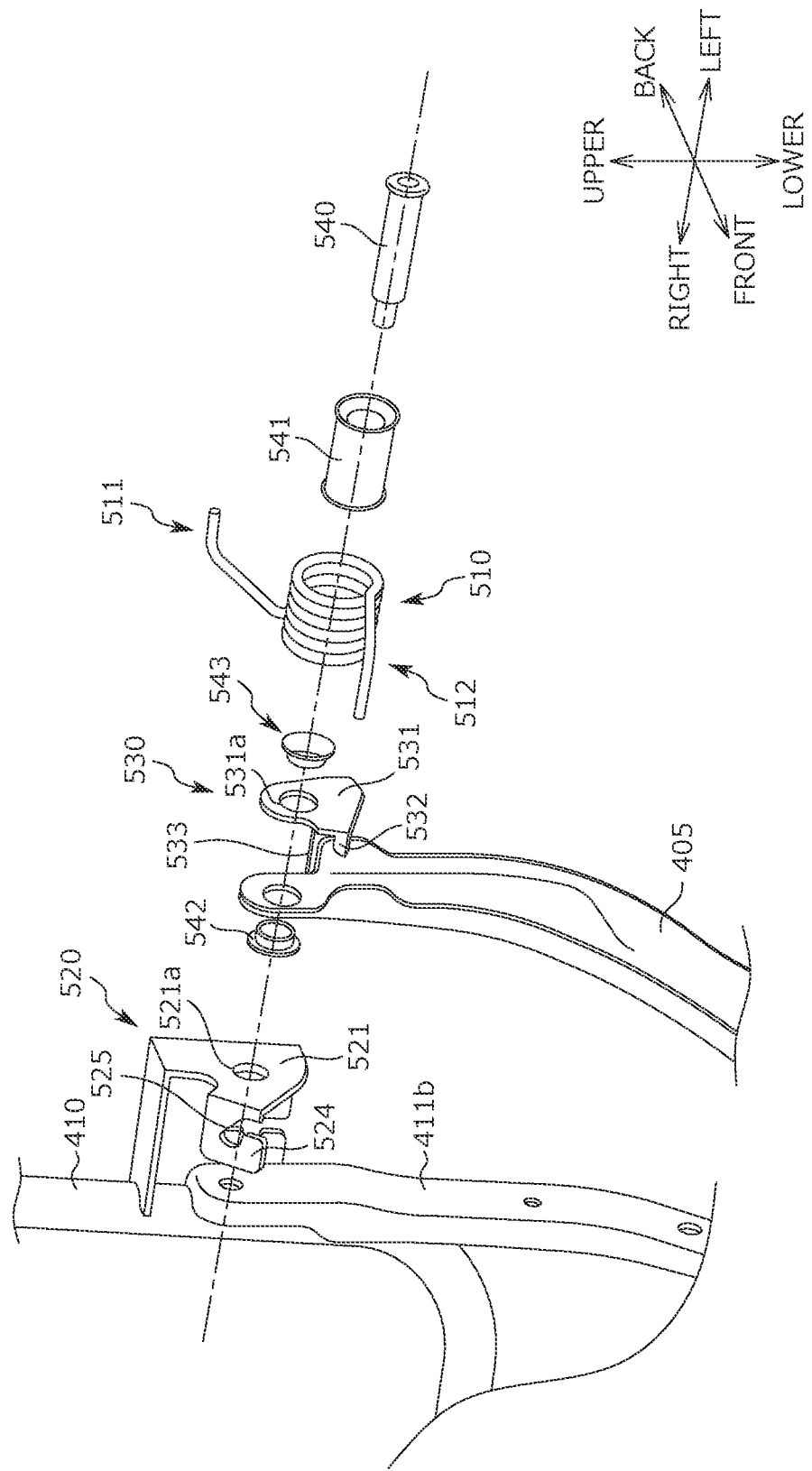
FIG. 66 is an exploded view of the biasing force reduction apparatus.

As illustrated in FIGS. 64 to 66, the back turning bracket 520 includes a side surface 521 having an opening 521a provided in the seat width direction, a back surface 522 on the seat back side, an upper surface 523 connecting the side surface 521 and the back surface 522, and a lock piece 524 for locking the second end portion 512 of the torsion spring 510. Note that the back turning bracket 520 is equivalent to a first bracket in the present embodiment.

As illustrated in FIG. 65, a back surface adjustment groove 522a for adjusting the biasing force of the torsion spring 510 is formed at the back surface 522 of the back turning bracket 520. The first end portion 511 of the torsion spring 510 is hooked on and fixed to the back surface adjustment groove 522a. The back surface adjustment groove 522a has two recessed portions separated from each other in the seat upper-to-lower direction. The position of the recessed portion in which the first end portion 511 of the torsion spring 510 is locked is changed so that the biasing force of the torsion spring 510 can be adjusted.

The back turning bracket 520 includes the lock piece 524 inwardly extending in the seat width direction. As illustrated in FIG. 64, a biasing force adjustment groove 525 for reducing the biasing force of the torsion spring 510 when the seat cushion 402 transitions from the seatable state to the tip-up state is formed at the lock piece 524. The biasing force adjustment groove 525 includes an inlet portion 525a as an inlet of the second end portion 512 of the torsion spring 510, an inclined portion 525b formed continuously from the inlet portion 525a and provided inclined inwardly in the seat width direction, and a restriction portion 525c provided inside the inclined portion 525b in the seat width direction.

As illustrated in FIGS. 64 to 66, the cushion turning bracket 530 includes a side surface 531 having an opening 531a provided in the seat width direction, a spring support portion 532 supporting the second end portion 512 of the torsion spring 510, and an attachment portion 533 attached to the coupling member 405 turnably coupling the seat cushion 402 to the seat back 401. Note that the cushion turning bracket 530 is equivalent to a second bracket in the present embodiment.

When the seat cushion 402 transitions from the seatable state to the tip-up state, the spring support portion 532 of the cushion turning bracket 530 supports the second end portion 512 of the torsion spring 510 while causing the second end portion 512 to contact the biasing force adjustment groove 525 of the lock piece 524. The cushion turning bracket 530 is attached to the coupling member 405 at the attachment portion 533, and therefore, turning motion of the cushion turning bracket 530 and turning motion of the coupling member 405 are linked to each other. Specifically, when the seat cushion 402 including the coupling members 405 is turned in a lifting direction, the cushion turning bracket 530 also turns in the same direction. When the biasing force is applied to turn the cushion turning bracket 530 downwardly, the seat cushion 402 also turn in the same direction (downwardly, in other words, in the direction in which the lower surface of the seat cushion 402 contacts the base cover 460 as the support member) through the coupling member 405.

As illustrated in an exploded view of the biasing force reduction apparatus 500 in FIG. 66, a shaft 540 and a tubular member 541 are inserted into the torsion spring 510, and the torsion spring 510 is combined with the back turning bracket 520 and the cushion turning bracket 530 with bushes 542, 543 being interposed. Note that a chain line in FIG. 66 is the axes of the coupling member 405, the torsion spring 510, the opening 521a of the back turning bracket 520, the opening 531a of the cushion turning bracket 530, the shaft 540, and the tubular member 541 (more specifically, the axes of rotation of the coupling member 405, the torsion spring 510, the cushion turning bracket 530, the shaft 540, and the tubular member 541).

In a case where the seat state is the seatable state, the biasing force reduction apparatus 500 is in a state illustrated in FIG. 67. In the state illustrated in FIG. 67, the spring support portion 532 of the cushion turning bracket 530 is downwardly pushed by the second end portion 512 of the torsion spring 510, and therefore, the biasing force (the pressing force) of biasing the lower surface of the seat cushion 402 through the coupling member 405 in the direction in which the lower surface of the seat cushion 402 contacts the first raised portion 461 and the second raised portion 462 of the base cover 460 (more specifically, the top portion 461a of the first raised portion 461 and the top portion 462a of the second raised portion 462) is generated.

Thus, in a case where the seat state is the seatable state, the lower surface of the seat cushion 402 is, by the torsion spring 510, pressed against and supported on the base cover 460 forming the support member, and therefore, vibration of the seat cushion 402 can be reduced.

Figure 68:
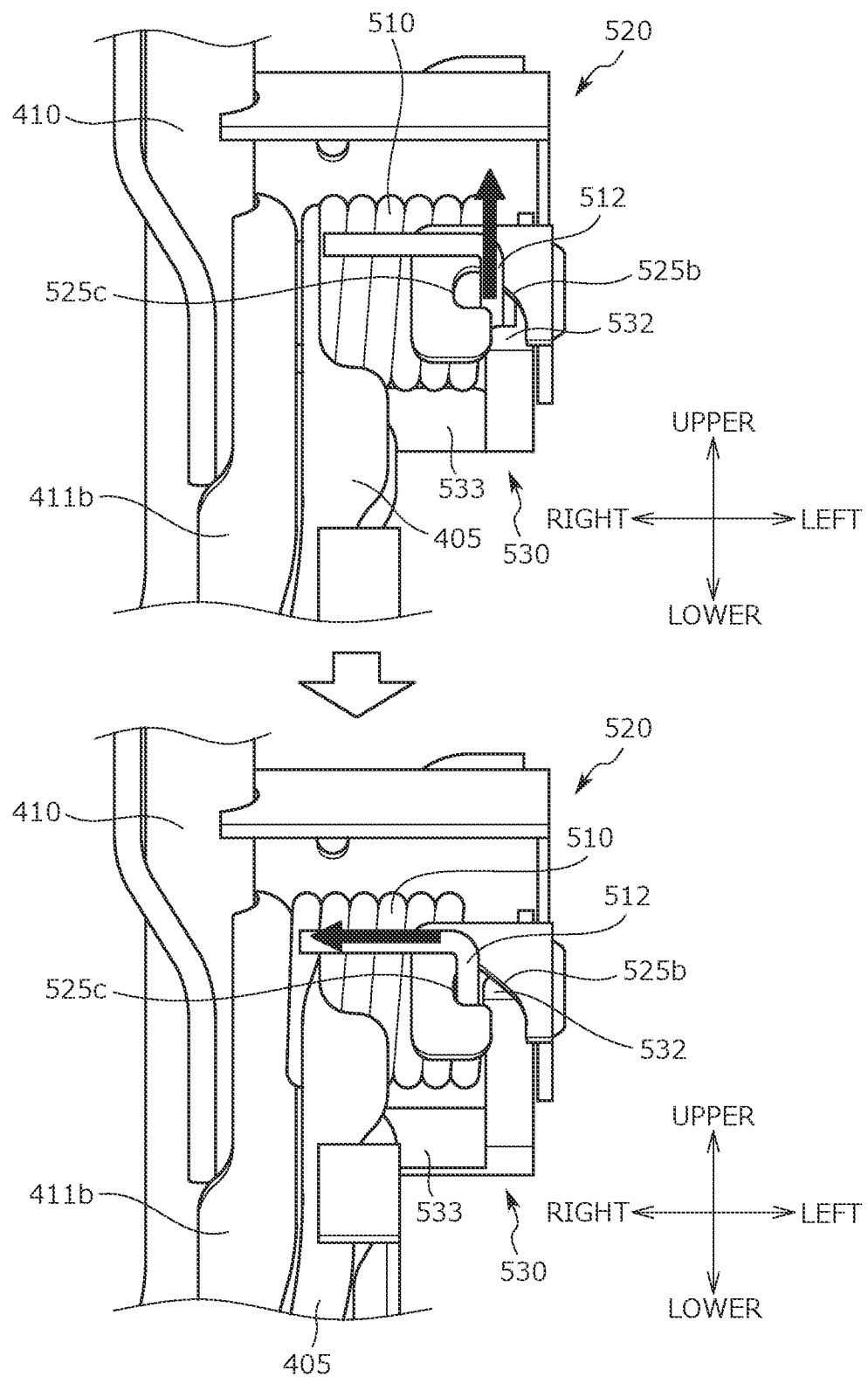
FIG. 68 is a view illustrating the biasing force reduction apparatus when the seat state transitions from the seatable state to the tip-up state.

While the seat state is transitioning from the seatable state to the tip-up state, the biasing force reduction apparatus 500 transitions from a state illustrated in FIG. 67 to a state illustrated on a lower view of FIG. 68 through a state illustrated in an upper view of FIG. 68. When the seat cushion 402 is lifted, the second end portion 512 of the torsion spring 510 is lifted up as indicated by an arrow of the upper view of FIG. 68 by the spring support portion 532 of the cushion turning bracket 530. At this point, the second end portion 512 of the torsion spring 510 is lifted along the inclined portion 525b of the biasing force adjustment groove 525 provided at the back turning bracket 520 while is moving inwardly in the seat width direction.

At this point, the second end portion 512 of the torsion spring 510 contacts the inclined portion 525b, and therefore, the force of downwardly pressing the spring support portion 532 by the second end portion 512 of the torsion spring 510 decreases as compared to that in the case of the seatable state (FIG. 67). Thus, the biasing force (the pressing force) of biasing the lower surface of the seat cushion 402 in the direction in which such a lower surface contacts the base cover 460 decreases as compared to that in the case of the seatable state. Thus, the operation load is reduced in transition from the seatable state to the tip-up state, leading to favorable operability.

When the seat cushion 402 is further lifted from the state illustrated in the upper view of FIG. 68, the second end portion 512 of the torsion spring 510 moves in a direction (an inward direction in the seat width direction) indicated by an arrow in the lower view of FIG. 68, and is locked in contact with the restriction portion 525c of the biasing force adjustment groove 525. At this point, the second end portion 512 of the torsion spring 510 is separated from the spring support portion 532, and is locked by the restriction portion 525c. In other words, inward movement of the second end portion 512 of the torsion spring 510 in the seat width direction is restricted by the restriction portion 525c. In this manner, fastening of the torsion spring 510 is stopped. Thus, the biasing force of biasing the lower surface of the seat cushion 402 in the direction in which the lower surface of the seat cushion 402 contacts the base cover 460 is maintained constant.

The biasing force reduction apparatus 500 includes the brackets (the back turning bracket 520 and the cushion turning bracket 530) for attaching the torsion spring 510 as the biasing member to the conveyance seat S7. The first end portion 511 of the torsion spring 510 is locked by the back turning bracket 520. The second end portion 512 of the torsion spring 510 biases the lower surface of the seat cushion 402 in the direction in which the lower surface of the seat cushion 402 contacts the base cover 460. The biasing force reduction apparatus 500 acts on the second end portion 512 of the torsion spring 510. Thus, the biasing force of the torsion spring 510 can be reduced with a simple configuration.

In the biasing force reduction apparatus 500, when the seat cushion 402 transitions from the seatable state to the tip-up state, the spring support portion 532 (a biasing member support portion) of the cushion turning bracket 530 attached to the seat cushion 402 causes the second end portion 512 of the torsion spring 510 to contact the biasing force adjustment groove 525 (a groove portion) of the back turning bracket 520 attached to the seat back frame 410 of the seat back 401. Thus, the biasing force of the torsion spring 510 can be properly reduced.

The biasing force adjustment groove 525 (the groove portion) includes the inclined portion 525b, and when the seat cushion 402 transitions from the seatable state to the tip-up state, the second end portion 512 of the torsion spring 510 contacts the inclined portion 525b to reduce the biasing force. Moreover, the biasing force adjustment groove 525 (the groove portion) includes the restriction portion 525c, and when the seat cushion 402 transitions from the seatable state to the tip-up state, the second end portion 512 of the torsion spring 510 is locked by the restriction portion 525c, and therefore, the biasing force is held constant. Thus, the biasing force can be properly reduced with a simple configuration.

In a case where the seat state is the tip-up state (FIG. 4), the biasing force reduction apparatus 500 is in the state illustrated in FIG. 69. The second end portion 512 of the torsion spring 510 is kept locked by the restriction portion 525c of the biasing force adjustment groove 525, and even when the seat cushion 402 is lifted, the torsion spring 510 is not fastened. Moreover, an inner wall 532a of the spring support portion 532 of the cushion turning bracket 530 serves as an outer barrier in the seat width direction, and therefore, shift of the torsion spring 510 to the outside (the left side in FIG. 67) in the seat width direction is prevented.

The above-described conveyance seat S7 includes the cushion lock apparatus 425 locking the seat cushion 402 in the tip-up state. The seat cushion 402 is turnably supported relative to the seat back 401 by the coupling members 405 provided in the seat width direction. The cushion lock apparatus 425 is provided at one coupling member 405 (the right coupling member 405 of FIG. 46) in the seat width direction. The torsion spring 510 is provided at the other coupling member 405 (the left coupling member 405 of FIG. 46). Thus, the torsion spring 510 and the cushion lock apparatus 425 as a lock apparatus for the seat cushion 402 can be, in the seat width direction, arranged separately at the right and left coupling members 405, and therefore, a seat structure can be compactified.

In the above-described conveyance seat S7 the seat cushion 402 is turnably supported relative to the seat back 401 about the rotation axis (the shaft 540 and the tubular member 541), and the torsion spring 510 is attached to the periphery of the rotation axis. Thus, the lower surface of the seat cushion 402 can be properly biased, with a simple configuration, in the direction in which the lower surface of the seat cushion 402 contacts the first raised portion 461 and the second raised portion 462 (the top portion 461a of the first raised portion 461 and the top portion 462a of the second raised portion 462) of the base cover 460 forming the support member.

Other Embodiments

In the above-described embodiments, the housing floor is formed on the seat front side of the conveyance seat S, but the present invention is not limited to such a configuration. The housing floor may be formed in the back of the conveyance seat S.

In this case, a position relationship in the upper-to-lower direction between the seat back 1 and the seat cushion 2 when the seat body is housed in the housing floor is preferably inverted arrangement.

In the above-described embodiments, the housing state of the seat body has been described as one equivalent to a movement state of the present invention, but the present invention is not limited to such a state. Needless to say, e.g., the tip-up state of the present embodiment may be equivalent to the movement state.

Alternatively, a slide movement state in which the seat body has moved to a predetermined seat front position (a predetermined seat back position) from a normal position illustrated in FIG. 19 by the rail apparatuses 4 may be equivalent to the movement state of the present invention.

In the above-described embodiments, the support base is fixed to the vehicle body floor through the rail apparatuses 4 as illustrated in FIG. 2, but the present invention is not limited to such a configuration. Changes may be made as necessary. For example, the support base 30 is directly fixed to the vehicle body floor without the rail apparatuses 4.

Alternatively, the not-shown support bracket (the support member) fixed onto the vehicle body floor may be employed instead of the support base 30.

In the above-described embodiment, as illustrated in FIGS. 2 and 5, the lock member 70 is attached to the seat cushion 2 side, and the lock target member 71 is attached to the seat back 1 side. However, the present invention is not limited to such a configuration. The lock member 70 may be attached to the seat back 1 side, and the lock target member 71 may be attached to the seat cushion 2 side.

In the above-described embodiment, the position holding member 74 holds the lock position of the lock target member 71 in the seatable state as illustrated in FIG. 12A, but the present invention is not limited to such a configuration. Instead, it may be configured such that the position holding member 74 holds the lock position of the lock member 70. Alternatively, it may be configured such that the position holding member 74 holds the lock positions of both of the lock member 70 and the lock target member 71.

In the above-described embodiments, it is configured such that the position holding member 74 (the contact portion 74a) contacts the lock target member 71 (the contact protrusion 71b) as illustrated in FIG. 12A, but a well-known coating agent may be applied to a contact surface of the contact portion 74a or a rubber member may be additionally attached to such a contact surface.

In this case, the coating agent is also preferably applied to a contact surface of the push-out portion 74b of the position holding member 74 contacting the lock member 70 (the fitting protrusion 70b) or a contact surface of a portion, which contacts the first unlock lever 72 (the contact portion 72a), of the position holding member 74.

In the above-described embodiments, the reinforcement wire 29 is arranged at the position above the ottoman rotary shaft 171 as illustrated in FIG. 22, but the present invention is not limited to such a configuration. The reinforcement wire 29 may be arranged at a position below the ottoman rotary shaft 171.

In the above-described embodiments, the cover portions 263, 283 are formed as resin covers as illustrated in FIGS. 29 and 31, but the present invention is not limited to such a configuration. Instead of the resin cover, a coating agent such as a resin material may be applied or sprayed to a target location, for example.

Figure 30:
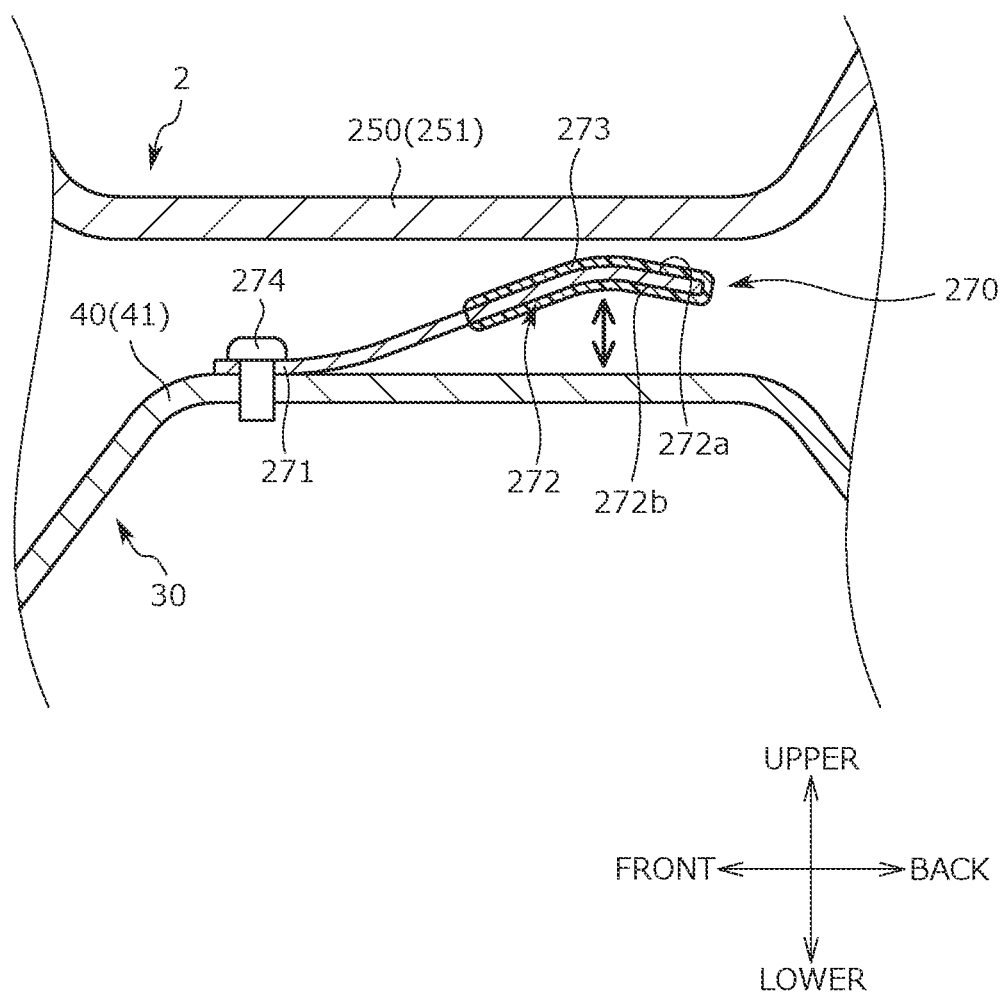
FIG. 30 is a C-C sectional view of FIG. 26 illustrating a clearance filling member of a first variation.

As illustrated in FIG. 30, the cover portion 273 is formed by coating a surface of the target location with the resin material. Instead of the surface coating, e.g., a resin cover may be attached.

In the above-described embodiments, the protruding shaft 281 is, as illustrated in FIG. 31, the stepped bolt attached to the seat cushion 2 such that the length of protrusion from the seat cushion 2 to the base cover 40 is changeable, but the present invention is not limited to such a configuration. Instead of the stepped bolt, e.g., a well-known protruding pin may be employed.

In the above-described embodiments, the rail lock member 363 of the rail apparatus 360 is attached onto the support base 30 in the conveyance seat S5 as illustrated in FIG. 34, but the present invention is not limited to such a configuration. The rail lock member 363 may be attached to an optional position of the conveyance seat S5.

Note that the rail lock member 363 is preferably arranged at a position (a position adjacent to) close to the upper rail 362 (the lower rail 361).

In the above-described embodiments, the rail operating lever 364 is rotatably attached to the base cover 380 (the back cover 380*b*) through the lever rotary shaft 365 as illustrated in FIGS. 35 and 36, but the present invention is not limited to such a configuration. Changes can be made to the rail operating lever 364.

That is, the rail operating lever 364 may be arranged at a position on the seat back side with respect to the seat back 1 in the conveyance seat S5, and may be attached to the periphery of the lower end portion of the seat back 1.

The rail operating lever 364 is rotatably attached to the base cover 380, but the present invention is not limited to such a configuration, but the present invention is not limited to such a configuration. The rail operating lever 364 may be attached movably in the upper-to-lower direction, the seat front-to-back direction, or the seat width direction.

In the above-described embodiments, the lever operating portion 364*b* is arranged at the position on the seat front position with respect to the lever operation support portion 385 as illustrated in FIG. 39, but the present invention is not limited to such a configuration. Changes can be made to the lever operating portion 364*b*.

For example, the lever operating portion 364*b* may be arranged at a position on the seat back side with respect to the lever operation support portion 385, and the lever rotary shaft 365 may be sandwiched between the lever operating portion 364*b* and the lever operation support portion 385 in the front-to-back direction.

Alternatively, for example, the lever operating portion 364*b* may be arranged at a position above the lever operation support portion 385, and the lever rotary shaft 365 may be sandwiched between the lever operating portion 364*b* and the lever operation support portion 385 in the upper-to-lower direction.

Alternatively, for example, the lever operating portion 364*b* may be arranged at a position on the left side with respect to the lever operation support portion 385 in the seat width direction, and the lever rotary shaft 365 may be sandwiched between the lever operating portion 364*b* and the lever operation support portion 385 in the seat width direction.

In the above-described embodiments, the top portion 441*b* raised from the side wall of the first base bracket 441 and the top portion 442*b* raised from the side wall of the second base bracket 442 are arranged at the substantially same position in the front-to-back direction as illustrated in FIG. 49. However, as illustrated in FIG. 56, it may be configured such that the top portion 441*b* of the first base bracket 441 is arranged on the front side with respect to the top portion 442*b* of the second base bracket 442 in the front-to-back direction. In FIG. 56, a dashed line indicates the axis of rotation of the first coupling link 411*a* and the axis of rotation of the second coupling link 411*b*, and a chain line indicates the axis of rotation of the first coupling link 411*a* and the axis of rotation of the second coupling link 411*b*.

The top portion 441*b* of the first base bracket 441 supports the first coupling link 411*a* on the side on which the reclining apparatus 413 is arranged, and the top portion 442*b* of the second base bracket 442 supports the second coupling link 411*b* on the side on which the reclining apparatus 413 is not arranged.

Thus, support stiffness of the second coupling link 411*b* of the coupling link 411 on the side on which the reclining apparatus 413 is not arranged is weaker than support stiffness of the first coupling link 411*a* on the side on which the reclining apparatus 413 is arranged. Thus, as illustrated in FIG. 56, the top portion 442*b* of the second base bracket 442 is arranged on the front side with respect to the top portion 441*b* of the first base bracket 441. Thus, a distance L2 from the rotation axis of the second coupling link 411*b* on the side on which the reclining apparatus 413 is not arranged to the top portion 442*b* of the second base bracket 442 can be longer (more separated) than a distance L1 from the rotation axis of the first coupling link 411*a* on the side on which the reclining apparatus 413 is arranged to the top portion 441*b* of the first base bracket 441 (in the seat front-to-back direction, the distance L2>the distance L1).

According to the conveyance seat of the variations, the seat cushion 402 can be efficiently supported on the top portion 442*b* of the second base bracket 442 with lower support stiffness while the space in the vicinity of the top portion 441*b* of the first base bracket 441 on the side on which the reclining apparatus 413 is arranged can be ensured.

The conveyance seat according to the above-described variations includes the following configuration.

The conveyance seat includes the seat body having the seat back 401 and the seat cushion 402 and a first support portion (the top portion 441*b* of the first base bracket 441) and a second support portion (the top portion 442*b* of the second base bracket 442) supporting the seat cushion 402 from below. The first support portion 441*b* and the second support portion 442*b* are provided separately in the width direction of the conveyance seat. The seat back 401 is supported tiltably with respect to the vehicle body floor by the first coupling link 411*a* coupled to the first support portion 441*b* and the second coupling link 411*b* coupled to the second support portion 442*b*. The reclining apparatus 413 turnably supporting the seat back 401 is attached to the first coupling link 411*a*. In the front-to-back direction of the conveyance seat, the distance L2 from the rotation axis of the second coupling link 411*b* to a contact portion between the second support portion 442*b* and the seat cushion 402 is longer than the distance L1 from the rotation axis of the first coupling link 411*a* to a contact portion between the first support portion 441*b* and the seat cushion 402.

Figure 57:
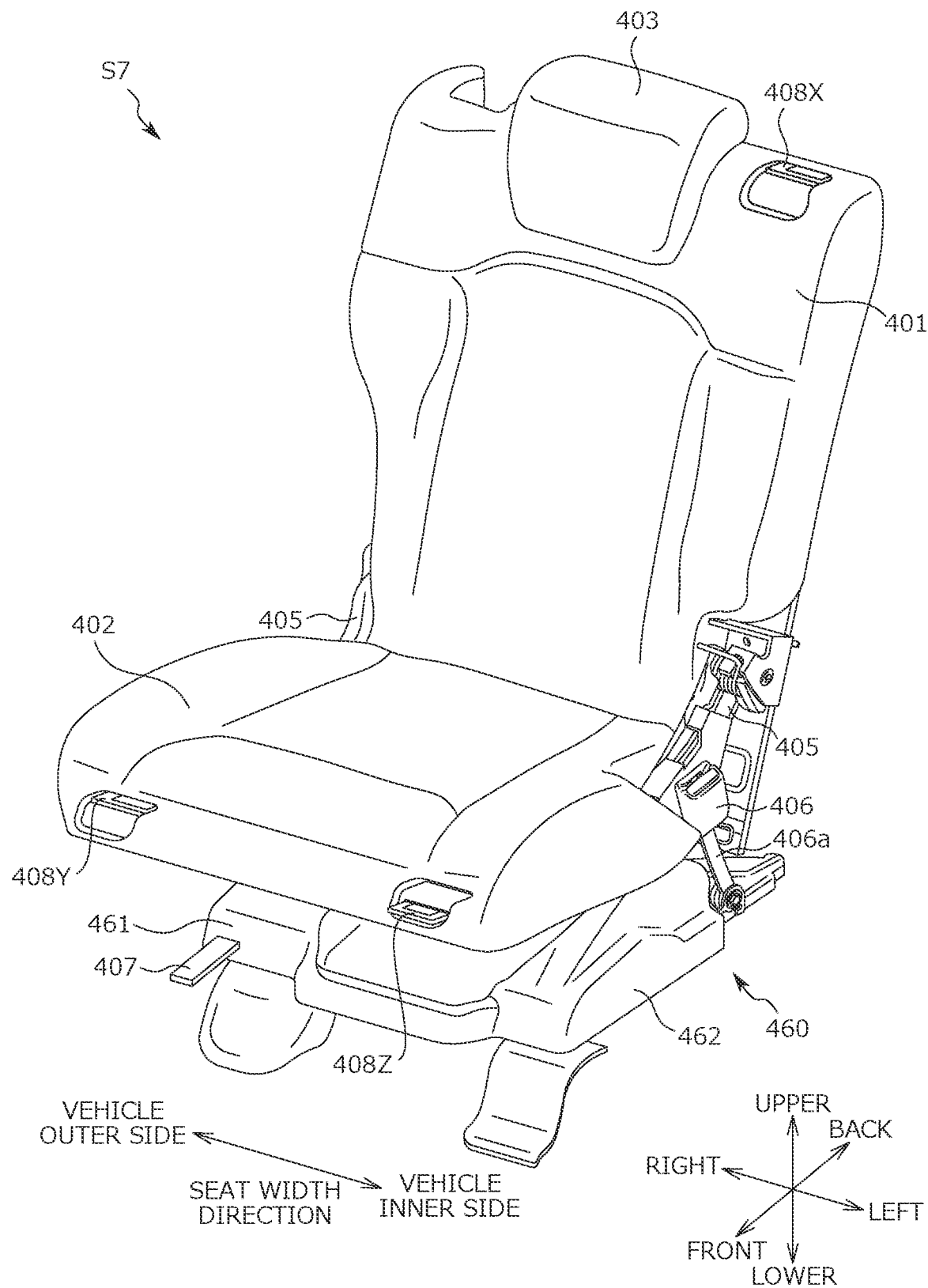
FIG. 57 is a perspective view of a conveyance seat according to a variation.

Arrangement of various operating levers is not limited to those described in the above-described embodiments, and arrangement can be made at a position illustrated in FIG. 57. In an example illustrated in FIG. 57, a reclining operating lever 408X for tilting the seat cushion 402 is provided at a shoulder of the seat back 401 on the vehicle inner side. A tip-up operating lever 408Y for tipping up (tip-up) the seat cushion 402 is provided in the vicinity of the lower surface of the seat cushion 402 on the vehicle outer side. A slide rail operating lever 408Z for slidably moving the seat body in the front-to-back direction is provided in the vicinity of the lower surface of the seat cushion 402 on the vehicle inner side. Each operating lever is connected to a not-shown cable.

By operation of various operating levers, the corresponding cables are pulled for unlocking, and therefore, tilting (reclining) of the seat cushion 402, tipping up (tip-up) of the seat cushion 402, and slide of the seat body are allowed.

The direction of operating various operating levers (in other words, an unlocking direction) is, for the reclining operating lever 408X and the tip-up operating lever 408Y, the direction of lifting the lever to an upper back side. For the slide rail operating lever 408Z, such an operating direction is the direction of pressing down the lever.

Figure 58:
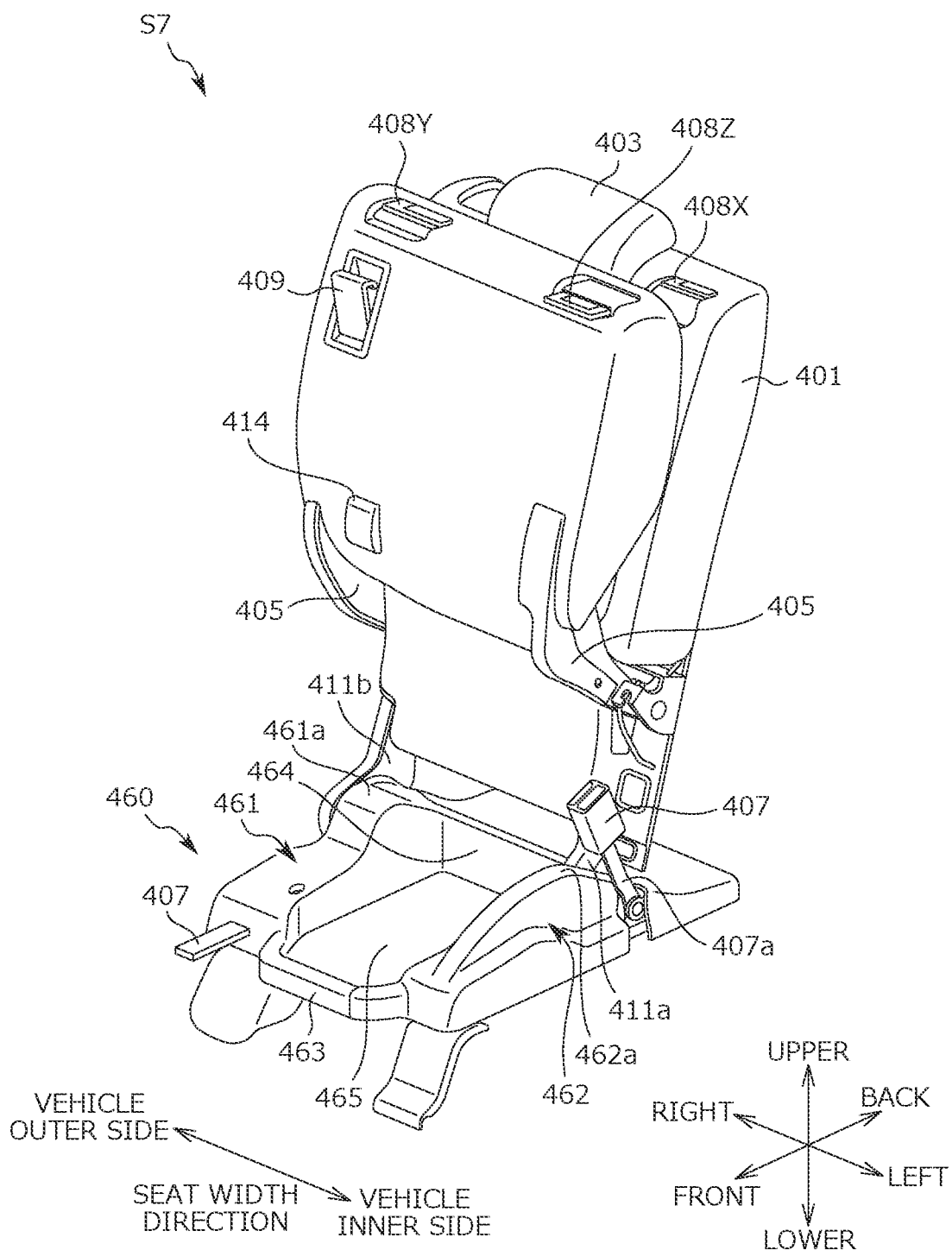
FIG. 58 is a perspective view when a seat state of a conveyance seat according to a variation is a tip-up state.

As illustrated in FIG. 58, a convenience hook 409 can be provided at the lower surface of the seat cushion 402. With the convenience hook 409 at the lower surface of the seat cushion 402, when a luggage in a bag is placed on the luggage housing recessed portion 465 in the tip-up state, a bag handle can be hooked on the convenience hook 409. The bag handle is hooked on the convenience hook 409, and therefore, the bag in which the luggage is placed can be hung.

Figure 59:
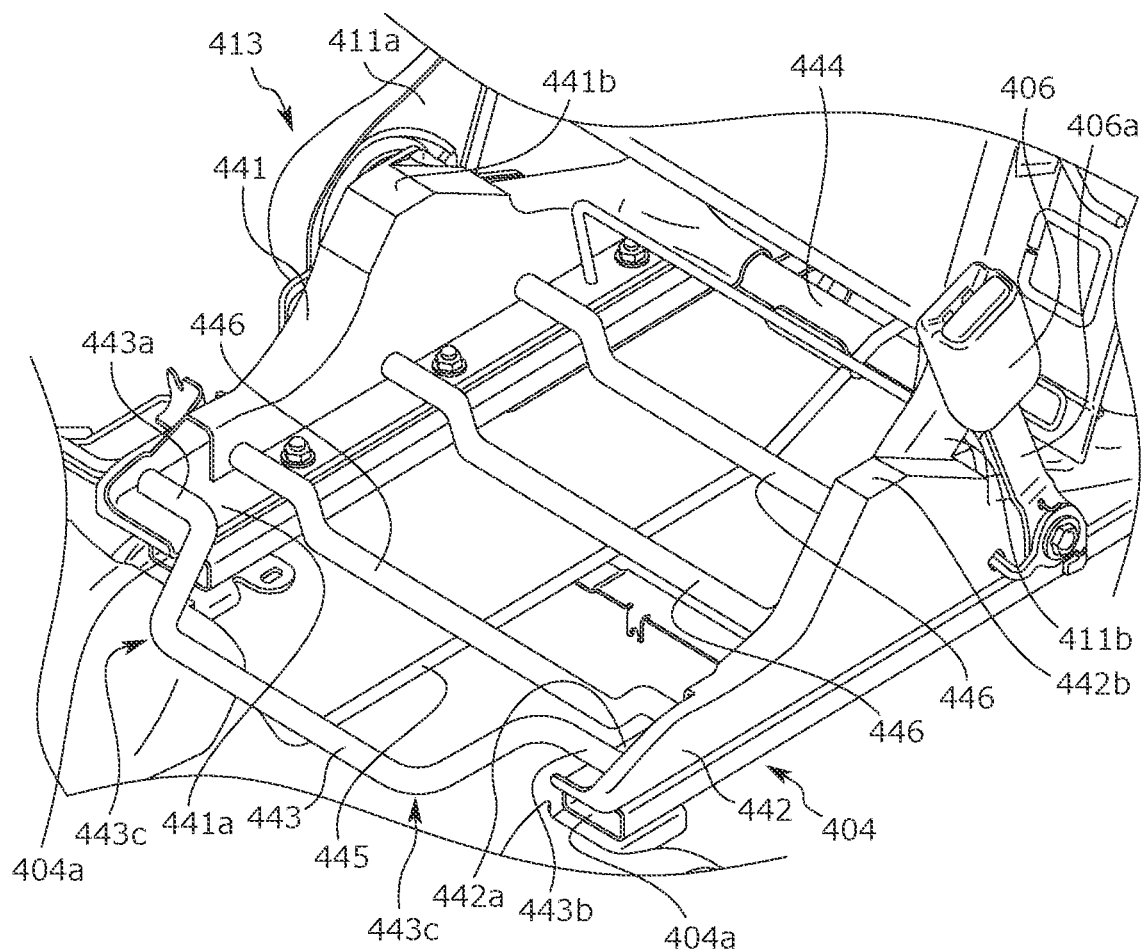
FIG. 59 is a view illustrating a lower portion of a seat frame and peripheral equipment thereof according to a variation.
Figure 60:
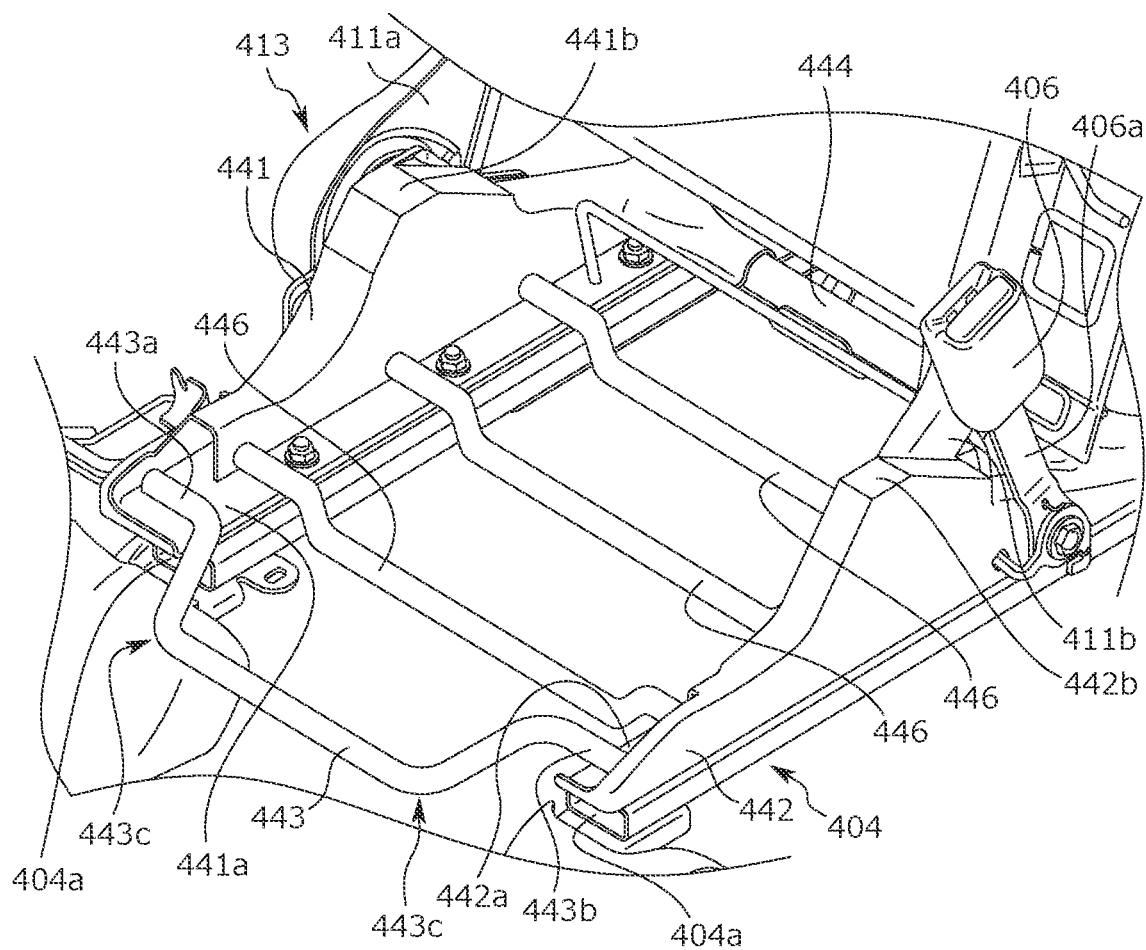
FIG. 60 is a view illustrating a lower portion of a seat frame and peripheral equipment thereof according to a variation.

In the above-described embodiments, the example where the front coupling member 443 extending in the seat width direction couples the pair of slide rails and the front coupling member 443 and the back coupling member 444 are coupled to each other by the back coupling member 445 extending in the seat front-to-back direction as illustrated in FIG. 49 has been described. However, as illustrated in FIG. 59, the first base bracket 441 and the second base bracket 442 can be coupled to each other by multiple back coupling members 446 extending in the seat width direction. As illustrated in FIG. 60, it may be configured such that the back coupling members 446 extending in the seat width direction are provided without the back coupling member 445 extending in the seat front-to-back direction. As illustrated in FIG. 61, the front coupling member 443 and the back coupling member 444 can be connected to each other by multiple back coupling members 447 extending in the seat front-to-back direction in addition to the back coupling member 445 extending in the seat front-to-back direction. As described above, the back coupling members 445, 446, 447 are, as necessary, arranged in the seat width direction and/or the seat front-to-back direction, and therefore, support stiffness of the luggage housing recessed portion 465 and support stiffness of the support base 440 can be set to desired stiffness.

Figure 62:
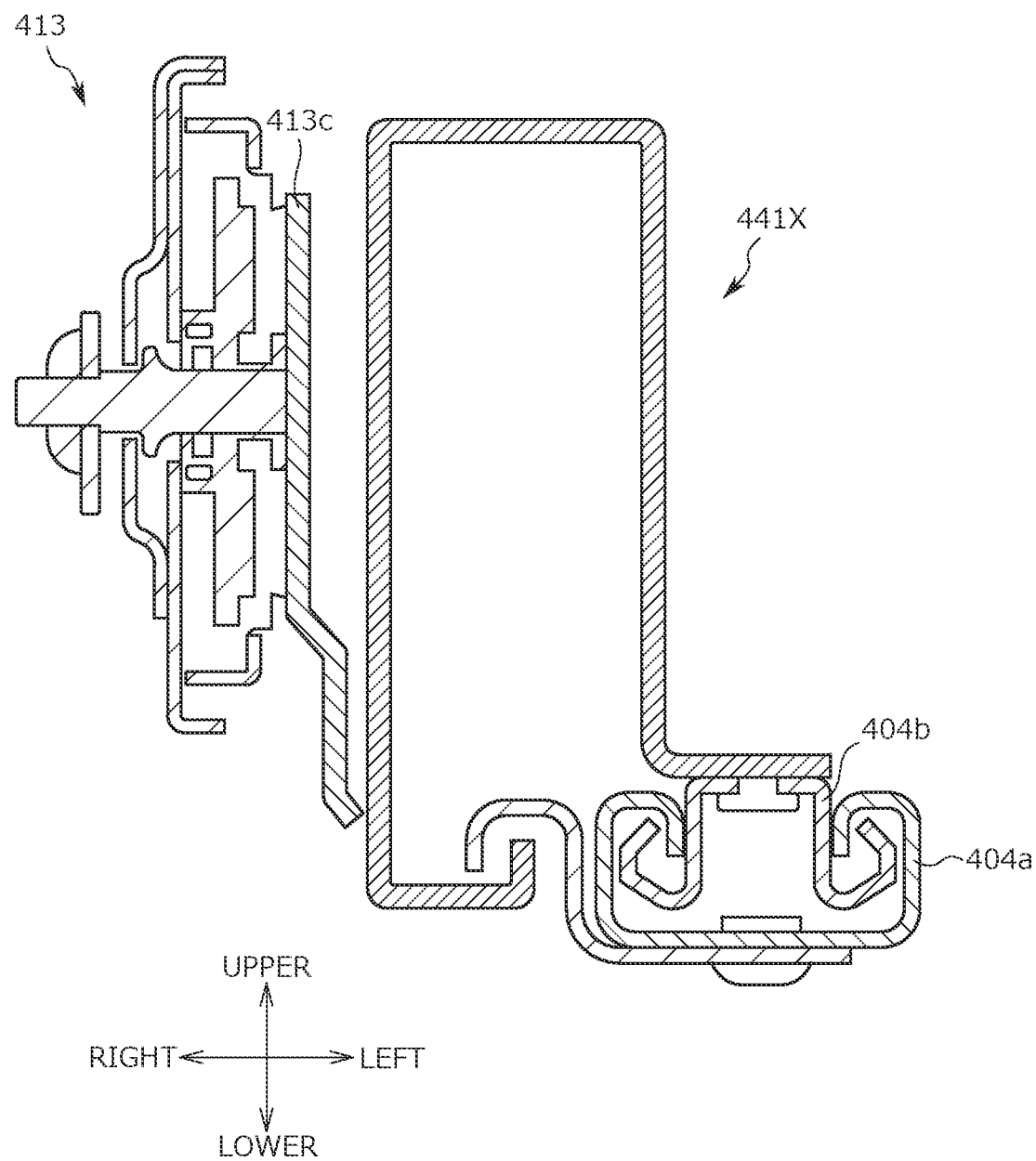
FIG. 62 is a view for describing an attachment structure of a reclining apparatus according to a variation.

In the above-described embodiments, the reclining apparatus 413 is attached to the side surface of the first base bracket 441 on the vehicle outer side by means of two plate members 413a, 413b as illustrated in FIG. 50. However, as illustrated in FIG. 62, only a single plate member 413c can be used as a plate member for attaching the reclining apparatus 413 to a first base bracket 441X. In an example illustrated in FIG. 62, the shape of the first base bracket 441X is changed to expand outwardly in the seat width direction for component sharing, and therefore, the number of components is reduced.

Figure 63:
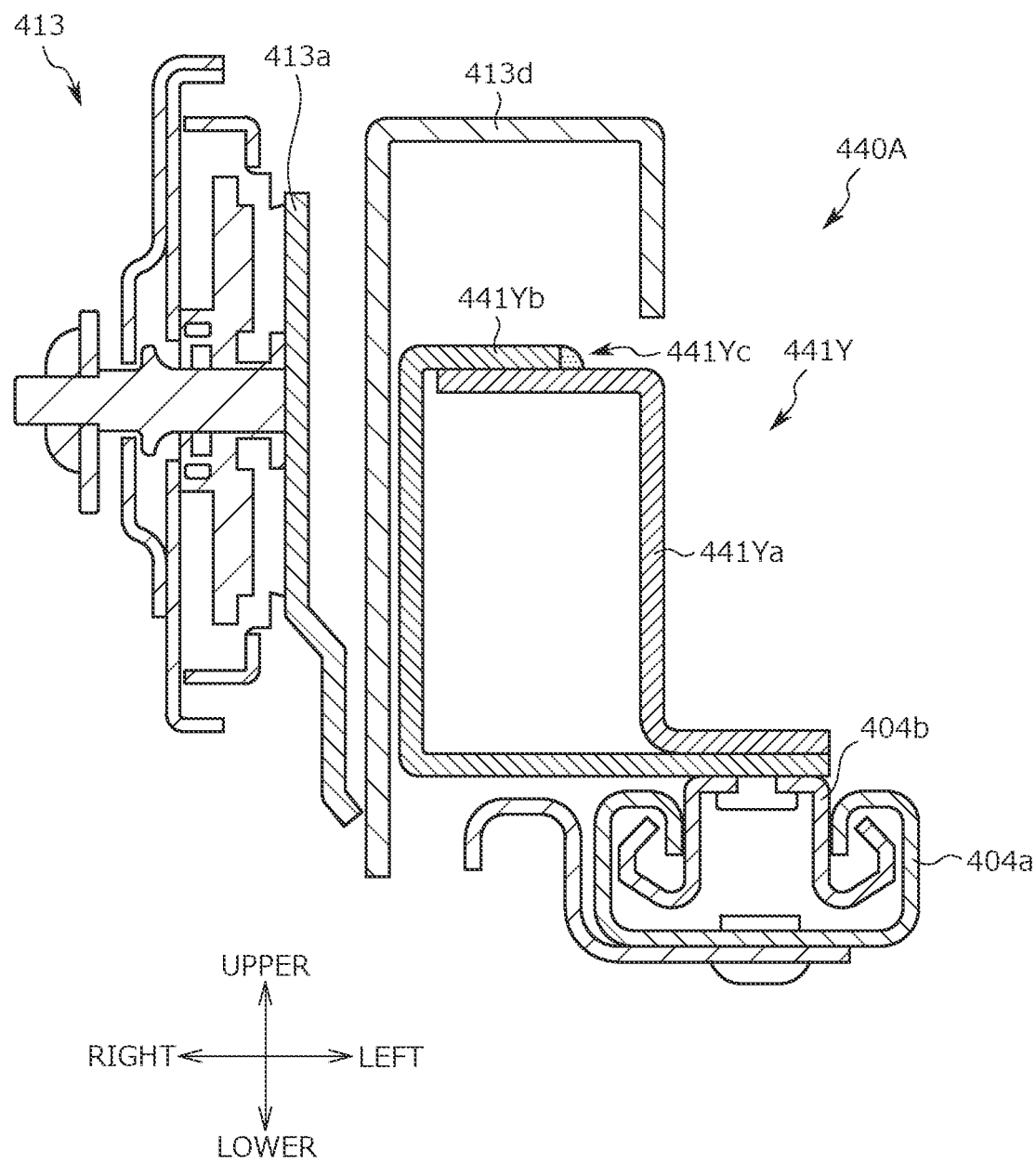
FIG. 63 is a view for describing an attachment structure of a reclining apparatus according to a variation.

In the above-described embodiments, the reclining apparatus 413 is attached to the side surface of the first base bracket 441 on the vehicle outer side by means of two plate members 413a, 413b as illustrated in FIG. 50. Using a plate member 413d as illustrated in FIG. 63 the plate member 413d may fulfill a role as the plate member 413b and the first base bracket 441 illustrated in FIG. 50. In an example illustrated in FIG. 63 a first base bracket 441Y includes the plate member 413d and two bracket members 441Ya, 441Yb. Specifically, two bracket members 441Ya, 441Yb are welded as indicated by a welding mark 441Yc, and the plate member 413d is attached to the outside of the bracket member 441Yb in the seat width direction.

In the above-described embodiments, the first end portion 511 of the torsion spring 510 is hooked on and fixed (locked) to the back surface adjustment groove 522a of the back surface 522 of the back turning bracket 520 as illustrated in FIG. 65. However, the first end portion 511 of the torsion spring 510 can be locked at other locations of the conveyance seat S, such as the seat back 401. For example, the first end portion 511 of the torsion spring 510 may be locked and fixed to the seat back frame 410 of the seat back 401.

In the above-described embodiments, the housable conveyance seat used for an automobile has been described as a specific example, but the present invention is not limited to such a seat. The conveyance seat can be utilized not only as conveyance seats for a train, a bus, etc., but also as conveyance seats for an airplane, a ship, etc.

In the present embodiments, the conveyance seat according to the present invention has been mainly described.

Note that the above-described embodiments are merely examples for the sake of easy understanding of the present invention, and are not intended to limit the present invention. Changes and modifications can be made to the present invention without departing from the gist of the present invention, and needless to say, the present invention includes equivalents thereof.

REFERENCE SIGNS LIST

U: conveyance seat unit
S, S2, S3, S4, S5, S6, S7: conveyance seat
1: seat back
   1a, 2a: cushion pad
   1b, 2b: skin
   1c: skin projecting portion
2: seat cushion
   2c: storage recessed portion
3: headrest
4: rail apparatus
   4a: lower rail
   4b: upper rail
   4c: rail operating lever
5: armrest
6: buckle (belt buckle)
10, 10A: back frame
11: coupling bracket
20: cushion frame
21: side frame
   21a: frame side wall portion
   21b: frame upper wall portion
   21c: frame bottom wall portion
22: front coupling pipe (front frame)
   22a: frame side portion
   22b: frame center portion
23: center coupling pipe (back frame)
24: pan frame
25: attachment wire
   25a: wire body portion
   25b, 25c: wire attachment portion
26: base contact member
   26a: frame attachment portion
   26b: base contact portion
27: lever attachment bracket
   27a: upper plate portion (plate portion)
   27b: lower plate portion
   27c: coupling wire portion
      27ca: first extending portion 27cb: second extending portion
27cc: third extending portion
27d: lever attachment portion
28: floor contact member
29: reinforcement wire (reinforcement member)
  29a: first reinforcement wire
  29b: second reinforcement wire
30: support base (support member)
31: side base portion
32: first base coupling portion (front base coupling portion)
33: second base coupling portion (back base coupling portion)
34: reinforcement base portion
40: base cover
41: cover protruding portion
42: cover housing recessed portion
50: reclining apparatus
51: reclining body
52: back rotary shaft
53: spiral spring
54: reclining operating lever (first reclining operating lever)
55: second reclining operating lever
56: reclining cable (first reclining cable)
57: second reclining cable
60: cushion lock apparatus (seat switching apparatus)
61: lock body (cushion lock body)
62: cushion rotary shaft
63: spiral spring
64: cushion operating lever (switching operating lever)
65: first cushion cable
66: second cushion cable
70: lock member
  70a: engagement portion
  70b: fitting protrusion
71: lock target member
  71a, 71d: engagement target portion
  71b: contact protrusion (contact target portion)
  71c: auxiliary protrusion
72: first unlock lever
  72a: contact portion
  72b: cable attachment portion
  72c: pressing portion
73: second unlock lever
  73a: cable attachment portion
  73b: fitting groove
74: position holding member
  74a: contact portion
  74b: push-out portion
75: lock rotary shaft
76: lever rotary shaft
77: first biasing spring
78: second biasing spring
79: third biasing spring (biasing member)
80: shaft coupling member
  80a: first shaft support portion
  80b: second shaft support portion
  80c: cutout portion
90: ottoman apparatus
91: ottoman rotary shaft
  91a: ottoman pad
  91b: skin material
  91c: attachment hole
92: leg support member
  92a: support-side end portion
  92b: deploy-side end portion
170: ottoman apparatus
171: ottoman rotary shaft
  171a: ottoman pad
  171b: skin material
  171c: attachment hole
172: ottoman pillar
173: pillar support member
174: pillar guide
  174a: front end flange
  174b: back end flange
175: ottoman lock member
176: ottoman operating lever
180: leg support member
  180a: back leg support portion
  180b: front leg support portion
181: leg support frame
  181a: leg coupling frame portion
  181b: auxiliary leg coupling frame portion
182: leg support pad
183: skin material
240: operation damper
250: cushion cover
251: cushion contact portion
260, 270, 280: clearance filling member
261: elastic portion
  261a: through-hole
262: coupling portion
263: cover portion
264: coupling bolt
271: spring attachment portion
272: spring contact portion
  272a, 272b: contact surface
273: cover portion
274: coupling bolt
281: protruding shaft
  281a: flange
282: elastic spring
283: cover portion
284: coupling nut
285: slide bearing
360: rail apparatus
361: lower rail
362: upper rail
363: rail lock member
  363a: lock body
  363b: rotary shaft
  363c: turning lever
364, 364A: rail operating lever
  364a: lever body portion
  364b: lever operating portion
  364c: lever bottom wall portion
  364d: lever side wall portion
  364e: lever movement restriction portion
  364f: cable attachment portion
365: lever rotary shaft
366: rail cable
  366a: one end portion
  366b: folded-back portion
  366c: other end portion
367: attachment bracket
370, 370A: anchor member
380: base cover
  380a: front cover
  380b: back cover
381: cover protruding portion
382: cover housing recessed portion
383: lever housing portion
  383a: bottom wall portion
  383b: shaft support portion

383c: movement restriction portion
383d: bent portion
384: anchor housing portion
385: lever operation support portion
386: partition wall portion
390: floor board
391: folding line portion
392: lever exposing portion
393: anchor exposing portion
401: seat back
402: seat cushion
    402a: slit
403: headrest
404: slide rail mechanism (a pair of slide rails) (support member)
    404a: lower rail
    404b: upper rail
405: coupling member
406: buckle
    406a: support bracket
407: operation strap
408X: reclining operating lever
408Y: tip-up operating lever
408Z: slide rail operating lever
409: convenience hook
410: seat back frame
411: coupling link
    411a: first coupling link
    411b: second coupling link
413: reclining apparatus
    413a, 413b, 413c, 413d: plate member
414: receiving portion
    414a: body portion
    414b: cover member
415a, 415b, 415c: pipe member
420: seat cushion frame
425: cushion lock apparatus (lock apparatus)
426: damper
427: cable
428: lock piece
429: engagement member
    429a: first engagement hole
    429b: second engagement hole
440: support base (support member)
    440A: first base member (base member)
    440B: second base member (base member)
441, 441X, 441Y: first base bracket
    441a: flange
    441b: top portion (first support portion)
    441c: closed sectional portion
441Ya, 441Yb: bracket member
441Yc: welding mark
442: second base bracket
    442a: flange
    442b: top portion (second support portion)
    442c: closed sectional portion
443: front coupling member (first coupling member) (support member)
    443a: first end portion
    443b: second end portion
    443c: bent portion (reinforcement portion)
444: back coupling member (second coupling member)
445, 446, 447: connection member
460: base cover (housing portion)
    460a: front base cover
    460b: back base cover
461: first raised portion
    461a: top portion
462: second raised portion
    462a: top portion
463: front protruding portion
    463a: space
464: back protruding portion
465: luggage housing recessed portion
466a: engagement recessed portion
466b: engagement raised portion
500: biasing apparatus, biasing force reduction apparatus
510: torsion spring (biasing member)
    511: first end portion
    512: second end portion
520: back turning bracket (first bracket)
    521: side surface
        521a: opening
    522: back surface
        522a: back surface adjustment groove
    523: upper surface
    524: lock piece
    525: biasing force adjustment groove (groove portion)
        525a: inlet portion
        525b: inclined portion
        525c: restriction portion
530: cushion turning bracket (second bracket)
    531: side surface
        531a: opening
    532: spring support portion (biasing member support portion)
        532a: inner wall
    533: attachment portion
540: shaft
541: tubular member (collar)
542, 543: bush
C: clearance
T1, T2: thickness
F: housing floor
W1, W2: width

The invention claimed is:

1. A conveyance seat comprising:
a seat body including a seat back and a seat cushion; and
a cushion lock apparatus turnably coupling the seat cushion to the seat back and locking turning motion of the seat cushion when the seat body is in a seatable state in which an occupant is able to be seated,
wherein the conveyance seat is switchable between the seatable state and a movement state in which the seat body is moved from the seatable state,
the cushion lock apparatus includes
a lock member attached to one of the seat cushion or the seat back,
a lock target member attached to the other one of the seat cushion or the seat back and engaging with the lock member to lock the turning motion of the seat cushion, and
a position holding member pivotally attached to one of the seat cushion or the seat back and attached to peripheries of the lock member and the lock target member and holding at least one of positions of the lock member and the lock target member to hold a state in which an engagement portion provided at the lock member and an engagement target portion provided at the lock target member are engaged and in which a clearance is formed between the engagement portion and the engagement target portion when the seat body is in the seatable state, and in the state in which the engagement portion and the engagement target portion are engaged and in which the clearance is formed between the engagement portion and the engagement target portion, the position holding member holds a state in which the lock member and the lock target member are not in contact with each other.

2. The conveyance seat according to claim 1, wherein the movement state is a housing state in which the seat body is moved to and housed in a housing floor positioned lower than a vehicle body floor,
the conveyance seat further includes
a reclining apparatus turnably coupling the seat back to the vehicle body floor and locking turning motion of the seat back in the seatable state, and
a support base provided on the vehicle body floor and supporting the seat cushion from below, and
the lock member is attached to a seat cushion side, and the lock target member is attached to a seat back side.

3. The conveyance seat according to claim 1, wherein a contact portion contacting a contact target portion provided at one of the lock member or the lock target member to hold the one of the positions is formed at the position holding member, and
the cushion lock apparatus further includes a biasing member attached to the position holding member and biasing the position holding member in a direction of causing the contact portion to contact the contact target portion.

4. The conveyance seat according to claim 3, further comprising:
a cushion frame as a framework of the seat cushion,
wherein the lock member and the position holding member are arranged next to each other in a seat width direction, and in the seat width direction, are turnably coupled to a side surface of the cushion frame through a lock rotary shaft.

5. The conveyance seat according to claim 4, wherein the seat cushion is turnably coupled to the seat back through a cushion rotary shaft,
the lock rotary shaft and the cushion rotary shaft are arranged at positions different from each other on the side surface of the cushion frame, and
the cushion lock apparatus further includes a shaft coupling member extending along the side surface of the cushion frame to couple the lock rotary shaft and the cushion rotary shaft to each other.

6. The conveyance seat according to claim 5, wherein the shaft coupling member includes a first shaft support portion supporting the cushion rotary shaft, a second shaft support portion supporting the lock rotary shaft, and a cutout portion cut out at a portion closer to a first shaft support portion side than to the second shaft support portion.

7. The conveyance seat according to claim 5, wherein the lock target member is, in the seat width direction, turnably coupled to the side surface of the cushion frame through the cushion rotary shaft,
the lock member and the lock target member are arranged at an identical position in the seat width direction, and
the contact portion of the position holding member contacts a contact protrusion as the contact target portion protruding from a side surface of the lock target member to a position holding member side in the seat width direction.

8. The conveyance seat according to claim 1, further comprising:
a housing portion provided below the seat cushion and capable of housing an article;
a pair of base members supporting the seat body; and
a coupling member coupling the pair of base members,
wherein the housing portion is supported by the coupling member, and
the coupling member includes a reinforcement portion between one end portion and the other end portion of the coupling member.

9. The conveyance seat according to claim 8, wherein the reinforcement portion is a bent portion bent to protrude to a front side of the conveyance seat.

10. The conveyance seat according to claim 9, wherein the housing portion is formed with a protruding portion upwardly protruding from a portion supported by the coupling member and having a space inside, and
the bent portion of the coupling member supports the housing portion in the space.

11. The conveyance seat according to claim 1, wherein the cushion lock apparatus
has a first unlock lever and a second unlock lever attached to the periphery of the lock member and moving between a lock position and an unlock position to cancel a lock state between the lock member and the lock target member,
cancels, in the seatable state, the lock state when the first unlock lever or the second unlock lever is moved from the lock position to the unlock position, and
does not cancel, in the movement state, the lock state when the first unlock lever is moved from the lock position to the unlock position and cancels the lock state when the second unlock lever is moved from the lock position to the unlock position, and
the first unlock lever and the second unlock lever are arranged at positions different from each other in an upper-to-lower direction or a seat front-to-back direction, and are provided to sandwich the lock member.

12. The conveyance seat according to claim 11, wherein the movement state is a tip-up state in which the seat cushion is rotatably upwardly moved relative to the seat back,
the conveyance seat is switchable among the seatable state, the tip-up state, and a housing state in which the seat body is moved to and housed in a vehicle body floor side,
the conveyance seat further includes a reclining apparatus turnably coupling the seat back to the vehicle body floor and locking turning motion of the seat back in the seatable state,
the reclining apparatus includes
a reclining operating lever attached to an upper portion of the seat back and operated for unlocking the seat back and
a reclining cable coupling the reclining operating lever and a body portion of the reclining apparatus and drawn by operation of reclining operating lever to act to switch the seat back from a lock state to an unlock state,
the cushion lock apparatus includes
a first cushion cable coupling the reclining operating lever and the first unlock lever and drawn by operation of the reclining operating lever to switch the first unlock lever from a lock position to an unlock position,
a cushion operating lever attached to the seat cushion and operated for unlocking the seat cushion, and a second cushion cable coupling the cushion operating lever and the second unlock lever and drawn by operation of the cushion operating lever to switch the second unlock lever from a lock position to an unlock position, and the first unlock lever is arranged at a position above the second unlock lever.

13. The conveyance seat according to claim 1, further comprising:
a seat switching apparatus including a switching operating lever operated for switching the seat body between the seatable state and the movement state and operated in association with operation of the switching operating lever; and
an ottoman apparatus including a leg support member turnably attached to a front portion of the seat cushion through an ottoman rotary shaft and provided for supporting legs of the seated occupant from below and capable of turning the leg support member between a storage position at which the leg support member is stored on a seat cushion side and a deploy position at which the leg support member is rotatably moved to a seat front side with respect to the storage position,
wherein the switching operating lever is attached to the front portion of the seat cushion, and
the switching operating lever and the ottoman rotary shaft are arranged next to each other in a seat width direction.

14. The conveyance seat according to claim 1, the conveyance seat being capable of switching the seat body between a normal state and a slide movement state in which the seat body is moved from the normal state, further comprising:
a rail lock member attached to of the conveyance seat at a predetermined position, and locking movement of the seat body in the normal state; and
a rail operating lever arranged at a position on a seat back side with respect to the seat back in the conveyance seat, attached to a periphery of a lower end portion of the seat back through a lever rotary shaft, and rotatably operated for unlocking the rail lock member,
wherein the lever rotary shaft is arranged between a lever operating portion as a portion of the rail operating lever on which an occupant's finger is hooked and a lever operation support portion as a portion which is provided at a periphery of the rail operating lever, which is different from the lever operating portion, and on which the occupant's finger is hooked.

15. A conveyance seat comprising:
a seat body including a seat back and a seat cushion; and
a cushion lock apparatus turnably coupling the seat cushion to the seat back and locking turning motion of the seat cushion when the seat body is in a seatable state in which an occupant is able to be seated,
wherein the conveyance seat is switchable between the seatable state and a movement state in which the seat body is moved from the seatable state,
the cushion lock apparatus includes
a lock member attached to one of the seat cushion or the seat back,
a lock target member attached to the other one of the seat cushion or the seat back and engaging with the lock member to lock the turning motion of the seat cushion, and
a position holding member pivotally attached to one of the seat cushion or the seat back and attached to peripheries of the lock member and the lock target member and holding at least one of positions of the lock member and the lock target member to hold a state in which a clearance is, in the seatable state, formed between an engagement portion provided at the lock member and an engagement target portion provided at the lock target member,
wherein a contact portion contacting a contact target portion provided at one of the lock member or the lock target member to hold the one of the positions is formed at the position holding member,
the cushion lock apparatus further includes a biasing member attached to the position holding member and biasing the position holding member in a direction of causing the contact portion to contact the contact target portion,
wherein the position holding member is biased by the biasing member, and is movable between a holding position as a position at which the contact portion contacts the contact target portion and a release position as a position at which the contact portion does not contact the contact target portion, and
when the position holding member is moved, in response to a load from an outside in the seatable state, from the holding position to a release position against biasing force of the biasing member, the engagement portion of the lock member and the engagement target portion of the lock target member engage with each other.

16. The conveyance seat according to claim 15, further comprising:
a cushion frame as a framework of the seat cushion,
wherein the lock member and the position holding member are arranged next to each other in a seat width direction, and in the seat width direction, are turnably coupled to a side surface of the cushion frame through a lock rotary shaft.

17. The conveyance seat according to claim 16, wherein the seat cushion is turnably coupled to the seat back through a cushion rotary shaft,
the lock rotary shaft and the cushion rotary shaft are arranged at positions different from each other on the side surface of the cushion frame, and
the cushion lock apparatus further includes a shaft coupling member extending along the side surface of the cushion frame to couple the lock rotary shaft and the cushion rotary shaft to each other.

18. The conveyance seat according to claim 17, wherein the shaft coupling member includes a first shaft support portion supporting the cushion rotary shaft, a second shaft support portion supporting the lock rotary shaft, and a cutout portion cut out at a portion closer to a first shaft support portion side than to the second shaft support portion.

19. The conveyance seat according to claim 17, wherein the lock target member is, in the seat width direction, turnably coupled to the side surface of the cushion frame through the cushion rotary shaft,
the lock member and the lock target member are arranged at an identical position in the seat width direction, and
the contact portion of the position holding member contacts a contact protrusion as the contact target portion protruding from a side surface of the lock target member to a position holding member side in the seat width direction.

20. A method of assembling a conveyance seat that has a seat body including a seat back and a seat cushion, and a cushion lock apparatus turnably coupling the seat cushion to the seat back and locking turning motion of the seat cushion when the seat body is in a seatable state in which an occupant is able to be seated, wherein the conveyance seat is switchable between the seatable state and a movement state in which the seat body is moved from the seatable state, the method comprising:
- preparing the seat body, and
- assembling the cushion lock apparatus to the seat body,
- wherein the assembling the cushion lock apparatus to the seat body comprises:
  - attaching a lock member to one of the seat cushion or the seat back,
  - attaching a lock target member to the other one of the seat cushion or the seat back, and engaging the lock target member and the lock member to lock the turning motion of the seat cushion,
  - pivotally attaching a position holding member to one of the seat cushion or the seat back and attaching position holding member to peripheries of the lock member and the lock target member for holding at least one of positions of the lock member and the lock target member, and
- arranging the position holding member so that, when the seat body is in the seatable state, the position holding member holds a state in which an engagement portion provided at the lock member and an engagement target portion provided at the lock target member are engaged and in which a clearance is formed between the engagement portion and the engagement target portion, and the position holding member holds a state in which the lock member and the lock target member are not in contact with each other.

* * * * *